United States Patent [19]

McCutchen

[11] Patent Number: 6,141,034
[45] Date of Patent: Oct. 31, 2000

[54] IMMERSIVE IMAGING METHOD AND APPARATUS

[75] Inventor: David McCutchen, Portland, Oreg.

[73] Assignee: Immersive Media Co., Portland, Oreg.

[21] Appl. No.: 08/572,785

[22] Filed: Dec. 15, 1995

[51] Int. Cl.[7] .......................... H04N 7/00; H04N 13/02; H04N 15/00

[52] U.S. Cl. ................................... 348/36; 348/48

[58] Field of Search ................................ 348/36, 38, 39, 348/47–49, 52–4, 42, 51, 135, 139, 169–171, 159, 153–155, 214; 350/502; 352/70; 354/94; 395/119, 125; 386/15, 37, 38, 106

[56] References Cited

U.S. PATENT DOCUMENTS

| | | | |
|---|---|---|---|
| 4,798,448 | 1/1989 | Van Raalte | 350/345 |
| 4,885,878 | 12/1989 | Wuu | 52/6 |
| 4,962,420 | 10/1990 | Judenich | 358/60 |
| 5,023,725 | 6/1991 | McCutchen | 358/231 |
| 5,130,794 | 7/1992 | Ritchey | 358/87 |
| 5,495,576 | 2/1996 | Ritchey | 395/125 |

OTHER PUBLICATIONS

A coding scheme for stereoscopic television sequences, B. Choquet et al.,Image Processing, p188–192, Apr. 7, 1995.

Y.P. Chen, "Landscape Generation: A Changing Perspective" Reprinted From *ESD*, Feb. 1988.

Seos Prodas Spherical Screen Components—Brochure 1995.

Kodak DCS Digital Camera Brochure 1994.

Canon RC–570 Still Video Camera—Brochure 1994.

Nikkor 15mm Lens Picture—From Brochure 1995.

Sagebrush Motorized Gimbals and Mounts—Brochure 1995.

Kenko Wide–Angle Adaptor Lens—Brochure 1994.

Chinon CX–062 Camera Description—Brochure 1994.

Sony Progressive–Scan IC Announcement—1995.

Crystal River Audio Description of Directional Sound—1995.

Lake Audio Directional Sound—Brochure 1995.

Century Precision Optics Wide Angle Lenses Brochure.

Tinsley Precision Optics Overview Brochure (1995).

Zorin + Barr; "Correction of Geometric Perceptual Distortion in Pictures" Siggraph '95 Proceedings (1995).

Veldkamp + McHugh; "Binary Optics" *Scien. Amer.* May 1992 p. 92–7.

Adaptive Optics Assoc. Lenslet Modules Brochure (1993).

Assorted Panoramic Cameras—B+H Catalog (1995).

Sony Betacam SP Recorder BVW–50 Brochure (1995).

Sony Control—L Keypad RM–95 (Xerox).

Steadicam Jr. Camera Mount—B+H Brochure (1996).

JVC GR–DVI DVC Camcorder Brochure (1996).

(List continued on next page.)

*Primary Examiner*—Dang Ton
*Assistant Examiner*—David R. Vincent

[57] ABSTRACT

Improvements in the production means for dodecahedral imaging are described, to define a simple, flexible and efficient strategy for the creation of extremely wide images. Improvements in production technology include lenses and optical mounts that enable automatic alignment of film and video cameras and other imaging devices to cover multiple fields of view equal to one, two or three dodecahedral pentagons. Three double-pentagon formats, X, P and O, are described in detail, the X format producing an even hemispherical division and a full spherical view, and the P format producing simplified coverage of most of a sphere and ease of use for stereoscopic effects, and the O based on the combination of the dodecahedron and the octahedron. A triple-pentagon T format based on the use of the tetrahedron is also described, along with crisscross optics and temporal offset mounts to minimize parallax differences between the separate camera views. Standard cropping mattes for dodecahedral images are given, and compressed storage methods are suggested for a more efficient distribution of dodecahedral images in a variety of media.

25 Claims, 76 Drawing Sheets

OTHER PUBLICATIONS

Kaiser "A New View of The World" (Peters Projection) pp. 4–11.

Hoffner "Digital ATV Arrives—Finally!" TV Technology Dec. 1995, p. 43.

Stephenson "Networked Large Image Archives" Advanced Imaging Jan. 1993 p. 14,16,18.

Sharp XV–P10U Video Projector Brochure (1992).

Sony LCX007AK LCD Panel Announcement (1994).

Cermax Xenon Lamps—Brochure (1995).

Critchley et al. "Picture Quality in Large Screen Projectors Using The Digital Multimirror Devices" S.I.D. 1995 Int'l. Symposium Preprint pp. 1–4.

"Miniature CRT For Virtual Reality" Photonics Spectra Dec. 1994 p. 50,52.

Tektronix SGS60 Stereotek MKII Active Stereoscopic Glasses—Brochure (1992).

Hughes JVC 335s Lightvalve Projector—Brochure (1995).

Sound Advance Speaker Systems—Brochure (1994).

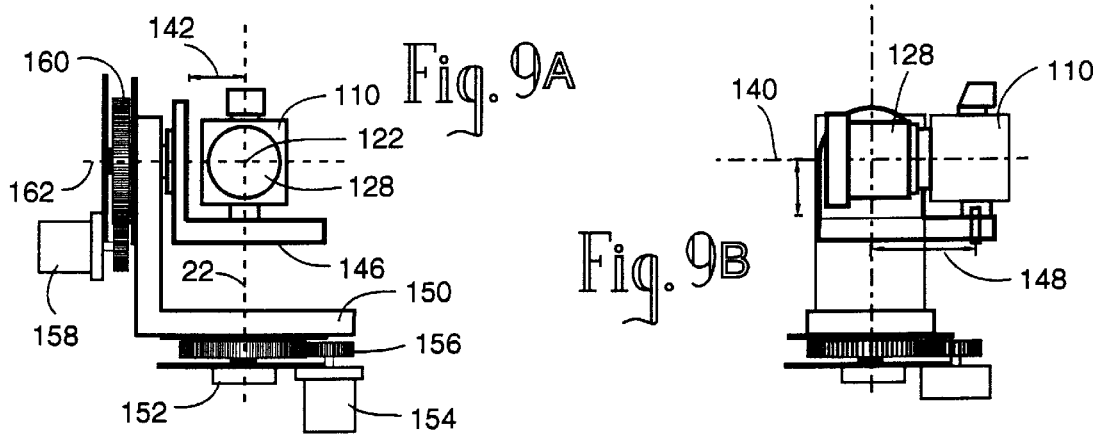
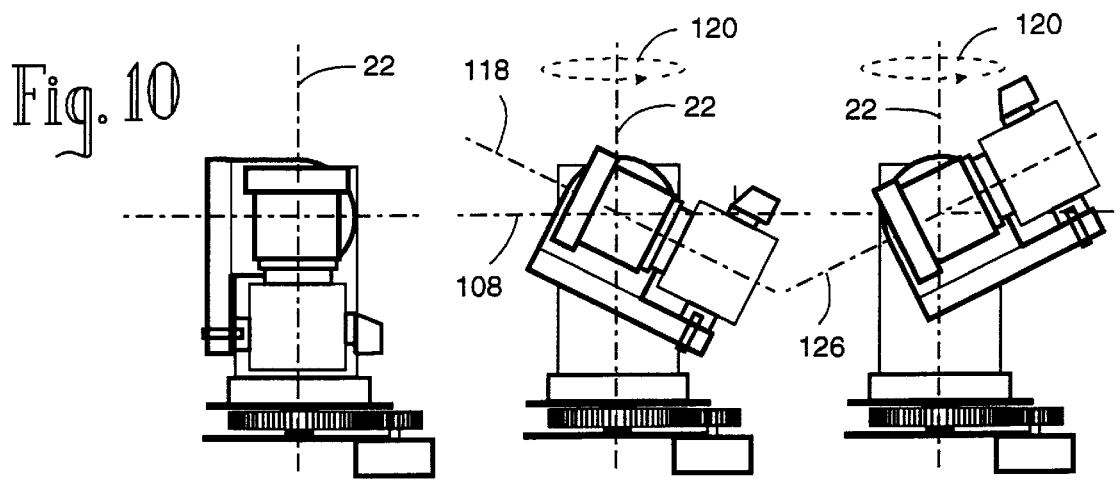
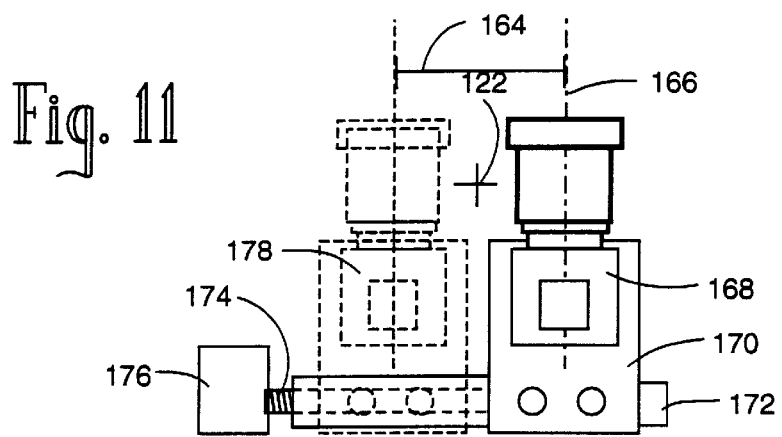

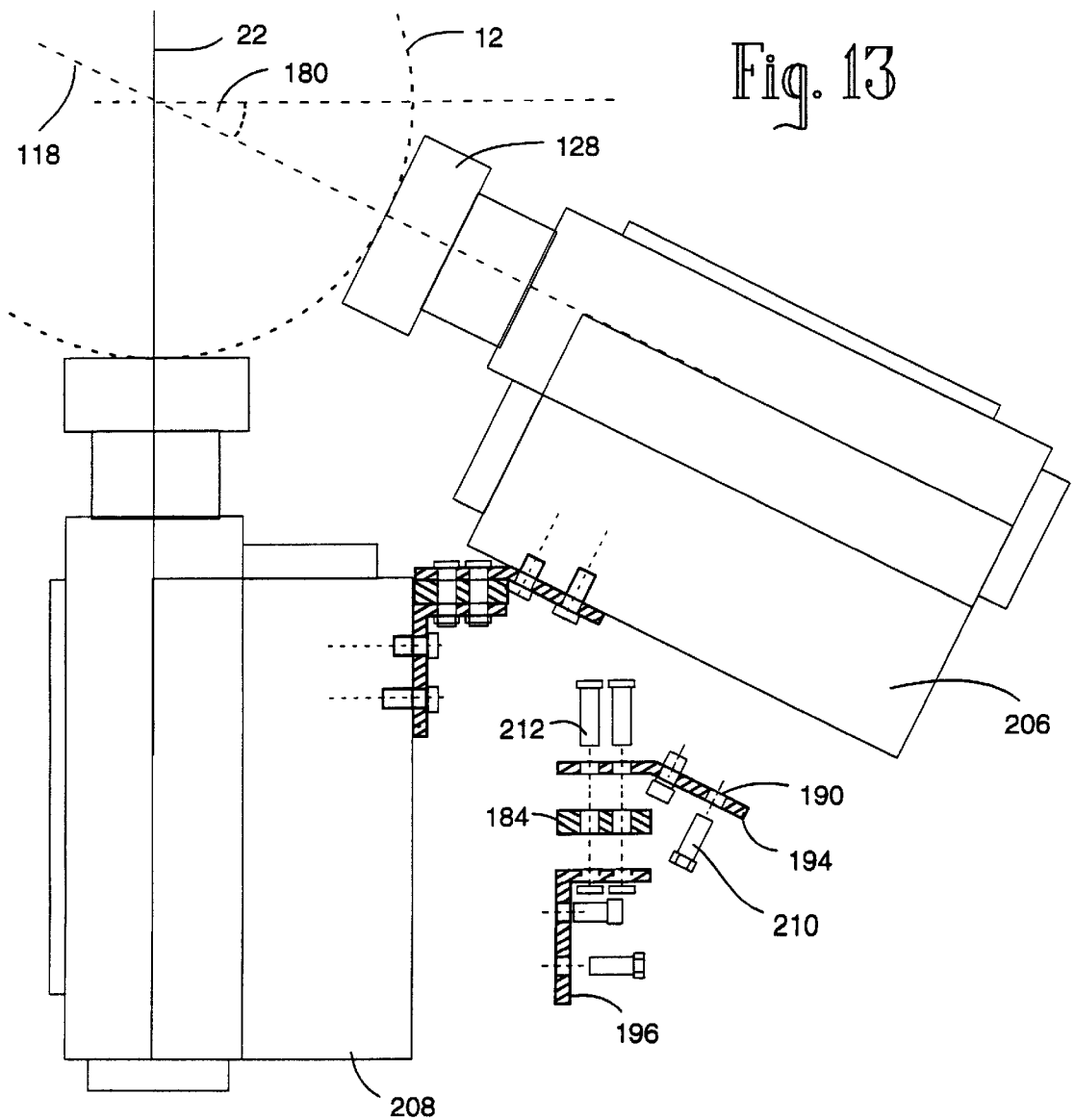

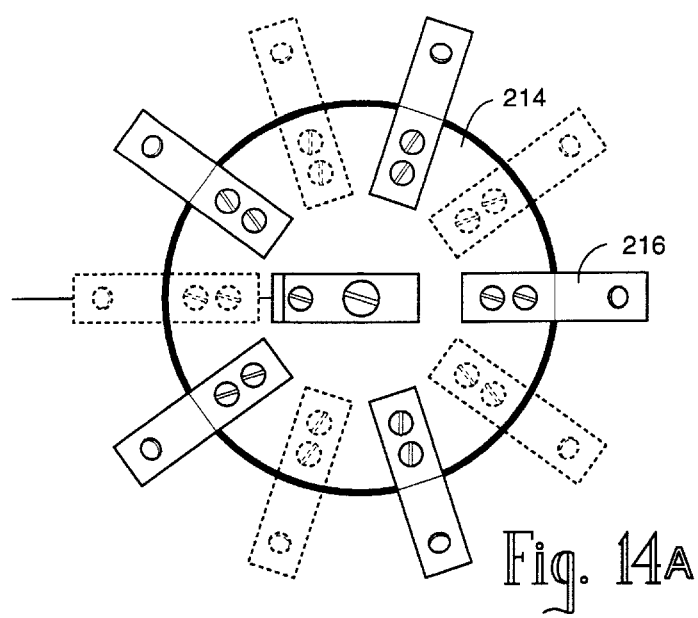
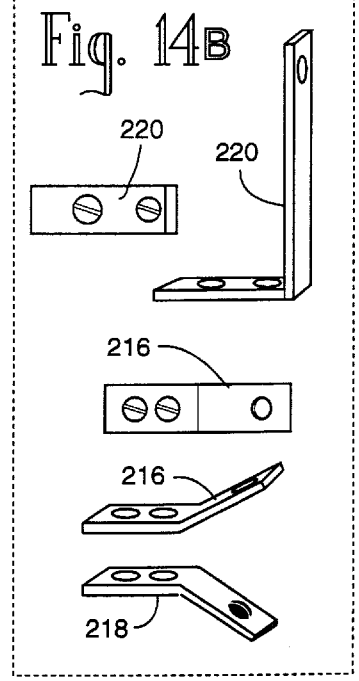
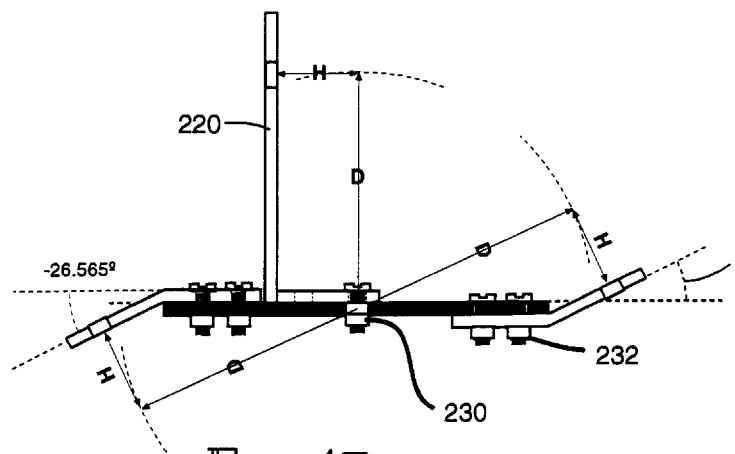
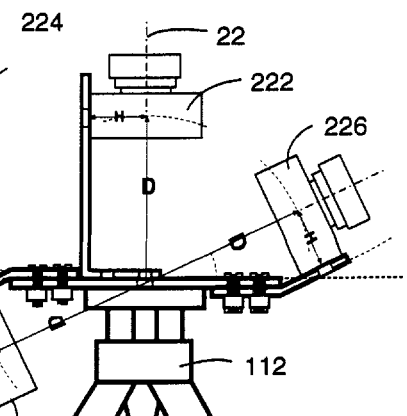

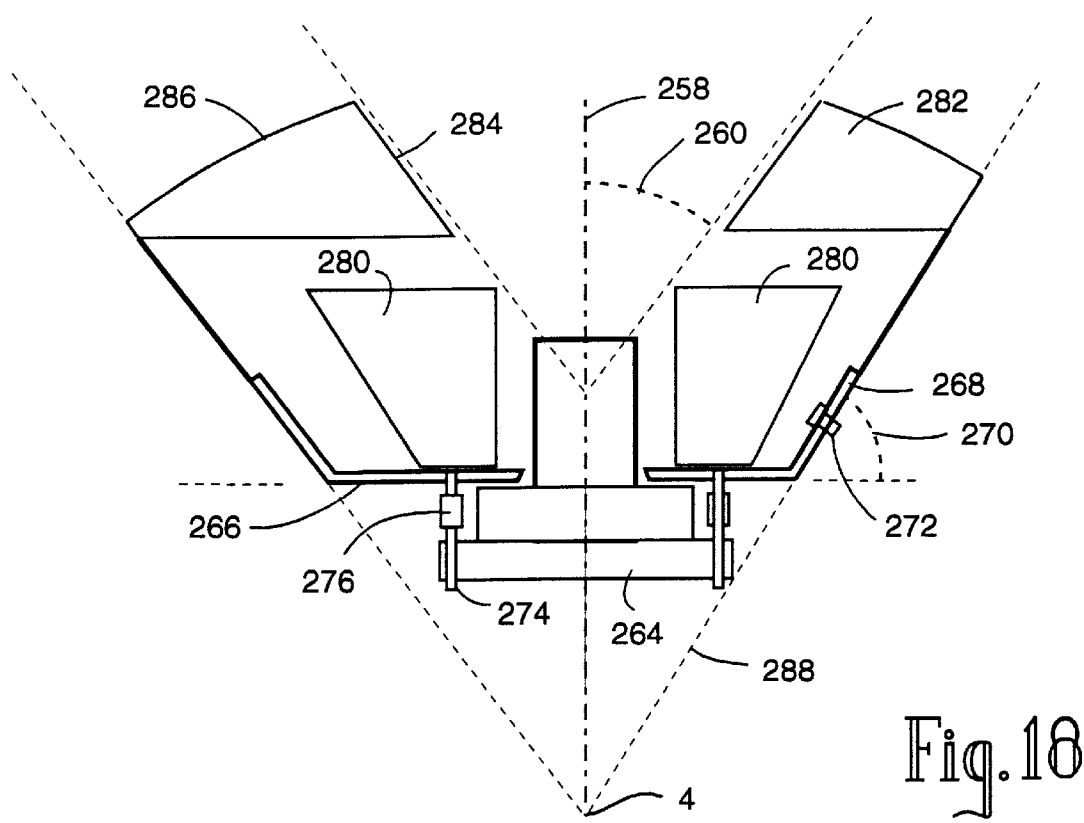
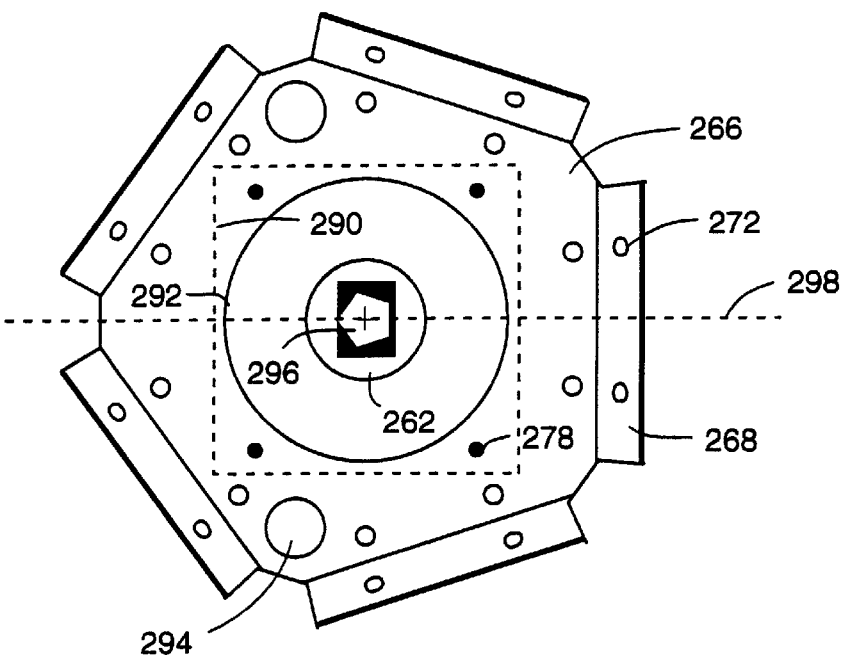

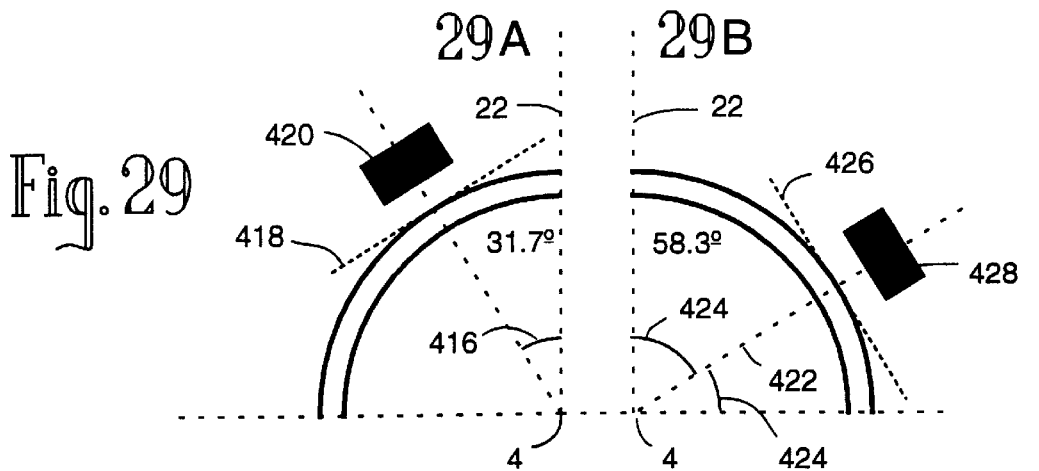
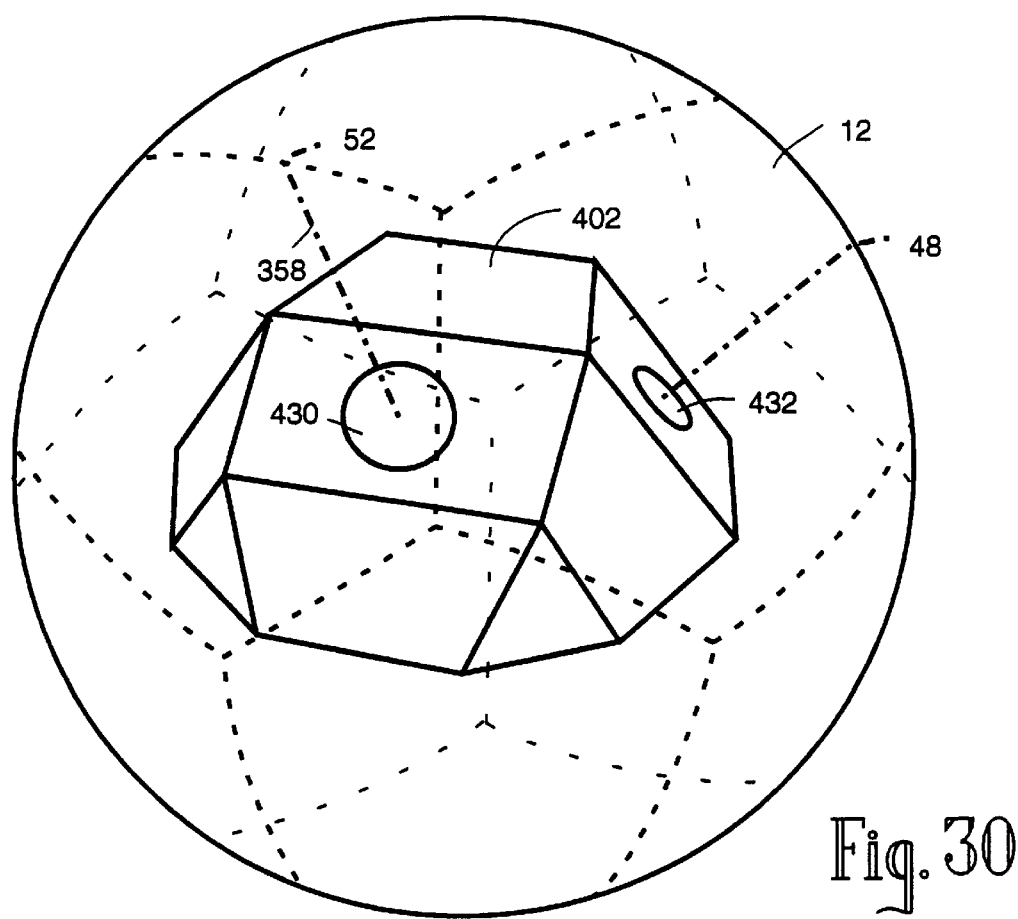

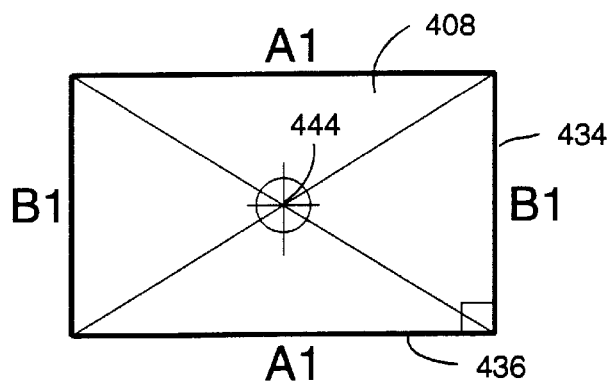
Fig. 31A
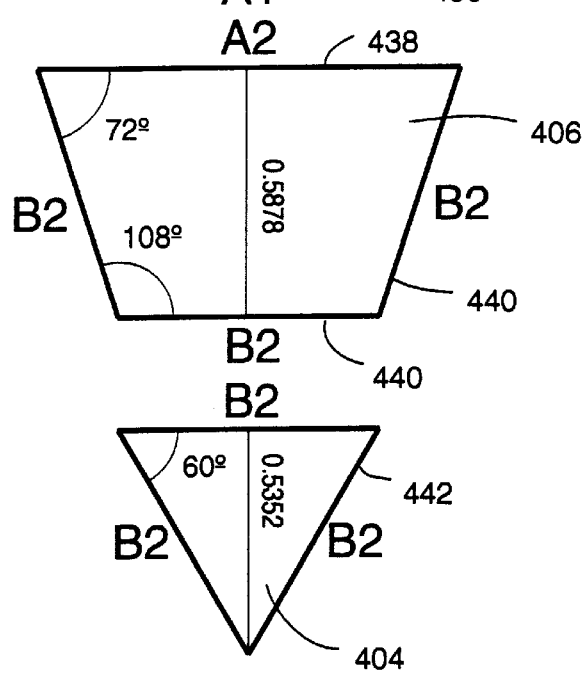
Fig. 31B
Fig. 31C
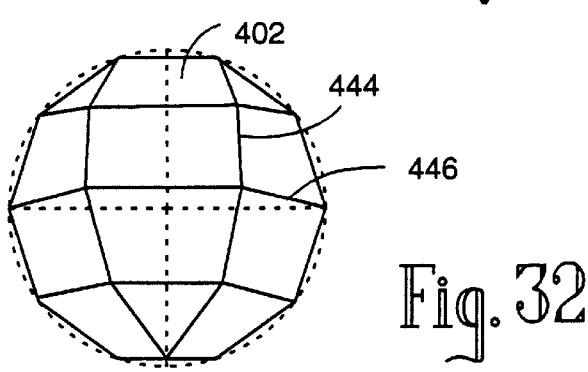
Fig. 32

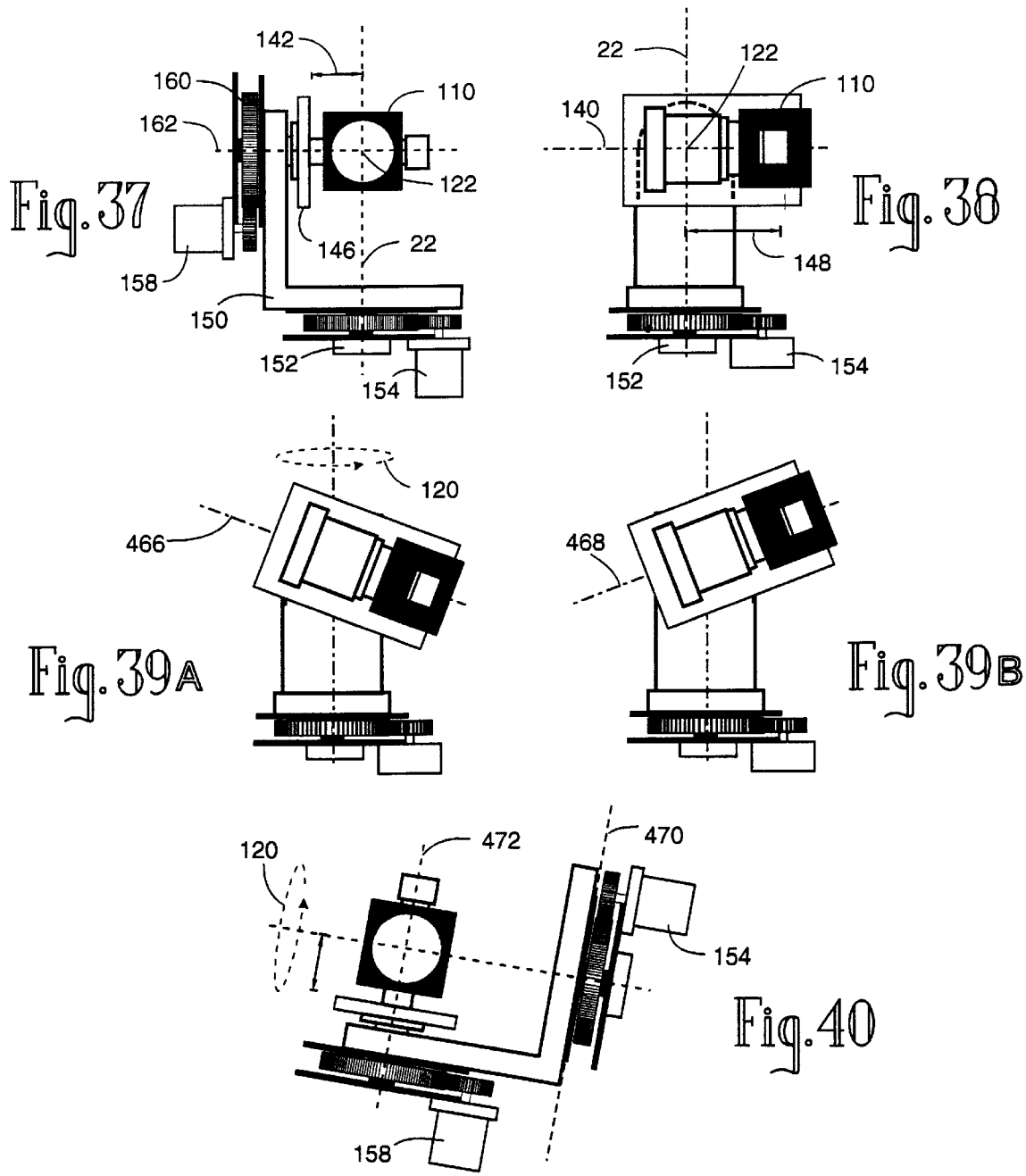

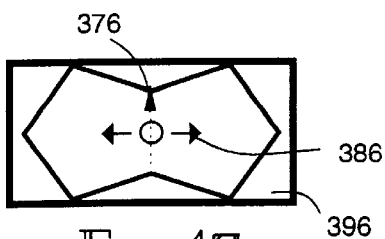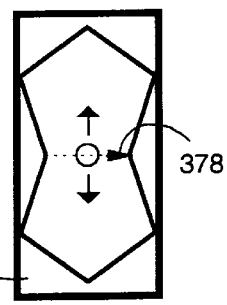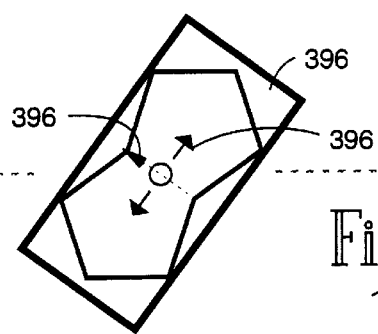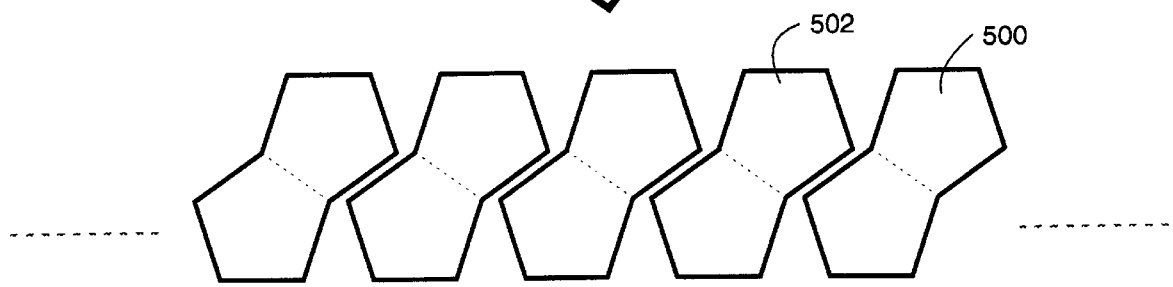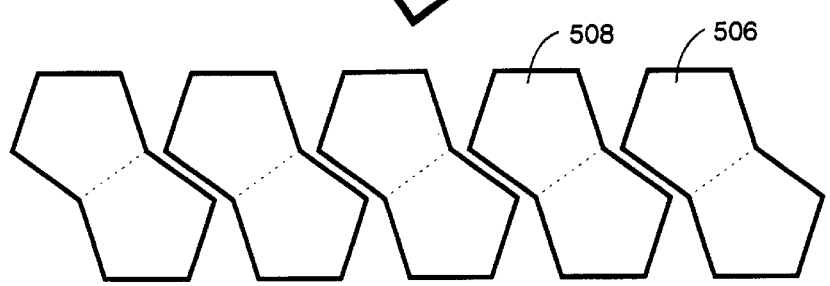

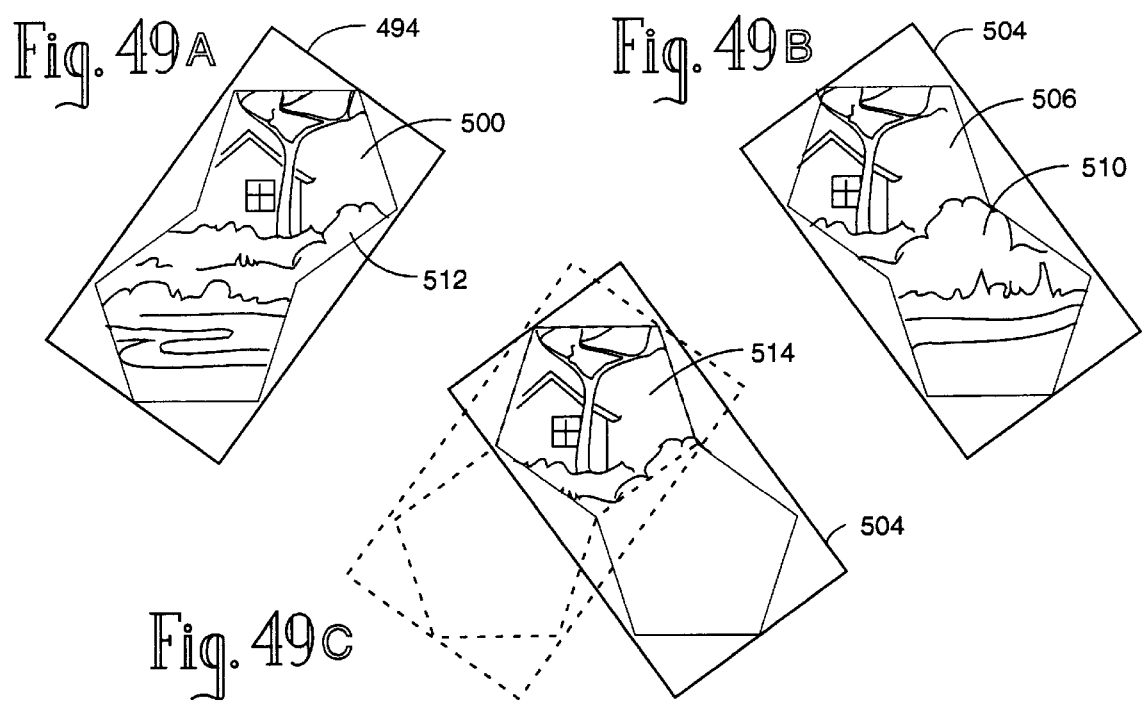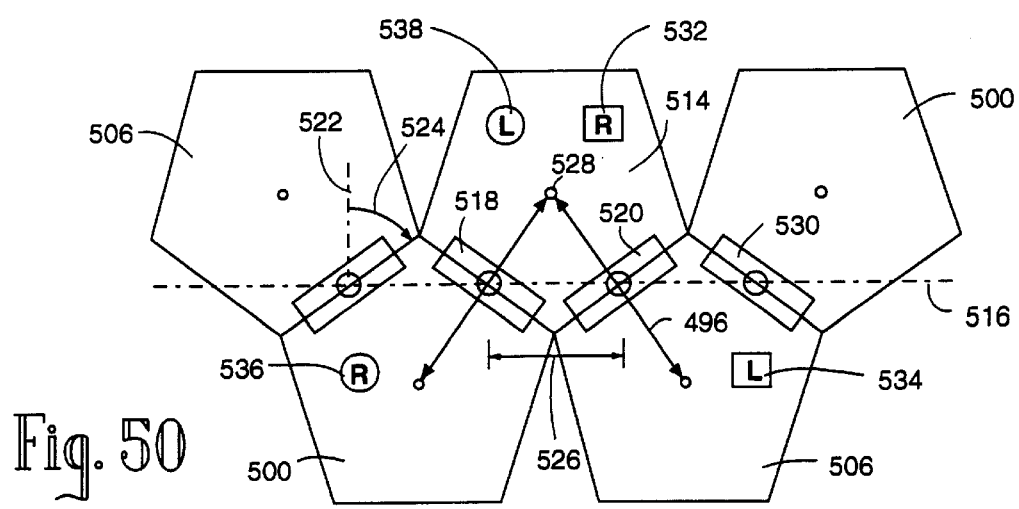

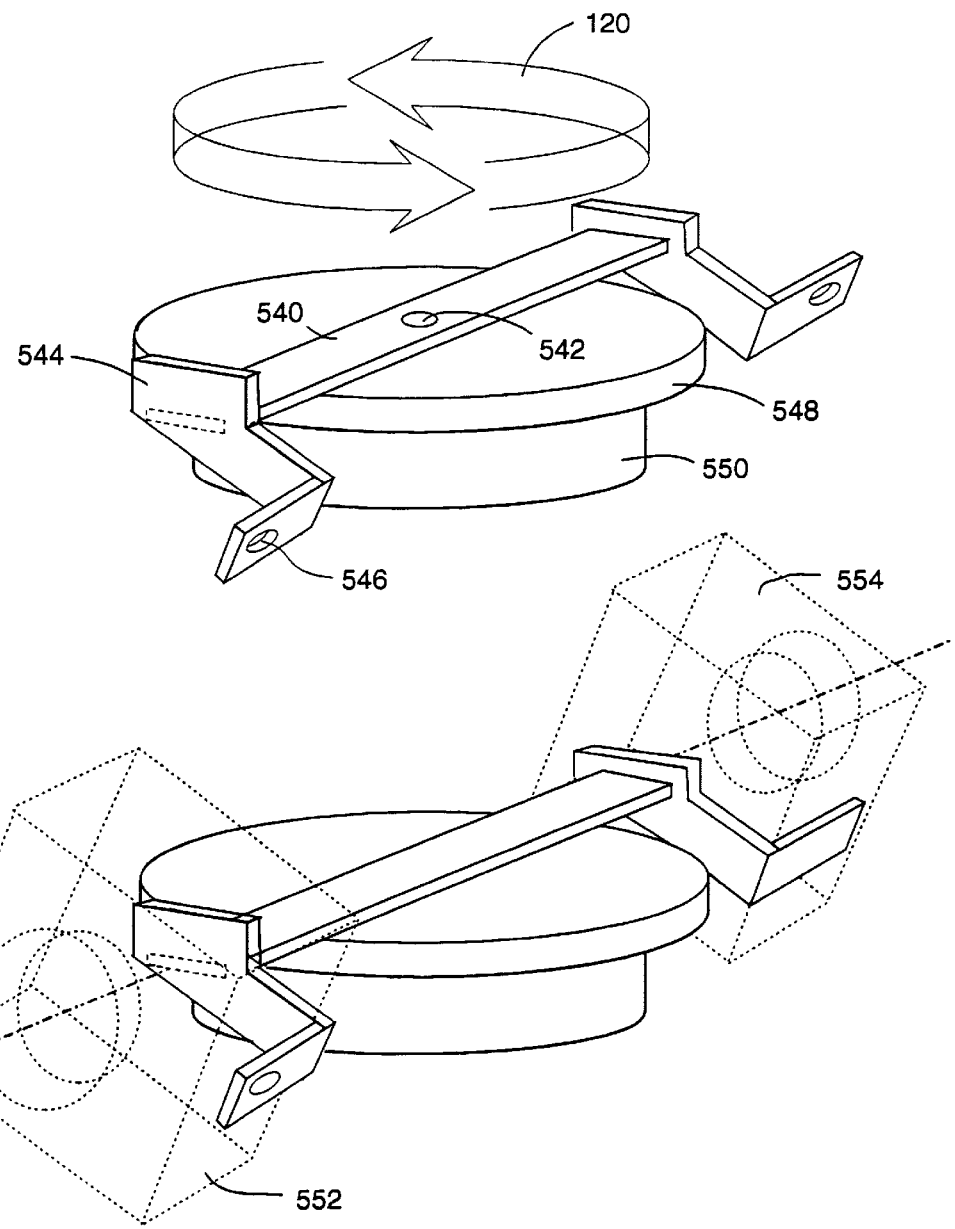

Octa

Pentarama™

Xodox™ -S

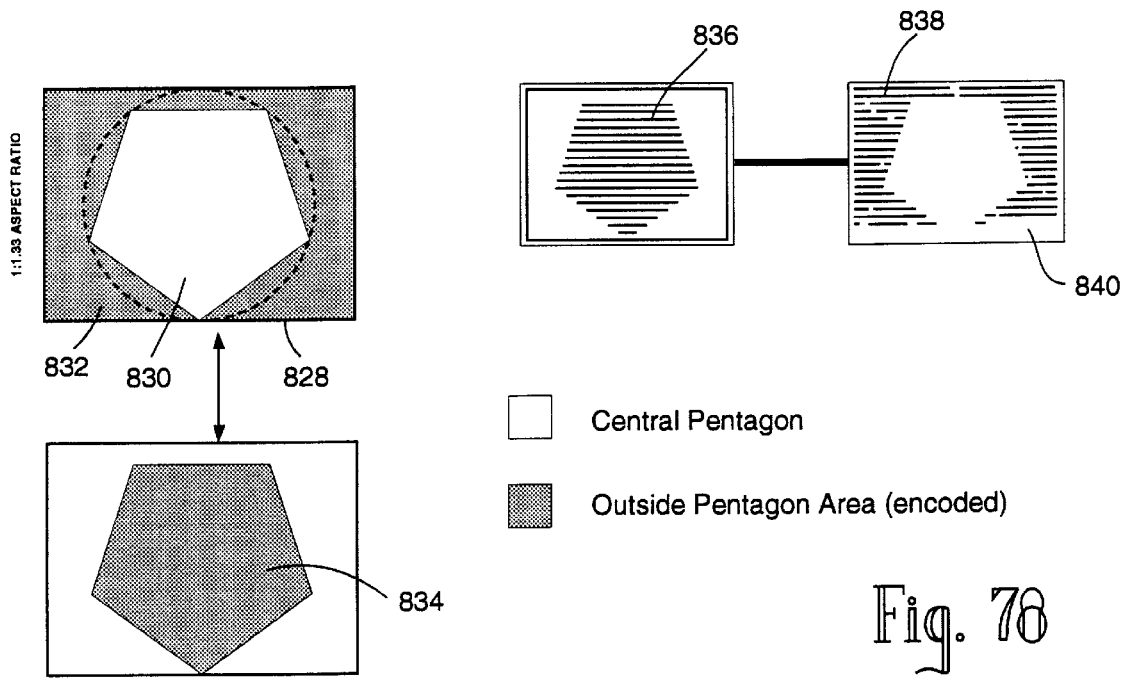
Central Pentagon
Outside Pentagon Area (encoded)
Fig. 78
Fig. 79
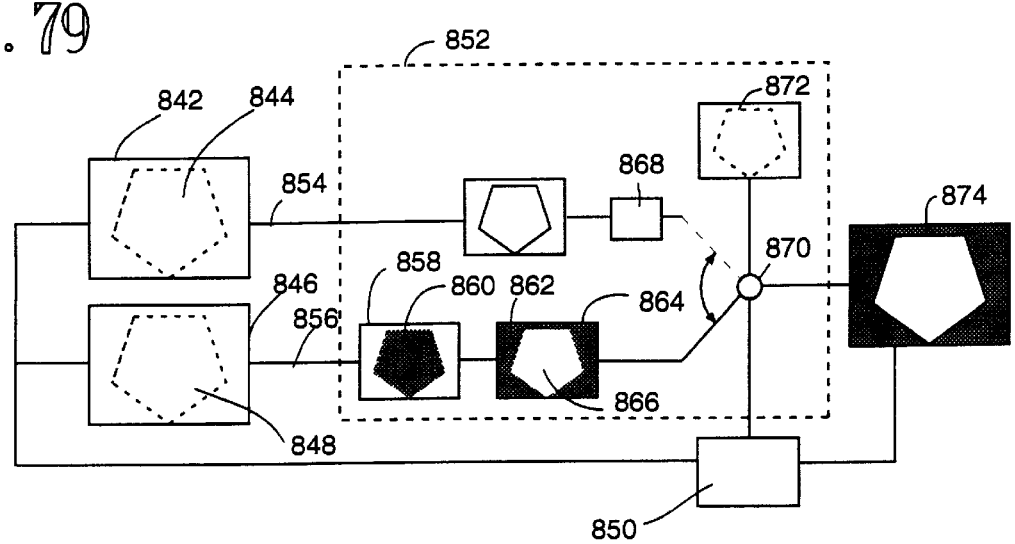

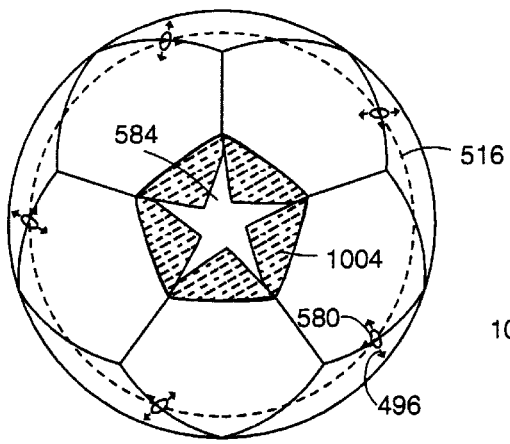
Fig. 93A
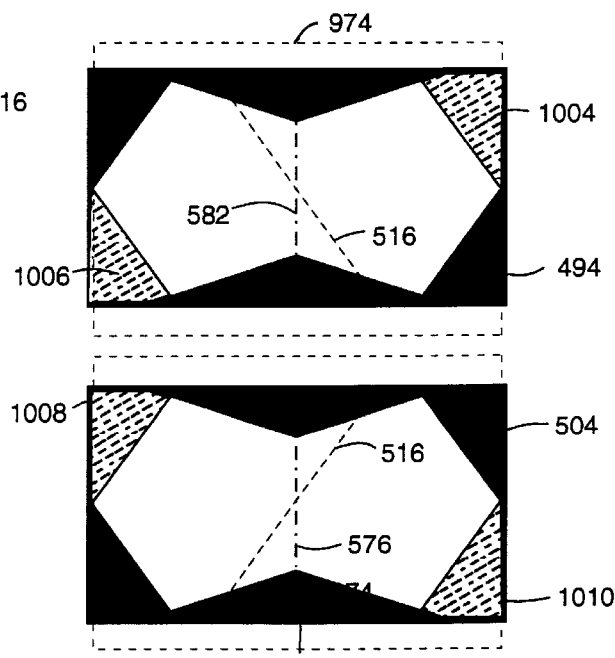
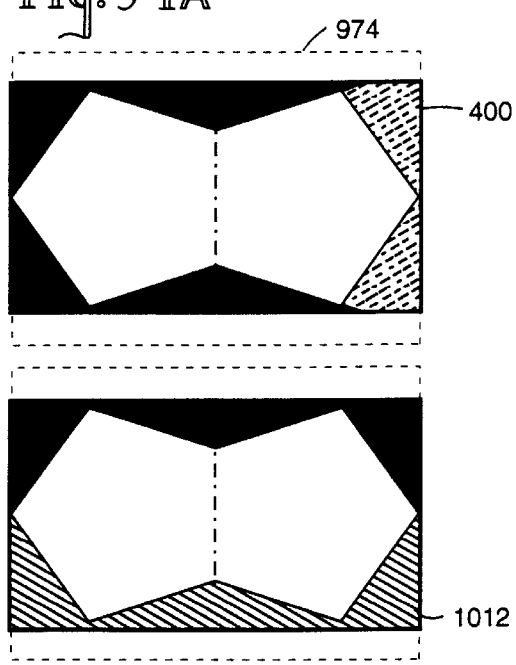
Fig. 94A
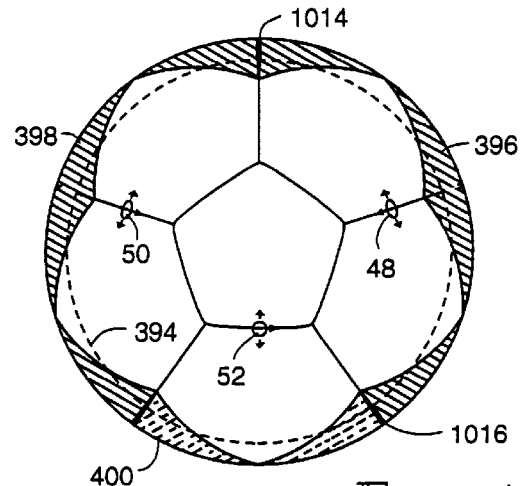
Fig. 94B

Fig. 99
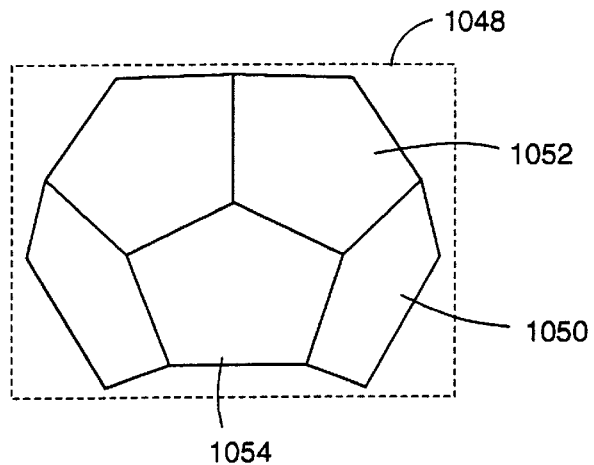
FIVE PENTAGONS IN
4:3 ASPECT RATIO
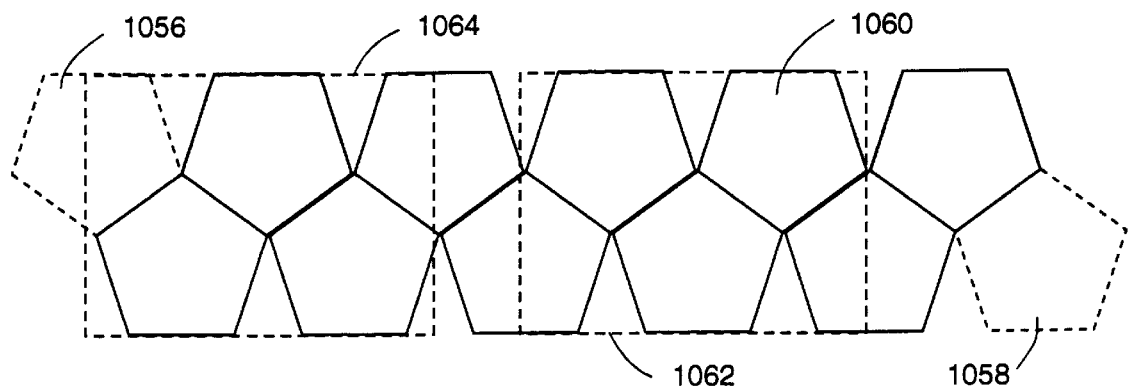
Fig. 100   SEQUENCE OF TEN SPREAD PENTAGONS
WITH MOVABLE 4:3 WINDOW

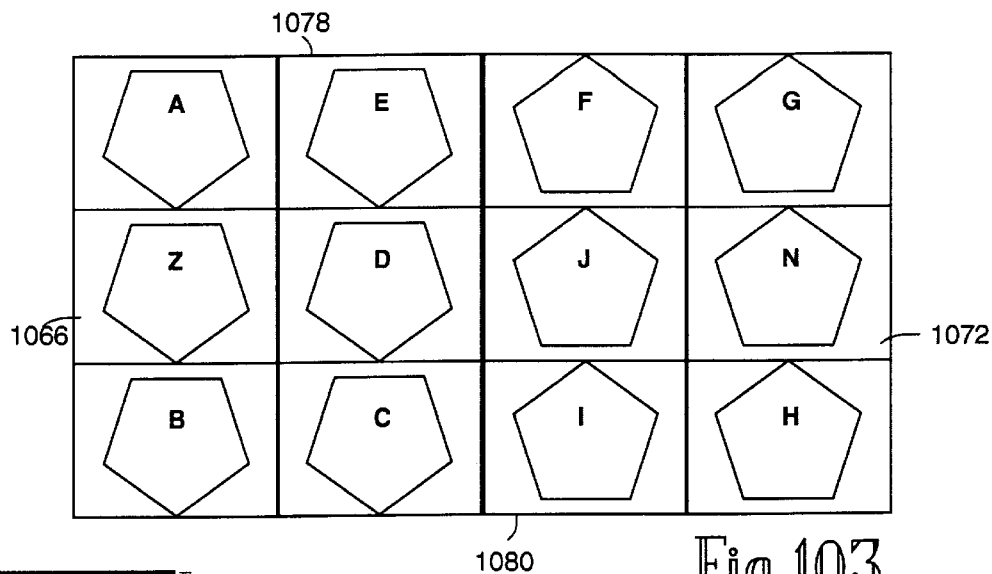
Fig. 103
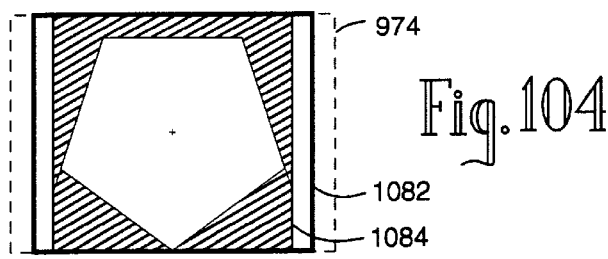
Fig. 104
Fig. 105
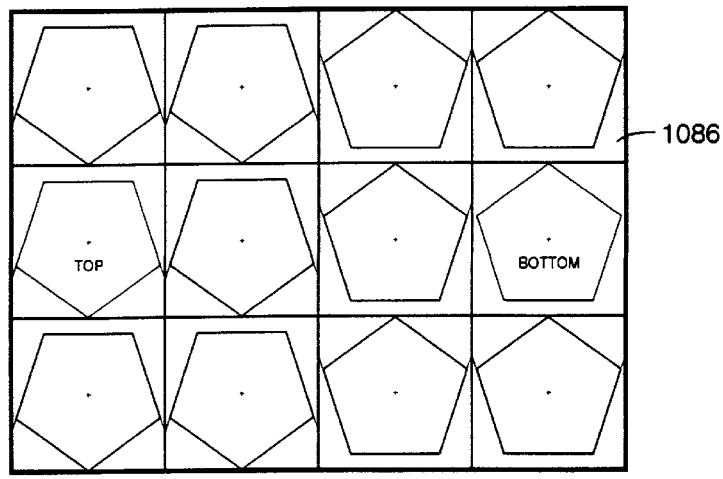

OBLIQUE VIEW

VIEW FROM ABOVE

VIEW FROM BELOW

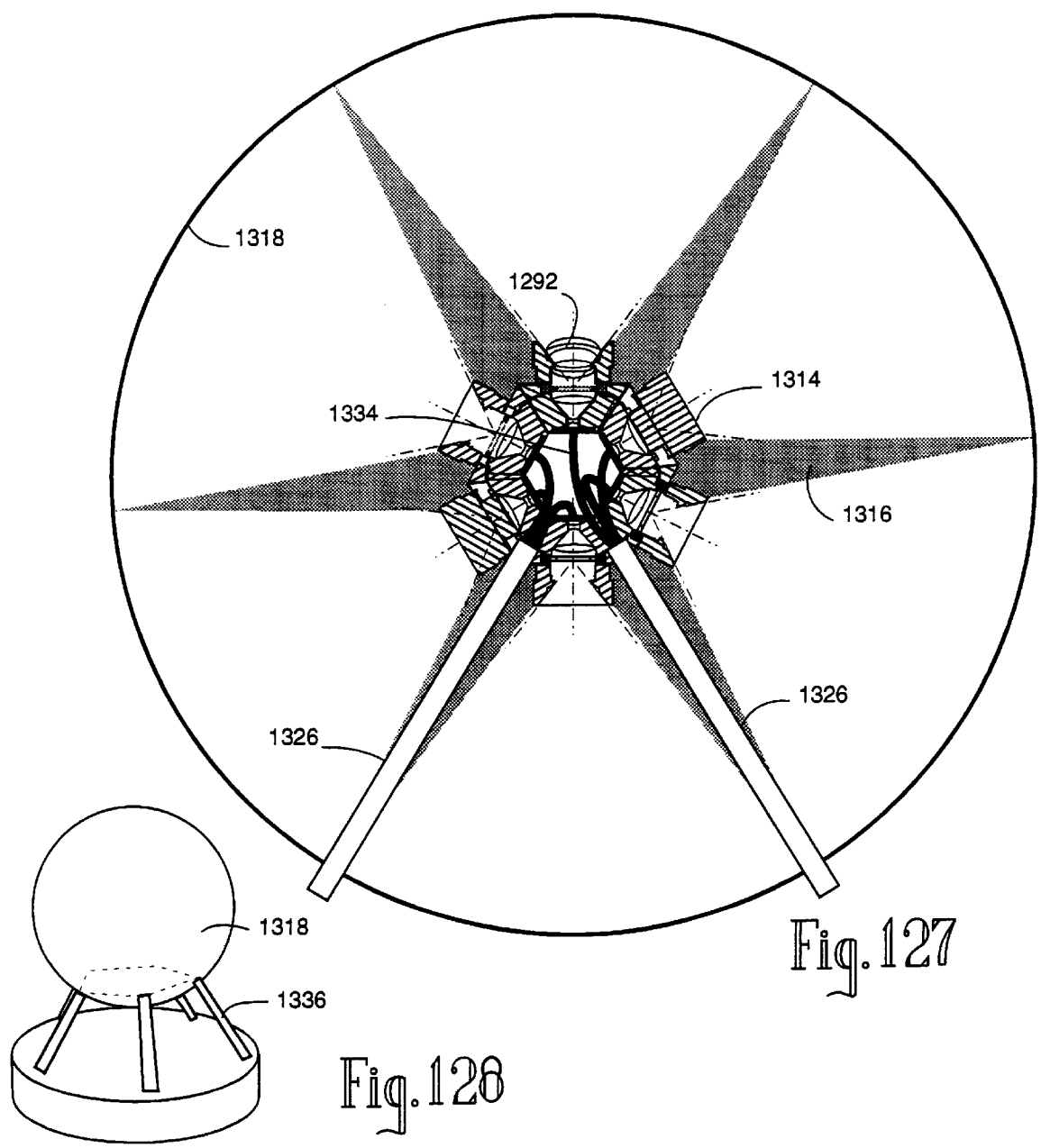

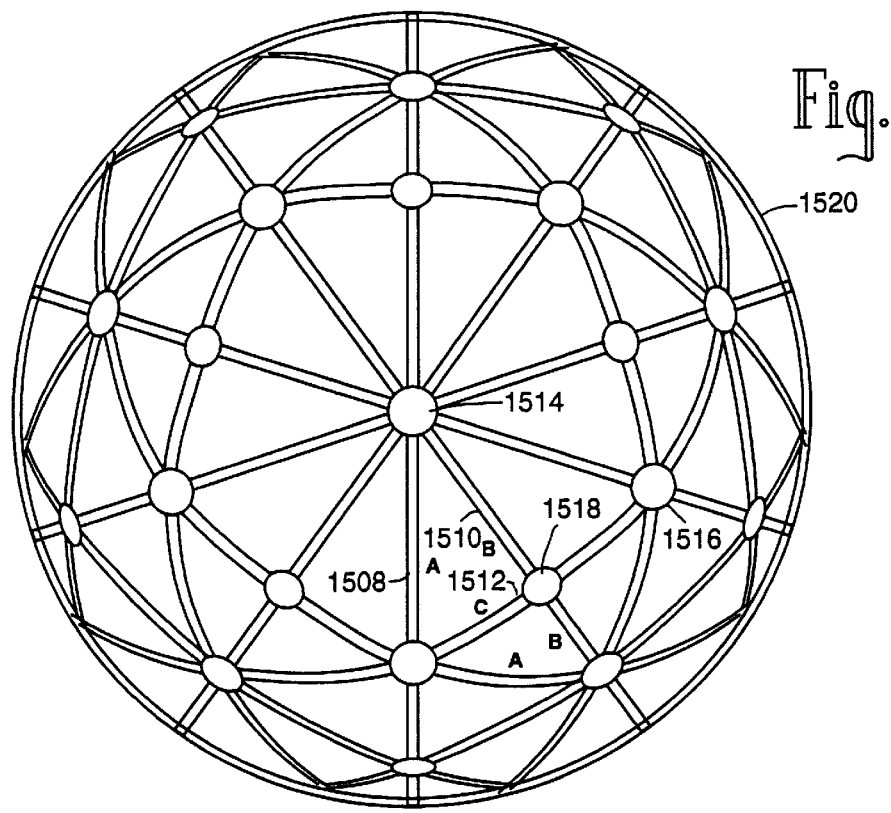
Fig. 139
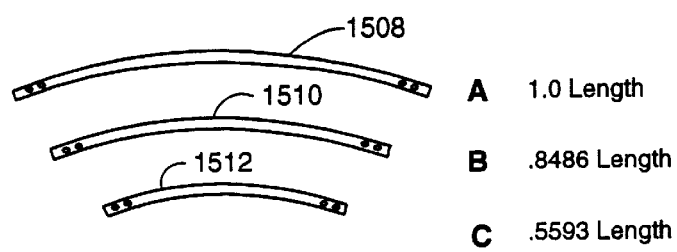
| | | A | 1.0 Length |
| | | B | .8486 Length |
| | | C | .5593 Length |
Fig. 140
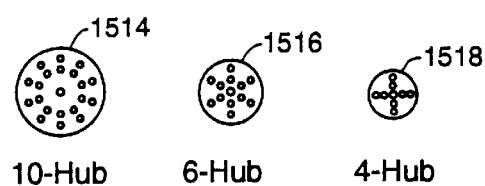
10-Hub  6-Hub  4-Hub

IMMERSIVE IMAGING METHOD AND APPARATUS

BACKGROUND

1. Field of the Invention

This invention relates to panoramic photography systems, and to the creation of images by means other than lenses. It is also related to signal processing devices for composite video recording.

2. Description of the Prior Art

Panoramic photography, to encompass a wider field of view, has been attempted with many systems, both for film and for video cameras. For example, fisheye lenses may be used on cameras to record a hemispherical field of view in a single exposure.

However, to gain greater overall resolution and more control over separate sections of the image, multiple exposures can also be used to create a composite wide-angle image. Many systems of composite image panoramic photography have been attempted. An optimum system would be based upon a simple standard picture shape, with equal edges, and a simple and consistent organization that lends itself to a variety of formats and applications. These qualities are characteristic of the dodecahedral imaging system described in the Applicant's U.S. Pat. No. 5,023,725, "Method and Apparatus for Dodecahedral Imaging System" (European patents pending) here called the Dodeca™ System, and also known as RoundAbout™ Immersive Imaging.

The Dodeca System uses the structure of the pentagonal dodecahedron to determine the angles of view and alignments for both cameras and projectors to produce pentagonal images; by adding together these pentagonal images, one can present a wrap-around spherical image with high resolution, freedom from distortion, and lack of visible seams. By overlapping pentagonal images taken from different points of view, stereoscopic effects can also be produced.

In this earlier patent, camera and projection systems are described based on single-pentagon, dual-pentagon and triple-pentagon views, as well as an electronic viewfinder, consisting of multiple camera views held contiguously in a virtual frame store, and viewed through a mobile viewing window controlled by the operator. The present application gives details and improvements for each of these systems.

Wrap-around computer image displays, whether stereoscopic or not, are found in advanced scientific and technical applications, from designing buildings and molecules to envisioning weather patterns. These displays are especially effective when viewed through a head-mounted display that can track the direction of the gaze of the viewer and react accordingly, giving one the impression of being surrounded by the computer-generated world. This has given rise to a growing number of applications in games and entertainment. These wrap-around stereoscopic environments, usually viewable by head-mounted displays, are usually described under the label of "virtual reality," or simply VR.

These VR displays to date have not included images of the real, photographable world; instead, the environment is entirely artificial, and has to be continuously regenerated in response to the direction of the gaze of the viewer and his or her interactions with it. This typically requires a great deal of expensive computer power, and there is always a lag in response corresponding to the complexity of the illusion being regenerated. A completely realistic computer-generated wraparound environment is a daunting challenge. Almost no computer can approach the complexity and subtlety of the appearance of the real world. The long labors of the most skilled programmers, on the most powerful computers, are needed to approach the level of complexity and subtlety visible in even a simple snapshot.

The lack of an efficient method for bringing wrap-around images of the external world into VR displays has led to a focus on artificially-generated environments, making a scene more difficult to construct and leading to an unconvincing result. To artificially create a stereoscopic, real-looking scene in full motion (30 frames per second), while retaining instant response to the gaze of the viewer in a head-mounted display, is beyond the current state of the art in VR technology.

Attempts at panoramic recording of external scenes for a wrap-around environment have been made for flight simulators, to show the landscape a trainee is flying over. For example, Y. P. Chen, in the magazine ESD for February 1988, reports the recording of a data base of hemispherical images by means of a custom-built array of seven cameras simultaneously exposing portions of the field of view onto 9-inch wide film; the resulting film images were scanned, then electronically color-corrected, and mapped to create a composite fisheye view. These fisheye views are taken in rapid sequence, sufficient to create an impression of motion. However, the images are not all the same size and shape, seven cameras are required for a hemispherical view, the recording medium is not standard, and extensive digital processing of the images is required to make them suitable for display. With a dodecahedral system, on the other hand, all the component images are of the same shape and size, a hemispherical image can be captured with six cameras or less, a standard recording medium such as video is used, and almost no processing of the image other than cropping is required for display.

A NOTE ON TERMINOLOGY

Through computer imaging, a pentagonal image can be generated directly onto film or video, without actually photographing any external physical objects through a lens. However, today the design of such images is still based on the principle of optics in photography and cinematography, commonly using such terms of the art as "lens," "camera," and "field of view," to describe functions within the computer. Similarly, a projector's lens and field of view can be mimicked by a computer creating an image for video projection. For purposes of simplicity in this discussion, no distinction will be drawn between this type of virtual camera and projector and a more traditional physical camera and projector. So it will be understood by those familiar with the art that such terms used here as "optical", "lens" "camera," "projector," and "field of view" refer to generalized means, and could refer to either embodiment. Similarly, the terms "picture" and "image" refer to a recognizable representation of something, regardless of the storage medium.

Currently the divisions between film, video, and digital media are fast disappearing. The Kodak Cineon system, for example, takes motion pictures originated on film, transfers them to digital video for enhancement and the addition of computer-generated effects, and then transfers this composite digital video image back to film. Because of this trans-migration of images across storage media, it will be understood that the images described here, even when they originate on one medium, are not confined to that medium alone. A film image, for example, can be transferred to video, then digitized for distribution on computers.

In this dodecahedral system, recording means such as cameras and reproduction devices such as projectors are complementary, since they share the same dodecahedral optical alignments and angles of view. Therefore, when describing an arrangement of lenses in a dodecahedral camera, it can be seen by one skilled in the art that a similar arrangement of lenses in a complementary projection system is implied as well.

Elements of this application are contained in the Applicant's Disclosure Documents 382,036, filed Sep. 16, 1995; 381,693, filed Jul. 19, 1995; 365,278, filed Nov. 16, 1994; 346,065, filed Jan. 18, 1994, and 309,333, filed May 12, 1992, and are related to the Applicant's pending U.S. patent application Ser. No. 08/445,658 "Dodecahedral Video Viewing System", filed May 22, 1995.

PURPOSES AND ADVANTAGES OF THE PRESENT INVENTION

The present invention comprises improvements in the production means for images designed for the Dodeca System. These improvements form the means for efficient production of images up to the area of a complete sphere, and their inclusion as a convincing picture of the real world in the immersive medium now called virtual reality.

A. It is an object of the present invention to provide improved camera mounts for sequential still panoramic photography. The advantages of the mounts according to the present invention are that: (1) parallax is eliminated from among the different views taken with the mount, unlike the prior art, particularly McCutchen (U.S. Pat. No. 5,023,795 (1991)); (2) a lightweight, portable, and inexpensive form of the mounts can be made for use with a common quick-release tripod; and (3) greater speed and accuracy in still panoramic photography than is possible under the prior art is provided by a motorized form of the mounts according to the present invention.

B. It is also an object of this invention to provide means for creating 3-D effects in panoramic photography. A motion control connected to the camera mounts creates offset images for stereoscopic effects. This plus the improved camera alignment process of the present invention is a significant improvement in 3-D panoramic photography over prior art, particularly McCutchen.

C. It is also an object of this invention to allow larger cameras to be used in a simultaneous multi-camera array for panoramic photography than are possible with the outward-facing array of McCutchen, while at the same time maintaining a minimum parallax distance between individual lenses. An inward-facing array of cameras, pointing toward the center of the dodecahedron, permits the use of very large cameras for panoramic photography, whether still or motion.

D. It is also an object of this invention to provide simple camera mounts to permit more varieties of off-the-shelf cameras to be used in a simultaneous multi-camera array for panoramic photography. The modular camera mounts of this invention can accommodate cameras such as high-resolution professional still cameras and commonly available industrial small video cameras, which is not possible with prior art camera mounts.

E. It is also an object of this invention to provide a method for full recording of a spherical view with a reduced number of components in a manner that also allows for easy division into hemispheres for use in dome theaters or other applications that require only half of a spherical view. The use of double-pentagon segments reduces the components required, and the structure of the camera mounts is especially simplified to allow for greater accuracy and ease in manufacture. This method, called the X format, uses a particular set of six alignment points, and is not found in the prior art.

F. It is also an object of this invention to provide a method for efficient recording of a panoramic view with optional stereoscopic overlap throughout. By making use of tilted double pentagon segments in a horizontal sequence, most of a spherical view, excluding only the very top and bottom, can be recorded with only five images, and the arrangement of the camera mounts is especially simple because the optical axes lie in a single plane, and represent a simple rotation of equal increments around a central point. The addition of five other images taken at intermediate positions adds stereoscopic overlap to the entire view. This method, the P format, uses a total of ten possible alignment points, and is superior to prior art methods in that it provides a way to use dodecahedral geometry to improve the recording of a horizontal panoramic sequence.

G. It is also an object of this invention to describe a method for full-sphere double-pentagon recording which also provides an improved way to create stereoscopic overlap throughout the image. This method, the O format, is unlike the prior art in that it utilizes a set of six alignment points on the dodecahedron determined by the vertices of a concentric octahedron. By utilizing an O format camera mount, a simple rotation creates a stereoscopic overlap for up to an entire sphere at once.

H. It is also an object of this invention to provide improved camera mounts for high resolution panoramic photography by using cameras each of which has a field of view covering three pentagons. Using a tetrahedon to determine camera alignment allows more efficient recording of a full-sphere image with fewer components than is possible under McCutchen, and also allows full-sphere stereoscopic photography for 3-D effects. This too is a significant improvement over McCutchen and all prior art.

I. It is also an object of this invention to eliminate parallax separations between camera images in a multi-camera array. This purpose is achieved by an optical mount aligned such that there are crossing optical paths among multiple divided lenses, with the nodal points being located near a common center. The advantage of the present invention over McCutchen and the prior art is the ability to use larger and higher quality cameras in a closely-packed camera array while simultaneously minimizing any parallax differences between them.

J. It is also an object of this invention to eliminate parallax differences between the cameras in a multi-camera array. Multiple cameras, of almost any size, may, through the present invention, seem to be taking their pictures from the same point in space. This object is achieved through the use of one-frame increments of distance determined by a given rate of movement of the camera array. This has been an unsolved problem in the art.

K. It is also an object of this invention to provide an easily adjustable camera mount which can be rapidly aligned as required by the X, P, and O formats for double pentagon fields of view.

Recording Means

L. It is also an object of this invention to provide mobile and stationary field recording equipment especially suited for the recording of nearly spherical views. This equipment is designed to remain invisible to the camera array despite its extremely wide field of view.

M. It is also an object of this invention to provide improved means for recording and playback of up to three pentagonal views on one video recorder. Using the image processors of the present invention, image compression is not necessary, and recording and playback can be done without significant loss of image information.

Postproduction Means

N. It is also an object of this invention to provide means for rapid comparison of pentagonal views, in order to test their alignment for use in a composite image. Improved video switcher functions perform the necessary image manipulations in a minimum number of steps.

Cropping and Storage Template Means

O. It is also an object of this invention to provide correction of common forms of image distortion and variation in camera lenses while preserving essential pentagonal image information. This extends the range of usable optical components beyond what is described in the prior art.

P. It is also an object of this invention to provide optimum arrangement of spherical image information for transmission and reproduction. By the use of special encoding maps for each of the various pentagonal formats, essential image information is preserved with a minimum of distortion and loss.

Q. It is also an object of this invention to provide for the generation of effective stereographic image displays. A separation and overlap process for double-pentagon views yields the proper right-eye and left-eye views with a preset series of steps.

Virtual Viewing Means

R. It is also an object of this invention to provide for rapid generation of a region of interest from within a virtual spherical image originally made up of multiple pentagonal segments. The amount of information required is reduced because of the selection process that is undertaken before the window of interest is generated.

Projector Means

S. It is also an object of this invention to provide inexpensive and compact slide projectors for projecting spherical images in either single or double-pentagon formats. This enables an efficient way to make use of high-resolution dodecahedral still photography recorded on film.

T. It is also an object of this invention to provide for the projected display of up to an entire spherical image at once through a modular global video projector with a fiber optic remote light source. The use of this light source offers both higher brightness and less heat in the display of a global video image.

U. It is also an object of this invention to provide for enhanced resolution in a global projector through the use of a Digital Multimirror Device (DMD). Use of a new form of projection module design produces higher resolution and image stability in the projected image, to aid in creating a seamless composite projection.

V. It is also an object of this invention to provide for creation of a nearly complete spherical television image viewable from outside on a spherical screen. The use of a central pentagonal image projector with special supports maximizes the area of the projected image to nearly an entire sphere without any cast shadows.

W. It is also an object of this invention to provide alternate forms of projection in dodecahedral dome theaters. By using peripheral projectors, off-axis lenses and mirror mounts, more forms of commercially available projectors can be used, while at the same time increasing the available audience space within the dome theater.

Screen Means

X. It is also an object of this invention to provide a lightweight dome screen consisting of a suspended folding geodesic curtain, suitable for the display of one or more pentagonal images up to an area of a hemisphere or more. This screen can be retracted to free up floor space when not in use.

Y. It is also an object of this invention to provide an easily assembled modular screen for a dome theater. This screen is made up of a simple modular framework covered by standardized spherical screen sections, with provision for attachment of speakers to the screen sections for vivid sound playback within the assembled dome theater.

Other objects, advantages and novel features of the present invention will become apparent from the following detailed description of the invention when considered in conjunction with the accompanying drawings.

These improvements in production means include:

CAMERA AND OTHER IMAGING MEANS

A. Simple optical mounts suitable for aligning common film or video cameras and projectors, for either still or motion pictures, to cover individual portions of a spherical field of view equal to a single dodecahedral pentagon.

B. A simple modular design for an optical mount for aligning common film or video cameras and projectors, for either still or motion pictures, to cover individual portions of a spherical field of view equal to two dodecahedral pentagons, with three such views forming a hemispherical image, and six a complete sphere.

C. Designs for a second type of double-pentagon optical mount, utilizing tilted double-pentagon views and optical axes in a single plane, capable of covering almost all of a spherical view. This arrangement offers panoramic coverage of most of a spherical view with a minimum number of cameras, and provision for easily recording such a view stereoscopically.

D. Designs for a third type of double-pentagon mount, wherein six double-pentagon images form a sphere, and the optical axes are aligned to the edges of a dodecahedron at the points of an octahedron.

E. Designs for a type of triple-pentagon mount, wherein the optical axes are aligned to the vertices of a dodecahedron that are also at the points of an tetrahedron, including provision for an offset position of this mount for stereoscopic imaging.

F. Designs for an optical mount with a criss cross lens mount, with provision for the use of multiple divided lenses with the nodal points located at a common center, to eliminate parallax separations between camera images.

G. A temporal offset mount for eliminating parallax differences through the use of one-frame increments of distance according to a given rate of movement.

H. A multi-purpose camera mount capable of being clicked to the set degrees of rotation used with the most common double-pentagon format variations.

Further related improvements will also be described for recording means, postproduction means, cropping and storage template means, as well as various display means, including virtual viewing means, projector means, and screen means, which will be covered by further continuations-in-part with new sets of claims related to this application.

Other objects, advantages and novel features of the present invention will become apparent from the following detailed description of the invention when considered in conjunction with the accompanying drawings.

BRIEF DESCRIPTION OF THE DRAWINGS

INTRODUCTION TO THE DODECAHEDRON

Figure 1:
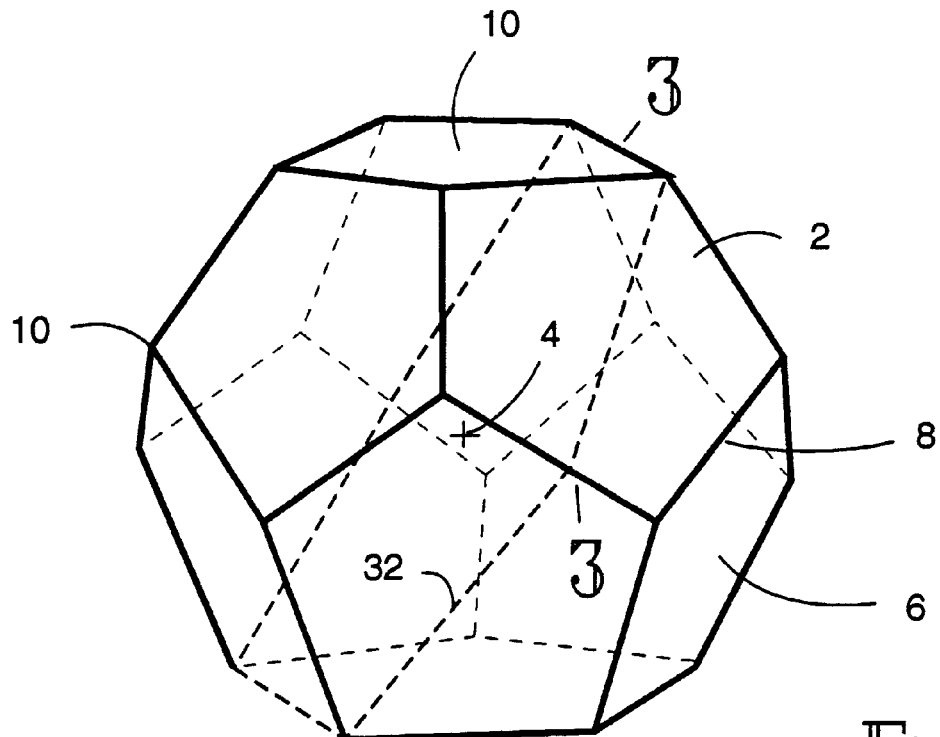

FIG. 1: Perspective view of a concentric dodecahedron.

Figure 2:
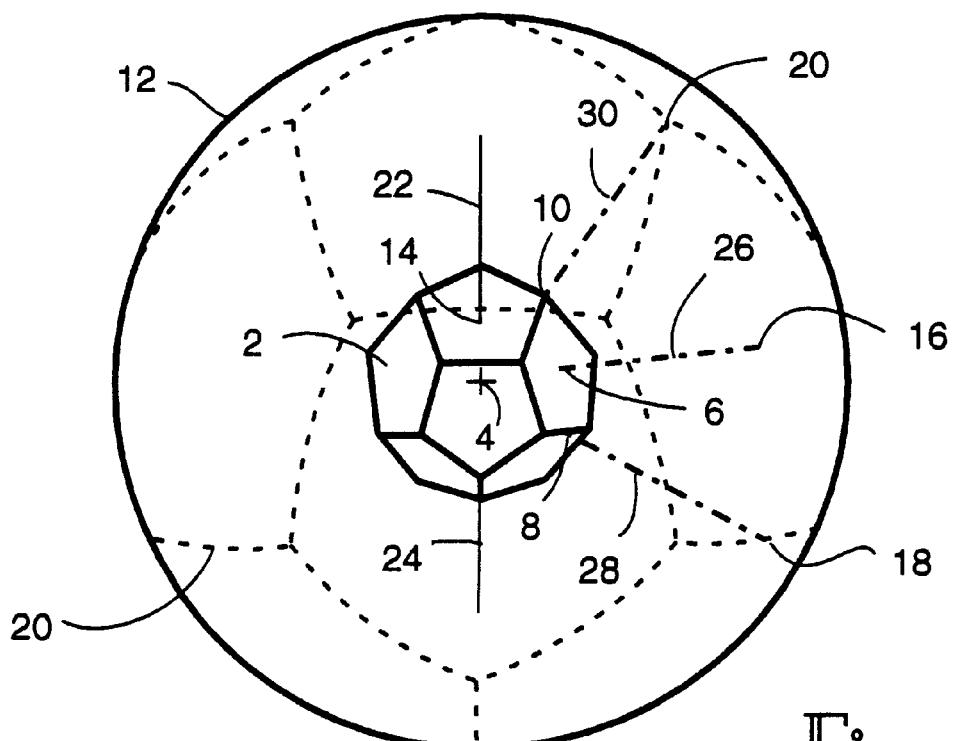

FIG. 2: Perspective view of the subdivision of a spherical field of view by the projection of a concentric dodecahedron.

Figure 3:
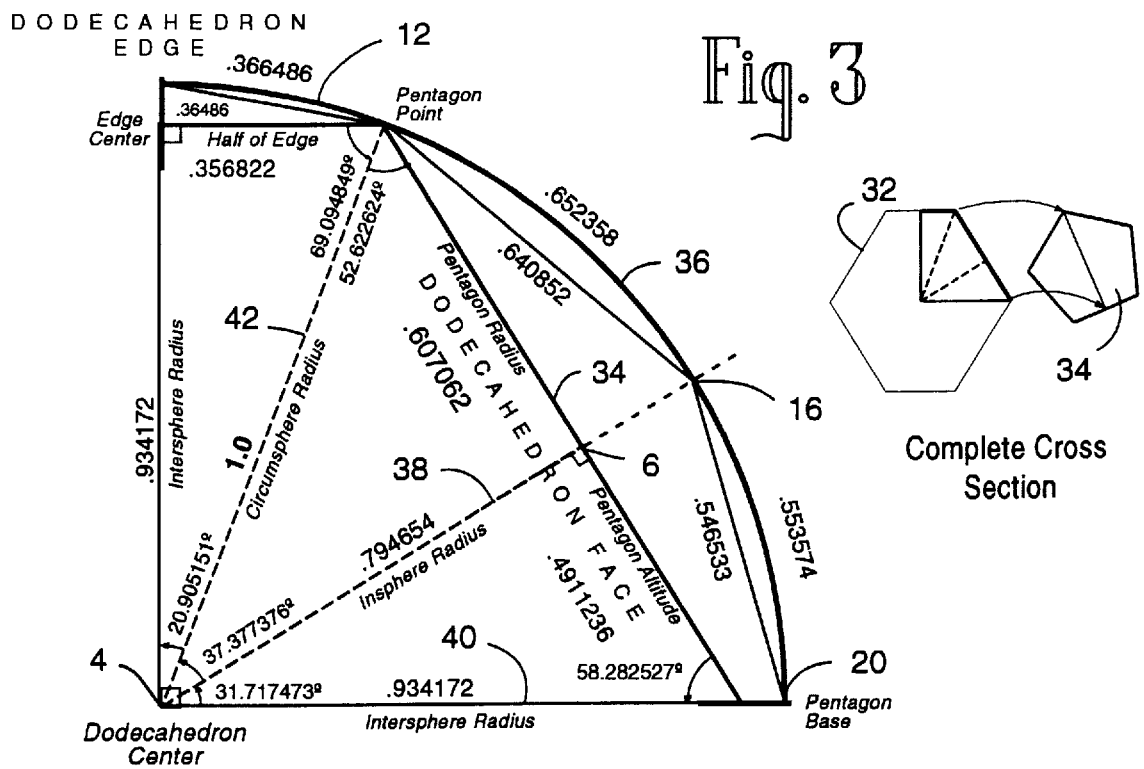

FIG. 3: Cross section of a quarter dodecahedron within a concentric sphere, showing its components, angles and length ratios.

Figure 4:
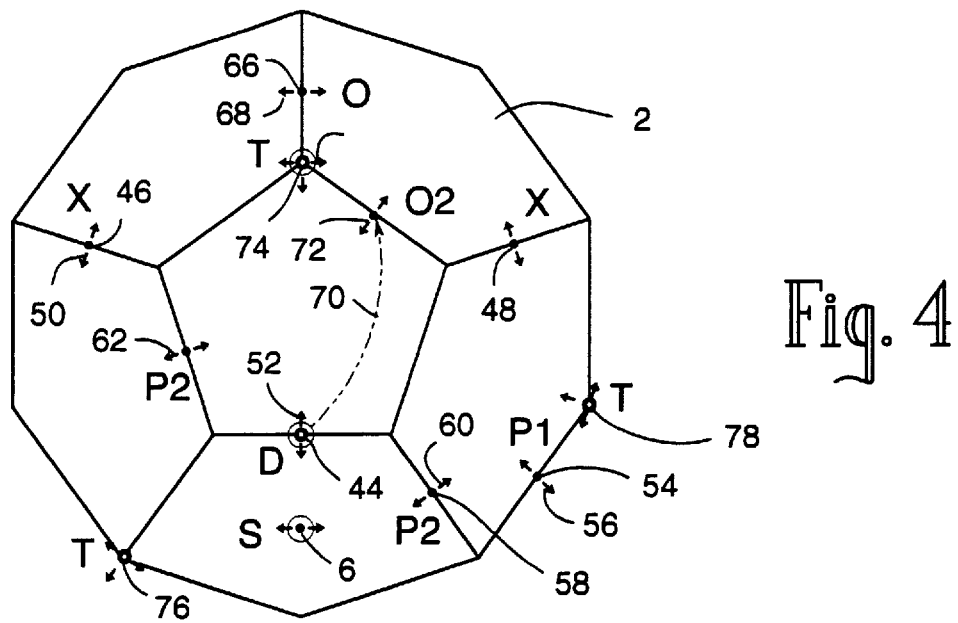

FIG. 4: Top view of a dodecahedron, summarizing the various alignment points used by the dodecahedral formats to be described.

IMAGING MEANS

SINGLE PENTAGON FORMAT

Figure 5:
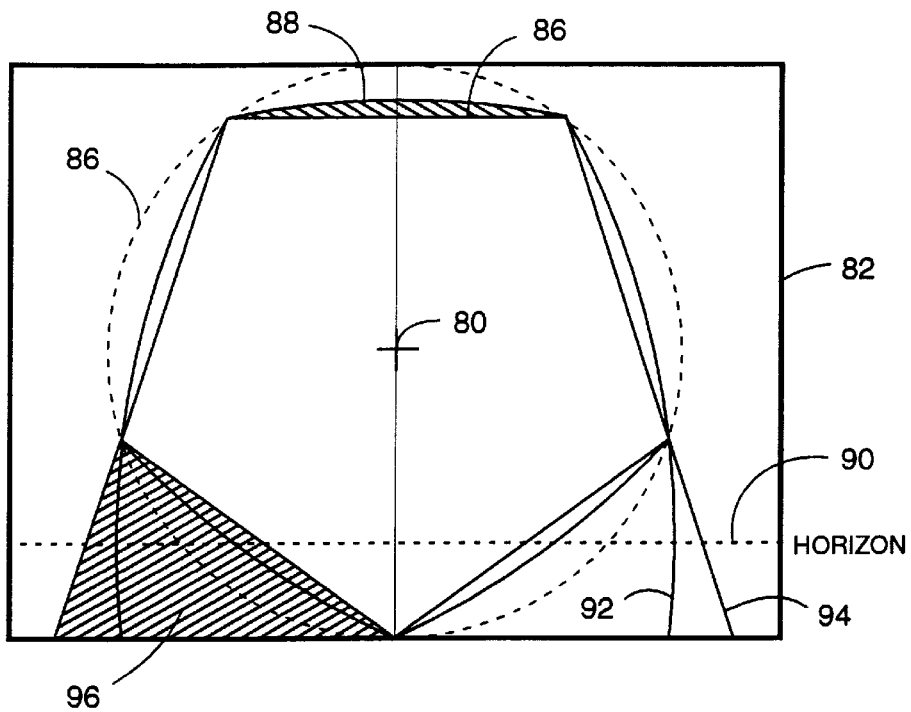

FIG. 5: A centered single-pentagon image shown within a common video aspect ratio, giving the optical characteristics of the single-pentagon lens.

Figure 6:
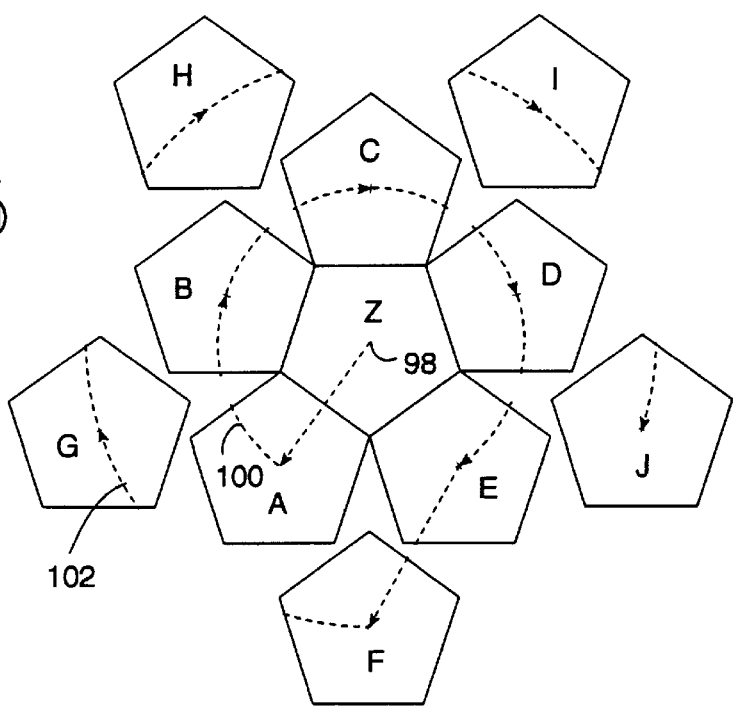

FIG. 6: A schematic view of sequential photography of single-pentagon images.

FIG. 7: A simple mounting bar for a still camera, for successive single-pentagon and regular panoramic photography with rotation around a nodal point.

Figure 8:
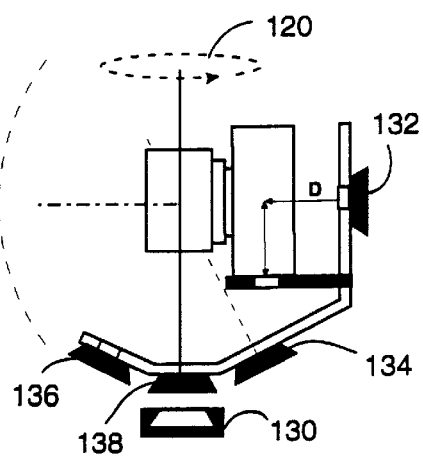

FIG. 8: Side view of this mount in its alignment for regular panoramic photography, showing components for a quick-release tripod mount.

FIG. 9: Side and front views of a motorized motion control version of a single-pentagon sequential photography mount with rotation around a nodal point.

FIG. 10: Side views of this mount showing the characteristic orientations for the vertical view, and for above and below-horizon views.

FIG. 11: Top view of an offsetting motion control mount for the camera in the above mount, allowing the production of stereoscopically offset views.

Figure 12:
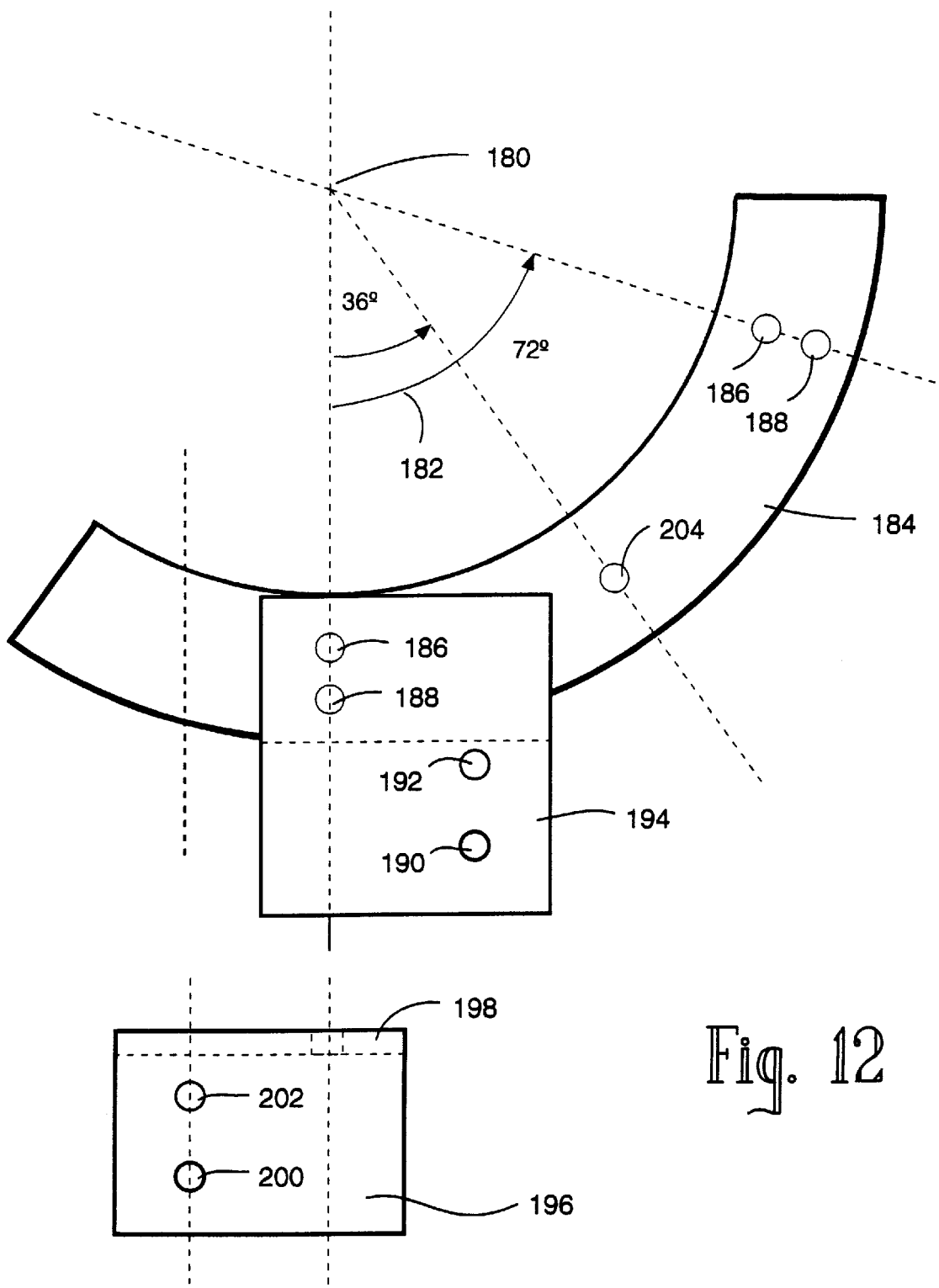

FIG. 12: Top view of the components of an inward-facing mount to align three cameras or projectors to cover three pentagon views.

FIG. 13: Side view of the above mount, used to mount multiple camcorders.

FIG. 14: Top view and perspective views of the components of a simple single-pentagon mount to align multiple cameras or projectors for simultaneous coverage of a nearly-spherical image, wherein the components are attached to a base plate.

FIG. 15: Cross section of the above mount showing cameras mounted.

Figure 16:
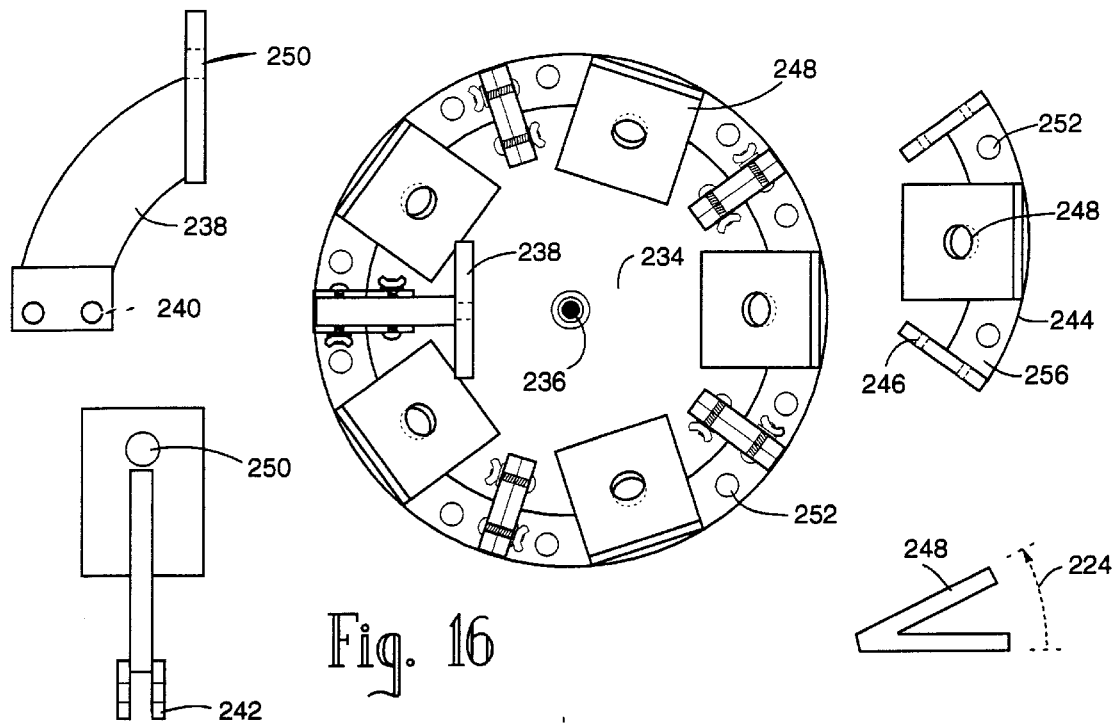

FIG. 16: Top view and orthogonal views of the components of a single-pentagon mount for simultaneous coverage of a nearly-spherical image, wherein the components are mostly attached to each other.

Figure 17:
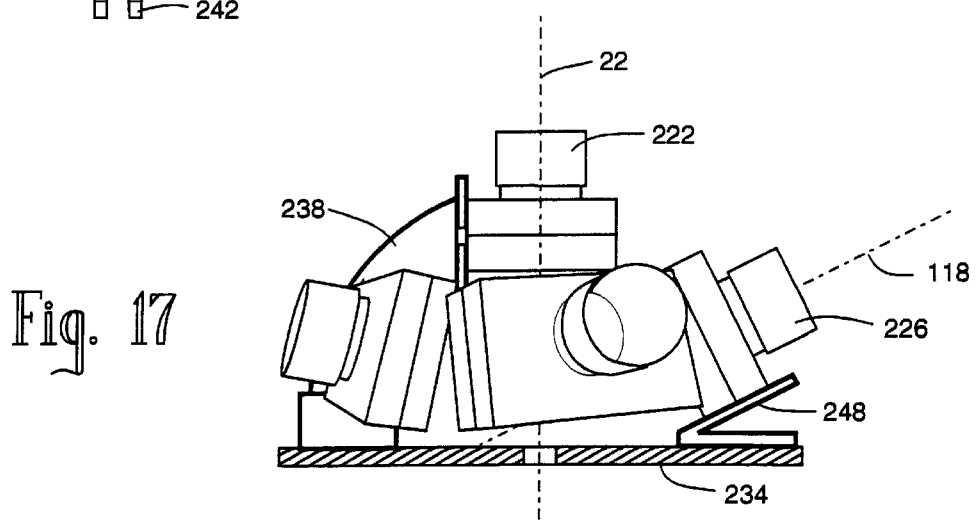

FIG. 17: Side view of the above mount, showing cameras mounted for coverage of a hemispherical image.

FIG. 18: Cross section of a modular facet mount for the alignment of miniature board cameras for simultaneous single-pentagon coverage of a spherical field of view.

FIG. 19: Top view of the above mount.

Figure 20:
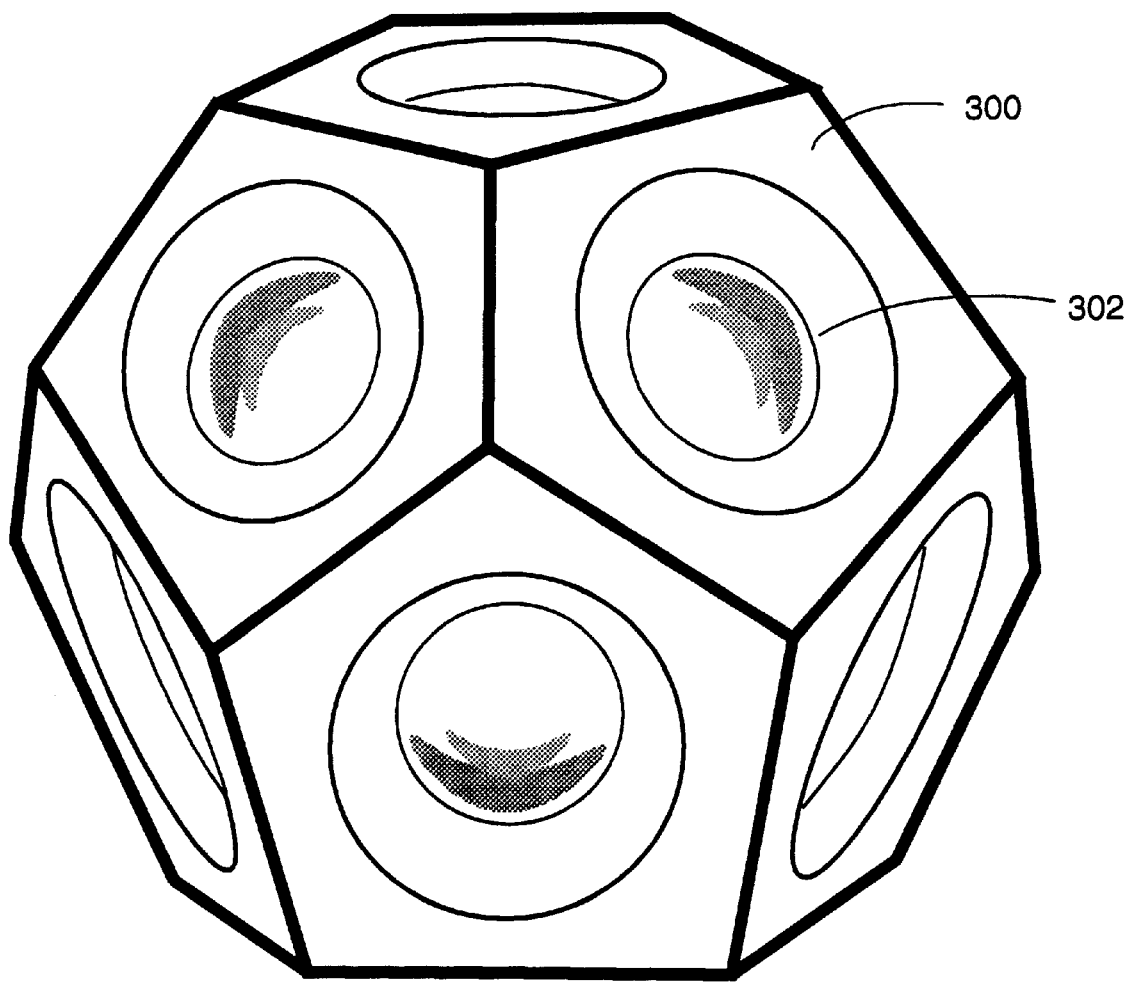

FIG. 20: A perspective view of an assembled dodecahedral optical apparatus such as a camera.

Figure 21:
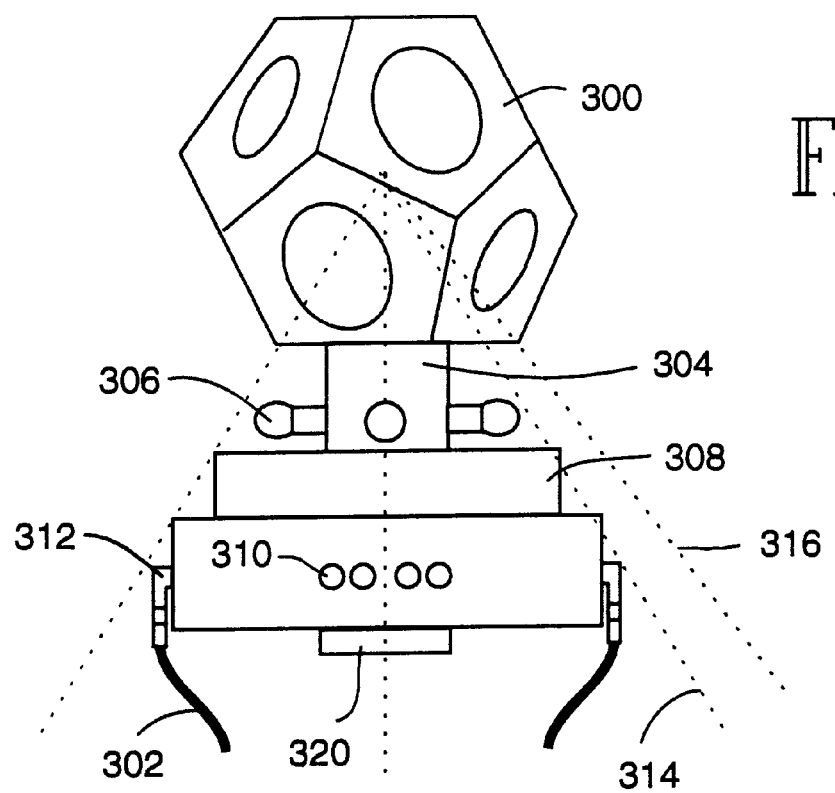

FIG. 21: A side view of a multifaceted dodecahedral mount for multiple single-pentagon cameras, showing the sound recording apparatus and the outboard electronic processor in an invisible area beneath the camera.

Figure 22:
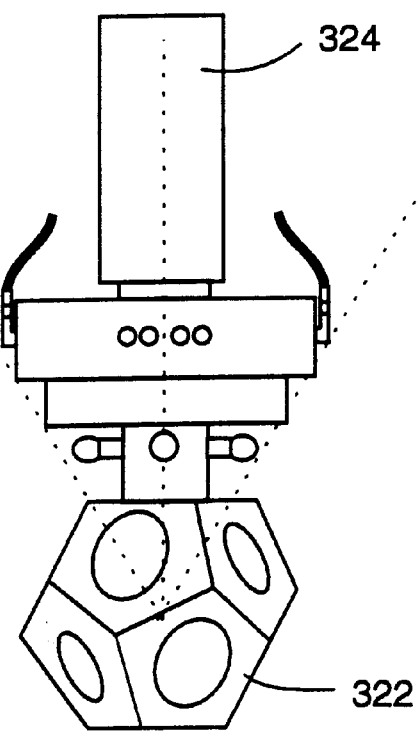

FIG. 22: A side view of the above dodecahedral camera, inverted by a suspension mount.

Figure 23:
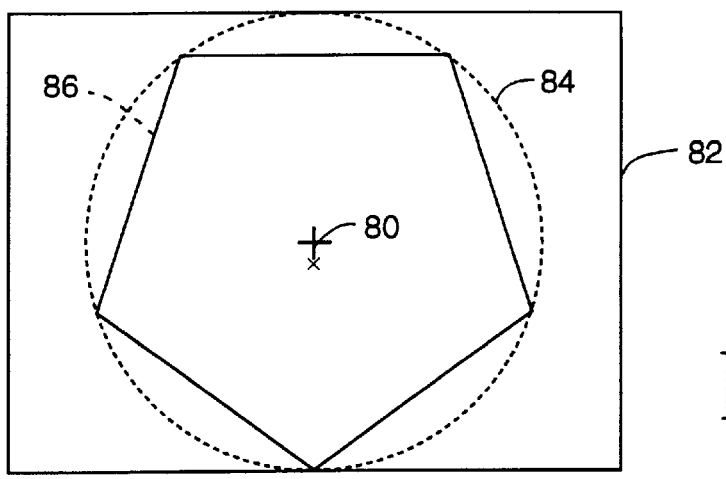

FIG. 23: The preferred single-pentagon image shown within the common 4:3 video aspect ratio.

Figure 24:
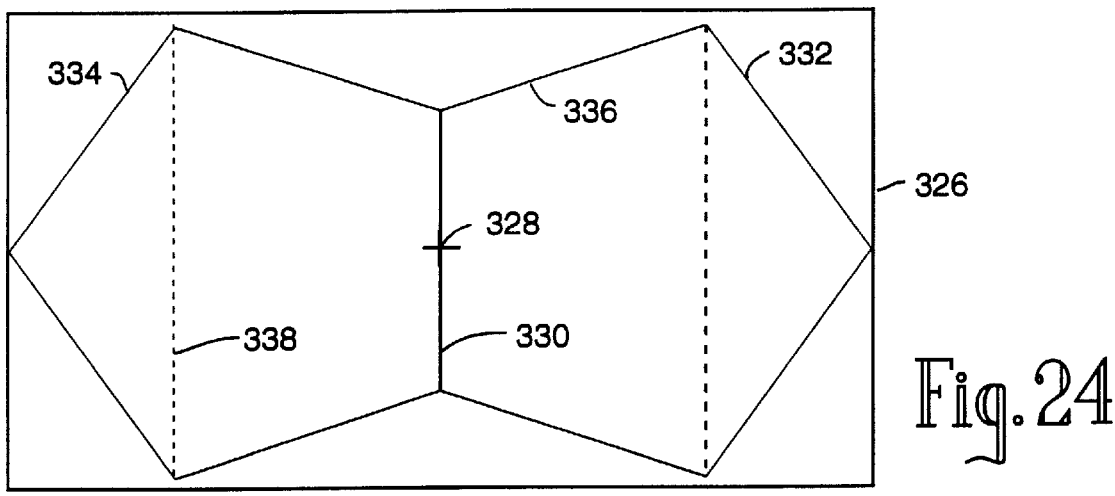

FIG. 24: The preferred double-pentagon image within a rectangular wide screen aspect ratio.

Figure 25:
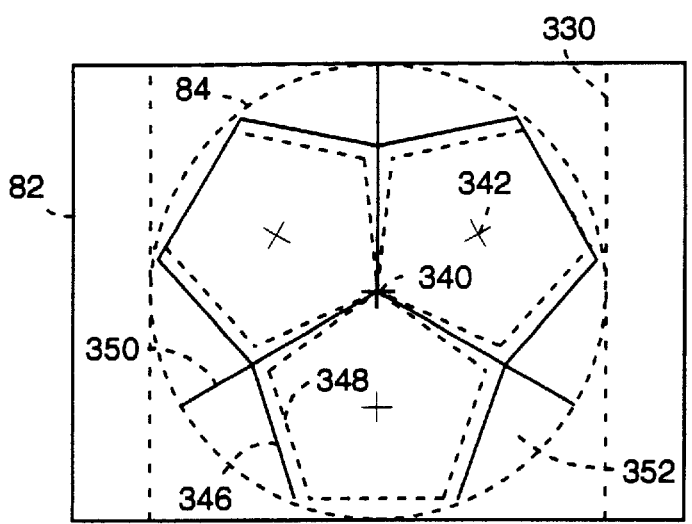

FIG. 25: The preferred triple-pentagon image shown within a square aspect ratio as well as the common 4:3 video aspect ratio.

DOUBLE PENTAGON FORMATS

X Format

Figure 26:
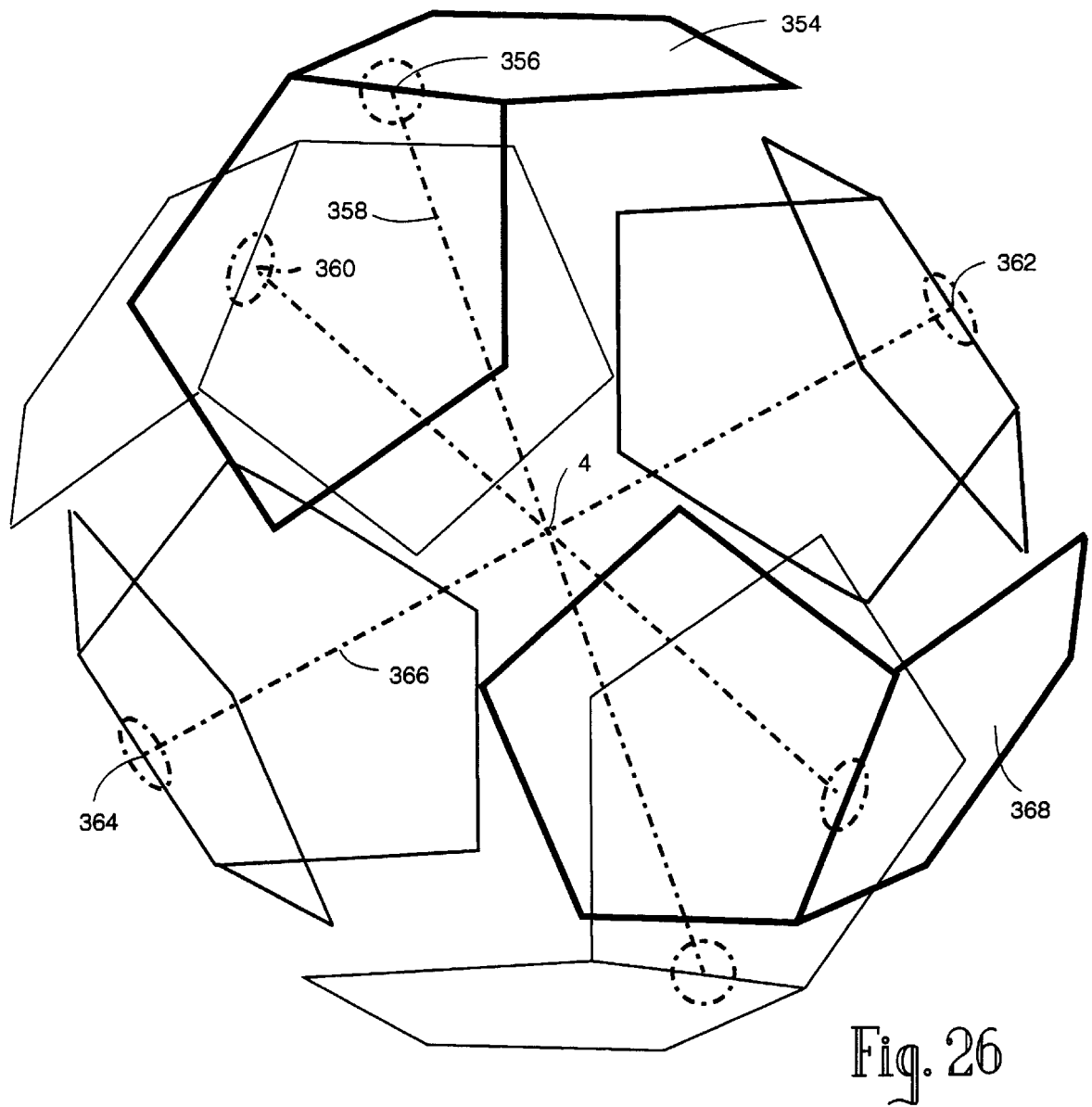

FIG. 26: Exploded perspective view of a sphere, showing the double pentagon section and optical axes characteristic of the XodoX™ or X Format.

Figure 27:
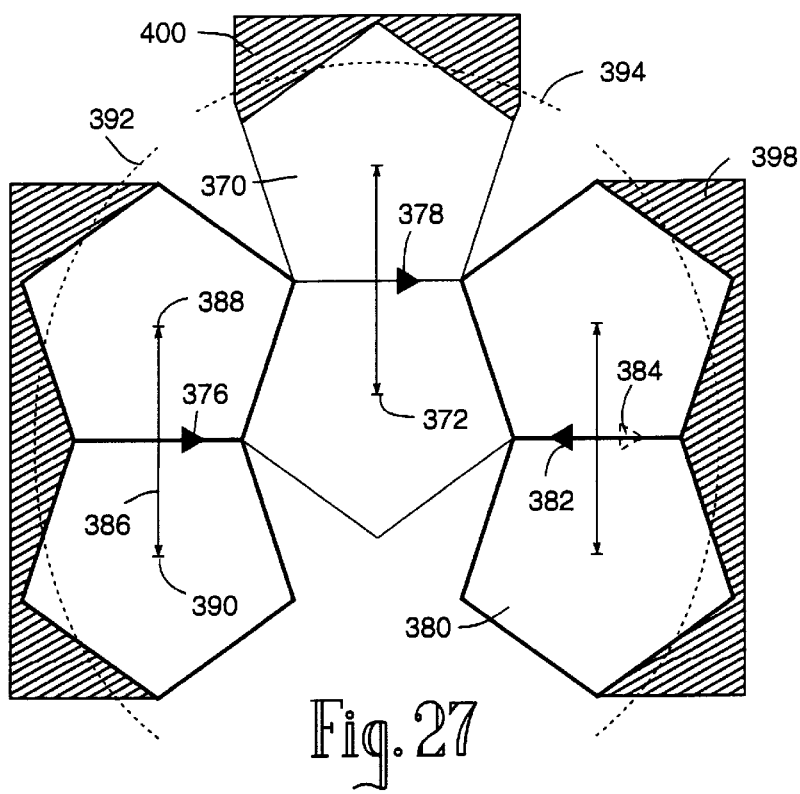

FIG. 27 Top schematic view of double pentagons in the X Format, in the X-H (X-Hemisphere) alignment, with three double-pentagon images representing a hemispherical view.

FIG. 28: Top view of an optical mount for double-pentagon images in the X-H format, and a top view of a dodecahedron showing the edges used as its alignment points.

FIG. 29: Schematic cross sections of the above optical mount, showing the characteristic angles for the vertical double pentagons, as well as the two sets of horizontal dual pentagons along the horizon.

FIG. 30: Perspective views of this optical mount for hemispherical coverage, showing the alignment points on a spherical field of view subdivided by a projected dodecahedron.

FIG. 31: Schematic top view of the component parts of this optical mount.

FIG. 32: Top view of this optical mount, assembled for a hemispherical view.

Figure 33:
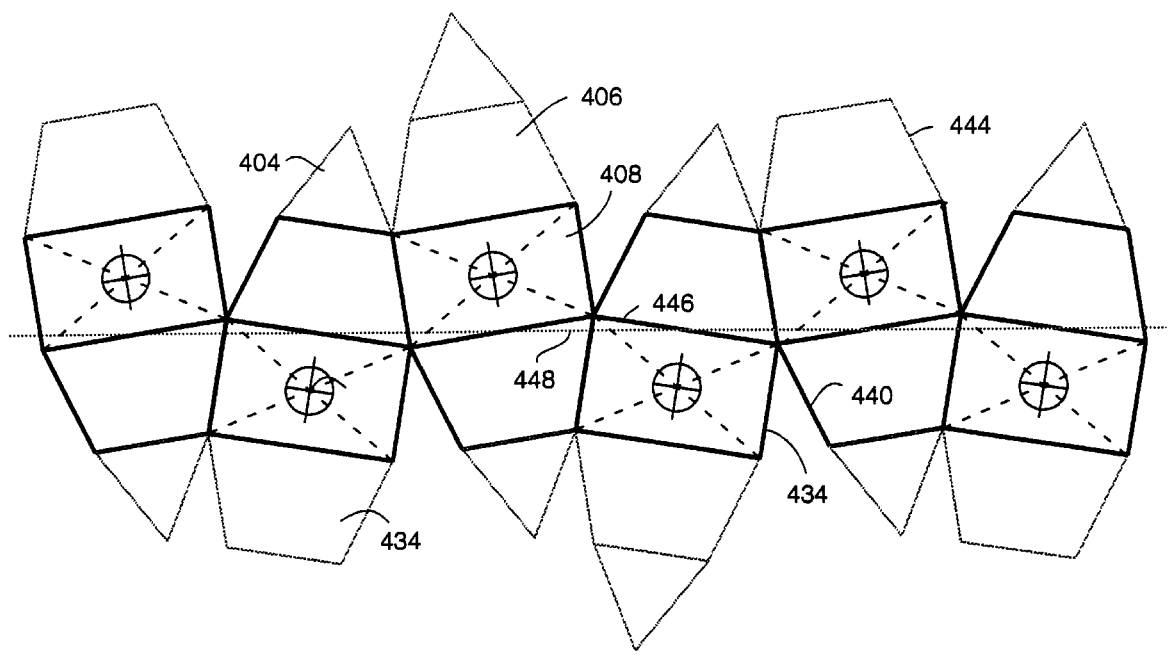

FIG. 33: Schematic lateral view of the components of the optical mount arranged for the coverage of a full-spherical field of view, and the position of the optical horizon relative to this arrangement, called the X-S (X-Spherical) format.

Figure 34:
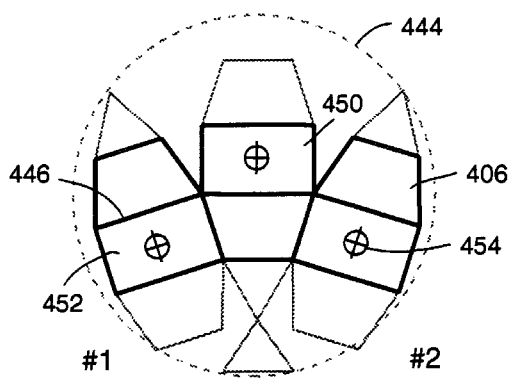

FIG. 34: Flattened top view of the arrangement of components for the X- format, showing the position of the optical horizon.

Figure 35:
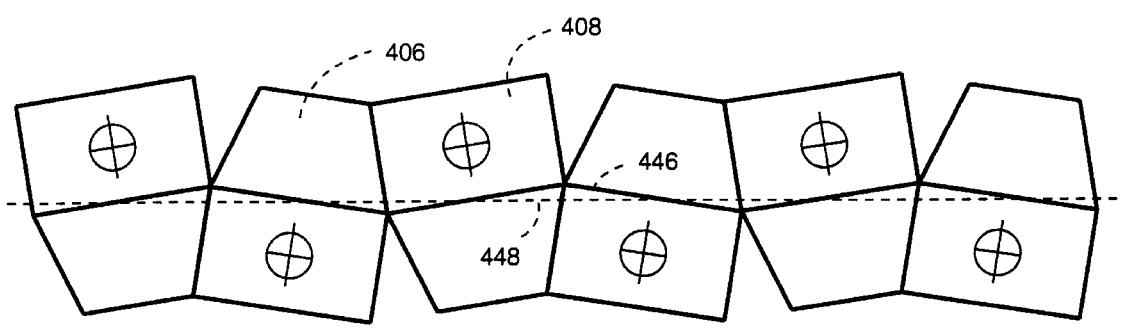

FIG. 35: The X-S spherical mount, reduced to its central band of rectangles and trapezoids, arranged horizontally.

Figure 36:
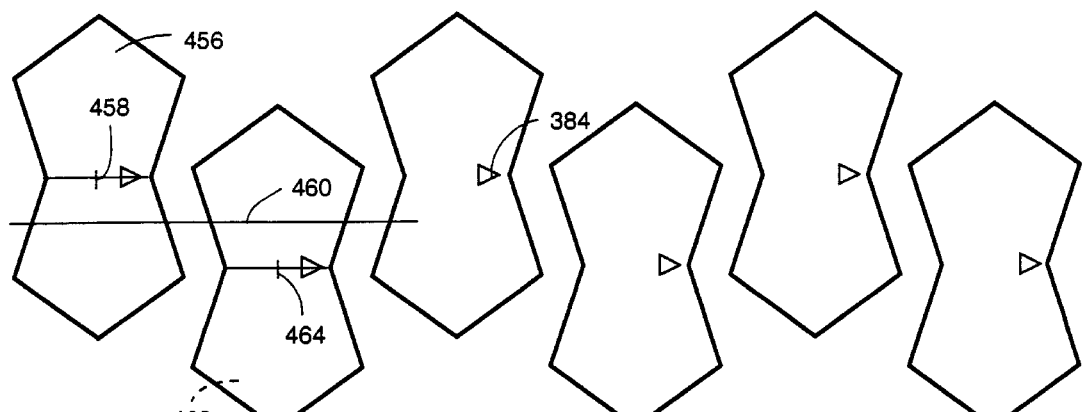

FIG. 36: The characteristic arrangement of the double pentagons for the X-S format, representing the coverage of a full spherical field of view.

FIG. 37: Front view of a motorized motion control X-S format mount with rotation around a nodal point.

FIG. 38: Side view of the above mount.

FIG. 39: Side views of this mount showing the characteristic orientations for the above and below-horizon double-pentagon views.

FIG. 40: Front view of the above mount, turned to produce the X-H format.

Figure 41:
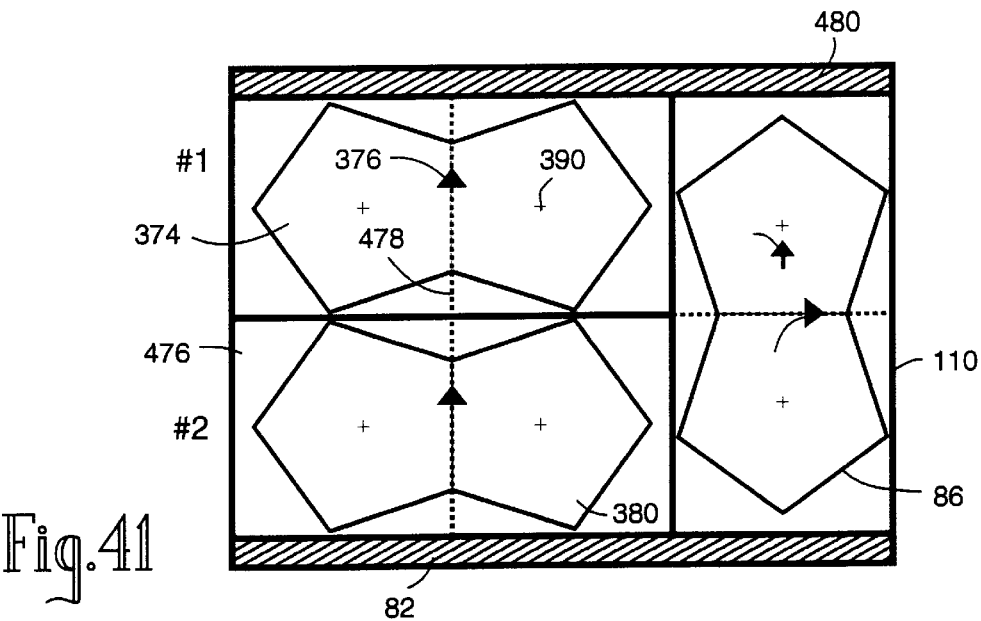

FIG. 41: Storage template for condensed storage of a hemispherical video image in the X-Hemisphere double-pentagon format.

Figure 42:
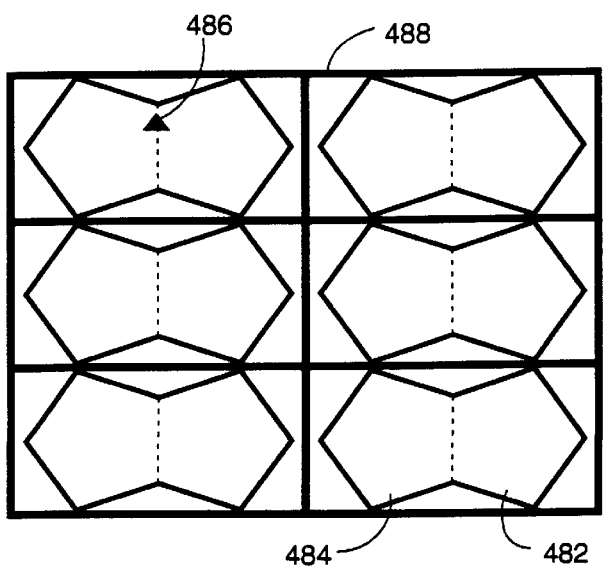
Figure 42:
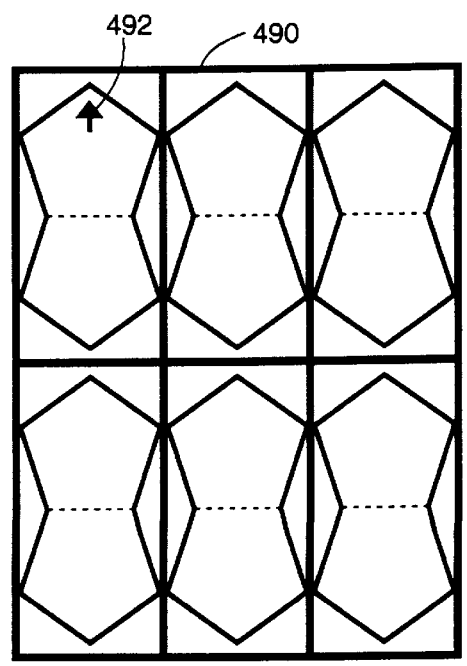

FIG. 42: Storage template for condensed storage of a stereoscopic spherical video image in the X-S format.

FIG. 43: An above-horizon X-H double pentagon image, showing the orientation of the top of the image relative to the horizon.

FIG. 44: A vertical X-H double pentagon image, showing the orientation of the top of the image relative to the horizon.

P Format

FIG. 45: A right-leaning Pentarama™ or P-Format double pentagon image, showing the orientation of the top of the image relative to the horizon.

FIG. 46: A succession of five right-leaning P-format double pentagons, representing most of a spherical field of view.

FIG. 47: A left-leaning P-Format double pentagon image, showing the orientation of the top of the image relative to the horizon.

FIG. 48: A succession of five left-leaning P-format double pentagons, representing most of a spherical field of view.

FIG. 49: Left-leaning and right-leaning P-Format double pentagon images, showing how they overlap to produce a stereoscopic area.

FIG. 50: Schematic representation of a succession of overlapping double-pentagon P-format views producing a stereoscopic area, and how the double pentagons are divided for assignment to alternate eyes in the stereoscopic viewing process.

FIG. 51: A perspective view of a simple still camera mount on a rotating bar, for two-dimensional coverage of most of a sphere with a single camera, or three-dimensional coverage with two cameras.

FIG. 52: Another perspective view the above mount, showing two cameras mounted for three-dimensional coverage.

Figure 53:
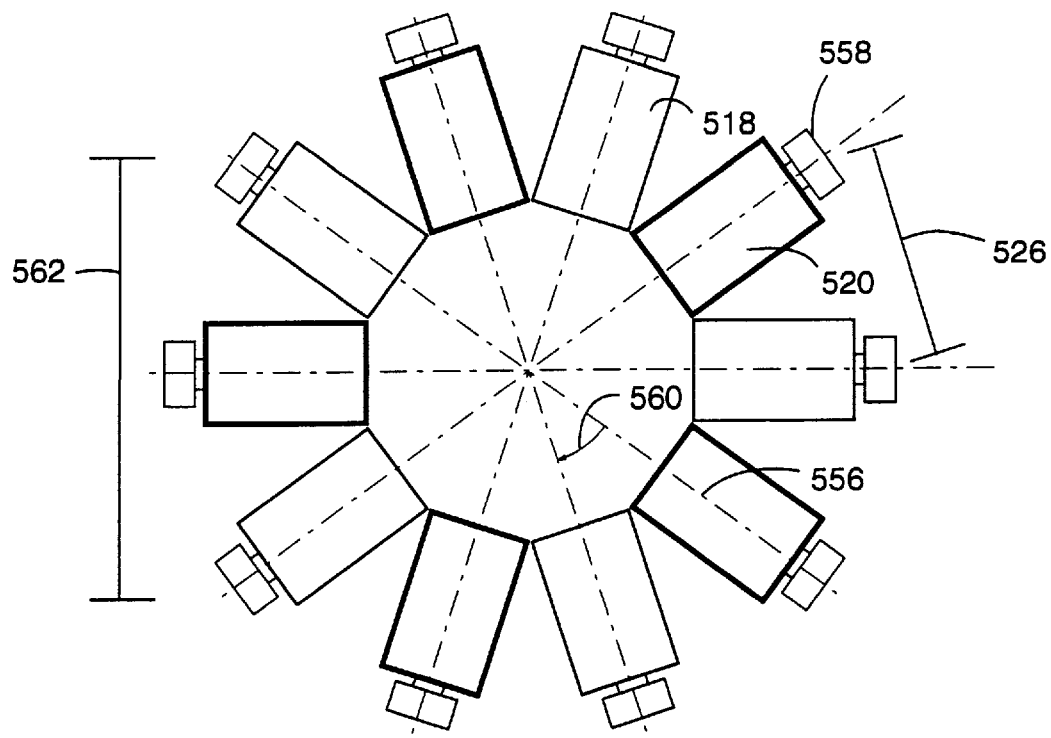

FIG. 53: A top view of a ring of ten cameras in the P-format for three-dimensional coverage.

Figure 54:
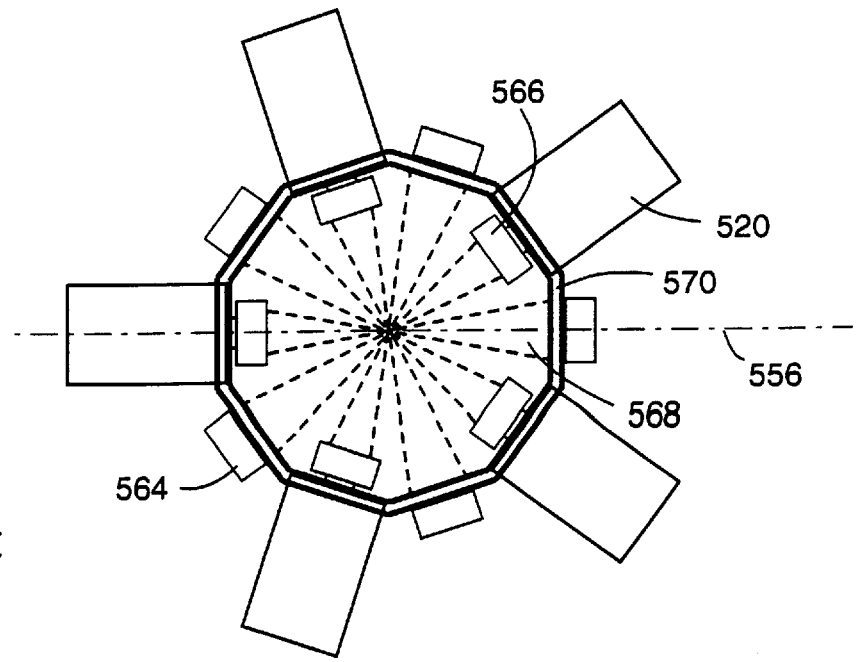

FIG. 54: A top view of a ring of five cameras in the P-format for two-dimensional coverage, showing the addition of nodal-point centered divided optics to eliminate parallax differences between the adjacent views.

Figure 55:
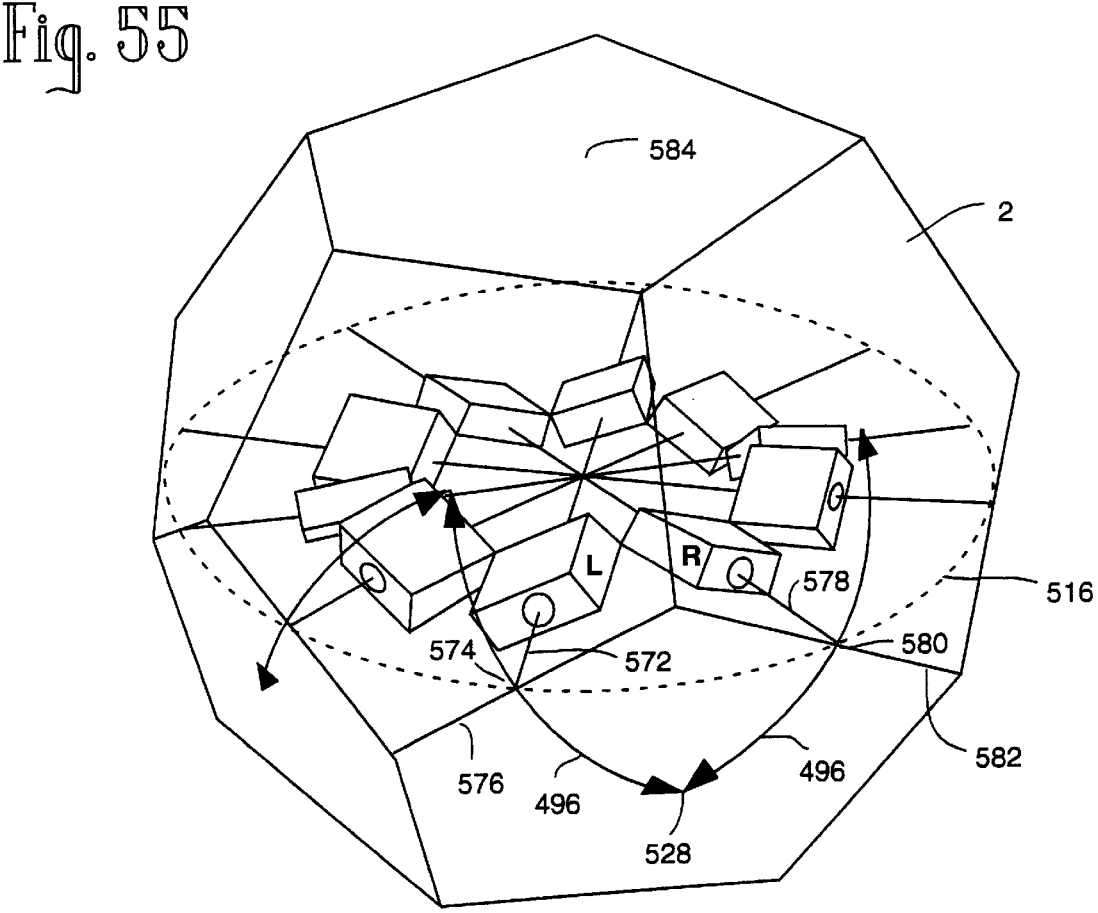

FIG. 55: A perspective view of a main ring of cameras, showing the tilted camera views and optical axes in a single plane characteristic of the P format.

Figure 56:
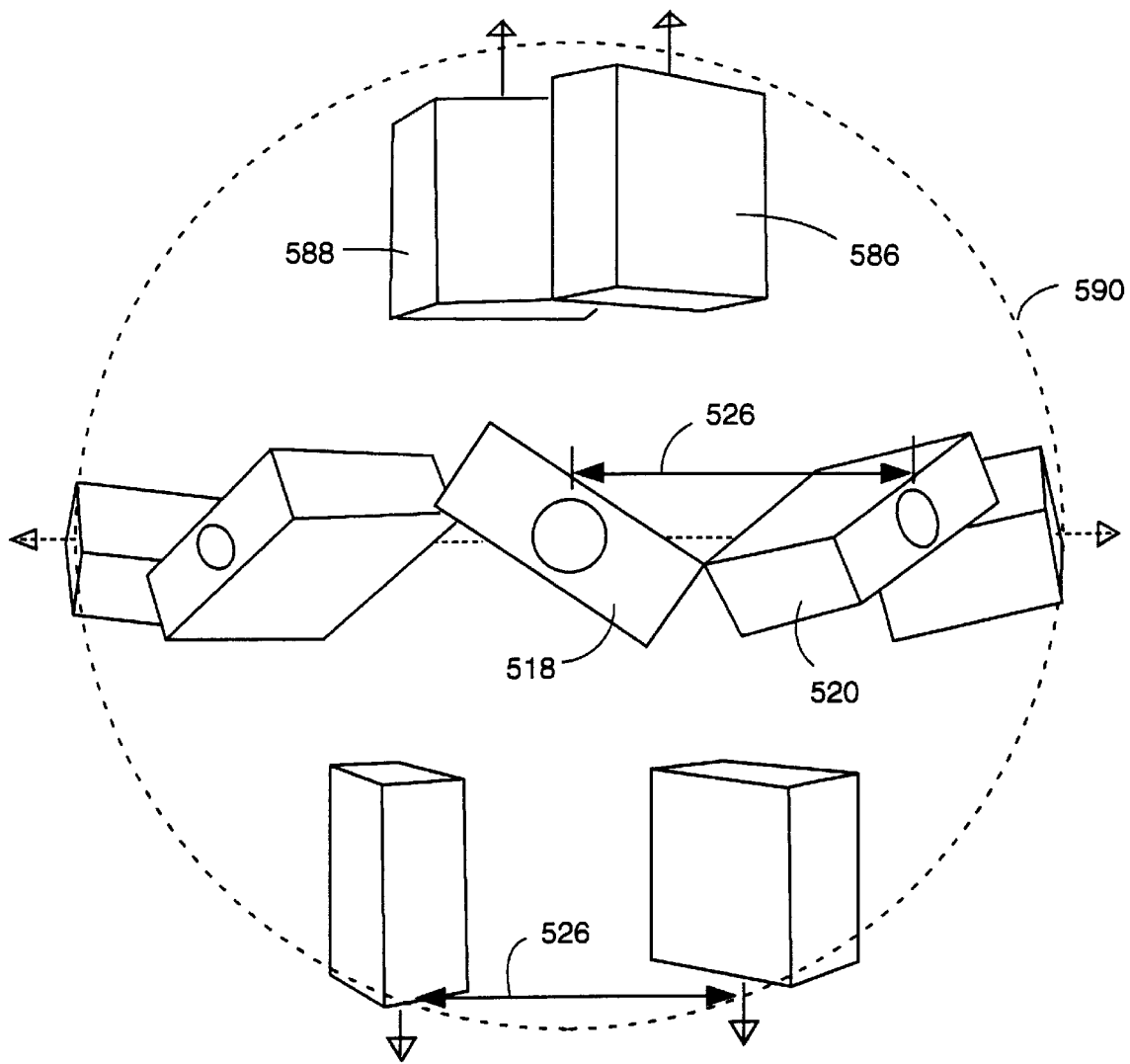

FIG. 56: Side view of multiple cameras for a full stereoscopic spherical image in the P format.

Figure 57:
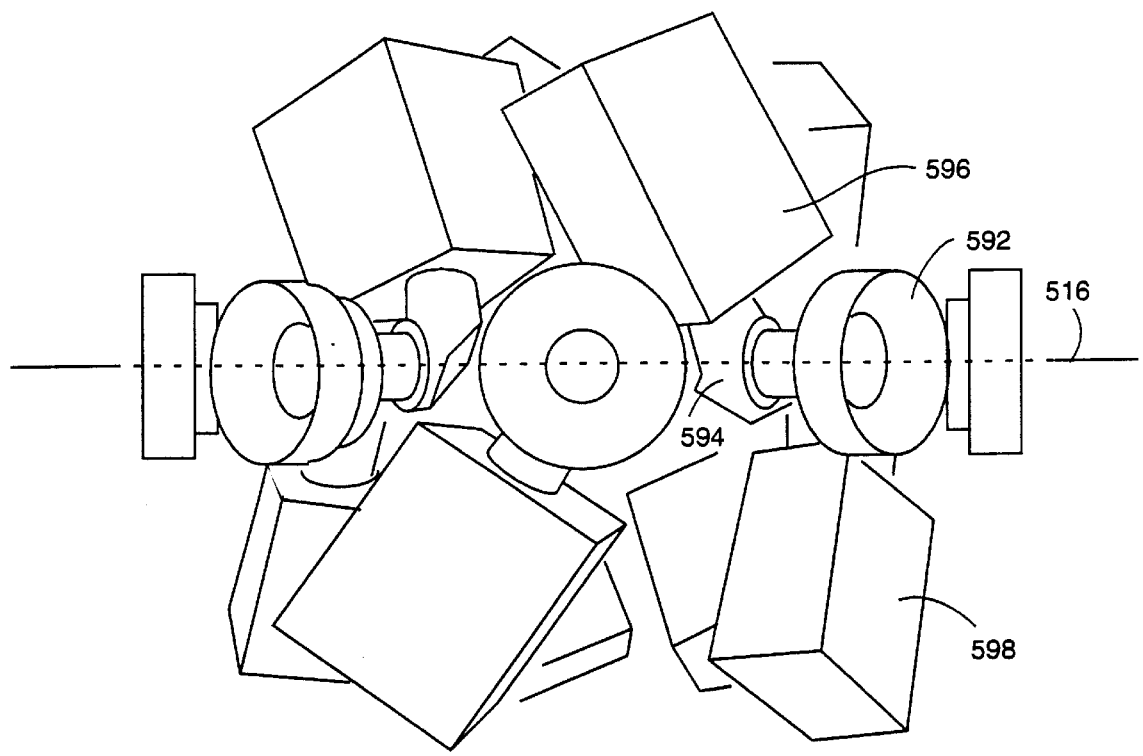

FIG. 57: Side view of a P format camera, showing cameras using right-angle optics and extended axes.

Figure 58:
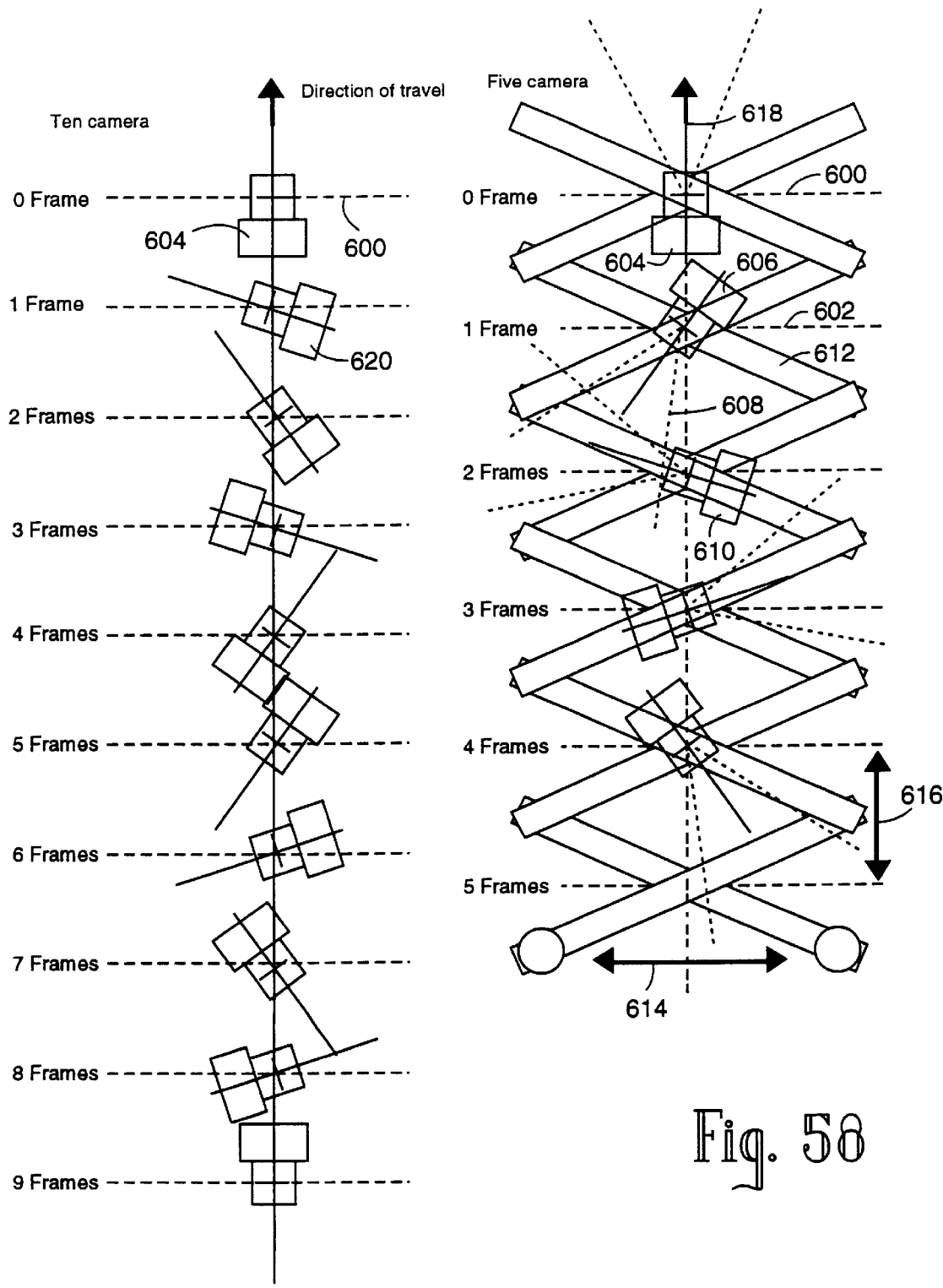

FIG. 58: A top view of temporally offset mounts of a five and ten-camera array, with the distance between cameras being dynamically adjusted to be the equivalent of one frame's worth of distance at a given rate of speed, as an alternate method of controlling parallax differences between adjacent views.

O Format

Figure 59:
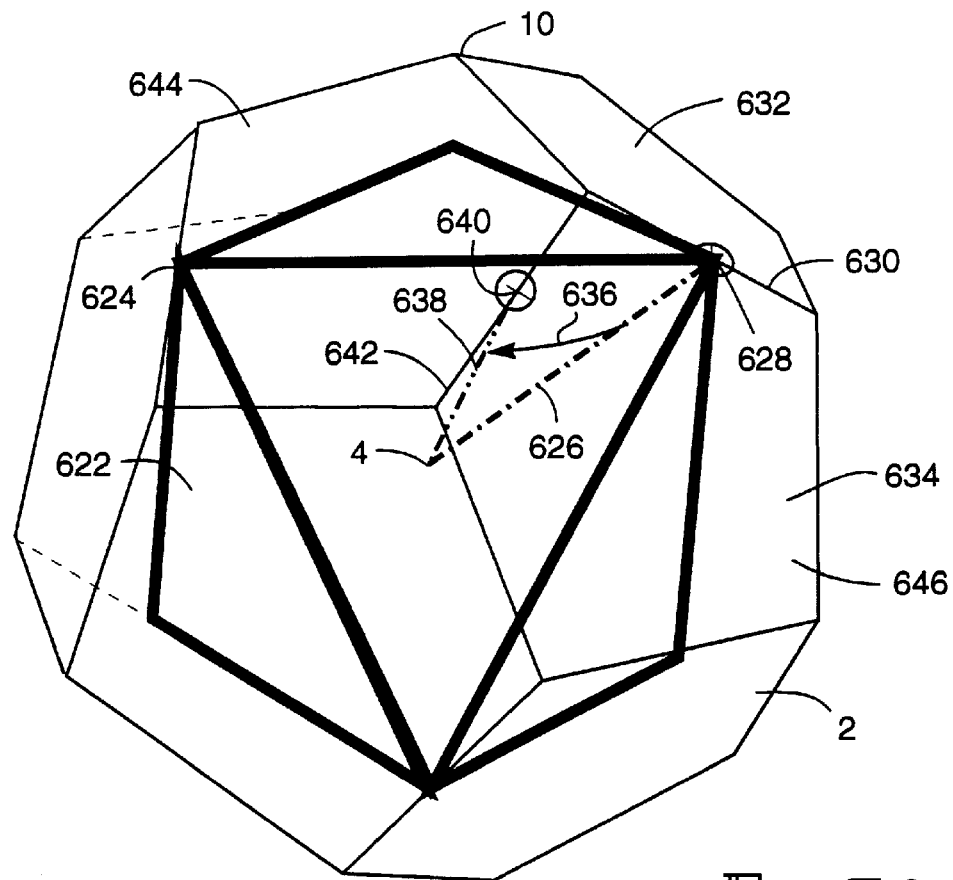

FIG. 59: Perspective view of a dodecahedron and a concentric octahedron, illustrating a third type of double-pentagon format, the Octahedron or O-format, which has optical axes pointing to the centers of dodecahedron edges which also lie at the vertices of an octahedron.

Figure 60:
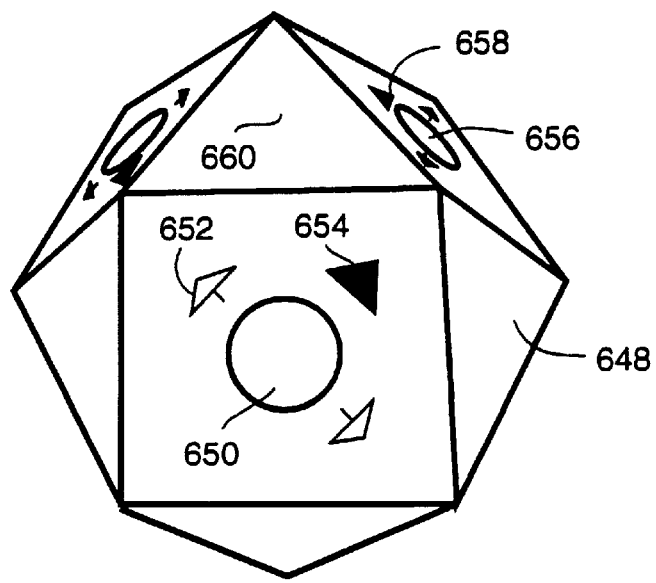

FIG. 60: A perspective view of an O-format optical mount.

Figure 61:
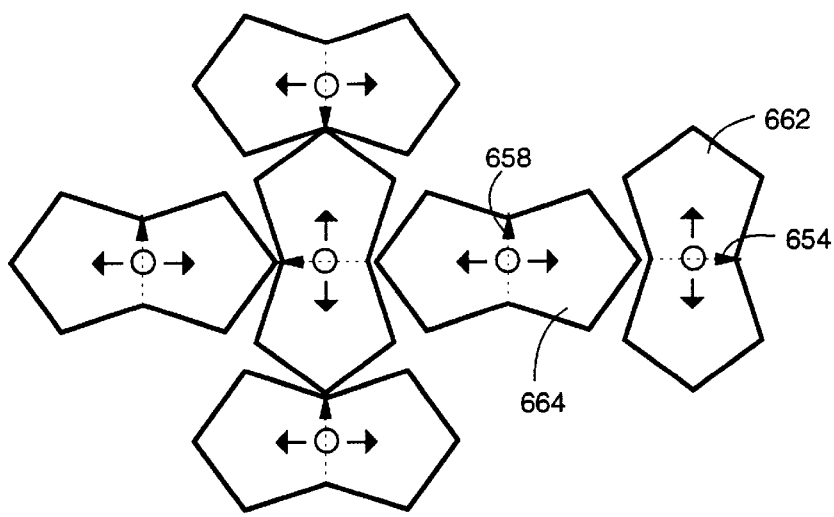

FIG. 61: Schematic representation the characteristic arrangement of O-format double-pentagon views representing a spherical field of view.

Figure 62:
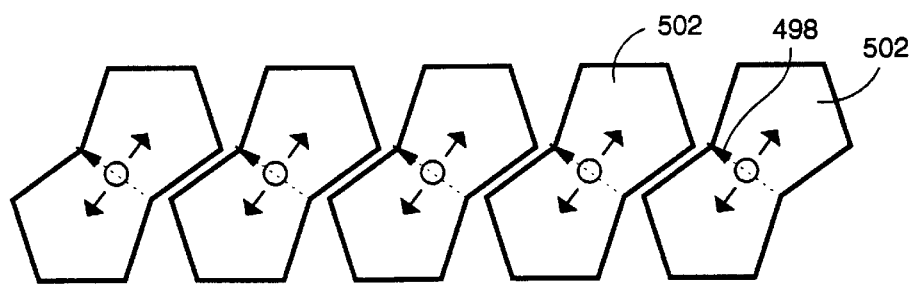

FIG. 62: Schematic representation of a succession of five right-leaning P-format double pentagons, representing most of a spherical field of view.

Figure 63:
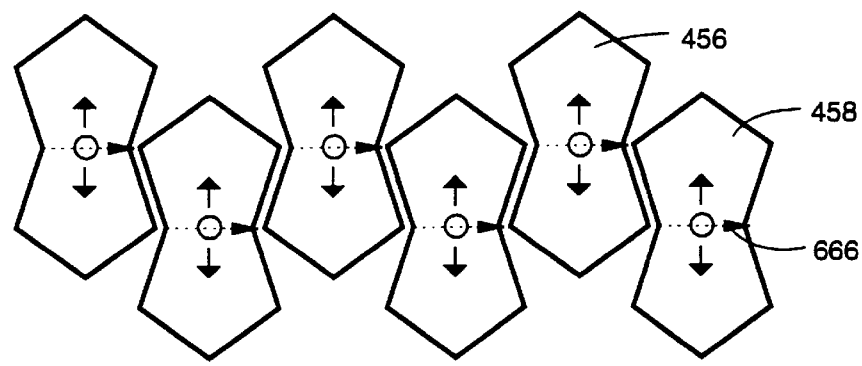

FIG. 63: Schematic representation of a succession of six X-S format double pentagons, representing all of a spherical field of view.

TRIPLE PENTAGON FORMAT

T Format

Figure 64:
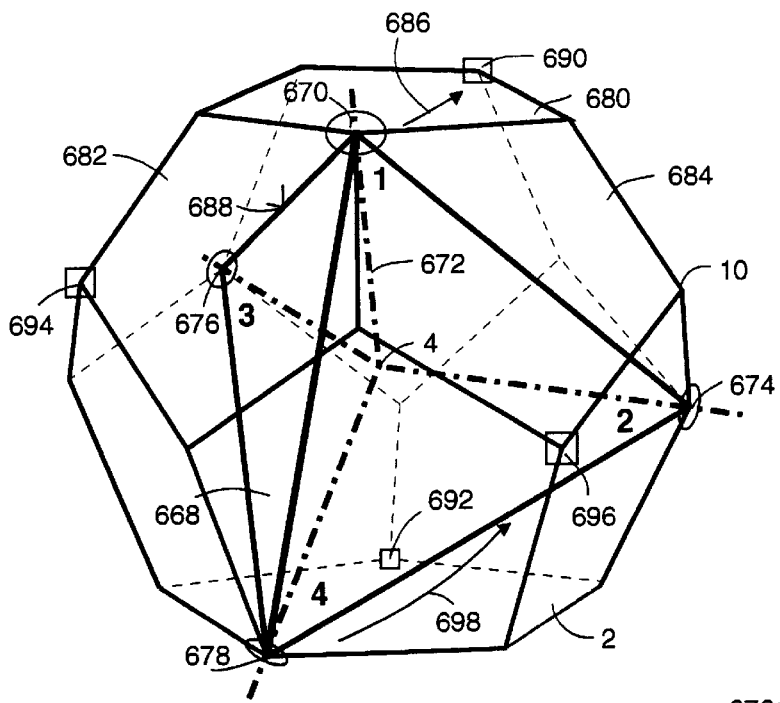

FIG. 64: Perspective view of a dodecahedron and a concentric tetrahedron, illustrating a triple-pentagon format, the Tetrahedron or T-format, which has optical axes pointing to the dodecahedron vertices which also lie at the vertices of a tetrahedron.

Figure 65:
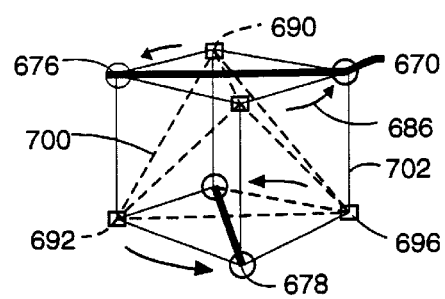

FIG. 65: Perspective schematic view of the relationship between the dodecahedron vertices of two T-format sets of views, with one set of views having been rotated relative to the other for a stereoscopic effect.

Figure 66:
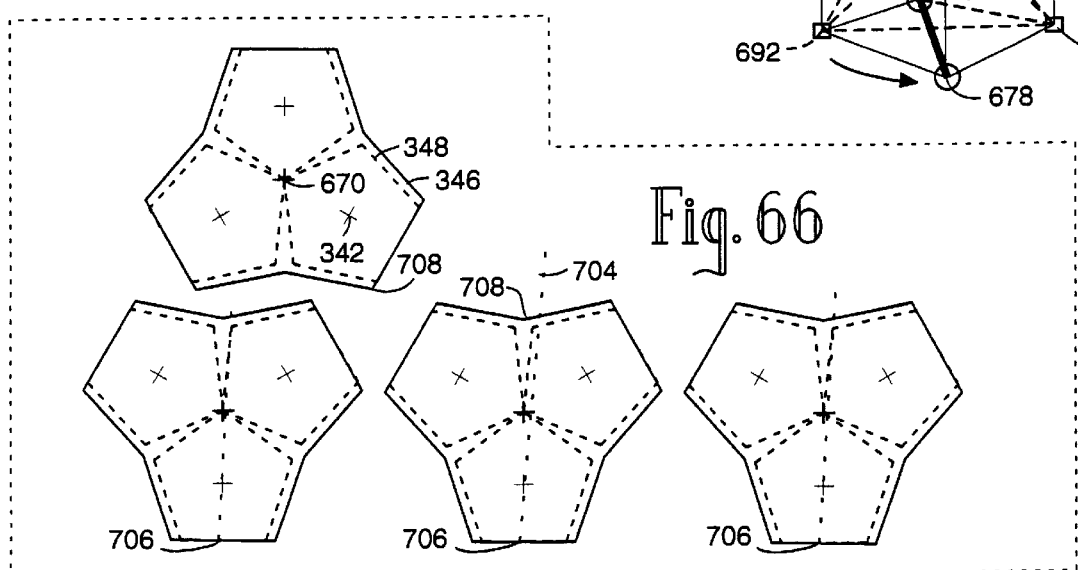

FIG. 66: Schematic representation of four T-format triple pentagons, representing all of a spherical field of view.

FIG. 67: Perspective schematic view of the relationship between the dodecahedron vertices of two stereoscopic T-format sets of views, which also lie on the alternate vertices of a cube, and an illustration of the set of views produced by a first orientation.

Figure 68:
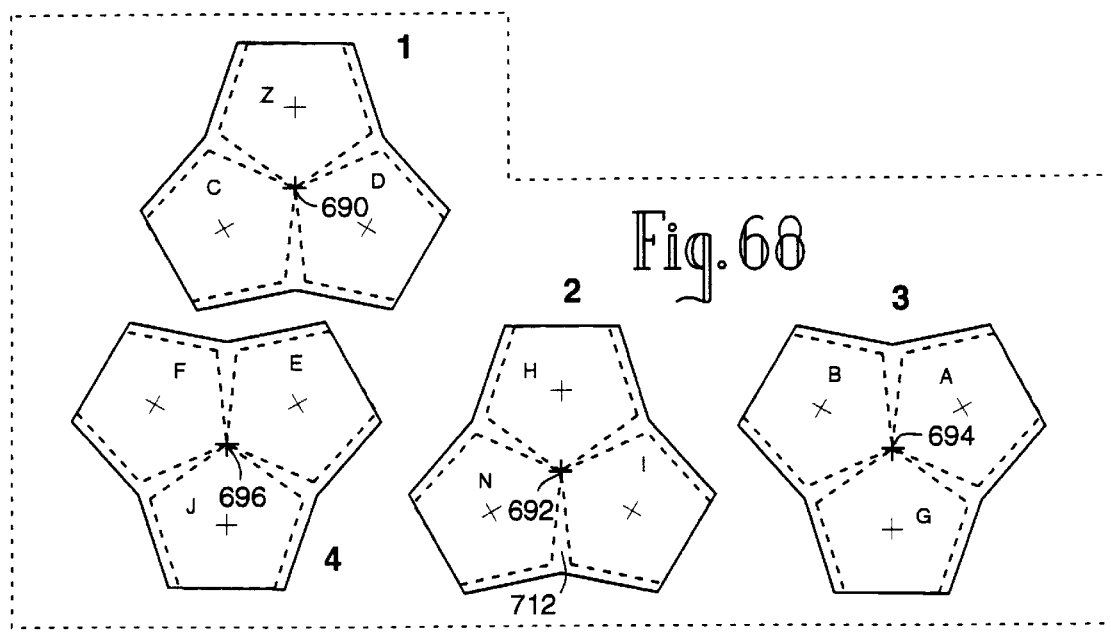

FIG. 68: An illustration of the set of views produced by the second rotated orientation.

Figure 69:
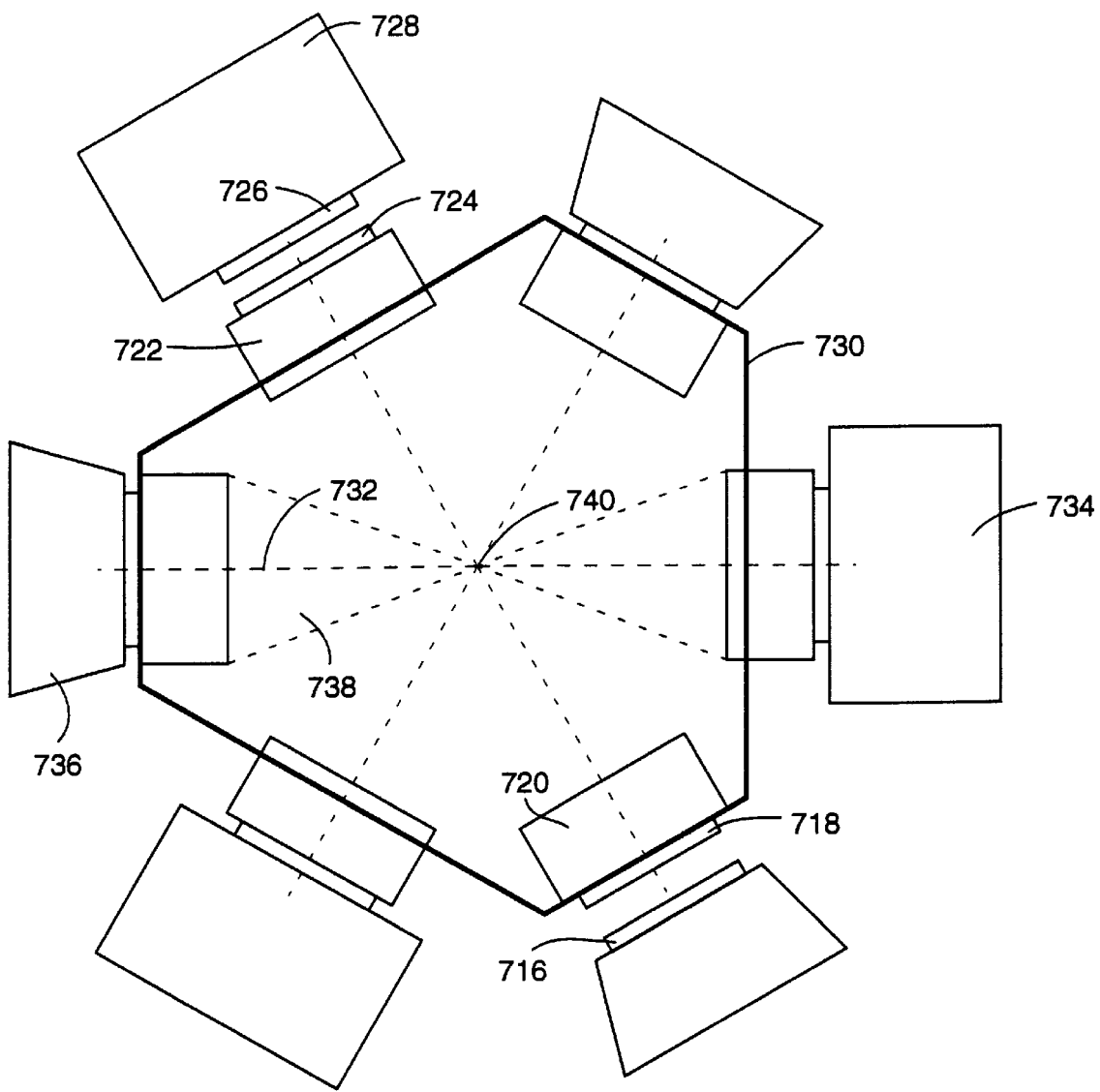

FIG. 69: A schematic cross section of a tetrahedral lens mount with crisscross optics.

RECORDING MEANS

Figure 70:
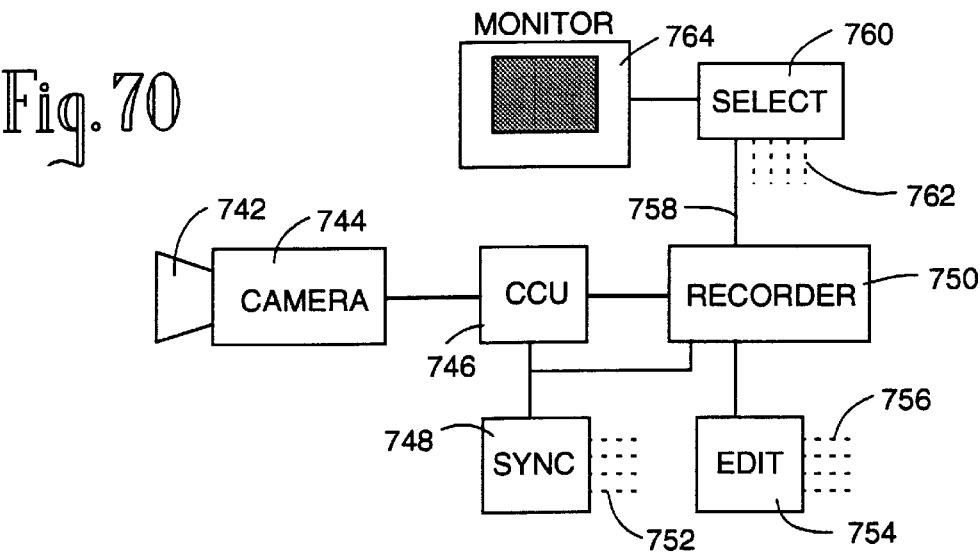

FIG. 70: Block diagram of the equipment used in a typical field recording.

Figure 71:
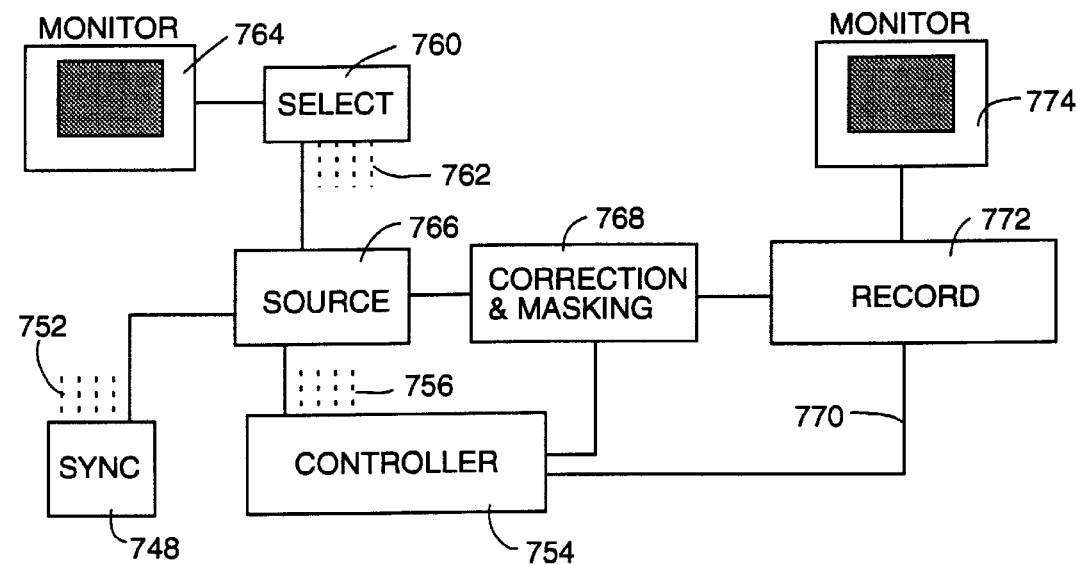

FIG. 71: Block diagram of the equipment used in the basic postproduction process.

Figure 72:
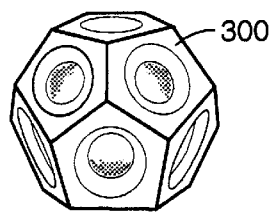

FIG. 72: Perspective view of an assembled dodecahedral camera.

Figure 73:
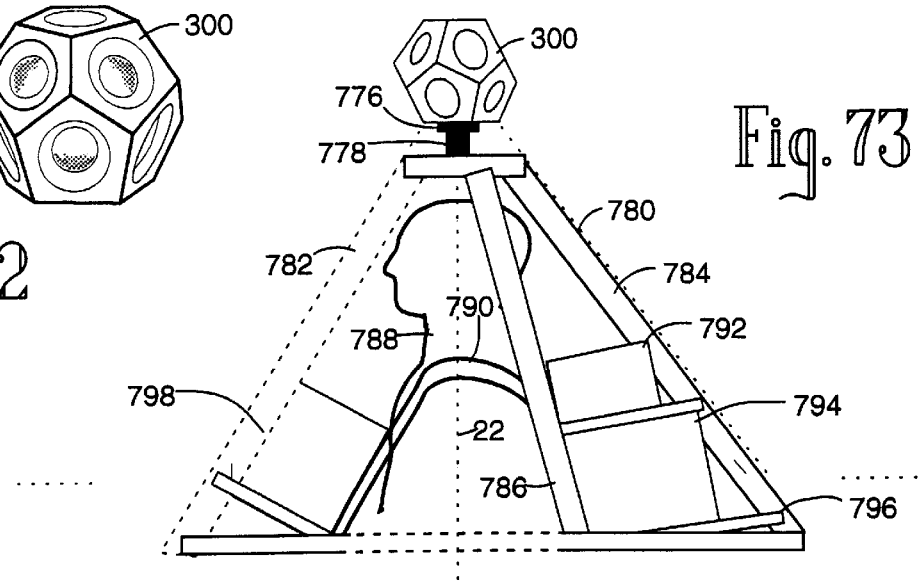

FIG. 73: Side view of a portable camera mount for a camera operator, including provision for carrying the necessary recording and monitoring equipment.

Figure 74:
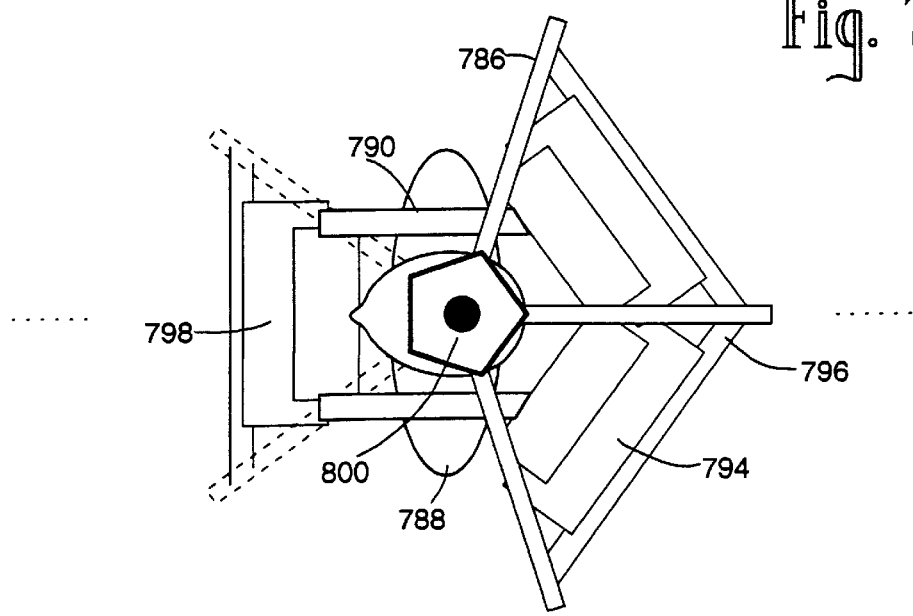

FIG. 74. Top view of the above portable camera mount.

Figure 75:
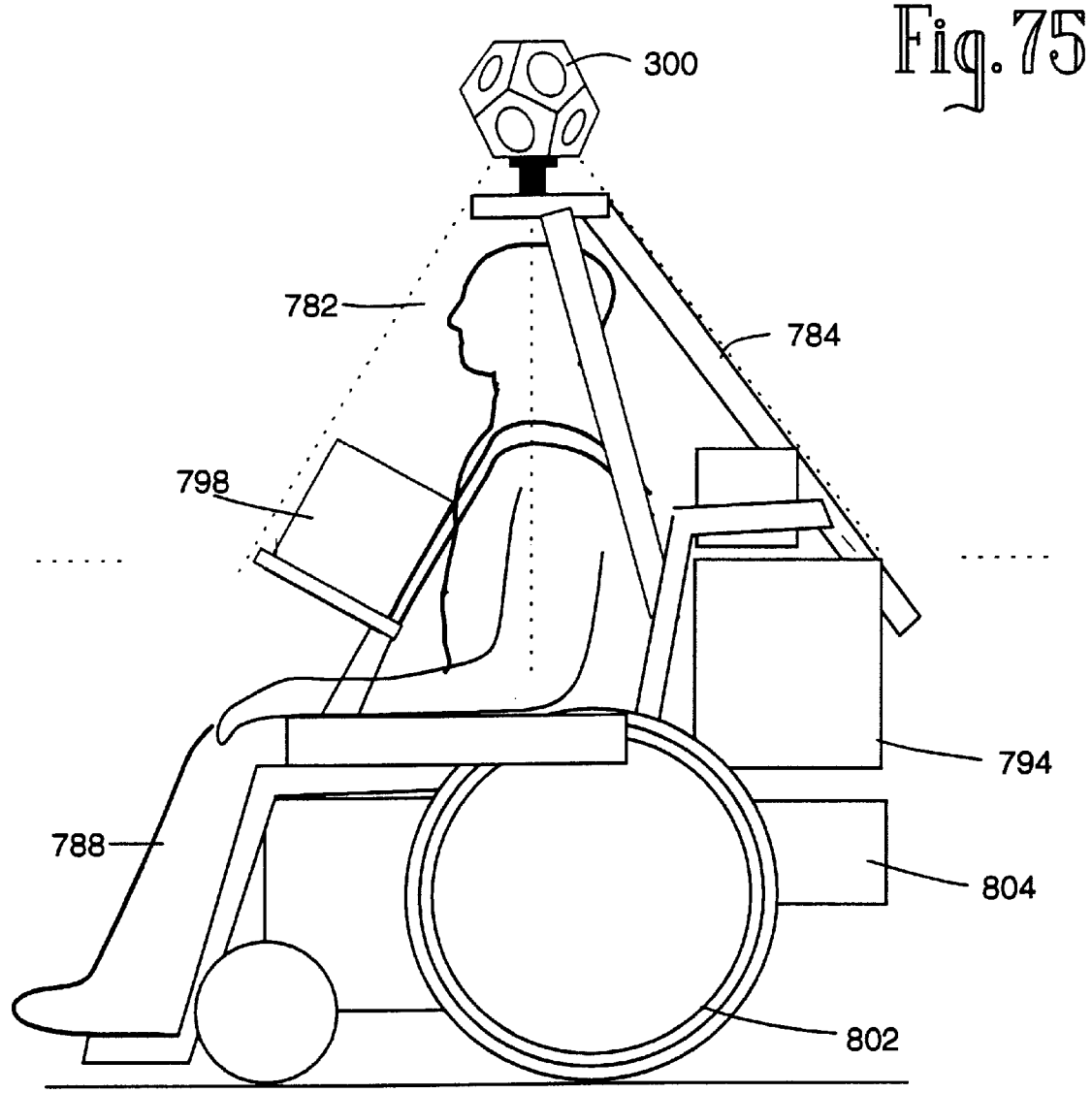

FIG. 75: Side view of a portable camera and equipment mount, with provision for carrying everything by means of a wheeled conveyance such as a wheelchair.

Figure 76:
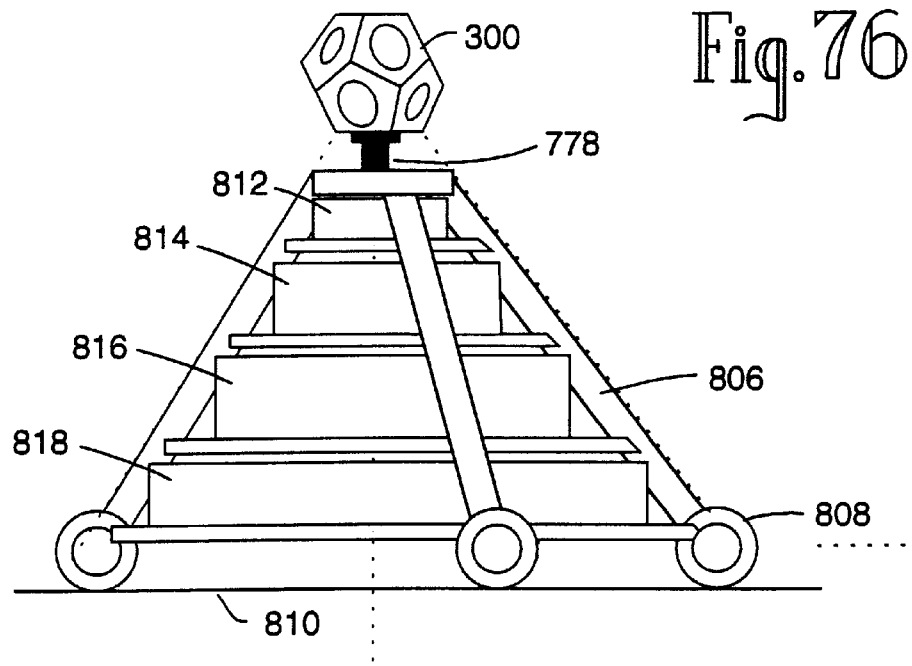

FIG. 76: Side view of a portable camera mount in the form of a motorized cart, capable of carrying the necessary recording and monitoring equipment.

Figure 77:
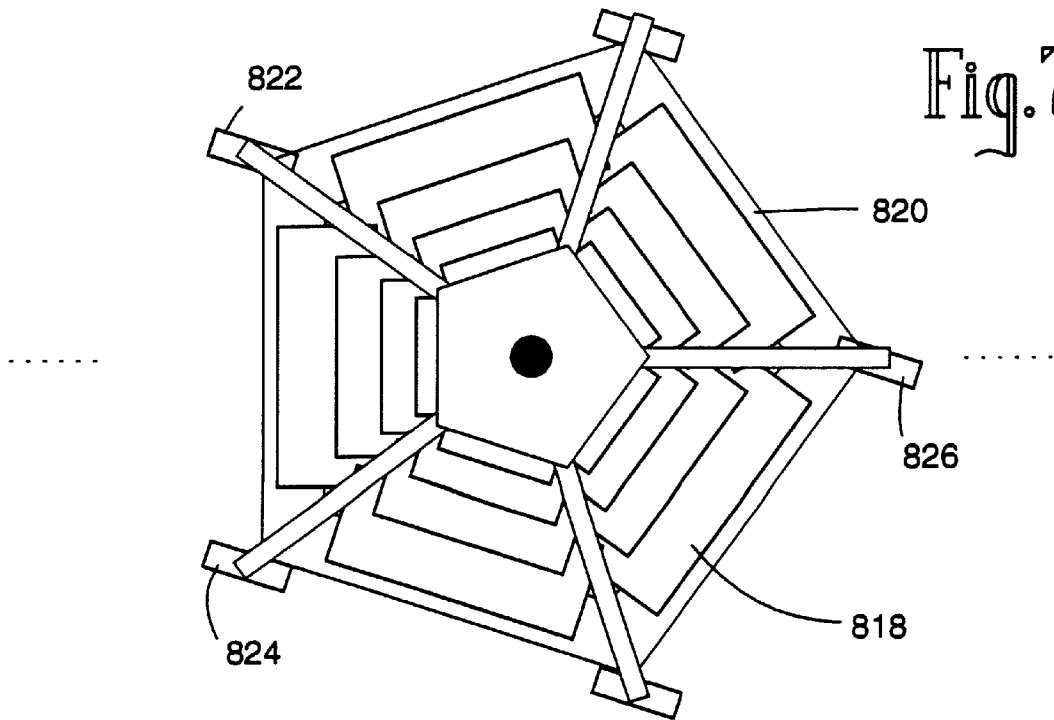

FIG. 77. Top view of the above camera cart.

FIG. 78: Schematic representation of two pentagons being recorded within a common 4:3 video aspect ratio, with the second pentagon image, being encoded and decoded in the area surrounding the first central pentagon, showing the position of outside pentagon information before and after encoding.

FIG. 79: Block diagram of an encoding processor for the coding and decoding of a dual pentagon image within a video image with a 4:3 aspect ratio.

Figure 80:
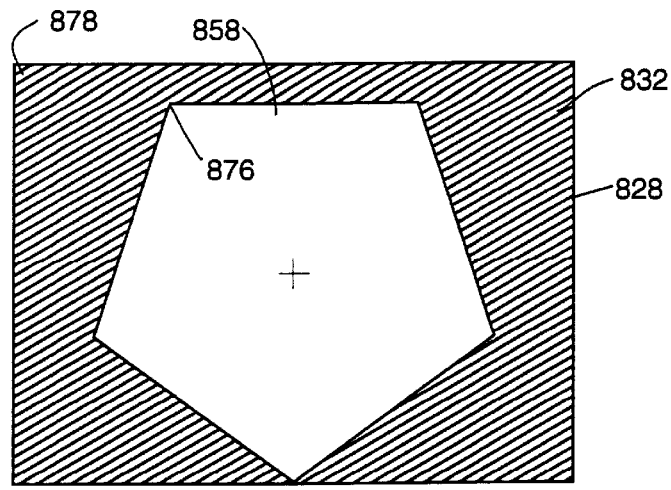

FIG. 80: Schematic representation of two pentagons being recorded within a common 4:3 video aspect ratio, with the second pentagon image, being encoded and decoded in the area surrounding the first central pentagon.

Figure 81:
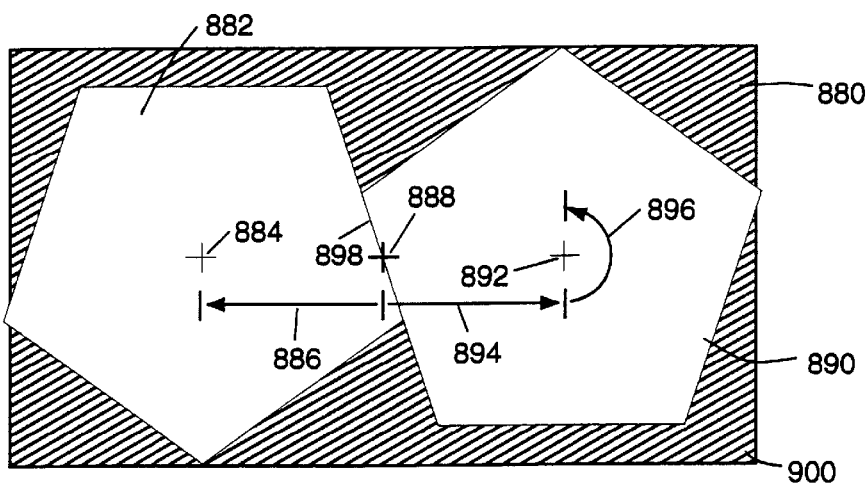

FIG. 81: Schematic representation of two transposed pentagons recorded within a 9:16 aspect ratio, also showing where information representing a third outside pentagon can be recorded.

Figure 82:
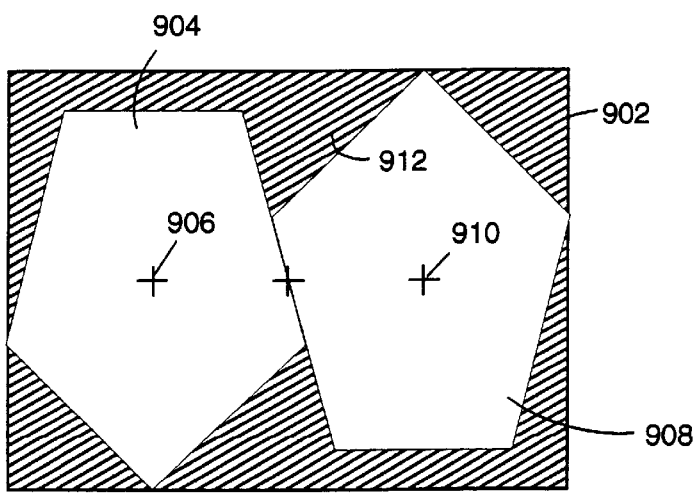

FIG. 82: Schematic representation of the above image, anamorphically squeezed to fit within a 4:3 aspect ratio.

POSTPRODUCTION MEANS

FIG. 83: Schematic view of the successive manipulation of two or more video images to examine an edge between adjacent pentagonal regions between a top single pentagon and a top of an above-the-horizon pentagon view.

FIG. 84: Schematic view of the successive manipulation of two or more video images to examine an edge between adjacent pentagonal regions between two above-the-horizon pentagon views.

FIG. 85: Schematic view of the successive manipulation of two or more video images to examine an edge between adjacent pentagonal regions between two below-the-horizon pentagon views.

FIG. 86: Schematic view of the successive manipulation of two or more video images to examine an edge between adjacent pentagonal regions between an above-the-horizon pentagon view and a below-horizon pentagon view.

CROPPING AND STORAGE TEMPLATE MEANS

Figure 87:
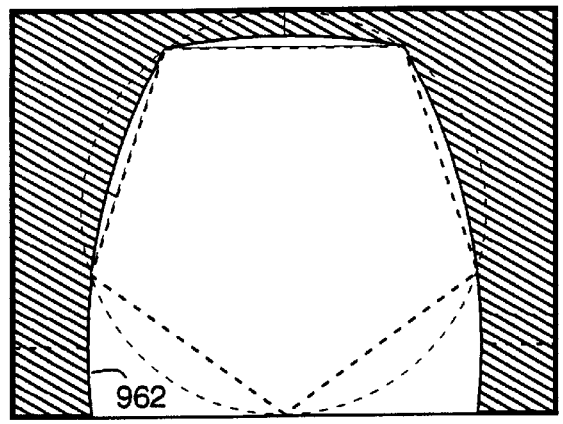

FIG. 87: Cropping diagram for a single-pentagon image in a video aspect ratio, including optional image area and typical optical distortion.

Figure 88:
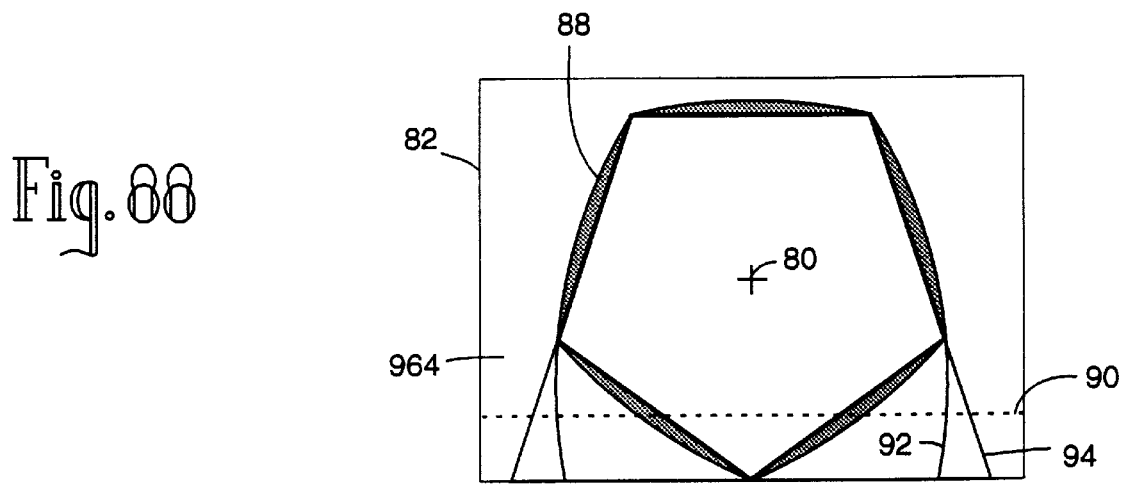

FIG. 88: A single pentagon image in a video aspect ratio, showing the correction of pentagon edges to their ideal shape.

Figure 89:
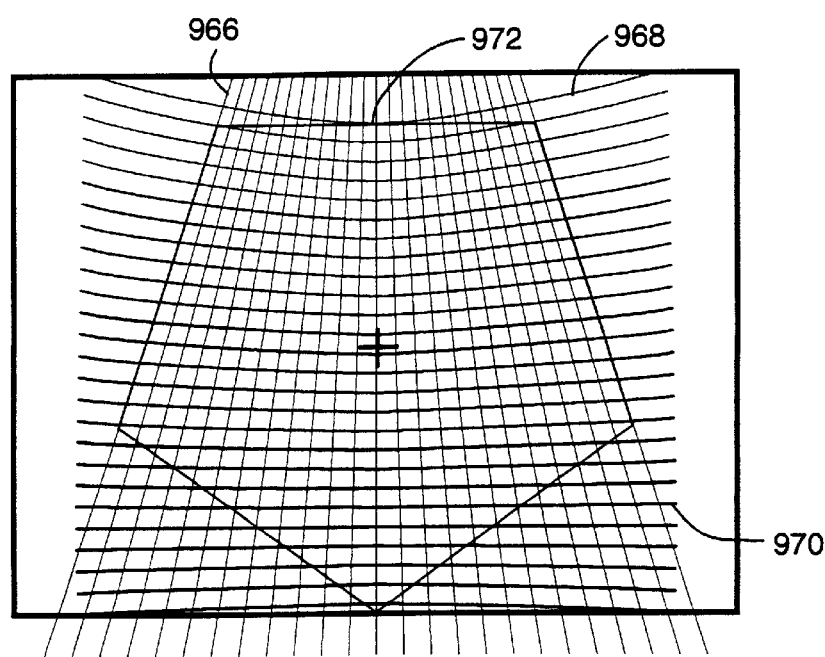

FIG. 89: Representation of the ideal goniotropic optical characteristics for the single pentagon image, expressed in latitude and longitude lines on a concentric global field of view.

Figure 90:
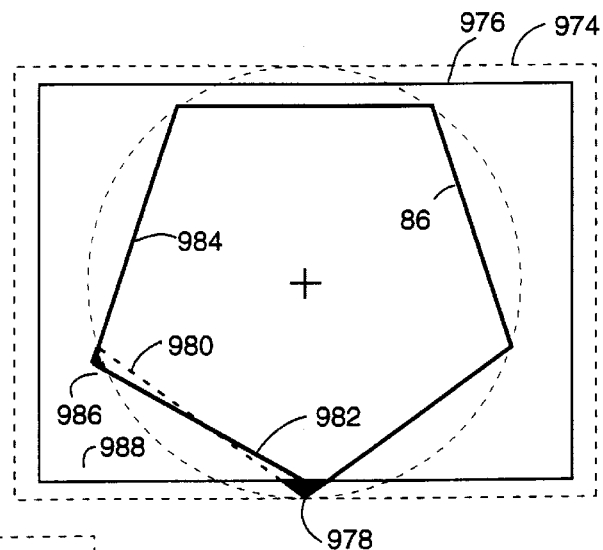

FIG. 90: A schematic representation of the optional correction of the equatorial edges of single pentagon images to fill in any missing regions caused by the use of lenses with fields of view narrower than the ideal.

Figure 91:
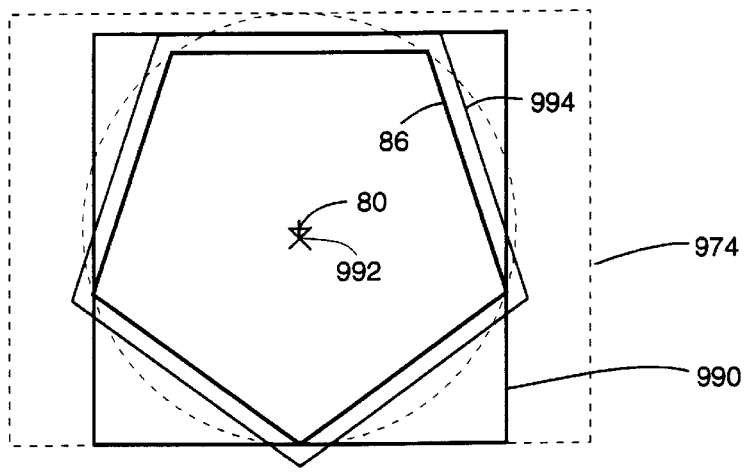

FIG. 91: A schematic view of a minimal square recording of a single-pentagon image, using a different optical center and a smaller angle of view than normal.

Figure 92:
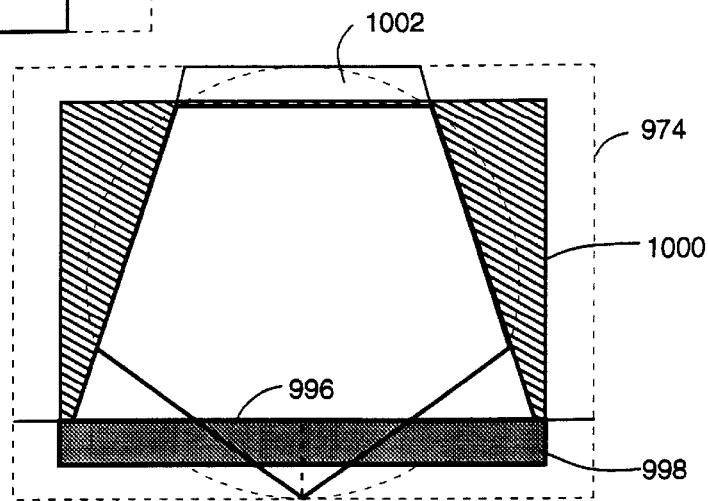

FIG. 92: Another type of cropping, designed to only show areas in above-horizon pentagons that are actually above the horizon.

FIG. 93: A schematic representation of the optional image areas in P-format double-pentagon images, and how they can serve to fill in a substantial portion of any missing image information in the topmost region of an overall recorded field of view.

FIG. 94: A schematic representation of the optional image areas in X-H format double-pentagon images, and how they can serve to fill in missing image information immediately below the horizon in an overall hemispherical recorded field of view.

Figure 95:
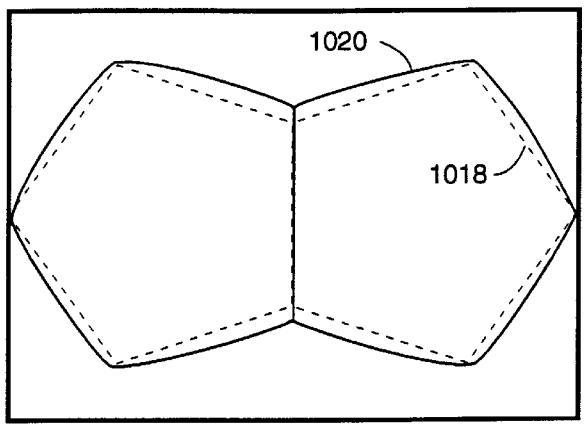

FIG. 95: The outline of a typical double-pentagon image in a wide aspect ratio, showing typical optical distortion.

Figure 96:
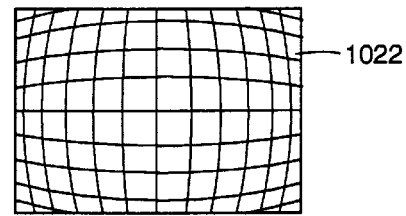

FIG. 96: A representation of typical optical barrel distortion in a wide-angle image.

Figure 97:
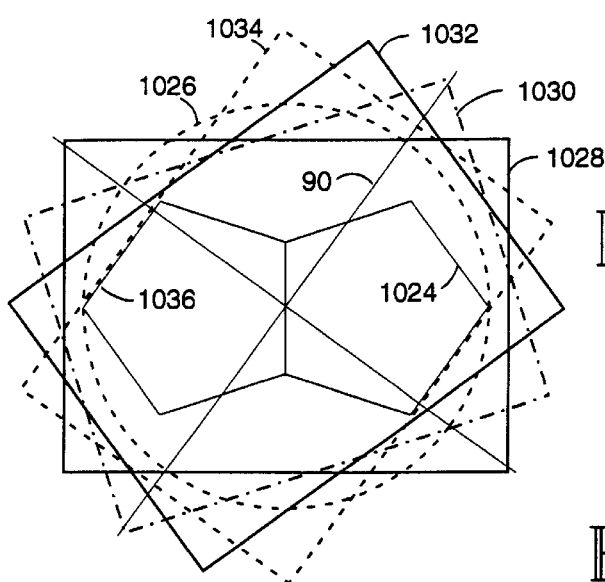

FIG. 97: Schematic representation of alternately tilted orientations for the recording of double-pentagon images in a 4:3 aspect ratio.

Figure 98:
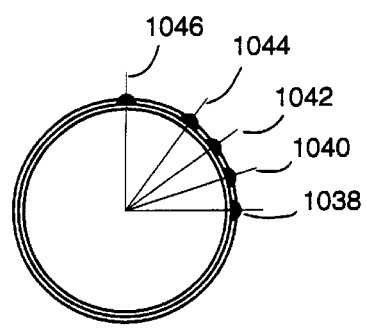

FIG. 98: Schematic representation of a camera mount with locking positions for these degrees of tilt.

FIG. 99: Representation of five pentagon images represented as tilted facets in a 4:3 aspect aspect ratio.

FIG. 100: Schematic view of a sequence of ten single pentagons arranged in a virtual sequence representing most of a spherical field of view, along with a horizontally movable region of interest.

Figures 101, 102:
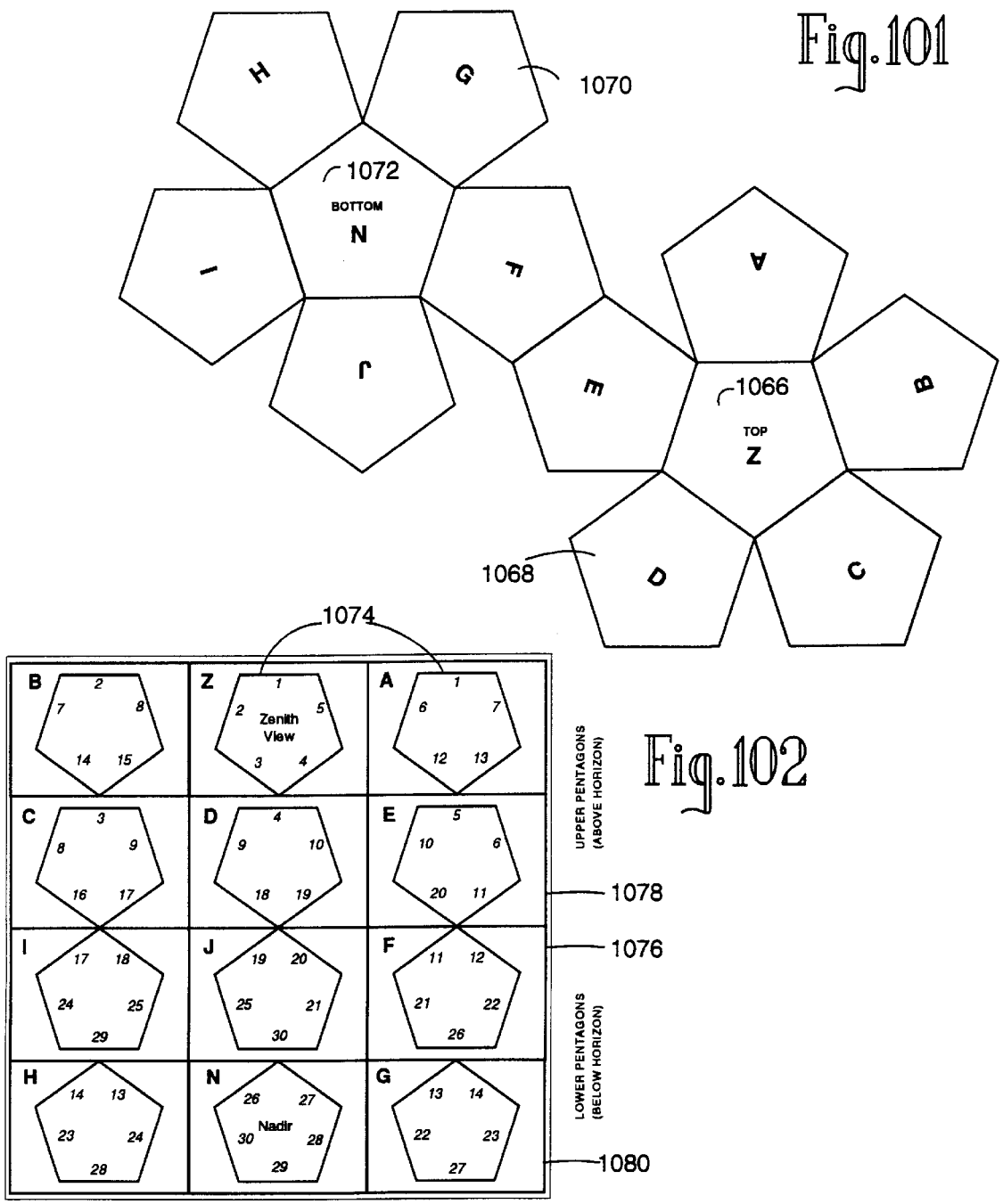

FIG. 101: Flattened view of the pentagonal facets of a spherical field of view, identified by standardized letters.

FIG. 102: Square storage template for condensed storage of a full spherical video image in twelve segments containing single-pentagon images, showing the individual facets and how their edges match.

FIG. 103: Wide-aspect-ratio storage template for condensed storage of twelve 4:3 video images containing single identified pentagons, surrounded by the optional image area to encode additional pentagons.

FIG. 104: Schematic diagram showing the relationship between a video aspect ratio of 4:3 and a square containing a central pentagon.

FIG. 105: Storage template in a 4:3 aspect ratio for condensed storage of a full spherical video image in twelve squares containing single-pentagon images.

Figure 106:
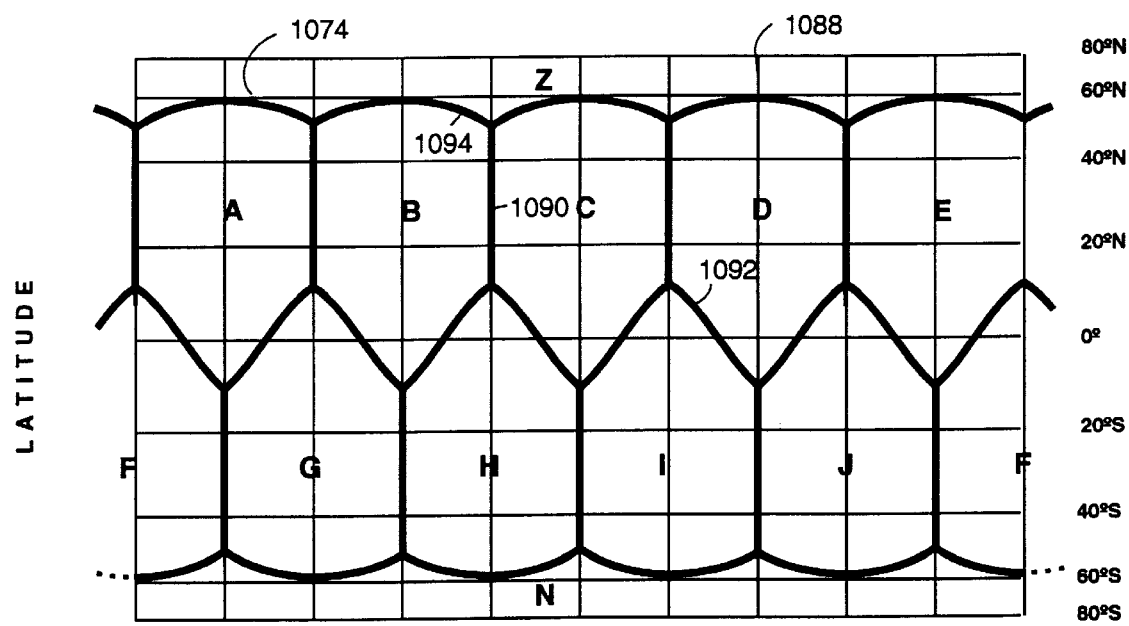

FIG. 106: Storage template in a 1.5:1 aspect ratio for condensed storage of a full spherical video image in twelve dodecahedral divisions, according to the Arno Peters global projection.

Figure 107A:
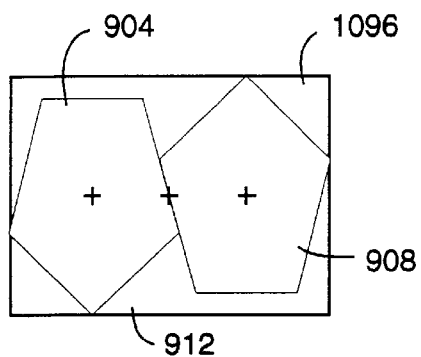
Figure 107B:
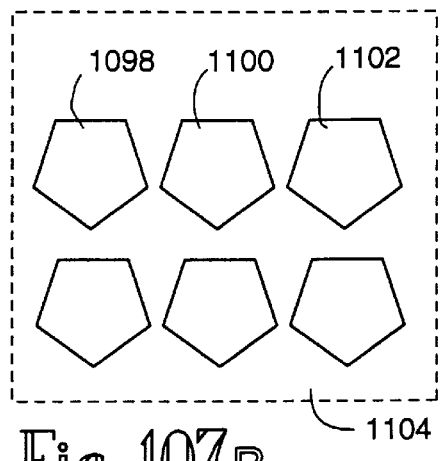

FIG. 107: Storage template for condensed storage of multiple pentagons in an anamorphically-squeezed 4:3 single-pentagon format, showing the extraction of up to six separate pentagonal views.

FIG. 108: Schematic view of a storage template for up to four anamorphically-squeezed 4:3 images, along with a second set for additional views such as for 3-D.

FIG. 109: Storage template for condensed storage of a stereoscopic spherical video image in the double-pentagon P-format, showing their division into right-eye and left-eye views.

DISPLAY MEANS

Figure 110:
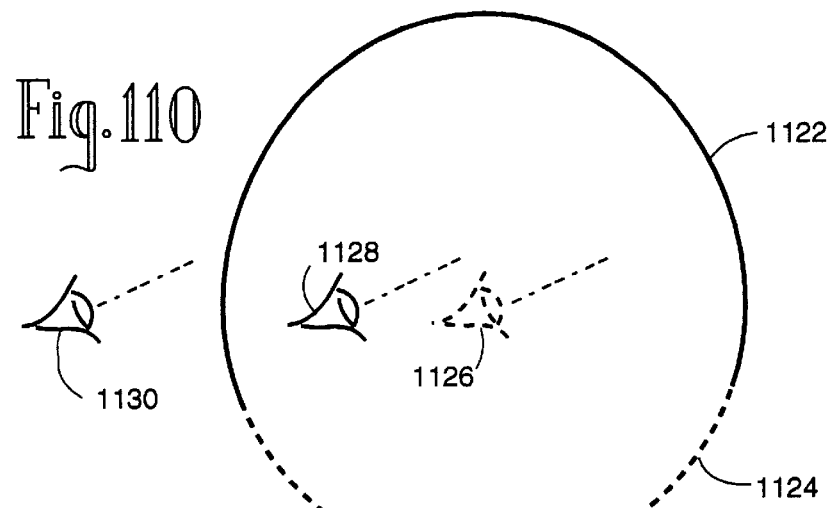

FIG. 110: Summary diagram of three possible ways of viewing the information representing a spherical field of view, including a virtual viewpoint, a point of view from inside a dome, and a point of view on the outside of a translucent sphere.

VIRTUAL VIEWING MEANS

Figure 111:
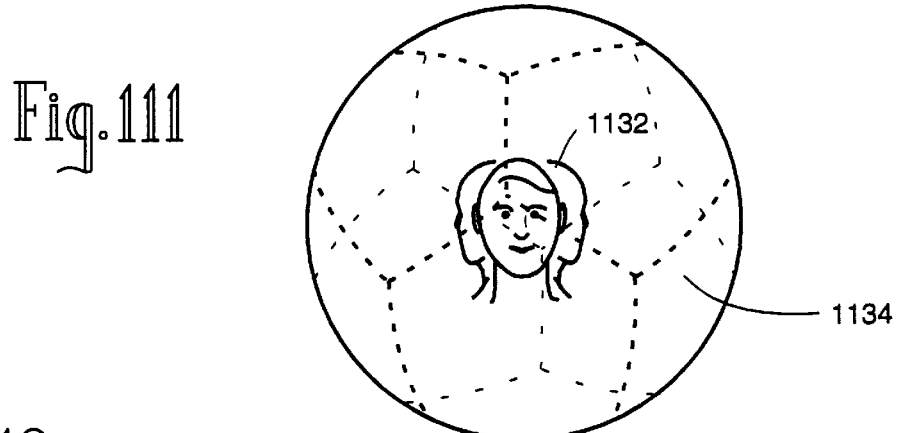

FIG. 111: Symbolic representation of a virtual viewpoint established in the center of a spherical field of view, wherein the viewer is free to look around.

Figure 112:
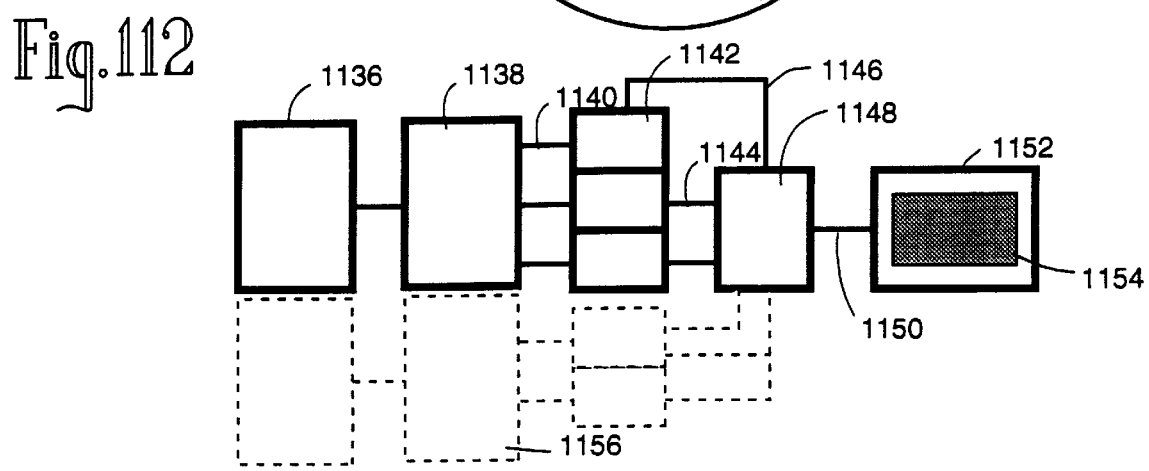

FIG. 112: Block diagram of the components of a multi-channel codec for the construction of a surrounding virtual field of view and the display of a region of interest therein.

PROJECTION MEANS

FIG. 113: Cross sections of a small personal dome projection screen, capable of being assembled in sections, showing a compact central dodecahedral projector for full or partial dome views.

Figure 114:
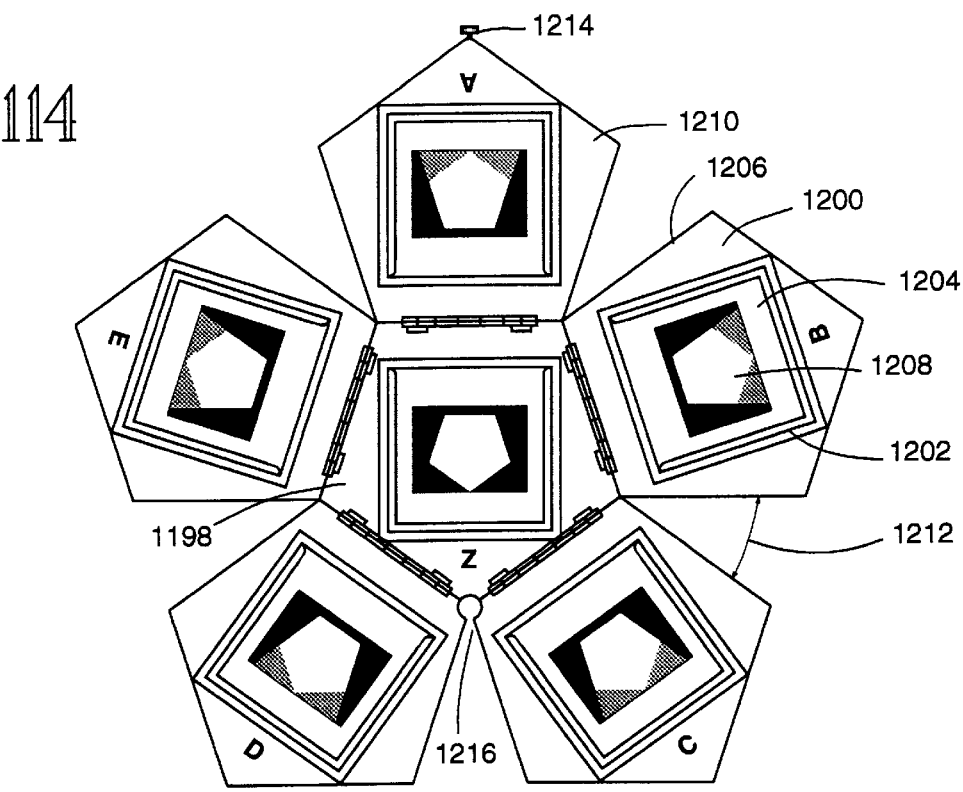

FIG. 114: A flattened top view of a hinged slide mount for six single-pentagon slides representing a hemispherical view, wherein the slides are hinged to a central view.

Figure 115:
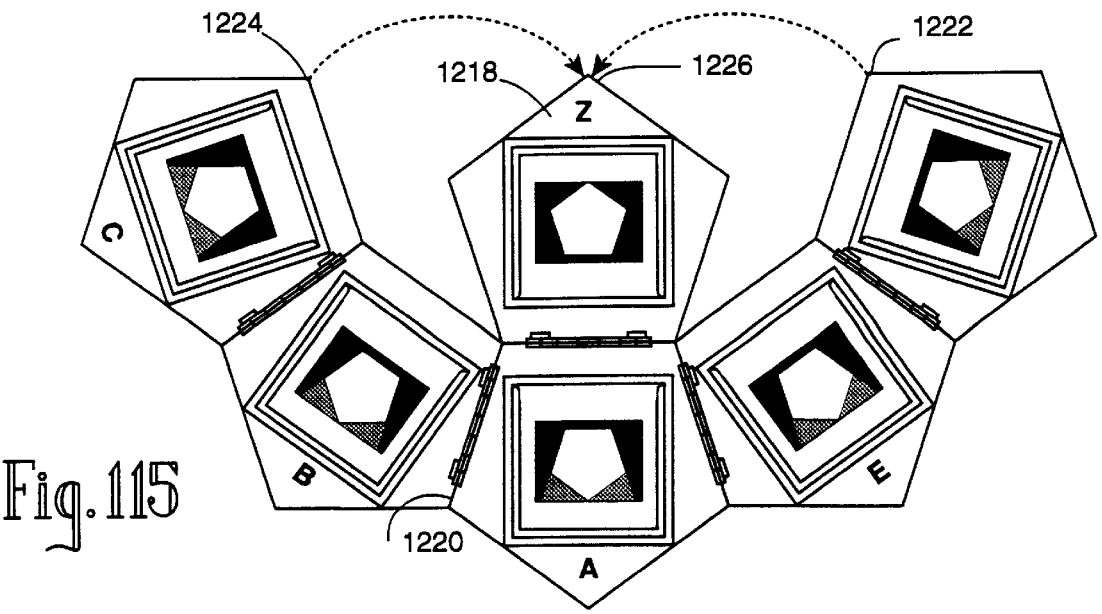

FIG. 115: A flattened top view of an alternate hinged slide mount for six single-pentagon slides representing a hemispherical view, wherein the above-horizon slides are mostly hinged to each other.

Figure 116:
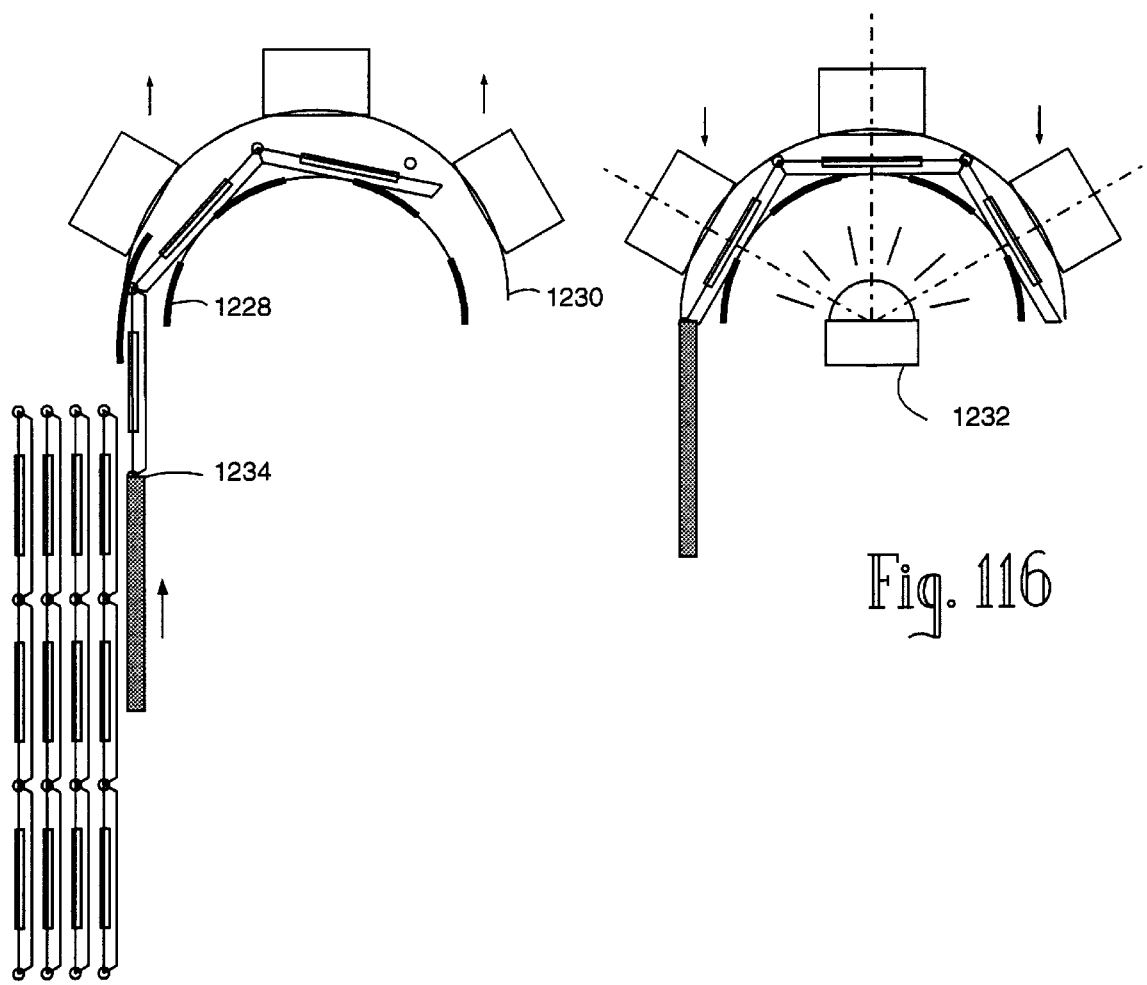

FIG. 116: Cross section of a slide projector for the display of up to six single-pentagon images representing a hemispherical view.

Figure 117:
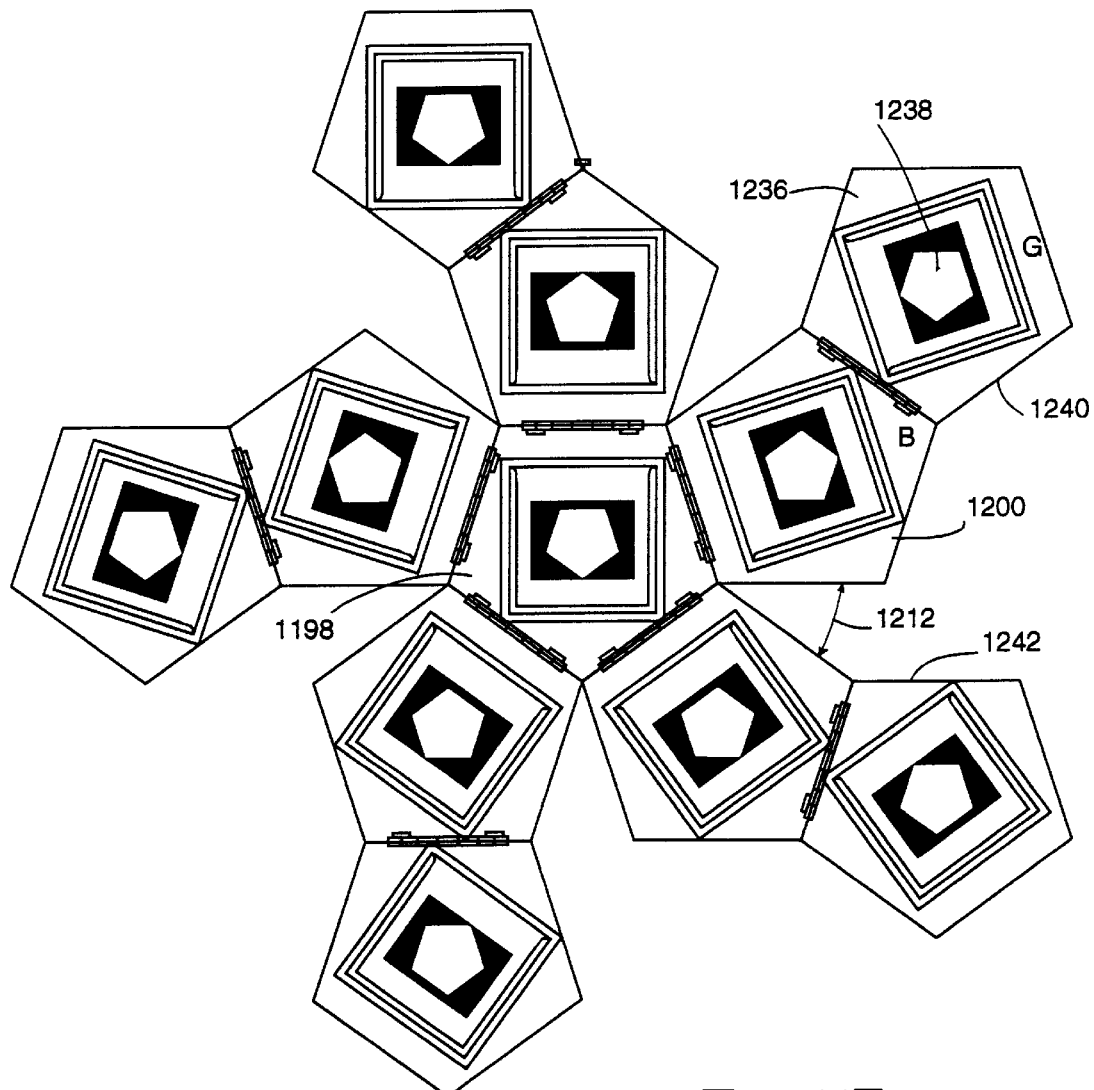

FIG. 117: A flattened top view of a hinged slide mount for single-pentagon projection, showing additional images added below the horizon for a nearly spherical image.

Figure 118:
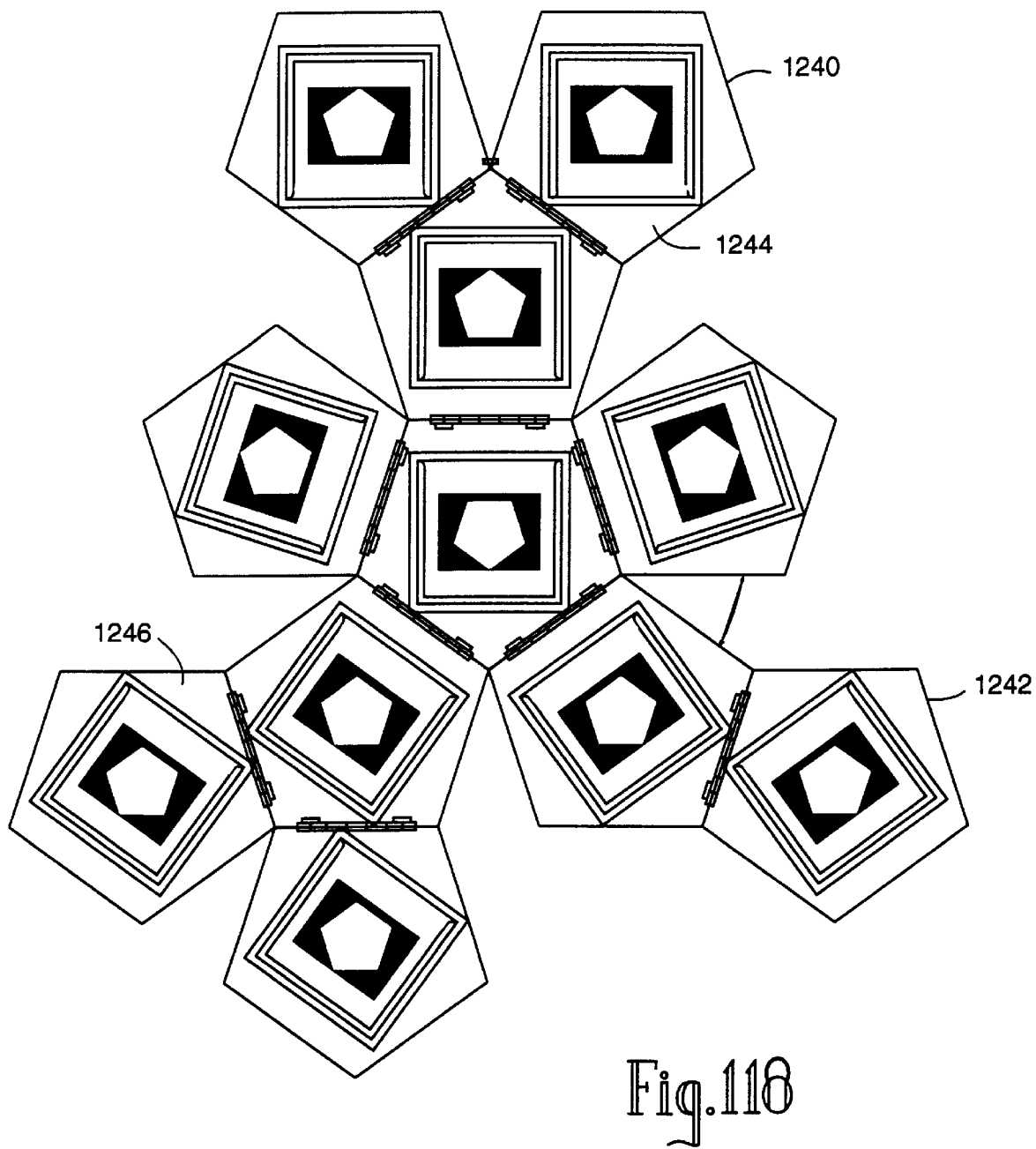

FIG. 118: A flattened top view of an alternate hinged slide mount for a nearly spherical image.

Figure 119:
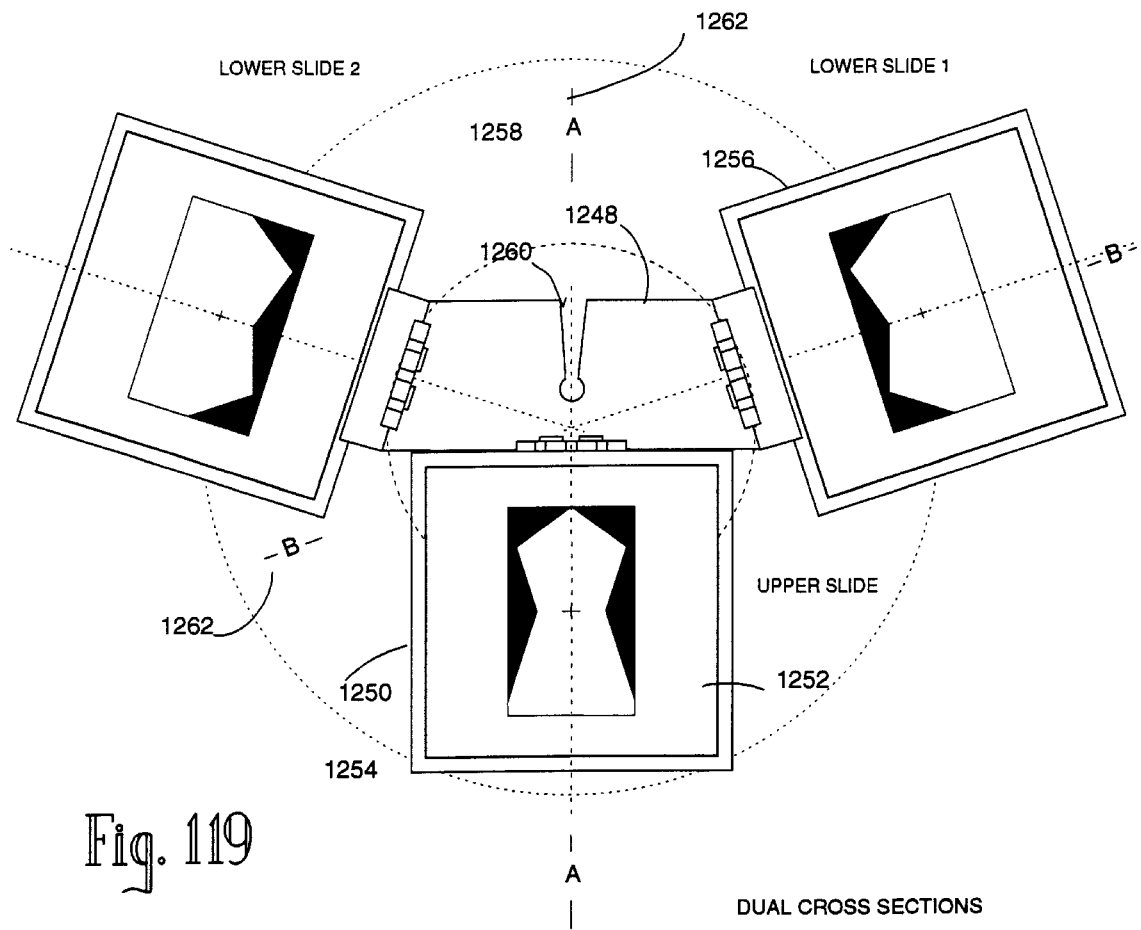

FIG. 119: A flattened top view of a hinged slide mount for three double-pentagon slides photographed according to the X-H format, representing a hemispherical view.

Figure 120:
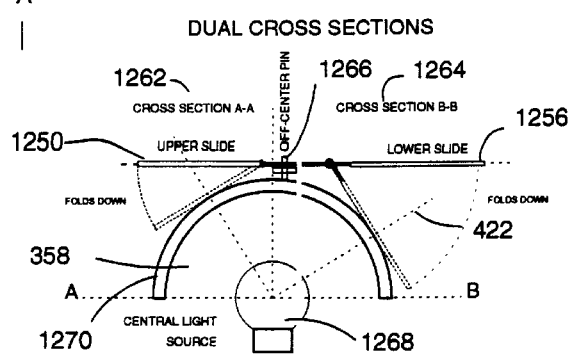

FIG. 120: Dual cross sections of a slide projector for the above mount.

Figure 121:
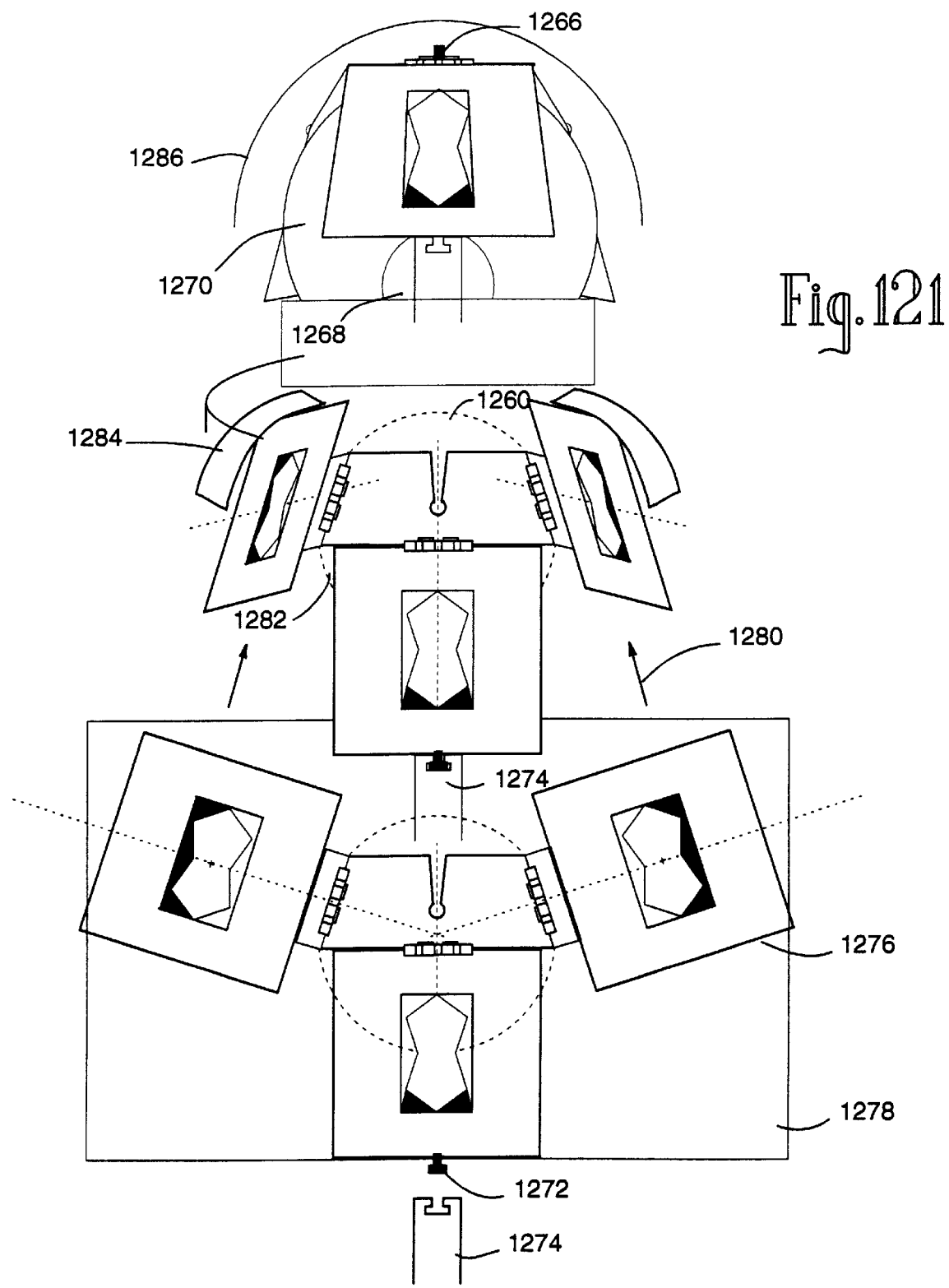

FIG. 121: Sequential side views showing the sequential manipulation of this slide mount in a special slide projector.

Figure 122:
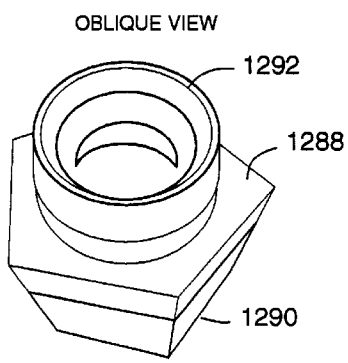
Figure 122:
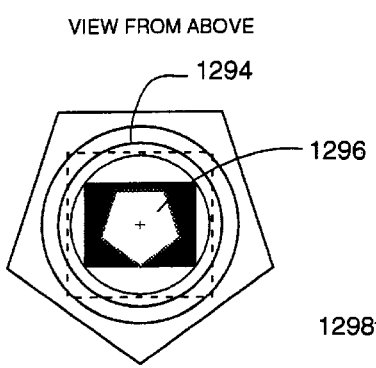
Figure 122:
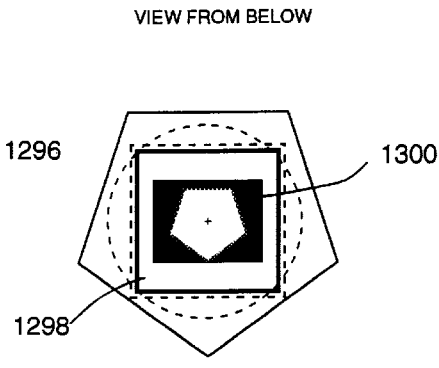

FIG. 122: Oblique, top and bottom views of a dodecahedral LCD projection module.

Figure 123:
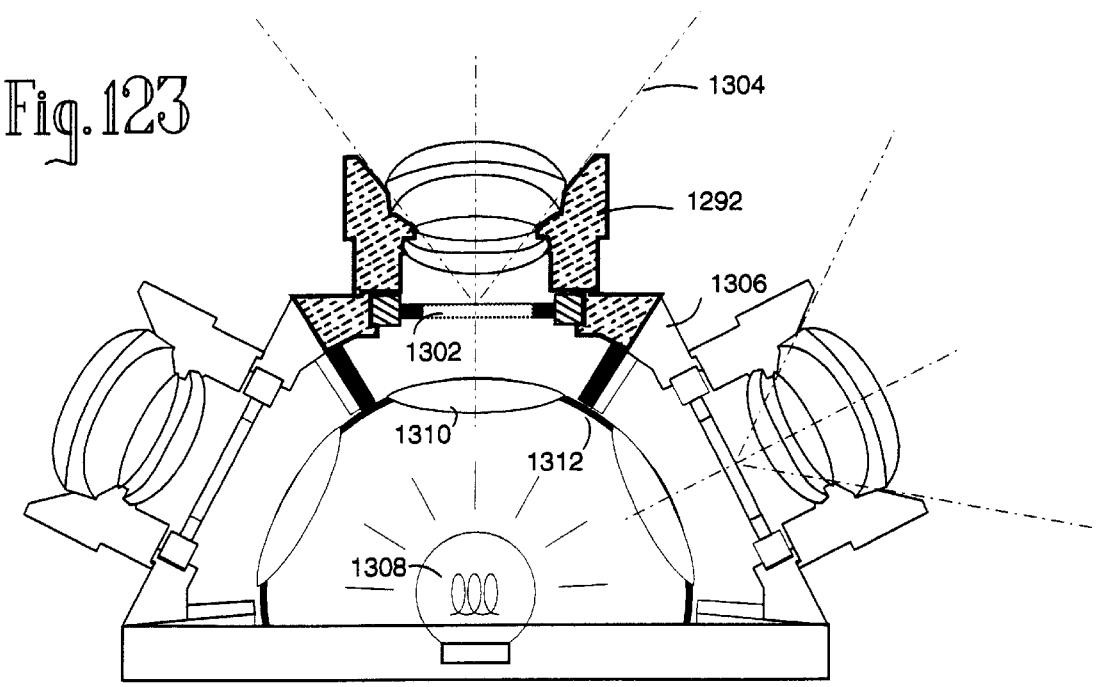

FIG. 123: Conventionalized cross section of a modular dodecahedral Liquid Crystal Display (LCD) video projector with a central light source for a hemispherical image.

Figure 124:
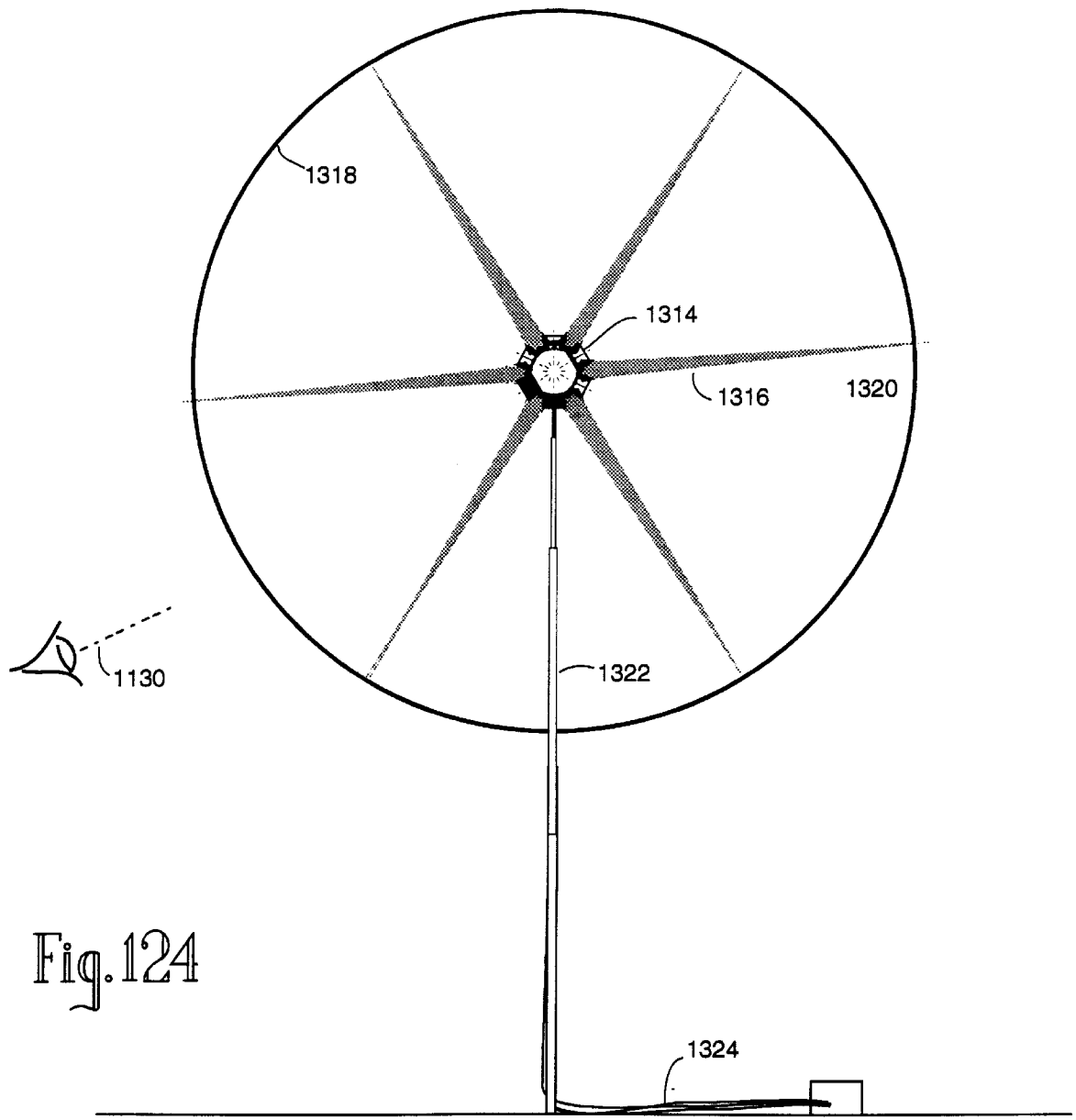

FIG. 124: Silhouette view of a modular dodecahedral LCD global video projector and a concentric global projection surface.

Figure 125:
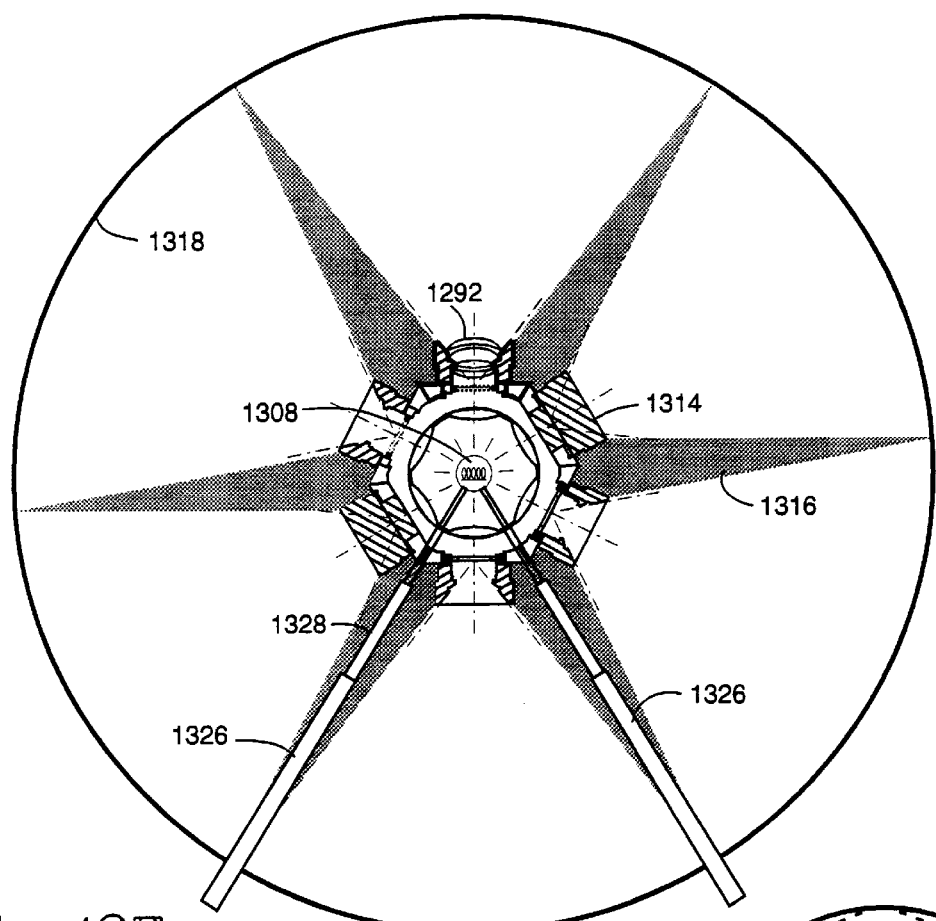

FIG. 125: Conventionalized cross section of a modular Liquid Crystal Display (LCD) global video projector with a central light source.

Figure 126:
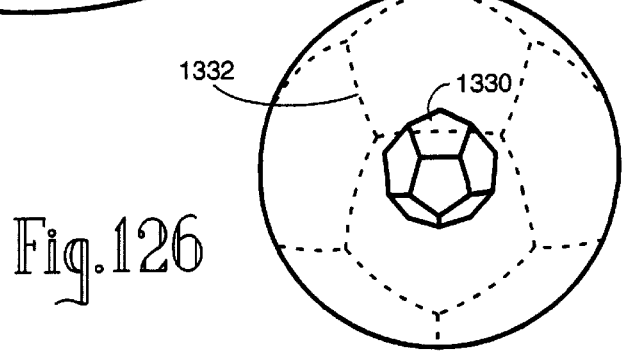

FIG. 126: Schematic representation of a dodecahedron projected onto a concentric sphere, showing dodecahedral divisions of the sphere.

FIG. 127: Conventionalized cross section of a modular LCD global projector with a fiber optic remote light source, and individual fiber optic illumination cables for the projection modules.

FIG. 128: A schematic representation of a global projection surface, with pentagonal support legs consistent with extensions of the vertices of a central dodecahedron.

Figure 129:
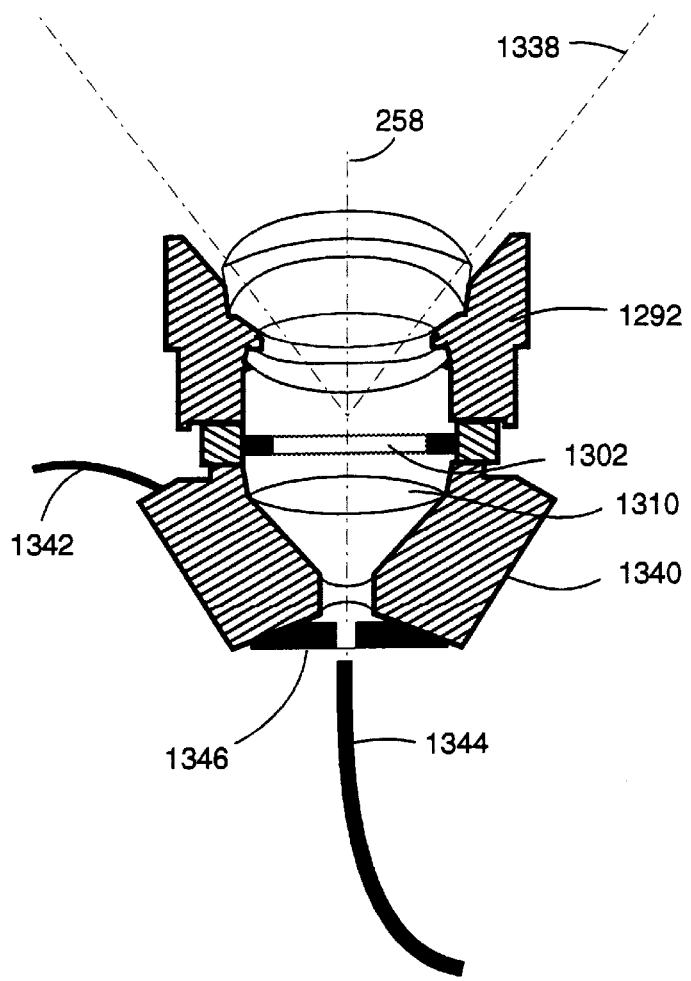

FIG. 129: Cross section of an individual fiber optic projection module, showing illumination and signal cables.

Figure 130:
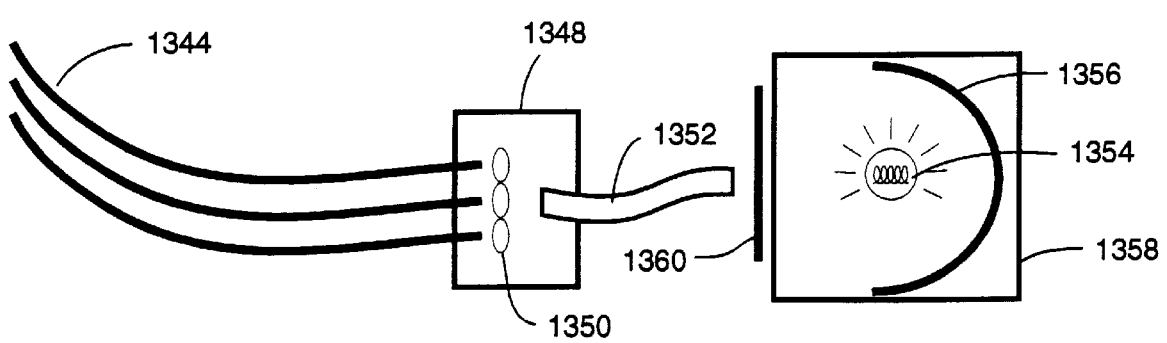

FIG. 130: Cross section of a remote fiber optic illumination source, and its division into individual illumination cables.

Figure 131:
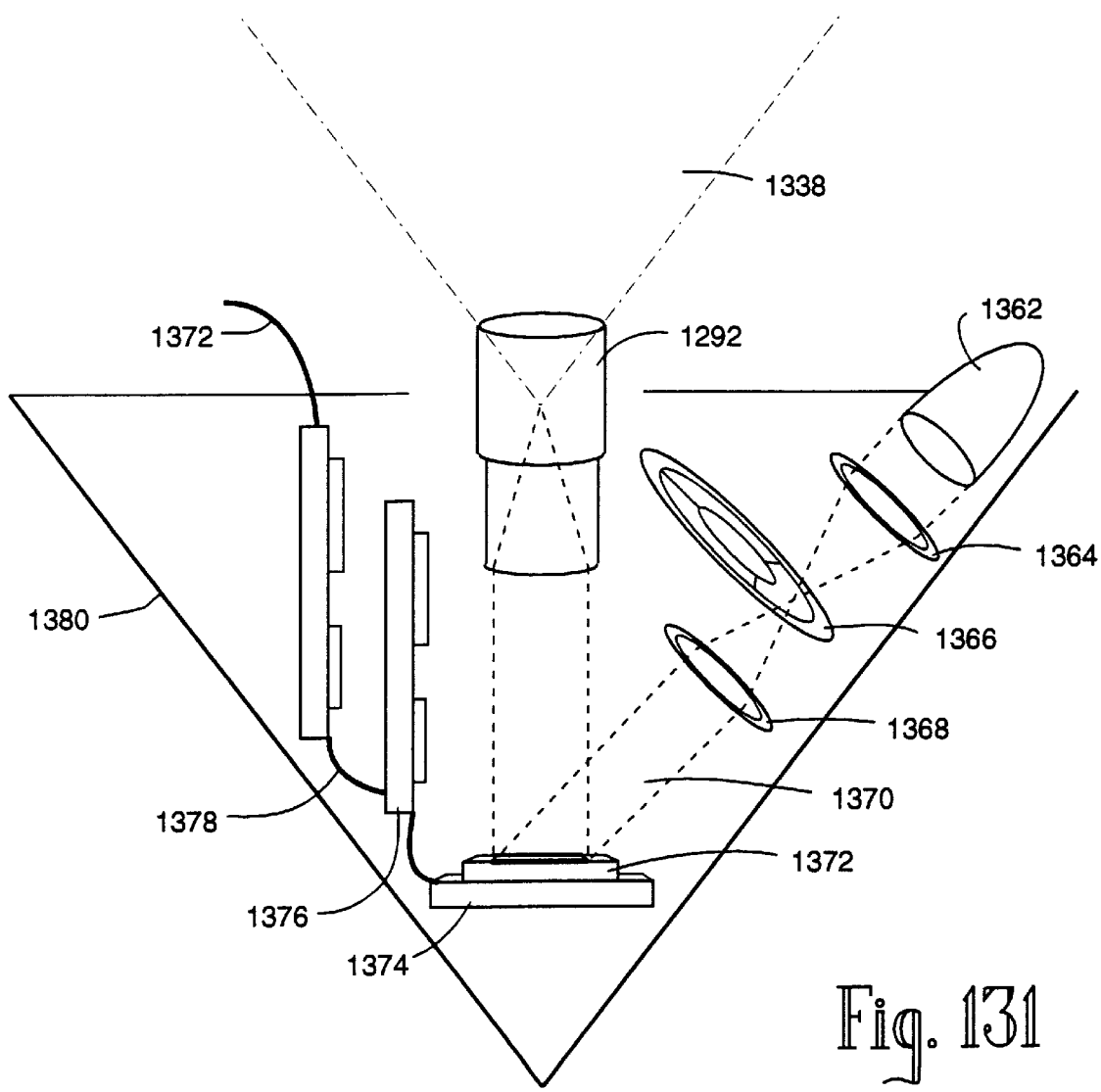

FIG. 131: Cross section of a spherical television screen with a central X-S format double-pentagon pentagonal image projector, made for viewing from outside the screen.

Figure 132:
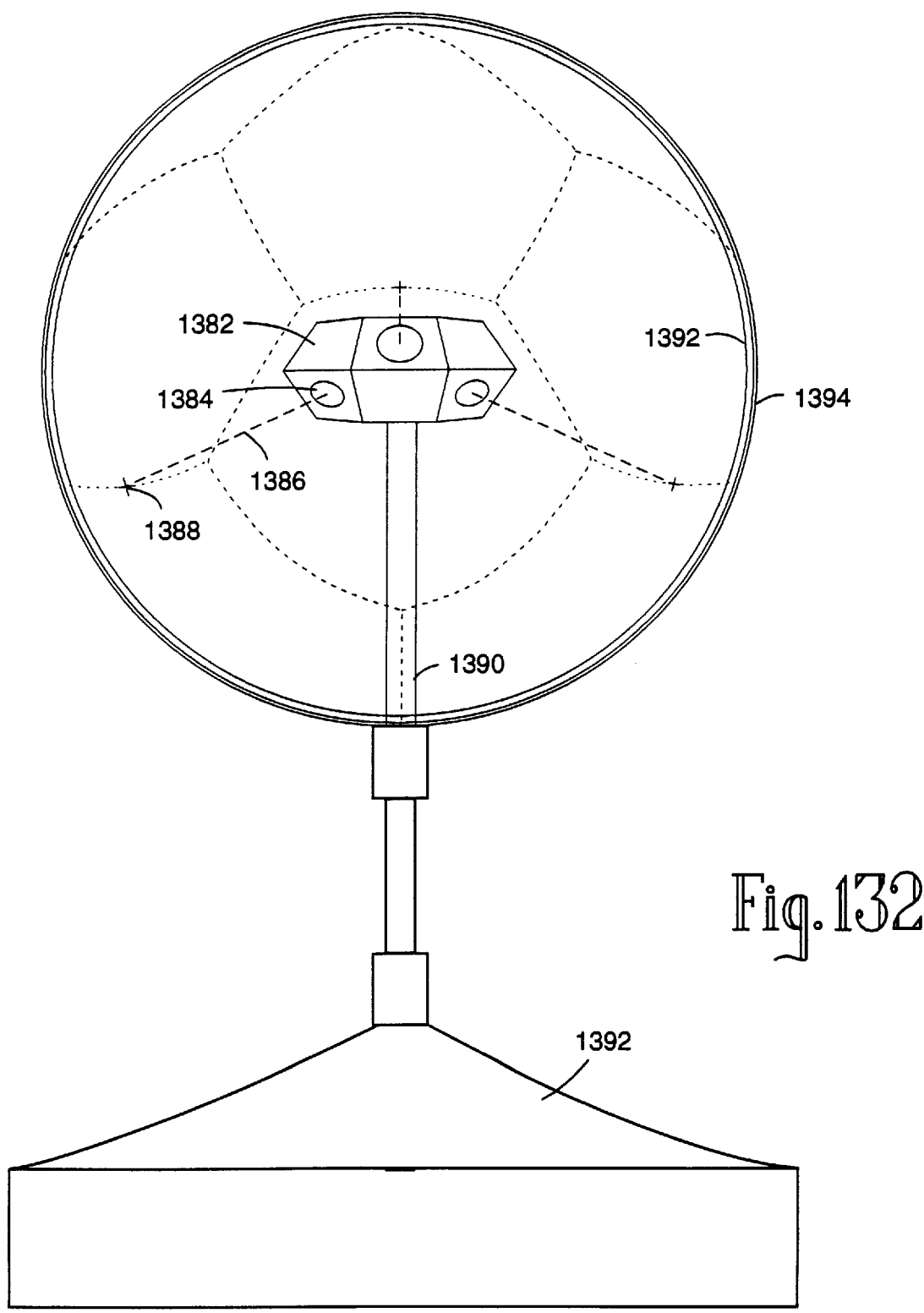

FIG. 132: Cross section of an individual Digital Multi-mirror Device (DMD) projection module, showing the illumination path components.

Figure 133:
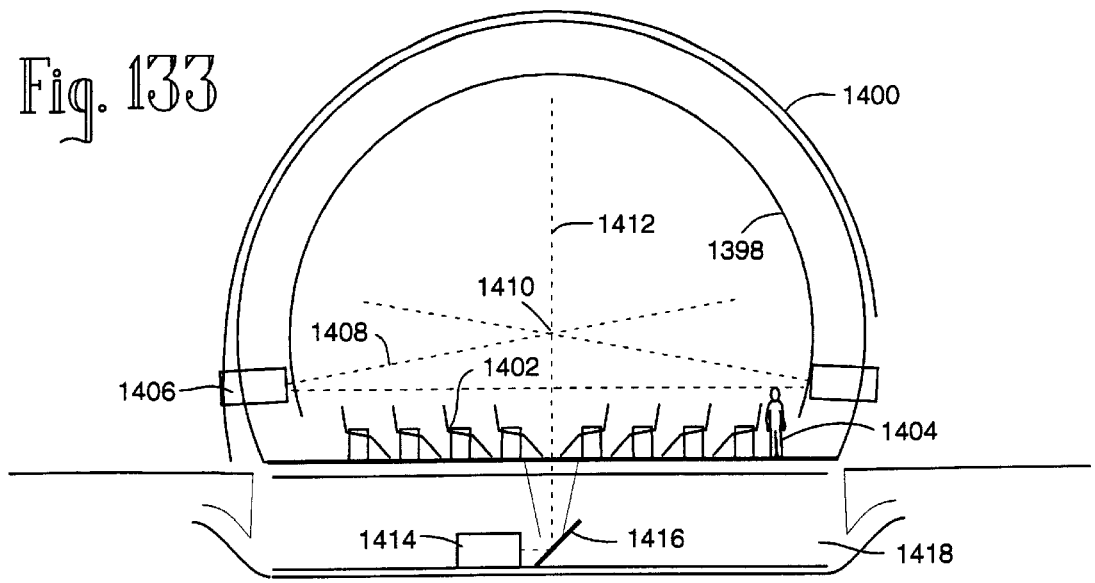

FIG. 133: Cross section of a dome theater showing peripheral projection, and the use a mounted mirrors for the vertical view.

Figure 134:
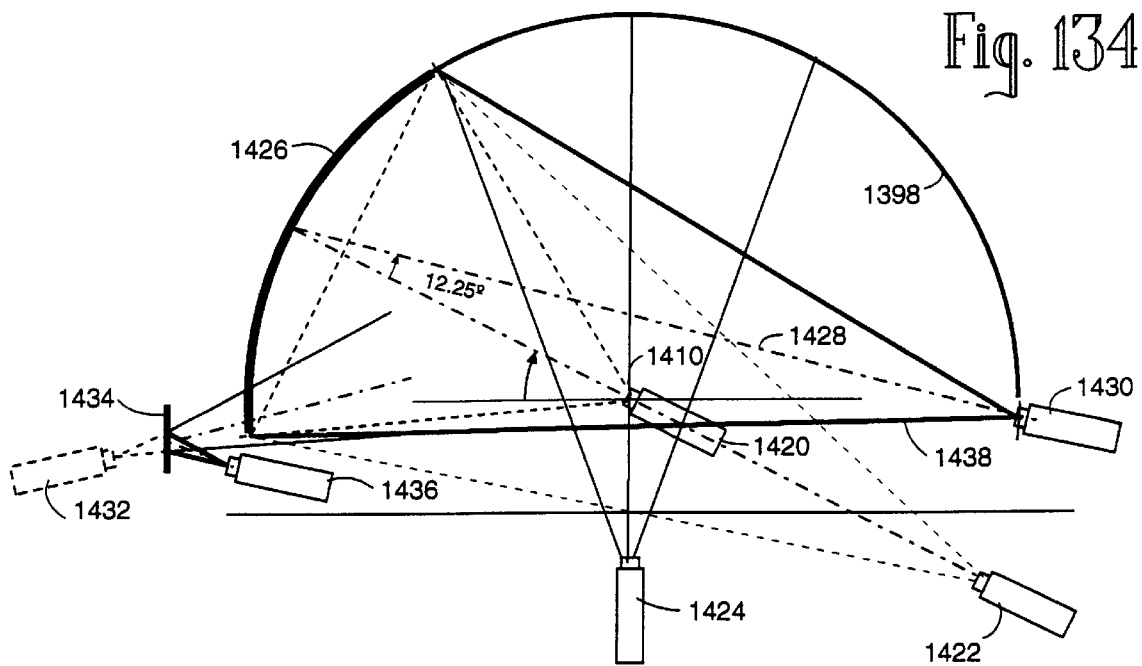

FIG. 134: Composite cross section of a dome screen showing peripheral projection, off-axis projection and the use of mounted mirrors for extended throw distances.

Figure 135:
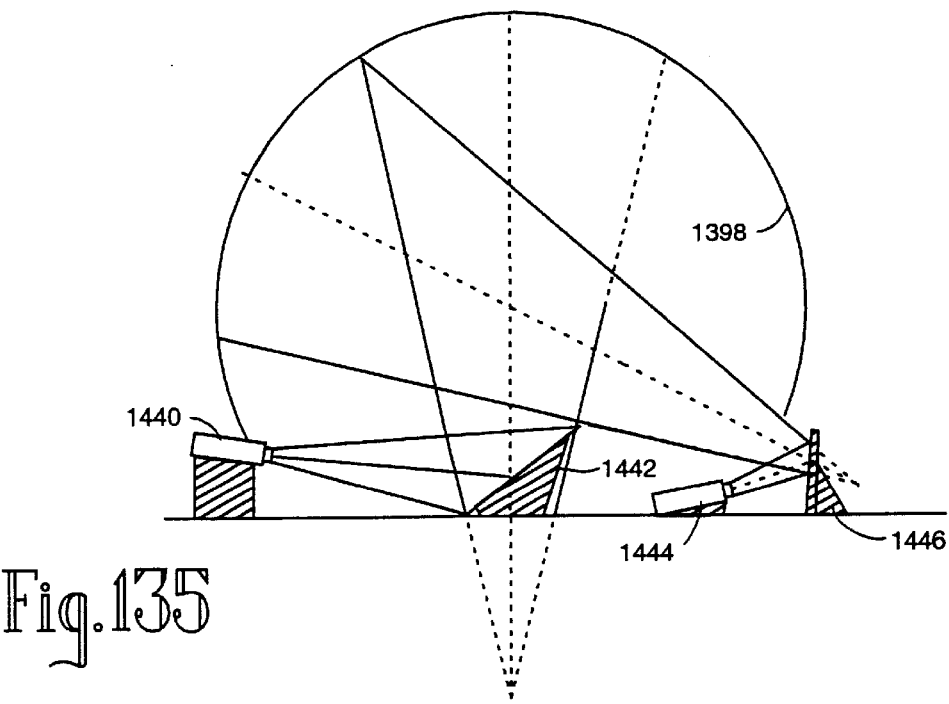

FIG. 135: Cross section of dome screen projection showing the use of mounted mirrors for extended throw distances.

SCREEN MEANS

Figure 136:
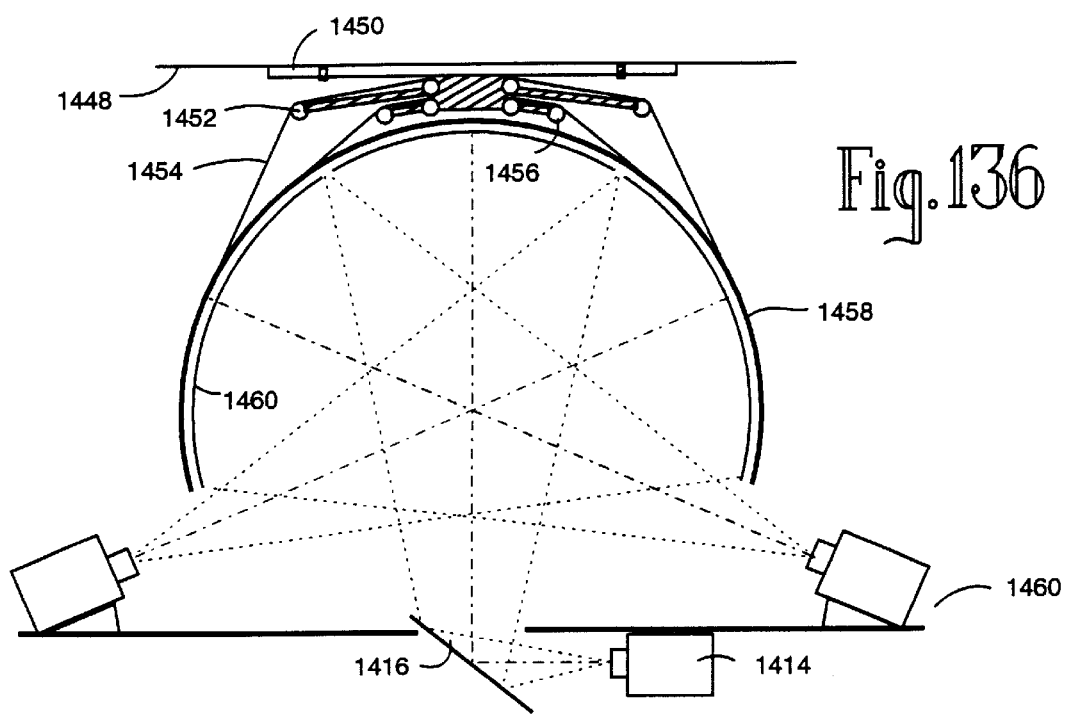

FIG. 136: A cross section of a geodesic curtain screen, showing the suspension elements and the position of projectors.

Figure 137:
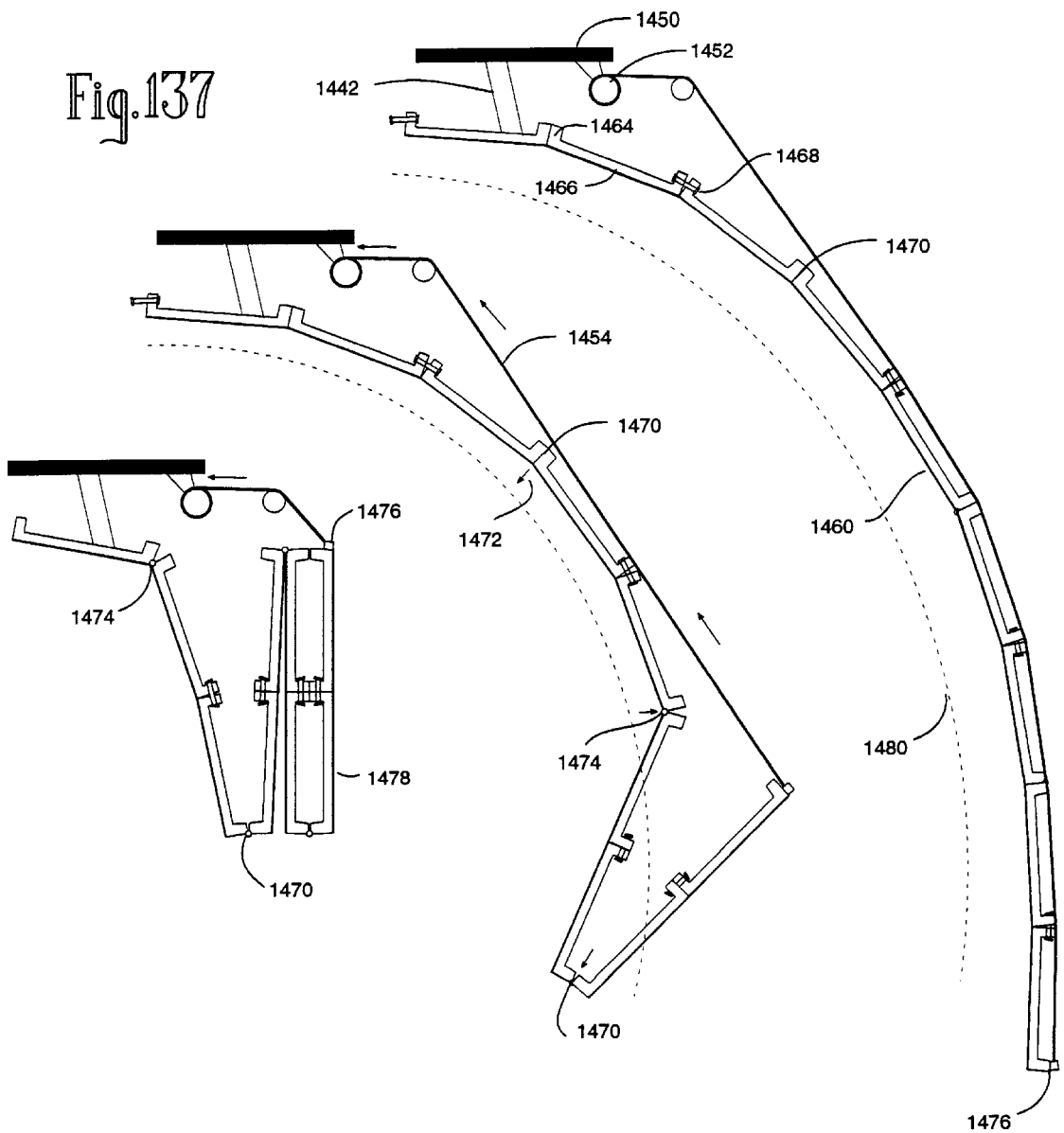

FIG. 137: A cross section of a portion of this screen, showing the types of hinging elements and how they interact during extension and retraction.

Figure 138:
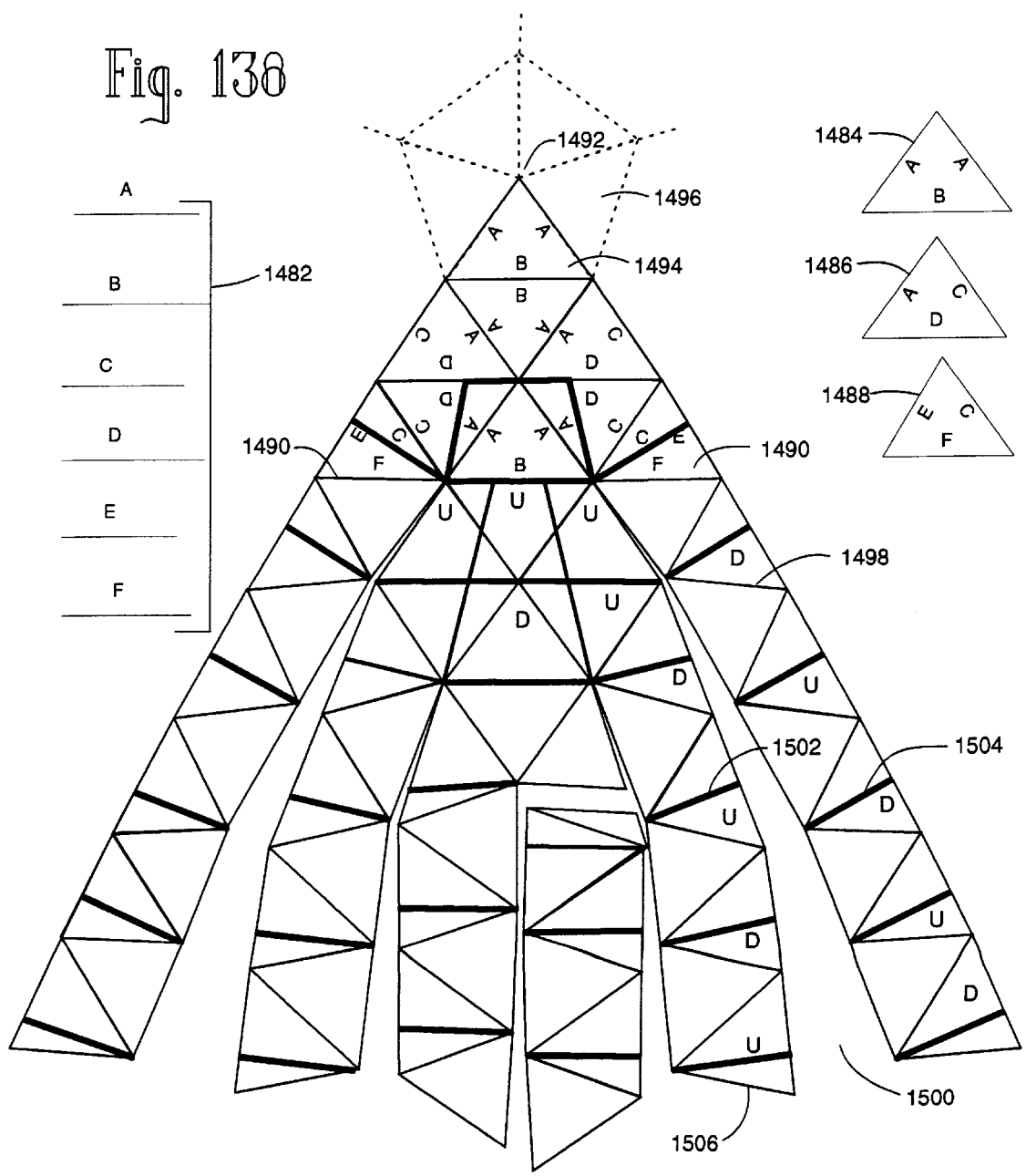

FIG. 138: Flattened top view of a section of this geodesic screen, showing its component parts and the location of the hinges.

FIG. 139: Top view of the framework of another kind of dome screen, made of sections that can be disassembled and easily packed, and designed according to geodesic great-circle division of the sphere.

FIG. 140: Schematic view of the components of this modular screen frame.

Figure 141:
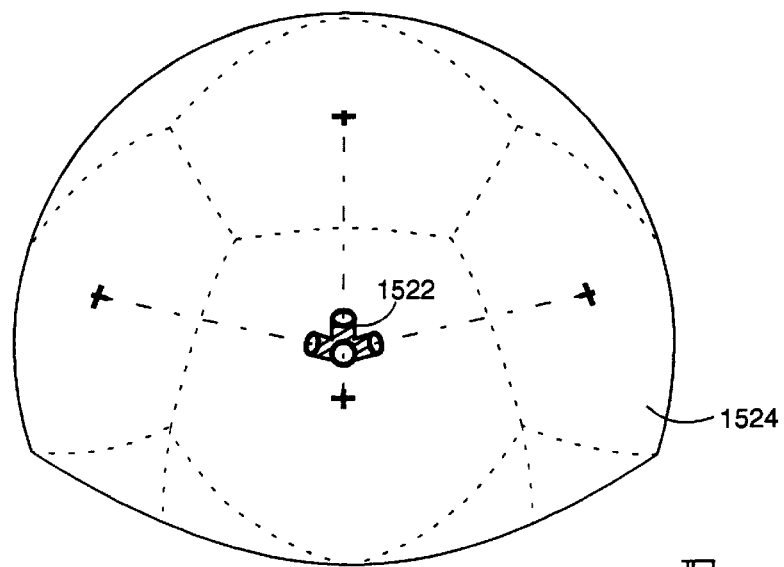

FIG. 141: A representation of a four-pentagon projected view.

Figure 142:
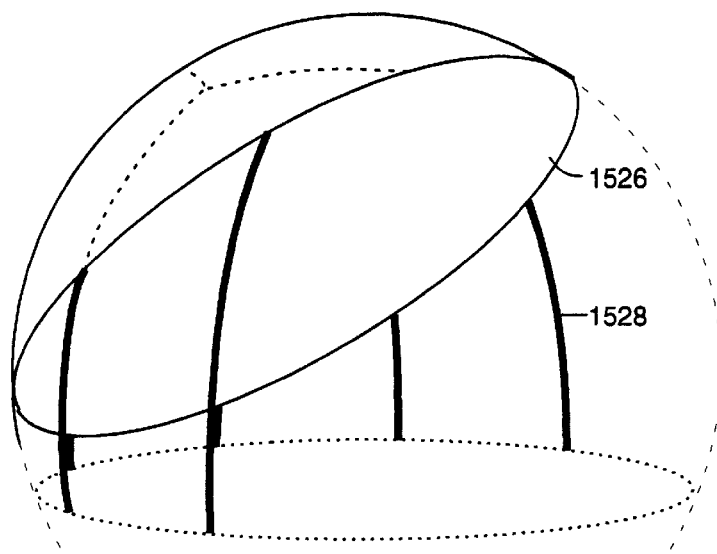

FIG. 142: A perspective view of a partial dome screen representing a three-pentagon view.

Figure 143:
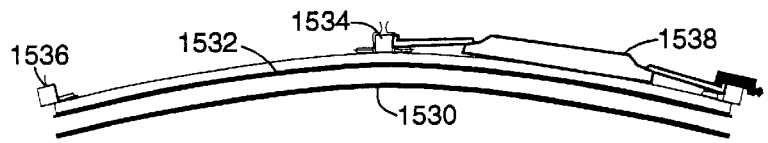

FIG. 143: Cross section of the framework and covering for the modular dome screen described above.

Figure 144:
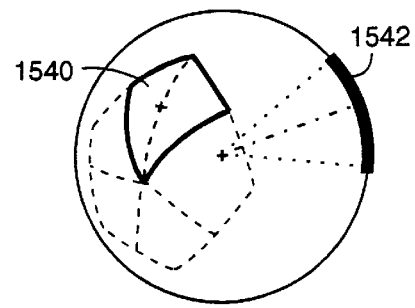

FIG. 144: A perspective view of a sphere, showing how each kite-shaped division of this modular screen represents a fifth of a pentagon.

Figure 145:
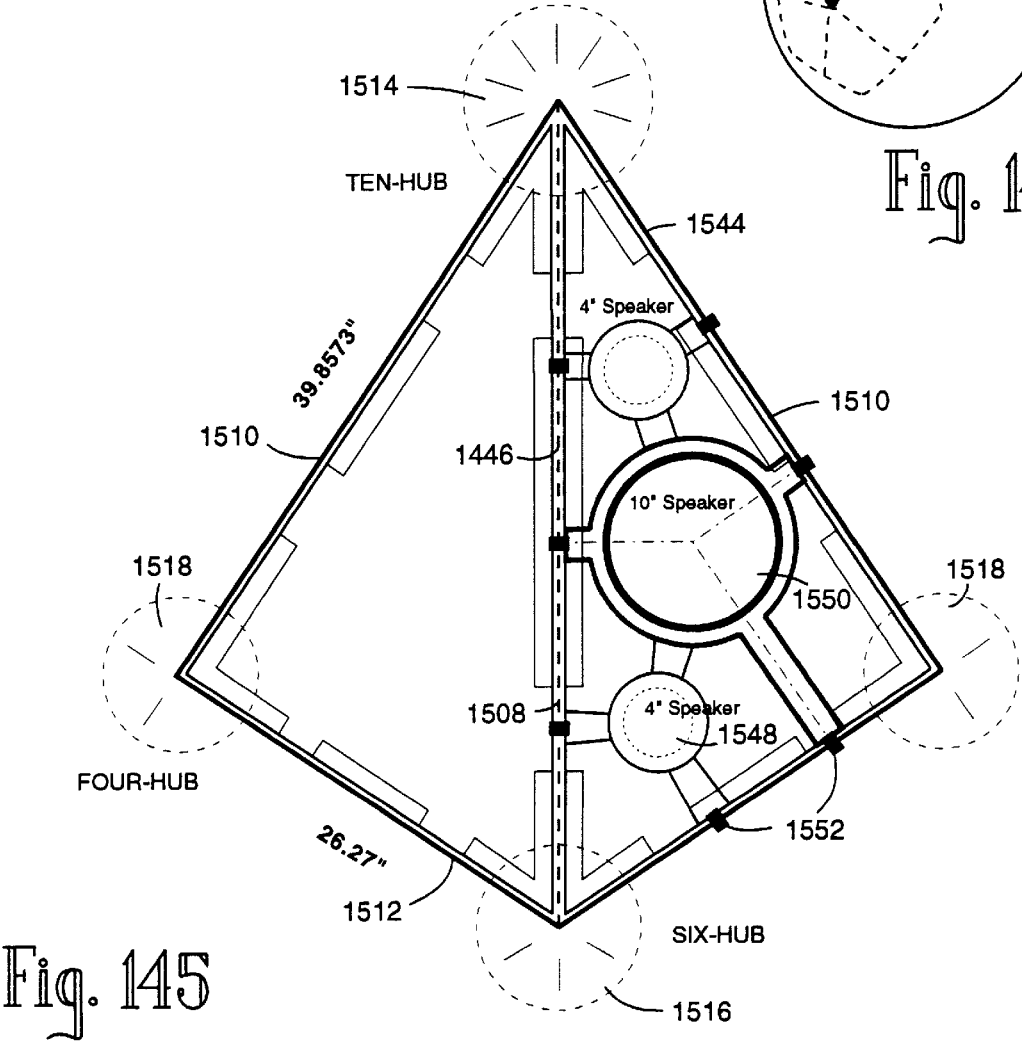

FIG. 145: Top view of one assembled section of this screen, along with its covering, and showing the mounting of an attached speaker.

LIST OF PARTS

| FIG. | # | Description |
|---|---|---|
| FIG. 1 | 2 | A Pentagonal Dodecahedron |
| | 4 | Dodecahedron Center |
| | 6 | Face (center) |
| | 8 | Edge (center) |
| | 10 | Vertex (center) |
| FIG. 2 | 12 | Concentric field of view sphere |
| | 14 | Pole point of dodecahedron |
| | 16 | Projected center of face |
| | 18 | Projected center of edge |
| | 20 | Projected center of vertex |
| | 22 | Polar axis - upper |
| | 24 | Polar axis - lower |
| | 26 | Axis to face (center) |
| | 28 | Axis to edge (center) |
| | 30 | Axis to vertex (center) |
| FIG. 3 | 32 | Cross section plane (of FIG. 3) |
| | 34 | Dodecahedron face |
| | 36 | Projected Dodeca pentagon face |
| | 38 | Center to face center (insphere radius) |
| | 40 | Distance to edge (center) (Intersphere radius) |
| | 42 | Distance to vertex (circumsphere radius) |
| FIG. 4 | 44 | Target reference point for alignments (double pentagon) |
| | 46 | First X - format X-H horizontal 1 |
| | 48 | Second X - format X-H horizontal 2 |
| | 50 | Width line of X -H 1 |
| | 52 | Width line of reference |
| | 54 | Offset P - format #1 left leaning |
| | 56 | Width line of above |
| | 58 | First offset P - format #1 right leaning |
| | 60 | Width line of above |

LIST OF PARTS-continued

|  |  |  |
|---|---|---|
|  | 62 | Second offset P - format #2 right leaning |
|  | 64 | Target reference vertex |
|  | 66 | Octahedral edge (center) |
|  | 68 | Width line of above |
|  | 70 | Rotation of target octahedrally |
|  | 72 | Rotationally offset position of target |
|  | 74 | Target vertex (3 pentagons) |
|  | 76 | First offset vertex |
|  | 78 | Second offset vertex |
| FIG. 5 | 80 | Center of a pentagon, recorded |
|  | 82 | Outside of a 4:3 recorded image |
|  | 84 | Central circle touching top and bottom edges |
|  | 86 | Straight edge of central pentagon |
|  | 88 | Optically distorted photographed pentagon edge |
|  | 90 | Photographed horizon |
|  | 92 | Distorted extended pentagon line |
|  | 94 | Straightened extended pentagon line |
|  | 96 | Extra image area outside pentagon |
| FIG. 6 | 98 | Center of 2 pentagon |
|  | 100 | Path connecting above - horizon centers |
|  | 102 | Path connecting below horizon centers |
| FIG. 7 | 104 | Pentagonal field of view on sphere |
|  | 106 | Boundary of lens field of view |
|  | 108 | Horizon plane |
|  | 110 | Still camera |
|  | 112 | Tripod |
|  | 114 | Flat position for vertical shot |
|  | 116 | Flat position for above horizon shots |
|  | 118 | Axis of above - horizon elevation |
|  | 120 | Rotation around polar axis |
|  | 122 | Nodal point of rotation |
| FIG. 8 | 124 | Flat position for below horizon shots |
|  | 126 | Axis of below - horizon declination |
|  | 128 | Camera lens |
|  | 130 | Quick - release female mount |
|  | 132 | Male mount for vertical |
|  | 134 | Male mount for above - horizon |
|  | 136 | Male mount for below - horizon |
|  | 138 | Male mount for panoramic photography |
|  | 140 | Horizontal optical axis |
| FIG. 9 | 142 | Distance from side of mount to polar axis |
|  | 144 | Distance from bottom of camera to optical center plane |
|  | 146 | Camera tilting support |
|  | 148 | Distance from nodal point to camera mount |
|  | 150 | Rotary overall support |
|  | 152 | Fixed mount |
|  | 154 | Rotary motor |
|  | 156 | Drive gear |
|  | 158 | Tilting motor |
|  | 160 | Following gear |
|  | 162 | Axis of tilt |
| FIG. 10–11 | 164 | Stereoscopic shift distance from center axis |
|  | 166 | Shifted optical axis |
|  | 168 | Camera in shifted position |
|  | 170 | Camera mount |
|  | 172 | Linear motion control track |
|  | 174 | Worm gear |
|  | 176 | Motion control motor |
|  | 178 | Camera in opposite shifted position |
| FIG. 12 | 180 | Intersection point of inward - pointing optical axis |
|  | 182 | Rotational offset between faces (72°) |
|  | 184 | Curved base plate for camcorder mount |
|  | 186 | First bolt hole for camera mount plate |
|  | 188 | Second bolt hole for camera mount plate |
|  | 190 | Main mount hole for camera (above horizon) |
|  | 192 | Alignment hole for camera (above horizon) |
|  | 194 | Camera mount plate (above horizon) |
|  | 196 | Camera mount plate (vertical) |
|  | 198 | Top surface of above |
|  | 200 | Main mount hole for vertical camera |
|  | 202 | Alignment hole for vertical camera |
|  | 204 | Tripod mount hole |
| FIG. 13 | 206 | Above - horizon camcorder |
|  | 208 | Vertical camcorder |
|  | 210 | Main mount bolt for camera |
|  | 212 | Bolts for base plate (long) |
| FIG. 14 | 214 | Baseplate for basic multi mount |
|  | 216 | Above - horizon mount |
|  | 218 | Below - horizon mount |

LIST OF PARTS-continued

| | | |
|---|---|---|
| FIG. 15 | 220 | Vertical mount |
| | 222 | Vertical camera |
| | 224 | Bending angle for other mounts |
| | 226 | Above - horizon camera |
| | 228 | Below - horizon camera |
| | 230 | Central mount bolt |
| | 232 | Outer plate mount bolts |
| FIG. 16–17 | 234 | Base plate for alternate multi mount |
| | 236 | Central mount hole |
| | 238 | Vertical mount |
| | 240 | Vertical mount bolt holes |
| | 242 | Vertical mount flange plates |
| | 244 | Above horizon mount |
| | 246 | Above - horizon mount flange |
| | 248 | Above - horizon tilted mount plane |
| | 250 | Above - horizon camera mount hole |
| | 252 | Vertical camera mount hole |
| | 254 | Mount hole for above - horizon to base plate |
| | 256 | Base plate for above - horizon mount |
| FIG. 18 | 258 | Generic camera optical axis |
| | 260 | Minimum offset for single pentagon field of view (31.37°) |
| | 262 | Generic single pentagon lens |
| | 264 | Single pentagon board camera |
| | 266 | Dodecahedral mount plate |
| | 268 | Mount plate flange |
| | 270 | Bending angle |
| | 272 | Bolts for mounting to adjacent flange |
| | 274 | Attachment flange to board camera |
| | 276 | Threaded barrel |
| | 278 | Adjustment point |
| | 280 | Associated electronics |
| | 282 | Outer area |
| | 284 | Lens hood region |
| | 286 | Outer surface of camera module |
| | 288 | Limits of Dodecahedral module carried down to the center |
| FIG. 19 | 290 | Edge of board camera |
| | 292 | Optional central hole |
| | 294 | Optional outer hole |
| | 296 | Central CCD with pentagon area |
| | 298 | Vertical axis of pentagon |
| FIG. 20 | 300 | Dodecahedral camera array |
| | 302 | Individual lens/optical element |
| FIG. 21 | 304 | Support shaft for camera |
| | 306 | Directional microphones |
| | 308 | Electronic controls |
| | 310 | Camera output/sound output |
| | 312 | Recessed angle plug |
| | 314 | Inner limit of blind spot |
| | 316 | Outer limit of blind spot |
| | 318 | Output cable |
| | 320 | Base mount |
| FIG. 22–23 | 322 | Inverted camera array |
| | 324 | Inverted support |
| FIG. 24 | 326 | Boundary of wide image (16:9) |
| | 328 | Center of double-pentagon image |
| | 330 | Center line of dual image (dodecahedron edge) |
| | 332 | Right pentagon |
| | 334 | Left pentagon |
| | 336 | Straightened pentagon edge |
| | 338 | Edge of concentric cube |
| FIG. 25 | 340 | Center of three pentagon image |
| | 342 | Center of individual triple pentagon |
| | 344 | Square aspect ratio tangent to central circle |
| | 346 | Original pentagonal division edge |
| | 348 | Undistorted pentagon edge |
| | 350 | Original junction between pentagons |
| | 352 | Optional outside image area |
| FIG. 26 | 354 | X format vertical dual (top pentagon) |
| | 356 | Center of X-H vertical dual |
| | 358 | Axis of X-H vertical dual |
| | 360 | Center of X-H side pentagon #1 |
| | 362 | Center of X-H side pentagon #2 |
| | 364 | Opposite center of lower dual |
| | 366 | Axis connecting opposite edges |
| | 368 | Other lower dual pentagons |
| FIG. 27 | 370 | Vertical X-H Dual Pentagons |
| | 372 | Center of top pentagon |
| | 374 | Side Dual X-H Pentagon #1 |
| | 376 | Top of recorded image for side X-H #1 |

LIST OF PARTS-continued

| | | |
|---|---|---|
| | 378 | Top of recorded image for vertical X-H pentagons |
| | 380 | Side Dual X-H Pentagon #2 |
| | 382 | Top of recorded image for side X-H #2 |
| | 384 | Top of recorded image for X-S Double Pentagon |
| | 386 | Width line of dual pentagon |
| | 388 | Left Center |
| | 390 | Right Center |
| | 392 | Horizon Line for side pentagons |
| | 394 | Horizon line for vertical Pentagons |
| | 396 | Optional image area - side pentagons #1 |
| | 398 | Optional image area - side pentagons #2 |
| | 400 | Optional image area - vertical pentagons |
| FIG. 28 | 402 | Assembled multifaceted X-H Mount |
| | 404 | Triangular facet |
| | 406 | Trapezoid facet |
| | 408 | Rectangular facet |
| | 410 | Center of axis for side pentagons #2 |
| | 412 | Center of axis for vertical pentagons |
| | 414 | Center of axis for side pentagons #1 |
| FIG. 29 | 416 | Offset angle from vertical for upper pentagon (31.7°) |
| | 418 | Plane orthogonal to upper pentagons axis |
| | 420 | Imaging means on orthogonal plane for upper pentagons |
| | 422 | Lower pentagons axis |
| | 424 | Offset angle from vertical for lower pentagons axis (58.3°) |
| | 426 | Plane orthogonal to lower pentagons axis |
| | 428 | Imaging means for lower pentagons |
| FIG. 30 | 430 | Lens on upper pentagons plane |
| | 432 | Lens on lower pentagons plane |
| FIG. 31–32 | 434 | Short edge of facets (rectangle) |
| | 436 | Long edge of facets (rectangle) |
| | 438 | Long edge (trapezoid) |
| | 440 | Short edge (trapezoid) |
| | 442 | Short edge (triangle) |
| | 444 | Center of optical mount |
| FIG. 33 | 446 | End piece (triangle) |
| | 448 | Central plane of X-S |
| FIG. 34–35 | 450 | X-H upper plate |
| | 452 | X-H lower plate #1 |
| | 454 | X-H lower plate #2 |
| FIG. 36–38 | 456 | X-S Upper dual pentagon |
| | 458 | Center of upper dual pent X-S |
| | 460 | Horizon plane of X-S |
| | 462 | X-S lower dual pentagon |
| | 464 | Center of lower dual pentagon X-S |
| FIG. 39 | 466 | Tilted upper X-S axis |
| | 468 | Tilted lower X-S axis |
| FIG. 40 | 470 | Tilted X-H rotation plane |
| | 472 | Tilted X-H tilting plane |
| FIG. 41 | 474 | Combined recorded images |
| | 476 | Dual pentagon image |
| | 478 | Square region boundary |
| | 480 | Extra area in 4:3 aspect ratio |
| FIG. 42–44 | 482 | Right pentagon |
| | 484 | Left pentagon |
| | 486 | Orientation arrow for top of frame |
| | 488 | Group of six pentagons in 4:3 image |
| | 490 | Second group of stereoscopic views |
| | 492 | Vertical indication |
| FIG. 45 | 494 | Right leaning P format dual pentagon image |
| | 496 | Width indicator for P format image |
| | 498 | Indicator for top of recorded P-format image |
| FIG. 46 | 500 | Isolated right-leaning P-format pentagons |
| | 502 | Isolated adjacent-leaning P-format pentagons |
| FIG. 47 | 504 | Left-leaning P-format dual pentagon image |
| FIG. 48 | 506 | Isolated left-leaning P-format pentagons |
| | 508 | Isolated adjacent-leaning P-format pentagons |
| FIG. 49 | 510 | Recorded image in left-leaning pentagons |
| | 512 | Recorded image in right-leaning pentagons |
| | 514 | Overlapping stereo image region pentagon |
| FIG. 50 | 516 | Equational plane of dodecahedron |
| | 518 | Camera producing right-leaning view |
| | 520 | Camera producing left-leaning view |
| | 522 | Normal vertical axis of picture |
| | 524 | P-format tilt (54°) |
| | 526 | Interocular dist. betw. opp. orientations of dual pentagons |
| | 528 | Center of overlapping region of stereo |
| | 530 | Adjacent right-leaning camera |
| | 532 | R assignement for viewing L half of L leaning |
| | 534 | L assignment to view R half of L leaning |

LIST OF PARTS-continued

| | | |
|---|---|---|
| | 536 | R assignment to view L half of R leaning |
| | 538 | L assignment to view R half of R leaning |
| FIG. 51 | 540 | P-format transverse bar |
| | 542 | Center of rotation |
| | 544 | Camera mount plate (right leaning) |
| | 546 | Camera mount hole |
| | 548 | Rotating disk support |
| | 550 | Fixed support |
| FIG. 52 | 552 | Right-leaning mounted still camera |
| | 554 | Left leaning mounted still camera |
| FIG. 53 | 556 | P-format optical axis |
| | 558 | P-format lens |
| | 560 | Rotation angle between right and left leaning (36°) |
| | 562 | Interocular distance between adjacent same-leaning axis |
| FIG. 54 | 564 | Foward part of modified P-format lens |
| | 566 | Rear part of modified P-format lens |
| | 568 | Optical path with nodal point at center |
| | 570 | Mount for optical relay system components |
| FIG. 55 | 572 | Left leaning optical axis |
| | 574 | Left leaning central target |
| | 576 | Left leaning dodeca edge |
| | 578 | Right leaning optical axis |
| | 580 | Right leaning central target |
| | 582 | Right leaning dodeca edge |
| | 584 | Top face of dodeca (2) |
| FIG. 56 | 586 | Right single-pentagon camera for top |
| | 588 | Left single pentagon camera |
| | 590 | Overall spherical diameter of array |
| FIG. 57 | 592 | P-format lens for right angle optics |
| | 594 | Right angle optics |
| | 596 | Upper camera for inverted image |
| | 598 | Lower camera for normal image |
| FIG. 58 | 600 | Base frame level for temporal offset |
| | 602 | Space to one video frame |
| | 604 | Mounted camera at base line |
| | 606 | Mounted camera at 1 frame offset |
| | 608 | Field of view for second camera |
| | 610 | Position of third offset camera |
| | 612 | Expanding and contracting mount frame |
| | 614 | Control for expansion and contraction |
| | 616 | Change of distance between cameras |
| | 618 | Direction of travel |
| | 620 | Second position for ten-camera row |
| FIG. 59 | 622 | A concentric octahedron |
| | 624 | Octahedron vertex |
| | 626 | Optical axis to octahedral vertex |
| | 628 | Target for octahedral on dodeca edge |
| | 630 | Octahedral dodeca edge |
| | 632 | Photographed dual pentagon #1 |
| | 634 | Photographed dual pentagon #2 |
| | 636 | Rotation angle for stereoscopic offset |
| | 638 | Offset axis |
| | 640 | New offset target point |
| | 642 | Offset target dodeca edge |
| | 644 | New photographed pentagon #1 |
| | 646 | New photographed pentagon #2 stereo |
| FIG. 60 | 648 | Octahedral mount |
| FIG. 61 | 650 | First octahedral optical element |
| | 652 | Width line of first recorded image |
| | 654 | Indicator of top of recorded image |
| | 656 | Second octahedral optical element |
| | 658 | Indicator of top of second recorded image |
| | 660 | Pole point corresponding to dodeca vertex |
| FIG. 62 | 662 | First octahedral dual pentagon |
| | 664 | Second octahedral dual pentagon |
| FIG. 63 | 666 | Indication of top of X-S recorded image |
| FIG. 64 | 668 | A concentric tetrahedron |
| | 670 | Tetrahedron point at vertex |
| | 672 | Axis to previous point |
| | 674 | Second tetrahedron point |
| | 676 | Third tetrahedron point |
| | 678 | Fourth tetrahedron point |
| | 680 | First covered pentagon (Z) |
| | 682 | Second covered pentagon (A) |
| | 684 | Third covered pentagon (E) |
| | 686 | Rotation of first point |
| | 688 | Rotation point on tetrahedron edge |
| | 690 | Rotation position (3-D) for first point |
| | 692 | Rotation position (3-D) for second point |

LIST OF PARTS-continued

|  |  |  |
|---|---|---|
|  | 694 | Rotation position (3-D) for third point |
|  | 696 | Rotation position (3-D) for fourth point |
|  | 698 | Rotation path for fourth point |
| FIG. 65 | 700 | Tetrahedron connecting rotated points |
|  | 702 | A Cube |
| FIG. 66 | 704 | Axis from pole to pole |
|  | 706 | Bottom vertex |
|  | 708 | Intermediate dodeca vertex |
| FIG. 67–68 | 710 | Top of top pentagon image (Z) |
|  | 712 | Top of bottom pentagon image (N) |
| FIG. 69 | 714 | A lens |
|  | 716 | Lens male mount |
|  | 718 | Female mount |
|  | 720 | Front element of lens |
|  | 722 | Lens rear element |
|  | 724 | Male mount |
|  | 726 | Camera mount |
|  | 728 | Camera |
|  | 730 | Rigid shell |
|  | 732 | Optical axis |
|  | 734 | Other camera |
|  | 736 | Other lens |
|  | 738 | Optical path |
|  | 740 | Nodal point at center |
| FIG. 70 | 742 | A camera lens |
|  | 744 | A camera |
|  | 746 | A camera control unit |
|  | 748 | External sync sources |
|  | 750 | A video recorder |
|  | 752 | Lines to other synchronized equipment |
|  | 754 | Edit controller (stop/start) |
|  | 756 | Lines to other equipment controlled by edit controller |
|  | 758 | Monitor output signal line |
|  | 760 | Selector |
|  | 762 | Lines from other recorders |
|  | 764 | Monitor |
| FIG. 71 | 766 | Playback source |
|  | 768 | Correction and masking (and comparison) |
|  | 770 | Line from edit controller to recorder |
|  | 772 | Studio mastering recorder |
|  | 774 | Studio monitor |
| FIG. 72–73 | 776 | Camera array mount |
|  | 778 | Stabilizing mount means |
|  | 780 | Outermost limit of blind spot on bottom pent point |
|  | 782 | Innermost limit of blind spot on bottom pentagon edge |
|  | 784 | Back support strut |
|  | 786 | Side support strut |
|  | 788 | Camera operator |
|  | 790 | Shoulder strap |
|  | 792 | Equipment e.g. camera control |
|  | 794 | Equipment e.g. recorders |
|  | 796 | Base support |
|  | 798 | Monitors and other equipment (in front) |
| FIG. 74 | 800 | Camera mount platform |
| FIG. 75 | 802 | A wheeled conveyance (e.g. a wheelchair) |
|  | 804 | Added equipment |
| FIG. 76 | 806 | Leg for camera cart |
|  | 808 | Wheel on leg |
|  | 810 | Floor surface |
|  | 812 | Uppermost level of equipment (CCU) |
|  | 814 | Second level of equipment (power) |
|  | 816 | Third level of equipment (recorders) |
|  | 818 | Bottom level of equipment (propulsion) |
| FIG. 77 | 820 | Base platform |
|  | 822 | First steering wheel |
|  | 824 | Second steering wheel |
|  | 826 | Passive wheel |
| FIG. 78 | 828 | 4:3 aspect ratio video image |
|  | 830 | Central pentagon area |
|  | 832 | Region around central pentagon |
|  | 834 | Reconstituted second image from outside area |
|  | 836 | Scan lines of central image before multiplexing |
|  | 838 | Scan lines after multiplexing |
|  | 840 | Extra area |
| FIG. 79 | 842 | First source image input |
|  | 844 | First pentagonal central image area |
|  | 846 | Second source image input |
|  | 848 | Second pentagonal central image area |
|  | 850 | Genlock source |

LIST OF PARTS-continued

|  |  |  |
|---|---|---|
|  | 852 | Codec processer |
|  | 854 | Line to first source |
|  | 856 | Line to second source |
|  | 858 | Frame buffer for second source |
|  | 860 | Pixels representing second pentagon |
|  | 862 | Open region in output buffer surrounding pentagon |
|  | 864 | Output buffer |
|  | 866 | Central pentagon in output buffer |
|  | 868 | Delay in first source signal |
|  | 870 | Switch between signal sources |
|  | 872 | Addresses for switching timing |
|  | 874 | Composite output image |
| FIG. 80 | 876 | Position of first pentagonal pixel |
|  | 878 | Position of first encoded pixel |
| FIG. 81 | 880 | Wide 9:16 aspect ratio image |
|  | 882 | Cropped pentagon from first source |
|  | 884 | Shifted center of first pentagon |
|  | 886 | Distance of first shift |
|  | 888 | Center of 9:16 image area |
|  | 890 | Cropped pentagon from second source |
|  | 892 | Shifted center of second pentagon |
|  | 894 | Distance of second shift |
|  | 896 | Rotation arount center |
|  | 898 | Adjacent diagonal edges |
|  | 900 | Outside region for third pentagon |
| FIG. 82 | 902 | Anamorphically squeezed 4:3 aspect ratio |
|  | 904 | Anamorphically squeezed first pentagon |
|  | 906 | Center of squeezed first pentagon |
|  | 908 | Anamorphically squeezed second pentagon |
|  | 910 | Center of squeezed second pentagon |
|  | 912 | Anamorphically squeezed outside third pentagon |
| FIG. 83 | 914 | Cropped top pentagon |
|  | 916 | Vertical line |
|  | 918 | Rotation (72°) of pentagon |
|  | 920 | Rotated top pentagon |
|  | 922 | Shifted center (vertical) |
|  | 924 | Half clip of displayed screen |
|  | 926 | Displayed screen |
|  | 928 | Vertical shift of center for second pentagon (above-horizon) |
|  | 930 | Above-horizon pentagon image |
| FIG. 84 | 932 | Left lateral shift of center (first pentagon) |
|  | 934 | Center line of displayed screen |
|  | 936 | Clockwise rotation of image |
|  | 938 | Vertical half clip of screen |
|  | 940 | Second adjacent above-horizon pentagon |
|  | 942 | Counter-clockwise rotation of image |
|  | 944 | Adjacent edges in center |
| FIG. 85 | 946 | Below-horizon pentagon image |
|  | 948 | Lateral shift for each |
|  | 950 | Adjacent second below-horizon pentagon |
| FIG. 86 | 952 | Diagonal division of displayed screen |
|  | 954 | Oblique shift of above horizon pentagon |
|  | 956 | Oblique shift of below horizon pentagon |
|  | 958 | Adjacent edges along diagonal division |
| FIG. 87 | 960 | Mask edge of uncorrected pentagon |
|  | 962 | Mask edge of optional image area |
| FIG. 88 | 964 | Area outside pentagon |
| FIG. 89 | 966 | Longitude line of gnomonic projection |
|  | 968 | Latitude line of gnomonic projection |
|  | 970 | Horizon line |
|  | 972 | Pentagon horizontal line |
| FIG. 90 | 974 | Border of ideal 4:3 image |
|  | 976 | Image from narrower field of view lens (3 mm) |
|  | 978 | Area not covered by narrower field of view |
|  | 980 | Uncorrected edge |
|  | 982 | Corrected bottom edge |
|  | 984 | Extended side edge |
|  | 986 | Area covered by extended edges not covered by adjacent pentagon |
|  | 988 | Area of adjacent pentagon |
| FIG. 91 | 990 | Minimal square area |
|  | 992 | Center of minimal square area |
|  | 994 | Extra area outside edge to facilitate blending |
| FIG. 92 | 996 | Equatorial cropping |
|  | 998 | Bottom area subtracted from equatorial cropping |
|  | 1000 | Masked area for minimum equatorial keystone |
|  | 1002 | Optional added area to extend keystone toward pole. |
| FIG. 93 | 1004 | Outer pentagon area top of right leaning |
|  | 1006 | Outer pentagon area bottom of right leaning |

LIST OF PARTS-continued

|  |  |  |
|---|---|---|
|  | 1008 | Outer pentagon area top of left leaning |
|  | 1010 | Outer pentagon area bottom of left leaning |
| FIG. 94 | 1012 | Extra image area on bottom of side X pents |
|  | 1014 | Gap between side pents |
|  | 1016 | Gap between top and side pents |
| FIG. 95 | 1018 | Straightened edge of double pentagon |
|  | 1020 | Distorted edge of double pentagon |
| FIG. 96 | 1022 | Barrel distorted grid |
| FIG. 97 | 1024 | Generic double pentagon image |
|  | 1026 | Circular lens image encompassing double pentagon |
|  | 1028 | Orientation of 4:3 ratio relative to double pentagon |
|  | 1030 | Rotation by 18° |
|  | 1032 | Rotation by 36° |
|  | 1034 | Rotation by 54° |
|  | 1036 | Edge parallel with top of screen |
| FIG. 98 | 1038 | Horizontal position |
|  | 1040 | Rotation by 18° |
|  | 1042 | Rotation by 36° |
|  | 1044 | Rotation by 54° |
|  | 1046 | Tilt by 90° (Vertical position) |
| FIG. 99 | 1048 | 4:3 Aspect ratio |
|  | 1050 | Side obliquely tilted pentagon facets |
|  | 1052 | Above-horizon obliquely tilted pentagon facets |
|  | 1054 | Central obliquely tilted pentagon facet |
| FIG. 100 | 1056 | Upper virtual pentagon facet |
|  | 1058 | Lower virtual pentagon facet |
|  | 1060 | Pentagon in ROI |
|  | 1062 | ROI position #1 |
|  | 1064 | ROI position #2 |
| FIG. 101 | 1066 | Top pentagon |
|  | 1068 | Above-horizon pentagons |
|  | 1070 | Below-horizon pentagons |
|  | 1072 | Bottom pentagon |
| FIG. 102–3 | 1074 | Top edge of both A and Z |
|  | 1076 | Frame buffer |
|  | 1078 | Above-horizon pentagons |
|  | 1080 | Below-horizon pentagons |
| FIG. 104 | 1082 | Border of intermediate cropping |
|  | 1084 | Border of essential square mask |
| FIG. 105 | 1086 | 4:3 array of essential squares |
| FIG. 106 | 1088 | Lat. and Long. lines mapped according to Arno Peters proj. |
|  | 1090 | Side of pentagon |
|  | 1092 | Equatorial edge |
|  | 1094 | Top edge |
| FIG. 107 | 1096 | Anamorphically squeezed 4:3 pentagon image |
|  | 1098 | Reconstituted first pentagon |
|  | 1100 | Reconstituted second pentagon |
|  | 1102 | Reconstituted third pentagon |
|  | 1104 | Extra group of three from field or frame-alternate signal |
| FIG. 108 | 1106 | Composite 4:3 image containing 4 anamorphically squeezed sets of 2–3 pentagons each |
|  | 1108 | Second composite set for stereographic view |
| FIG. 109 | 1110 | Right eye portion of right leaning pents |
|  | 1112 | Left eye portion of right leaning pents |
|  | 1114 | Right eye portion of left leaning pents |
|  | 1116 | Left eye portion of left leaning pents |
|  | 1118 | Composite view in left eye |
|  | 1120 | Composite view in right eye |
| FIG. 110 | 1122 | Recording of spherical field of view |
|  | 1124 | Extended region below horizon |
|  | 1126 | Virtual viewpoint in center |
|  | 1128 | Observer in dome theater |
|  | 1130 | Observer outside translucent screen |
| FIG. 111 | 1132 | Imaginary observer surrounded by spherical field of view |
|  | 1134 | Dodecahedral division of virtual view |
| FIG. 112 | 1136 | Receiver for composite dodeca image |
|  | 1138 | Codec for image separation |
|  | 1140 | Extracted pentagon information |
|  | 1142 | Selection of pentagon information |
|  | 1144 | Selected pentagon information |
|  | 1146 | Control signal for selection |
|  | 1148 | Viewer buffer |
|  | 1150 | Composite image |
|  | 1152 | Display buffer |
|  | 1154 | Displayed image |
|  | 1156 | Additional pentagon channels |
| FIG. 113 | 1158 | Avergae room ceiling |
|  | 1160 | Compact dodecahedral projector |
|  | 1162 | Projected image |

LIST OF PARTS-continued

|  |  |  |
|---|---|---|
|  | 1164 | Screen (above-horizon) module |
|  | 1166 | Support frame |
|  | 1168 | Apparent field of view (1–2 pentagons) |
|  | 1170 | Observer (standing) |
|  | 1172 | Dodecahedral camera |
|  | 1174 | Separate location from dome |
|  | 1176 | Subject being recorded by camera |
|  | 1178 | Transmission means for camera signals |
|  | 1180 | Transmission lines for camera signals |
|  | 1182 | Top screen module |
|  | 1184 | Support frame for top screen |
|  | 1186 | Apparent field of view (3–4 pentagons) |
|  | 1188 | Seated observer |
|  | 1190 | Optional added support |
|  | 1192 | Additional above-horizon screen |
|  | 1194 | Support frame for additional screen |
|  | 1196 | Apparent field of view (5–6 pentagons) |
| FIG. 114 | 1198 | Central pentagon plate (2) |
|  | 1200 | Another pentagon plate attached to it by flanged hinge (B) |
|  | 1202 | Slide mount on plate |
|  | 1204 | Slide |
|  | 1206 | Beveled plate edge |
|  | 1208 | Pentagonal image concentric with face center |
|  | 1210 | Adjacent plate (A) |
|  | 1212 | DIstance to contact of bevels |
|  | 1214 | Pull pin |
|  | 1216 | Registration notch |
| FIG. 115 | 1218 | Semi-isolated top plate |
|  | 1220 | Adjoining above-horizon hinged edge |
|  | 1222 | Right point to center |
|  | 1224 | Left point to center |
|  | 1226 | Center tips |
| FIG. 116 | 1228 | Inner Spherical enclosure - single pentagon projector |
|  | 1230 | Outer Spherical enclosure - single pentagon projector |
|  | 1232 | Light source |
|  | 1234 | Manipulator pin for array |
| FIG. 117 | 1236 | Additional outside below-horizon plate |
|  | 1238 | Below-horizon image |
|  | 1240 | Edge of plate |
|  | 1242 | Corresponding edge |
| FIG. 118 | 1244 | First shifted plate (for 2 on 1) |
|  | 1246 | Second shifted plate (for 2 on 1) |
| FIG. 119 | 1248 | Central plate of double-pent slide (X-H) |
|  | 1250 | Hinged plate for upper slide |
|  | 1252 | Upper slide |
|  | 1254 | Upper double pentagon image with extra |
|  | 1256 | Lower slide plate #1 |
|  | 1258 | Lower slide plate #2 |
|  | 1260 | Registration notch |
|  | 1262 | First cross section |
|  | 1264 | Second cross section |
| FIG. 120 | 1266 | Registration pin |
|  | 1268 | Central light source |
|  | 1270 | Support for slides in folded position |
| FIG. 121 | 1272 | Manipulation pin |
|  | 1274 | Manipulator claw |
|  | 1276 | Flattened slide mount |
|  | 1278 | Magazine for multiple slide mounts |
|  | 1280 | Direction of travel for slides |
|  | 1282 | Lower curved support |
|  | 1284 | Upper curved guide |
|  | 1286 | Outer shell |
| FIG. 122 | 1288 | LCD projection module |
|  | 1290 | Beveled edge of module |
|  | 1292 | Projection lens |
|  | 1294 | Lens mount |
|  | 1296 | Pentagonal image area |
|  | 1298 | LCD panel |
|  | 1300 | Outside image area |
| FIG. 123 | 1302 | Active image area of LCD |
|  | 1304 | Single pentagon field of view |
|  | 1306 | Adjacent module |
|  | 1308 | Central light source |
|  | 1310 | Condenser lens |
|  | 1312 | Opaque side walls |
| FIG. 124 | 1314 | Central compact dodecahedral projector |
|  | 1316 | Spaces between projected images |
|  | 1318 | Concentric spherical projection screen |
|  | 1320 | Seams between images |

LIST OF PARTS-continued

| | | |
|---|---|---|
| | 1322 | Support member |
| | 1324 | Cables for signals, air, and light |
| FIG. 125 | 1326 | Support legs for projector array |
| | 1328 | Extensions of legs to central light source |
| FIG. 126 | 1330 | Projector symbolized as a dodecahedron |
| | 1332 | Dodecahedral division of projected screen image |
| FIG. 127 | 1334 | Fiber optic illumination cables |
| FIG. 128 | 1336 | Extensions of support legs along pentagonal vertices |
| FIG. 129 | 1338 | Projection field of view |
| | 1340 | Side walls of module |
| | 1342 | Video and power inputs |
| | 1344 | Fiber optic illumination cable |
| | 1346 | Beam spreader |
| FIG. 130 | 1348 | Junction box |
| | 1350 | Optional condenser lenses |
| | 1352 | Main illumination cable |
| | 1354 | Illumination source |
| | 1356 | Mirror |
| | 1358 | Housing |
| | 1360 | Filter |
| FIG. 131 | 1362 | Light source for DMD |
| | 1364 | Condenser lens |
| | 1366 | RGB wheel or filter |
| | 1368 | Lens |
| | 1370 | Oblique light path |
| | 1372 | Digital Multimirror Device |
| | 1374 | Supporting PC board |
| | 1376 | Associated electronics |
| | 1378 | Attachment between boards |
| | 1380 | Surface outline of module |
| FIG. 132 | 1382 | Projector |
| | 1384 | Projector lens |
| | 1386 | Projection axis |
| | 1388 | Center between two pentagons |
| | 1390 | Support column in blind spot |
| | 1392 | Concentric projection surface |
| | 1394 | Phosphor screen |
| | 1396 | Floor support |
| FIG. 133 | 1398 | Dome projection surface |
| | 1400 | Outer shell |
| | 1402 | Seats |
| | 1404 | Viewer |
| | 1406 | Peripheral projector |
| | 1408 | Above - horizon axis |
| | 1410 | Center of dome sphere |
| | 1412 | Vertical axis |
| | 1414 | Projector under floor |
| | 1416 | Mirror |
| | 1418 | Service area |
| FIG. 134 | 1420 | Ideal location for projector |
| | 1422 | Common position at usual throw distance |
| | 1424 | Intrmediate position for vertical projector |
| | 1426 | Projected single pentagon |
| | 1428 | Offset optical axis |
| | 1430 | Offset position of peripheral projector |
| | 1432 | Position of projector at farther throw distance |
| | 1434 | Mirror for periphery |
| | 1436 | New position of peripheral projector |
| | 1438 | New lower limit of projection |
| FIG. 135 | 1440 | Peripheral projector for top |
| | 1442 | Central mirror |
| | 1444 | Projector for side |
| | 1446 | Mirror for side |
| FIG. 136 | 1448 | Ceiling |
| | 1450 | Anchor platform |
| | 1452 | Suspension strut and pulley attached to motorized reel |
| | 1454 | Cable |
| | 1456 | Inner strut and cable |
| | 1458 | Outer support for screen |
| | 1460 | Inner screen surface |
| FIG. 137 | 1462 | Rigid suspension member |
| | 1464 | Flanges |
| | 1466 | Screen panel |
| | 1468 | Limited - travel hinge |
| | 1470 | Back-surface hinge |
| | 1472 | Direction of travel when opening |
| | 1474 | Front - surface hinge |
| | 1476 | Cable anchor point |
| | 1478 | Flattened pair of panels for stacking |

LIST OF PARTS-continued

| | | |
|---|---|---|
| | 1480 | Spherical curviture of extended panels |
| FIG. 138 | 1482 | Six constituent geodesic edge lengths |
| | 1484 | Large triangle |
| | 1486 | Medium triangle |
| | 1488 | Small triangle |
| | 1490 | Edge of dodeca face |
| | 1492 | Center of top of dome |
| | 1494 | Fixed section of curtain section |
| | 1496 | Other curtain sections |
| | 1498 | Inter - triangle boundaries (limited hinges) |
| | 1500 | Gore paths between strips |
| | 1502 | Front surface hinge |
| | 1504 | Back surface hinge |
| | 1506 | Cable anchor point at bottom |
| FIG. 139–40 | 1508 | Long strut |
| | 1510 | Medium strut |
| | 1512 | Short strut |
| | 1514 | Center hub (large) |
| | 1516 | Vertex hub (med.) |
| | 1518 | Edge hub (small) |
| | 1520 | Dome framework |
| FIG. 141 | 1522 | Four pentagonal projectors |
| | 1524 | Four pentagon screen |
| FIG. 142 | 1526 | Assembled three pentagon screen |
| | 1528 | Vertical support struts |
| FIG. 143 | 1530 | Screen panel |
| | 1532 | Screen panel attached to strut |
| | 1534 | Long strut in middle |
| | 1536 | Short or medium strut on side |
| | 1538 | Speaker in back of panel |
| FIG. 144 | 1540 | Outline of screen section |
| | 1542 | Cross - section of section |
| FIG. 145 | 1544 | Velcro strips on outside edge |
| | 1546 | Velcro strips in center edge |
| | 1548 | Small speaker |
| | 1540 | Large speaker |
| | 1542 | Clamps to attach speakers to frame |

DETAILED DESCRIPTION OF THE INVENTION

INTRODUCTION TO THE DODECAHEDRON

The use of the pentagonal dodecahedron, as shown in FIG. 1 at 2, allows the construction of an imaging system featuring standardized component parts. This dodecahedron has a center 4, a nd is divided into twelve equal pentagonal faces, the center of one of which is shown at 6. These faces are separated by dodecahedron edges, the center of one of which is shown at 8. Three edges meet at a dodecahedron vertex, such as at 10, which is also the intersection point of three dodecahedron faces.

In FIG. 2 is shown how a dodecahedron 2 can be projected onto a concentric sphere 12, which can represent a concentric spherical field of view. The pole point of the dodecahedron 14 is shown here in the center of the topmost face. The projected center of a face 6 is carried out onto the concentric sphere to form the center 16 of a spherically-curved projected pentagon. The center of the dodecahedron edge 8 corresponds to a projected edge center 18, and the dodecahedron vertex 10 corresponds to the projected vertex 20. The polar axis for the projection of the pole point is shown at 22 for its upper part and at 24 for its lower part. The projection axis for the face center is shown at 26, for the edge center at 28, and for the vertex at 30.

FIG. 3 shows a cross section of a quarter dodecahedron with in a concentric sphere, showing its component angles and length ratios. Note the shape 32 of the dodecahedron cross section. A quarter section of this cross section represents a bisection of a pentagonal face, as shown at 34. The projected version of this face onto a concentric sphere 12 is shown at 36. The insphere radius 38 represents the distance from the center of the dodecahedron 4 to the center 6 of the dodecahedron face 34. The intersphere radius 40 represents the distance from the center of the dodecahedron to the center of one of its edges, and the circumsphere radius 42 represents the distance to each vertex of the dodecahedron, which here is also the radius of the concentric sphere 12.

FIG. 4 shows a top view of a dodecahedron, summarizing the various alignment points used by the dodecahedral formats to be described in more detail in the rest of this application. In addition to the single-pentagon alignment which is centered on the center 6 of a single face, this diagram shows the alignment points for double and triple-pentagon formats. At 44 is a target reference point for double pentagon alignments, which is centered on a pentagon edge and covers the two adjacent pentagons. Three other alignments of double-pentagon formats relative to this sample edge alignment point are shown.

The first double pentagon format can be called the X Format. For a hemispherical view, the target point 44 stands for the alignment point of the double pentagon that encompasses the top pentagon and one of the side pentagons. Then the center of the first X-format (Hemispherical mode or X-H) horizontal dual-pentagon image is shown at 46, and the center of the second X-H horizontal dual pentagon is shown at 48. An indication of the width of the double-pentagon image, pointing to its two constituent parts, is shown at 50 for X-H 1 and at 52 for the reference point.

A second double pentagon format is the panoramic or P format. The center of the double pentagon image relative to the target point is at 54 for an offset P-format double pentagon #1 in what is called a "left leaning" configuration; its width indication is at 56. Another type of P-Format double pentagon, the "right-leaning," is shown at 58, with the width line at 60. Note that it overlaps one of the pentagons of the double pentagon target point. A second offset P-format right leaning double pentagon target reference point is at 62.

A third type of double-pentagon format is the octahedral or O-format, which has a different centering edge at 66, with the width indication at 68, relative to the original target point 44. For stereoscopic imaging in this format, a rotation of the target point 70 to a new edge center at 72 is done, to give a stereoscopically overlapping field of view.

A final type of pentagonal imaging format is the triple-pentagon system, wherein each imager cover the image area of three pentagons, centered on a dodecahedral vertex such as the target vertex shown at 74. Relative to this target, a first offset triple-pentagon vertex is shown at 76 and a second offset vertex is shown at 78, for the production of non-overlapping triple-pentagon views. A triple pentagon format, the T format, based on dodecahedral alignment using the tetrahedron, will be described.

These various single, double and triple-pentagon formats will be discussed in turn, along with means for the production of images in these formats.

IMAGING MEANS

SINGLE-PENTAGON IMAGES

The single-pentagon configuration is the most simple and straightforward expression of the Dodeca System of dodecahedral photography and projection. Here each camera and projector covers an area of a surrounding spherical field of view corresponding to one face of a concentric pentagonal dodecahedron. Thus, by adding together these separate single-pentagon images, a larger and larger overall image can be achieved, up to a complete sphere. The single-pentagon format requires at least a circular lens field of view approximately equal to 74.755°. This is within the common range for wide-angle lenses with a relatively distortion-free or rectilinear image. However, most standard lenses are designed for cameras and projectors that utilize a rectangular image that extends outside of the central pentagonal area. Therefore some form of cropping must be done prior to its final display.

FIG. 5 shows a centered single-pentagon image shown within a common video aspect ratio, with an indication of the optical characteristics of a common single-pentagon lens. This represents the active display lines of the video image, excluding the overscan areas and the blanking interval. The center of the recorded pentagon image is shown at 80, which also represents the center of the recorded overall image, shown here as a 4:3 aspect ratio image whose border is at 82. This aspect ratio is characteristic of broadcast video formats such as NTSC and PAL video, as well as other computer video formats such as VGA and SVGA. It is also the common format for still-image film photography. The central pentagon is bounded by the central circle 84 whose top and bottom touch the top and bottom of the frame, and which represents an approximately 75° angle of view. Within this circle is the pentagon, whose straight edge is shown at 86. Although the straight edge is preferred, because of the common optical distortion found in most lenses, this pentagon edge, which corresponds to a pentagonal division of a concentric spherical field of view, will often be photographed as a curved line, which is shown at 88. Given an orientation of the dodecahedron where one face is straight up, the equatorial or horizon plane bisects the dodecahedron into five above-horizon views and five below-horizon views, plus the top and bottom polar views. For the above-horizon views, the photographed horizon would fall along a line at 90 that bisects the bottom pentagon point. Therefore such an above-horizon single pentagon view would extend somewhat below the horizon as well. For a below-horizon view, this illustration would be upside-down, with the pentagon point on top, and the horizon line bisecting it.

In such a rectangular image, there is a recorded picture area outside of the central pentagon as well. An extension of the side pentagon edges, corresponding to lines of longitude in the surrounding spherical field of view, is shown in their distorted form at 92, and in their ideal straightened form at 94. These extended lines enclose an optional outside image area 96 on either side of the lower pentagon point which, if it is added to the central pentagon, will make for an overall keystone-shaped cropped image.

The pentagon boundary here and elsewhere will be shown as a hard edge. However, it will be well understood by those versed in the art that to enable blending of the pentagonal images when they are displayed adjacent to each other, the pentagon edge should represent the center of a soft-edge transition zone, of whatever width may be desirable. Metavision, Inc., of North Hollywood Calif., and Seos Technologies of Surrey, England, for example, have demonstrated means of giving video images soft edges so they can be displayed side by side so as to form an apparently continuous image.

SUCCESSIVE PHOTOGRAPHY

The simplest method of photographing multiple single-pentagon views is to photograph them in succession, using a single still-frame camera such as a Nikon or Canon 35 mm single-lens reflex film camera, with a wide-angle lens such as the Nikkor or Tegea rectilinear 15 mm lens, which has a 135-degree rectilinear angle of view. This, however, includes an extraneous image area because it extends to the corners of the usual rectangular format for 35 mm film photography. Successive shots could also be taken with a 35 mm or 16 mm movie camera driven by a time-lapse motor and a scaled-down lens appropriate to the size of the recorded rectangular film image. Since only the central circle need be recorded, an option is to use a lens made for another format, such as an 8 mm lens on a 16 mm film camera, using the appropriate lens adapter. With this approach, there may be vignetting and poor image quality at the corners of the rectangular recorded image, but since these are outside of the essential pentagon area they can safely be ignored.

A better basic format, more closely matching the shape of the essential pentagon, is a square, such as is used for medium-format, 2.25-inch photography. Hasselblad, which uses this format, has a specially-built panoramic camera with a 38 mm lens with a 90-degree diagonal field of view, which is nearly wide enough to cover a complete pentagon.

Digital still cameras have also been introduced which can capture images directly to video formats at various resolutions. The Canon RC570, for example, photographs still images at an NTSC video resolution of 450 lines, while the Kodak DCS200 photographs directly to a digital form through a 1000×1500 pixel Charge-Coupled Device (CCD), using regular 35 mm photography lenses. There are also camera backs available to convert existing professional still camera formats to digital imaging, such as the 2000×2000 pixel resolution Leaf Digital Camera Back for Hasselblad cameras and the 5000×5850 pixel resolution Rollei Digital Scan Back for Rollei 6008 and other 4×5 format cameras.

FIG. 6 shows a schematic view of sequential photography of single-pentagon images, with the pentagons flattened and exploded for greater clarity. This procedure will be described, for convenience's sake, assuming an orientation with the central pentagon directly overhead. First, one shot of this overhead pentagon is taken pointing straight up, according to its center 98. As in the earlier patent, this will be called the Z (for Zenith) pentagon. Then the camera's optical axis is lowered to an elevation of approximately 26.565054° above the horizon and rotated 36° to take a shot of the D pentagon (for convenience and consistency, the pentagons will be identified as in FIG. 13 of the earlier patent). Then, while maintaining the same elevation, the camera is rotated 72° along this path shown at 100 and a views are taken of the E, A, B and C pentagons, thereby capturing images corresponding to all five dodecahedral pentagon facets above the horizon. These, plus the zenith shot overhead, form the six images equivalent to the upper hemispherical view. If desired, the camera can then be rotated a further 36° while lowering it to an elevation of −26.565034° below the horizon, and five more shots made of the I, J, F, G, and H pentagons, rotating the optical axis 72° between each to the positions along the path 102, to capture almost all of a spherical view in eleven pentagons, before a final rotation of 72° and an elevation of 116.565034° brings the camera back to the starting point. (The shot directly down is usually precluded by the tripod or base support, although if this impediment is removed, a final shot in that direction of the N or Nadir pentagon can also be made.) In this example, the tripod head base is held absolutely flat.

With a motorized motion-control camera head, this procedure can be automated, and any desired number of single-pentagon views can be snapped off in succession with greater speed and accuracy. The Z-D-E-A-B-C-I-J-F-G-H sequence has the advantage of always moving in small increments in a clockwise direction, and not requiring more than two axes of motion at a time from the camera mount. The shots could also be taken in an order other than the one described here. Another effective sequence includes ten views zigzagging above and below the horizon.

Figure 7A:
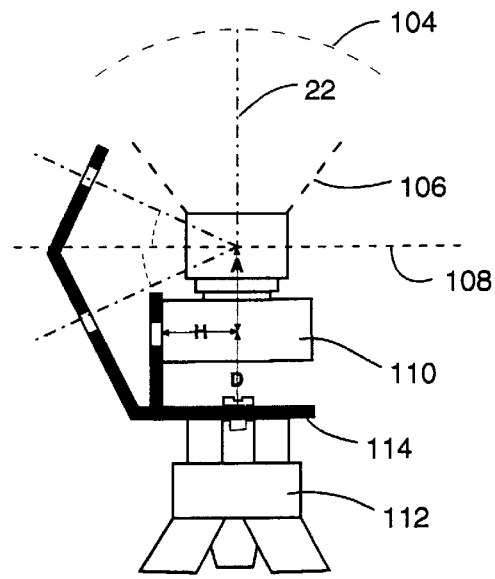

To eliminate parallax differences between the views, the nodal point of the camera lens should be kept at a central intersection point. FIG. 7A shows a simple mounting bar for a still camera, for manual successive single-pentagon and regular panoramic photography with rotation around a nodal point. At 104 is a pentagonal angle of view as projected onto a sphere, with 106 showing a boundary of this lens angle of view. The horizon plane is at 108. At 110 is a still camera attached to the mount, such as the film or electronic cameras mentioned above. The still camera and the mount should be mounted on a moveable tripod head shown at 112, such as the Gitzo 370 or 372 tripod head, mounted on a stable tripod base such as from the Gitzo 300 series, or a panoramic head showing exact rotations in degrees.

Figure 7B:
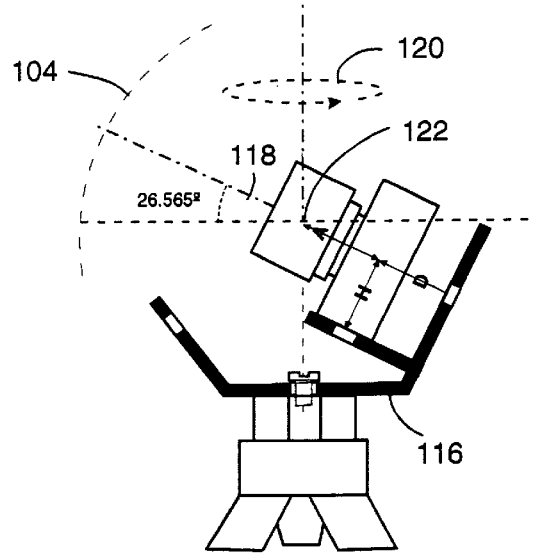
Figure 7C:
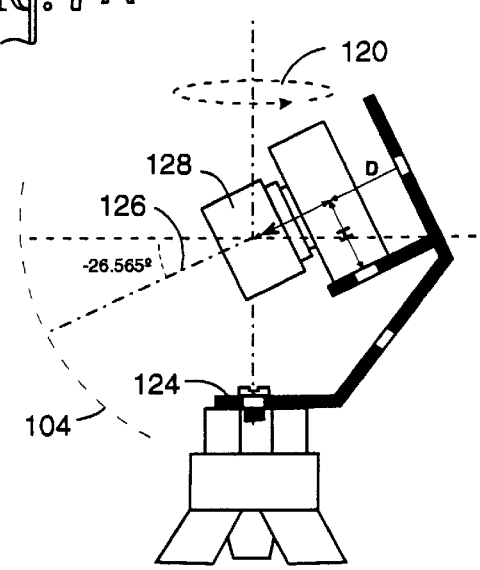

The mount comprises a bar with several flat planes suitable for attachment to the tripod base. Each of these flat planes defines one of the desirable alignments for the successive photography. At 114 is the flat position for the first vertical shot of the Z pentagon. After this is done, the mount is rotated to a second position as is shown in FIG. 7B and attached by the second flat position 116 for above-horizon shots, according to an axis 118 elevated above the horizon of approximately 26.566°. And rotation around the vertical polar axis 120, so that the center of rotation 122 matches the nodal point of the lens. At 124 is the flat position for the below-horizon views, as is shwon in FIG. 7C, according to an axis 126 with a declination of approximately 26.566°. Once again the nodal point of the lens 128 matches the center of rotation.

FIG. 8 shows a side view of this mount in an alternate version including provision for regular panoramic photography, showing components for a quick-release tripod mount. To increase the utility of this mount, an extra plane of attachment for conventional horizontal panoramic photography has been added between the second and third attachment planes, representing those for the above- and below-horizon pentagons, respectively. A quick-release female mount such as the Bogen Quik-lok is shown at 130, and its respective male mounts, are attached to the attachment planes of the mount, as shown at 132, 134, and 136 for the single pentagon mounts, and 138 for conventional horizontal panoramic photography, according to a horizontal optical axis 140.

FIG. 9A and FIG. 9B show shows an apparatus for automatic sequential photography by means of a motion-control mount. Here we see front and side views respectively, of a motorized motion control version of a single-pentagon sequential photography mount with rotation around a nodal point. Here again the rotation is around the nodal point 122 of the lens 128 of the camera 110. The camera is mounted on an L-shaped support, according to a lateral distance 142 between the camera optical center (here corresponding to the mount center) and the side portion of this tilting camera support 146. The distance from the camera mount to the optical center plane is shown at 144. In the side view, FIG. 9B, the forward distance from the nodal point to the camera mount center is shown at 148. Here the camera 110 is held horizontal so it has a horizontal optical axis 140. Returning to the front view, the base support for the tilting camera support is shown at 150, which rotates relative to a fixed base 152 by means of a rotary motor 154 driving gears or other appropriate means to create accurate, repeatable rotary motion. A similar rotary motor 158 is used in combination with gears or other means 160 to rotate the tilting camera support around a tilting axis 162 which also intersects the center of rotation 122.

FIG. 10 shows side views of this mount showing the characteristic orientations of the camera and its optical axis for the vertical view 22, and for above-horizon 118 and below-horizon 126 views. In the preferred embodiment, a cable-driven motion control apparatus, such as those made by Sagebrush Technologies of Albuquerque, N.Mex., would be used, because of their smoothness, speed, accuracy, and repeatability. If a film camera is used, a motor drive added to the camera can advance the film while the motion control rig is repositioning the camera for the next shot. If a pause control is added before the picture is taken, then the cameraperson can make sure that they are not in the shot.

FIG. 11 shows a top view of an offsetting motion control mount for the camera in the above mount, allowing the production of stereoscopically offset views. With this apparatus, each single-pentagon view is photographed twice, with the camera displaced equidistantly from a central nodal point 122 for a total distance 164 so the two images will form a stereo pair; an optimum displacement would be akin to the distance between human eyes, or approximately 6 cm. The displaced camera axes should be aligned to converge at a central point of the pentagon view at a given distance. The optical axis for the displaced view to the right is shown at 166, and the displace position of the camera at 168 as mounted on its plate 170, which is movable back and forth by a separate motion control mechanism, involving a track 172, a worm gear 174 and a motor 176. All of these elements can be attached to the original camera tilting support 146. The displaced position of the camera to the right is shown at 178.

The advantage of successive still photography is its simplicity and low cost, which makes it suitable for simple panoramic surveys. The disadvantages of this approach are the danger of inexact alignment as the camera is moved from position to position, and the fact that the whole procedure takes time, so that any movement in the photographed scene will lead to at least some mismatches along the edges of the successive views, as the subject matter changes its position between exposures. This amount of time required for this procedure also precludes its use for photographing full motion, such as with video cameras. To achieve better matching of the components of a scene in motion, simultaneous rather than successive photography should be used.

SIMULTANEOUS PHOTOGRAPHY

For the construction of a camera array for simultaneous photography, several arrangements can be used. Since the multiple cameras in this array cannot all occupy the space where the central nodal point is, they must be spaced around it. Therefore, to minimize parallax differences between the various views, it is important that the multiple cameras be small in size. Motion picture film cameras could be used in a clustered single-pentagon array, such as the small 16 mm film cameras made by Bell & Howell or Bolex, or even 8 mm film cameras. However, to allow for ease of synchronization, and the use of an even smaller camera size, video cameras are preferred, as will be described in more detail here.

The first described arrangement is where the cameras or projectors do not point outward, but inward, so that their optical axes cross at the central point of the dodecahedron. The advantage of this arrangement is that it allows for large cameras or projectors to be used, because their size is free to extend backwards, away from the lenses and the central intersection point. The limiting factor is mostly how closely the fronts of the lenses can be clustered together, and the fact that more than four cannot be used, because beyond that number, the fields of view of the lenses start to interfere with each other. For example, with four cameras covering four adjacent pentagons, such as the top pentagon and three above-horizon views, the cameras become visible at the sides of the two side pentagons. Three cameras or projectors together is preferred, because there is almost no interference.

FIG. 12 shows a top view of the components of an inward-facing mount to align three cameras to cover three pentagon views. Here the cameras are common video camcorders, such as the Sony TR-500 Hi8 camcorder, with a Sager 0.42 wide-angle adapter added to the lens to widen its view out to encompass a single pentagon. The intersection point of the inward—pointing optical axes is shown at 180; the axes of the two above-horizon pentagon views are off set by an angle 182 of 72°. The camcorders are mounted onto a curved base plate 184, according to bolt holes 186 and 188 for attaching camera mount plates, each of which includes a screw mount hole 190 for the camcorder itself, such as a common ¼ screw mount, and a registration hole 192 for the camera alignment pin. The camera mount plate 194 for the above-horizon cameras has a bend in it at an angle of approximately 26.56° relative to the base plate, to point the camera upward. For the Z camera, which points straight up towards the zenith view, the vertical camera mount plate 196 is attached to the underside of the base plate on a right-angle flange 198, and includes mount hole 200 for the camera and for the alignment pin 202. A tripod mount hole 204 is located in the base plate approximately midway between the camera mount plates.

FIG. 13 shows a side cross section view of this mount for multiple camcorders, such as the above-horizon camcorder at 206 and the vertical camcorder at 208. Here a bolt for mounting the camera is shown at 210 in the exploded cross section view of the above-horizon plate 194 and vertical camera mount plate 196 and their attachment to the base plate 184. Long bolts 212 can serve to attach both the vertical plate for the Z camera and the above-horizon plate for the A camera to the base plate. The other above-horizon plate is attached to the base plate alone. In FIG. 12, if 194 represents the plate for the A camera, then the Z camera is underneath it, and the other camera mount holes 186 and 188 to the right are for the E camera. If the A and Z cameras are mounted to this part of the curved base plate instead, then 194 will be the mount plate for the B camera. Using this mount, the various cameras' optical axes, such as the vertical axis at 22, and above-horizon axis at 118, meet at a central point 180, and the cameras serve to cover three pentagonal sections of an overall spherical field of view 12. For the projection of this image onto a curved screen, it will be obvious to one skilled in the art that a simple reversal of the use of this mount, with projectors so aligned, will reproduce these components of the photographed view so that they go together.

If more than four views need to be covered at once, a different arrangement is preferred which feature outward-facing lenses. FIG. 14 shows a simple single-pentagon optical mount suitable for simultaneous photography of a hemispherical area by means of the rigid alignment of support elements bolted to a base plate. Because projectors projecting these images would use the same alignment angles as their respective cameras, this also represents a mount for multiple projectors. Because of this complementarity of alignments for cameras and projectors, the alignment structures described here will be called "optical mounts," since they can be used to support such optical devices as cameras or projectors.

An oblique view of the assembled mount is shown in FIG. 14A, and the individual components are shown in FIG. 14B. The baseplate for this basic multiple mount, which is parallel to the dodecahedral equatorial plane, is at 214, and the bent element for the mounting of an above-horizon optical device is at 216, and shown reversed at 218 for a below-horizon optical device. The mount for the Z optical device pointing to the zenith pentagon is shown at 220. All of these supports have at least one hole for attaching a camera or projector by means such as the bolts shown here. The supports should be constructed so that all of the optical axes of the cameras or projectors meet at a central point, and all of the image planes of the cameras or projectors are equidistant from this point. The mounts shown here assume that the mount hole for the optical device is in line with its optical axes; if it is offset, such as can be seen for the camera mount plates in FIG. 12, then the mount holes shown here can be used to attach other plates which include the offset actual optical device mount.

FIG. 15A shows a cross section of the above mount and FIG. 15B shows cameras mounted to it. The vertical camera is at 222. The other cameras are attached to above-and below-horizon mounts which are bent by an angle 224 of approximately 26.56° relative to the dodecahedral equatorial plane. The above-horizon camera 226 has this bend go up;

the below-horizon camera 228 has the bend go down. For multiple cameras, the base plate can be further attached to a rigid support such as a tripod 112 by means such as a central hole for at least one bolt at 230. Mounting bolts for the main ring of optical elements are shown at 232.

FIG. 16 shows a variation of this multiple mount, a simple single-pentagon optical mount for simultaneous coverage of a hemispherical image by bolting the support elements to each other. The base plate for this alternate multiple mount is at 234, with the central mount hole at 236. A vertical mount element is at 238, showing the vertical mount bolt holes 240 and vertical mount flange plates 242. At 244 is a typical support element for the ring of five pentagons above the horizon. This element can be bolted to other such support elements by attachment means such as bolts through the side flange 246, and includes a tilted mount plane 248 which includes a main optical device mount hole. The mount plane and mount hole for the vertical support element is at 250. Note that the vertical support element can be attached to the flanges of the horizontal support elements. The composite support structure thus formed can either be attached to a stable base such as a tripod, or carried as a portable camera mount that will keep its respective cameras locked to the proper dodecahedral angles. Thus a desired plurality of cameras can be locked together through these support elements to form a properly aligned unit.

FIG. 17 shows a side view of the above mount, with cameras mounted for coverage of a hemispherical image. The vertical or Z camera is at 222, with an optical axis at 22, and an above-horizon camera is at 226, with an optical axis at 118.

FIG. 18 shows how the use of miniaturized video board cameras allows for another type of optical mount which is more directly dodecahedral in shape. Here we see a cross section of a modular facet mount for the alignment of miniature board cameras for simultaneous single-pentagon coverage of a spherical field of view. A generic camera optical axis is at 258. The opening for the camera's angle of view acts as a lens hood; to minimize radiometric distortion from bright light such as sunlight leaking sideways into the camera's angle of view, this opening should either closely match the rectangular image produced by the lens, as is usual with professional film and video cameras, or a more constricted circular or pentagonal opening that matches the final cropped shape of the image. Although this cuts off the corners of the recorded image, it minimizes the radiometric distortion effects. Such an opening is shown here, with the minimum angle of opening of approximately 31.72° at 260, which represents the distance to a straight pentagon edge. A generic single pentagon lens for the camera is shown at 262, which has a mount such as a C mount or a CS-mount. Although the C mount is more common and allows more off-the-shelf components to be used, the CS-mount is preferred for compactness. A miniaturized video board camera is at 264. This board, which holds the imaging sensor such as a Charge-Coupled Device (CCD), can be a daughterboard to a larger image processing board found elsewhere. This is common for color cameras in particular. For the Chinon CX-062 camera, as shown here, this sensor board is attached by a ribbon cable to a camera control board, which can be located below the camera array, out of sight. The board camera is attached to a faceted dodecahedral mount plate 266, which reproduces the shape of a pentagonal dodecahedral facet. This plate is attached to adjacent plates, by means such as bent flanges 268 which are bent by an angle at 270 of approximately 58.28° for the straight pentagon sides. The flanges are attached to those of adjacent plates by means such as bolts 272. The camera boards are attached to the plate itself by adjustable bolts at 274. The bolts can be varied in their length to allow final adjustment of the pointing direction of the camera so it will match the others in the dodecahedral array. This variation in length can be done by a threaded barrel 276 midway; the bottom half of the bolt is fixed to the to the camera board, usually by chemical glues, and the top half of the bolt, at 278 is fixed to this barrel, so that the barrel is also up snug against the backside of the plate. A turning of the outside head of the bolt 278, will thus act to turn the barrel, either drawing in or forcing away the bottom half of the bolt and its attached corner of the camera board, and thus changing its angle.

On either side of the lens 262 is space 280 which can hold outboard electronics, such as processing electronics for the camera board. And on the outside is an outer covering 282 which can also incorporate the lens hood surfaces 284. This outer covering and its associated lens hood can be removed if conditions such as even or dim lighting indicate that a lens hood is not necessary. If this outer covering has a round, shiny outer surface, 286, then people being photographed by this camera module can see, in the reflection from this surface, an analogue of what the final recorded picture will be, and can tell if they will be in the shot, and where the seams between the image segments will lie. This is important because, although this type of camera array is the most compact of all, there will still be a certain amount of parallax difference between the views, and it is best to keep critical parts of the image off the seams.

This facet assembly has a shape which matches a face of a dodecahedron, as projected outward along planes 288 from a center point 4.

FIG. 19 shows a top view of this facet mount 266, with mounting bolts 278 for the attachment of a CX-062 camera board 290, and bolt holes 272 in the side flanges for attachment to adjacent facet mounts. A large central hole 292 allows the egress of the lens 262, and other holes 294 and openings at the corners allow access to the interior of the camera array after assembly. The central lens covers the CCD and its central pentagonal imaging area 296. The vertical axis of this pentagon, and of its associated image, is shown at 298.

The most common small video cameras are usually made with CCD's, using video standards such as NTSC and PAL. The most popular sizes for CCD imagers for video cameras are ⅔" (8.98×7.04 mm), ½" (6.4 mm×4.8 mm), ⅓" (4.8 mm×3.6 mm) and ¼" (3.6 mm×2.4 mm). A single-pentagon rectilinear lens with a field of view of at least 74.755°, sufficient to produce a single-pentagon view, would be a 3.18306528 mm lens for a ½" CCD, and a 4.607717838 mm lens for a ⅔" CCD. A common 4.8 mm lens on a ⅔" imager, yielding a 72.5 degree field of view, is very close. Other close fields of view are produced by the Fujinon 2.5 mm ⅓" CS-mount lens, and the Chinon 3 mm ⅓" CS-mount lens. In general, the optimal rectilinear focal length is approximately two-thirds of the height of the imager. In CCD's Sony recently announced a new family of progressive-scan CCD's such as the ½" color ICX074AK-6 and the ⅓" color ICX084AK, which effectively double vertical recorded video resolution. Recent advances in CMOS manufacturing techniques for digital imaging chips may enable such types of imagers to replace CCD's, which are partly analog, in the near future.

FIG. 20 shows a perspective view of an assembled dodecahedral optical apparatus 300 such as a camera. This view does not include lens hoods to reduce radiometric distortion. The assembled framework for the optical elements such as cameras and lenses may be in separate facets, or it can be in other sections, such as fused groups of three, four or six pentagons, for ease of alignment and assembly. Thus each facet 302 can be individual, or part of a larger group.

FIG. 21 shows a side view of a multifaceted dodecahedral mount for multiple single-pentagon cameras, showing the sound recording apparatus and the outboard electronic processor in an invisible area beneath the camera. The assembled apparatus, in this case a camera, is at 300, with the support shaft for the camera at 304, containing multiple directional microphones 306. If several directional stereo microphones are used, such as four directional microphones, then the multiple channels of sound can be recorded on a separate synchronized recording machine such as an ADAT digital tape machine, for later use in postproduction, to create the effect of panning the localized audio sources. This is especially useful in cases where the spherical images are viewed as a "virtual reality" application through a head-mounted display. In this method of viewing, it is important that as the head shifts and the image shifts accordingly, that the apparent location of the audio sources shift as well. This can be done currently through Crystal River Engineering's audio digital signal processing, or through Ambisonics™ recording and Lake Huron Audio's digital signal processing. An alternate form of surround sound with discrete channels is Dolby AC-3 sound, which is being used for the next generation of digital high-definition television.

In the completed recording array, there is space below the camera that will be invisible to it, because it falls in the "blind spot" that would normally be covered by the twelfth pentagon. In this case below the camera 308 could be the space devoted to electronic controls, such as audio and camera control units. The outputs from the various cameras and microphones 310 would best be served by recessed right-angle plugs 312, to keep the cables and connectors from extending outward into any of the cameras' field of view, which is represented by a minimum angle 314 of 31.720 to the center of the lower pentagon edge, and 37.38° as the angle 316 to the outer pentagon corner. The whole array is attached via a base mount 320 to the overall support. This mount can be rigid, as in a tripod mount, or it can be part of a flexible system, such as is made by SteadiCam™, that keeps the camera from moving unduly when it is in motion.

FIG. 22 shows a side view of an inverted embodiment 322 of the above dodecahedral camera, inverted by a suspension mount 324. This alternate form of the camera is especially useful for filming in situations where a conventional mount underneath the camera is impractical, such as part of a sports event or concert where a tripod would block the movement of the performers. It would be better to suspend the camera overhead, out of the way. This version of the camera also allows one to look directly down, into the former blind spot. In this case, the blind spot is moved to the top pentagon. This can be very effective when the camera is suspended from an airplane or helicopter, especially if the plane or copter is kept invisible in this blind area. In this upside-down configuration, the cameras in their modules can be remounted on their facets in an inverted manner, relative to the arrangement described above, or, if the camera array is kept as before, then the recorded images would need to be inverted as part of the postproduction and playback process, with the exception of the camera facing straight down. This is usually simpler than remounting the cameras, and produces a correct-reading picture.

VIEWING OF SINGLE-PENTAGON IMAGES

The single-pentagon views may be projected onto a spherical screen, to recreate the spherical view of real life. Or they can be viewed as multiple facets, either through the use of photographic prints attached to each other, edge to dodecahedral edge, or via electronic reproduction. For example, a set of dodecahedral views could be presented, five or six views at a time, via the Internet, to give an incrementally turnable view of another location. If these views are arranged facing inward, then the illusion of real life is especially strong for the viewer in the facets most directly facing the viewer, and less so on those that are oblique. Despite any break in lines as the travel across the edges, the overall continuity of the scene is strongly apparent.

Up to this point, the photography of pentagonal images has been discussed in terms of single-pentagon views. FIG. 23 shows a preferred single-pentagon image, with a concurrent center 80 within the common 4:3 video aspect ratio 82, showing its circular perimeter 84, and straightened pentagon edge 86.

But if a different lens and aspect ratio is used, then a dramatically different approach becomes possible: the double-pentagon view, where each camera or projector covers two pentagonal views at once.

DOUBLE-PENTAGON IMAGES

The use of the double-pentagon format means that only half of the number of cameras and recorders are required for capturing a spherical view. Thus, the recording, display and distribution of spherical images can be greatly simplified. And because each image is composed of two single pentagons, it is essentially compatible with a single-pentagon system. For example, a double-pentagon image can be divided between two single pentagon projectors, or two single pentagons can be combined to make a double pentagon image.

FIG. 24 shows the preferred double-pentagon image within a wider rectangular aspect ratio at 326 of 9:16, close to the aspect ratio of theatrical motion picture films, and equal to the HDTV aspect ratio of 1:1.77 (9:16) used by most HDTV video systems. The concurrent center of the double-pentagon image 328 is also at the center of a dodecahedral edge 330. The right pentagon 332 and the left pentagon 334 are here shown with a straight edge 336. The size of the pentagons is determined by the same circle 84 which touches the top and bottom edges of the aspect ratio. Note how the double-pentagon area represents an efficient use of the wide aspect ratio area. The lens photographing such an image should have a width of view 32 of at least 138.19°, equal to the width of two pentagons. A round-number field of view of at least 140° is preferred, to allow for a margin of error. The image produced by a typical lens is circular, so if coverage can be made of the full diagonal of the wide aspect ratio, using a width of view of approximately 180°, then extra image area can also be included outside of the original dual pentagons to extend the recorded area or for use in blending adjacent double-pentagon images together.

This double-pentagon image can also be mapped onto a cube, because this shape too is compatible with a dodecahedron. The edge of a concentric cube is shown at 338—note that the cube face connects the upper and lower points of the pentagons together. This vertical cube edge also defines the minimum vertical angle of view of approximately 71°.

In addition to single-pentagon and double-pentagon recording, triple-pentagon recording can also be done. FIG.

25 shows the preferred triple-pentagon image within a square aspect ratio whose border is at 344, as well as the common 4:3 video aspect ratio at 82. The center of the three-pentagon image 340 corresponds with a dodecahedron vertex. Around this center are the centers 342 of the individual triple pentagons. Each of these pentagons typically appears in a distorted form with a boundary at 346; image warping can then be used to separate them into more standard pentagon shapes 348 that are compatible with other forms of dodecahedral recording and display. This warping also acts to separate the pentagons along their original dividing line 350. There is also an optional outside image area 352 which can added on to the outer edges of the pentagons if desired. More will be described later about triple-pentagon systems.

DOUBLE PENTAGON LENSES

The photography and projection of double-pentagon images can be done by any suitable lens that can encompass a double pentagon view with a minimum of distortion, since any uncorrected distortion in the image, such as that caused by the barrel distortion of a typical fisheye lens, will cause visible discontinuities across the edges of adjacent dual-pentagon views. The 3.5 mm C-mount lens from Century Precision Optics is a good example of a typical extreme wide-angle lens. A preferred form of lens is called a rectilinear lens, and is based on a gnomonic projection of pentagonal facets onto a concentric sphere, so that the edges of the pentagons, shown in FIG. 1 at 40 which represent great-circle divisions of the sphere, will appear as straight lines. If they do not appear as straight lines, then further processing of the image is necessary in order to make straight edges on a two-dimensional screen surface that can be properly matched together to create a composite image. A rectilinear lens for the very wide field of view required for this application is near the state of the art, because of the limitations of spherical leens manufacture when the field of view is over 130°. To create a lens with a rectilinear field of view 140° across or more, there are six approaches.

1. The construction of a glass lens with such a field of view, which is very difficult to do without chromatic or spherical aberration. The use of aspherical elements, such as are manufactured by Tinsley Laboratories of Richmond, Va., enables better performance in wide-angle optics than spherical elements.

2. The application of counter-distortion, such as the counter-distortion of a video raster or CCD reading sequence described in the earlier Dodeca System patent as an electro-optical lens. This type of distortion can have the effect of giving the image more than one optical center, such as an optical center placed in the center of each pentagon of the dual-pentagon image. An alternate way to look at this type of counter-distortion is that it creates the effect of an image photographed with an ideal lens. This distortion can be applied either during or after any recording made by a conventional lens, and acts to augment and perfect the appearance of the recorded image. A detailed discussion of counter-distortion is found in "Correction of Geometrical Perceptual Distortions in Pictures" by Zorin and Barr, Computer Graphics Proceedings, SIGGRAPH '95 Annual Conference series.

3. The application of distortion to the light by means of binary optics. As detailed in "Binary Optics," Scientific American, May 1992, binary optics is a method of etching very fine lines on a clear substance such as silicon; such lines act to distort light, bending it like the refraction caused by passing through glass lenses. These lines can be arranged to provide forms of light distortion impossible to do by glass lenses, and have the added advantages of low manufacturing cost, light weight, small size, and freedom from the chromatic distortion of blue light characteristic of glass lenses. A composite glass-binary optic lens can produce the best overall results.

4. Using stacked arrays of micro-optic lenses, such as the monolithic lenslet modules produced by Adaptive Optics Associates of Cambridge Mass. These very fine arrays of lenses, usually molded from optical epoxy, are usually matched to the component parts of a sensor, such as the pixels of a CCD. Stacking these lens arrays can yield increased performance in the sensors, and by applying them to curved substrates, or controlling the curvature of the lenslets across the array, unusual optical effects such as improved panoramic lenses can be produced.

5. The production of a holographic lens. Since every hologram is a three-dimensional representation of light modulation, then a hologram of a lens can act as a lens itself. To produce a hologram of a lens, an actual lens is constructed with the desired characteristics of light modulation. Then a laser is split into two beams; one, the reference beam, shines directly onto the recording photographic film, while the other beam passes through the lens before falling onto the film. The manipulation of the modulated beam can also be done through computer control directed according to a simulated lens. The resulting photographic hologram is a pure reproduction of the modulation of light caused by the lens, and therefore will modulate any other light passing through it the same way. Such holographic lenses would be flat, easy to produce, and inexpensive. Forms of holographic lenses are already in use in optical equipment such as head-mounted displays and in laser scanning devices.

6. The last approach to the double-pentagon image is to use a panoramic camera with a rotating turret lens. Such cameras typically hold the film in a cylindrical fashion, and sequentially expose it through a moving slit in a rotating turret with a moderately wide angle lens. The result is a wide image with minimal distortion. While such cameras give good results for still photography, such an approach has proved too cumbersome for motion picture photography and projection. Examples of these still panoramic cameras are the Fujix GX617 Panorama Camera for 120 roll film, the Cyclops Mark IV and Panon Model 1500 for 70 mm still film, and the Panon Widelux for 35 mm photography. All of these have fields of view of the requisite 138.19° for a double-pentagon image, and all but the Widelux also have the required height of view of at least 71°.

NEW MEANS FOR DOUBLE PENTAGON FORMATS

There are several ways of grouping dual-pentagon images for photography, recording and display. Three special new formats will be described here. Each uses a different combination of dodecahedral edges as the basic for image alignment. The use of a double-pentagon format means that only half the number of cameras are required for capturing a 2-D spherical view, as compared to a single-pentagon system. Thus, the recording, display and distribution of spherical images can be greatly simplified. And because each image is composed of two single pentagons, it is essentially compatible with a single-pentagon system, since the dual-pentagon image can be divided into its two pentagon component parts. Such extra manipulation of images produced by the present invention can be done later in a studio, so all that is needed in the field is the cameras and recorders themselves.

The first format has the advantage of even division into a hemisphere, with three dual-pentagon views exactly covering the hemisphere of six single-pentagons described above, and six dual-pentagon views encompassing a complete spherical view of twelve pentagons. Because in this format certain dual-pentagon views appear turned at a crossways angle relative to other dual-pentagon views, it will be identified as the Xodox™ or "X" format.

The second dual-pentagon format has almost all of the dual-pentagon views appearing side by side, in a horizontal sequence like that found in multi-view panoramic cameras. Because of this resemblance, the second format will be identified as the Pentarama™ or p (Panoramic) format. It allows efficient recording of the greater part of a spherical field of view, and the use of overlapping fields of view producing a 3-D stereoscopic image.

The third dual-pentagon format, the Octahedron or "O" format, is based on the octahedron, and offers another way of recording a full-spherical 3-D image.

X FORMAT

FIG. 26 shows an exploded perspective view of a dodecahedron, showing the double pentagon sections and optical axes characteristic of the Xodox™ or X Format. Here the orientation is for the tilted X-Hemisphere (X-H) best suited for recording a hemisphere in three dual-pentagon segments. The center of the X-H vertical dual-pentagon group 354, which is shown in a bold line, is at 356. Note how this includes the top pentagon, and has an optical axis 358 through the center of the dodecahedron 4 to a corresponding dual-pentagon on the bottom. The other four pentagons in the upper hemisphere are in two groups along the sides. The center of X-H side dual pentagons #1 is at 360, which again corresponds to the center of a group 368 on the opposite side, and the center of X-H side pentagons #2 is at 362, corresponding to a center 364 along an axis 366 also through the center 4.

FIG. 27 is a top schematic view of double pentagons in the X Format, in the X-H (X-Hemisphere) alignment, as seen from above, with three double-pentagon images representing a hemispherical view. The vertical X-H dual pentagons 370 include the center of the top pentagon 372. The side X-H dual pentagon #1 is shown at 374, with an indication of the top of the recorded image, as it appears on the screen during playback. Note that the top of these dual pentagons is towards the top of the hemisphere, in the same direction as the top of the vertical pentagons 378. For the side dual pentagons 380, the top is in the opposite direction, but pointing also toward the top of the hemisphere 382. This switch in direction of the top of the recorded image for one of the side dual pentagon groups is the hallmark of the X-H format, because it enables all of the recordings to appear on the screen in a relatively natural way. If the top of the last image were in the opposite direction, as shown at 384, it would be more consistent, even though the image would appear on the screen to be upside down. This consistent top direction is characteristic of a variation of the X format called the X-Sphere (X-S) format. A line 386 connecting the centers of the two pentagons 388 and 390 is an easy way of indicating the direction of the width of the recorded image relative to the dodecahedral edge which lies at their center. For a hemispherical view (assuming that the zenith pentagon is straight up as usual), the horizon is shown here at 392 as it is recorded by the first side dual pentagons, where it runs along the bottom of the recorded image, and at 394 as it appears in the vertical pair, running along the left side. Below the side pentagons, as at 396 and at 398, and to the left of the vertical pentagons at 400, is an optional image area which can be included in the final displayed image, if it is not covered by any other recorded pentagons, to extend the overall field of view well below the horizon in every direction.

Figure 28A:
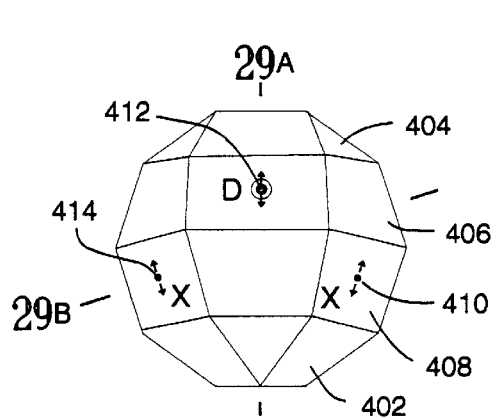
Figure 28B:
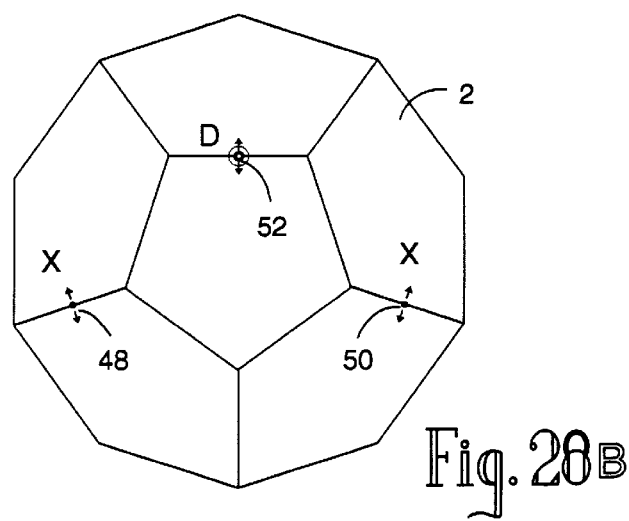

FIG. 28A shows a top view of an optical mount for double-pentagon images in the X-H format, and a top view in FIG. 28B of a dodecahedron showing the edges used as its alignment points. The basic target point D on the dodecahedron 2 is at 54, representing the center of the edge used for the vertical pair, and the edges used for the two side pairs are at 48 and 50. These points correspond to points on the optical mount which represent the optical centers of the optical elements, which can be either cameras or projectors. The assembled multifaceted X-H Mount is at 402, which is made up of three characteristic types of facets, a triangular facet 404, a trapezoidal facet 406 and a rectangular facet 408. The optical centers are found on these rectangular facets, with the width of the recorded image extending opposite to the width of the facet. The center for the side pentagons #2 is at 410, including an indication of the width of the recorded image, for the vertical pentagons at 412, and for the side pentagons #1 at 414.

FIG. 29 shows a schematic cross section of the above optical mount, showing two cross sections of the above camera/projector mount, along the axis 29A–29A, and along the axis 29B–29B in FIG. 28. The center of the dodecahedron is in both views at 4. The declination angle from vertical for the upper pentagons of 31.717473° is at 416. A plane orthogonal to the upper pentagons' axis 418 represents the surface on which will be mounted the optical elements for the vertical dual pentagons 420 in this mount. The axis for the lower pentagons has a declination 424 of 58.282527° as shown at 424, and an elevation above the horizon of the same 31.717473°. An orthogonal plane 426 to the optical axis is used for mounting the imaging elements 428 for the side pentagons.

FIG. 30 shows a perspective view of an optical mount 402 for double-pentagon images in the X-H format, wherein three double-pentagon images form a hemispherical view, with the alignment points on a spherical field of view subdivided by a projected dodecahedron. Here an even hemisphere of three dual-pentagon views is covered by a turtleshell-like asymmetrical arrangement of facets that happens to lie perfectly flat along a hemisphere base plane. In this mount, one of the lenses 430 is near the top, with an optical axis 358 pointing to an edge center 52 on a concentric spherical dodecahedron 12 representing a spherical field of view. Two lenses such as at 432 are on the sides, also pointing to an edge center such as at 48.

Reduced to its essential elements, this optical mount forms a pleasing combination of three-dimensional shapes with unique properties.

FIG. 31A, FIG. 31B, and FIG. 31C show a schematic top view of the component parts of this optical mount. Their construction is simple, because they have only two edge lengths: a short edge 434, and a long edge 436, with a proportion between them equal to the Golden Ratio, 0.618:1. Thus the rectangle, the facet holding the optical mount, is a Golden Rectangle. The bevel angle on the short edge is −31.72° from a right angle, and on the long rectangle edge the bevel is −20.91°. The trapezoid facets 406 have three short edges and one long edge, and represent the bottom part of a pentagon. Both of these are the same lengths as before, but the long edge 438 has a bevel of −10.81° and the short edges 440 have a bevel of −26.57°. And the final element that draws them all together is an equilateral triangle facet 404, which has three short edges 442, also with a bevel of −26.57°.

FIG. 32 shows a top view of this assembled shell-like X-H mount 402 for a hemispherical view. The X-H mounts are defined by a perfect decagon (ten sided) base, which is result of the division of this shape in half along a plane such as along edge 444.

Two of these mounts, attached at their base with one turned 180° relative to the other, will cover six dual-pentagon views, thereby forming a complete spherical view of twelve pentagons. These full-sphere views result from optical elements on the rectangles on alternate sides of the plane marked by edge 446, which produces a perfect hexagon cross section, characteristic of the X-Sphere (X-S) variant of this format.

FIG. 33 shows a schematic flattened view of the components of the X-S optical mount arranged for the coverage of a full-spherical field of view. The optical horizon, representing the hexagon division plane, is at 448 and also along 446. The X-H decagon cross section plane is along edges such as at 444.

FIG. 34 shows a flattened top view of the arrangement of components for the X-H format, showing the position of the optical horizon plane 444 and the three mounts for the vertical dual pentagons 450 and the two side dual pentagons at 452 for #1 and 454 for #2. The division plane for the X-S format runs along edges such as at 446.

FIG. 35 shows this spherical mount stripped down to only the central band of trapezoids 406 and rectangles 408, lying horizontally. Here it can be seen that the spherical mount is essentially a faceted hexagonal box, with a dihedral angle of 148.282527° across the central hexagon edge 446, with trapezoid faces alternating with rectangle faces (including the lenses of the cameras/projectors). The X-S mount facets can also be made equal, producing a regular hexagonal faceted box with a dihedral angle of 138.189698° across the central hexagon edge. The optical axis intersections on what used to be the rectangular facets should remain in the same places relative to the dodecahedron center.

FIG. 36 shows the characteristic arrangement of the double pentagons for the X-S format, representing the coverage of a full spherical field of view. Here all of the dual pentagon images share an identical vertical orientation. In its simplest form, the X-S format can be understood as six dual-pentagon images whose optical axes lie alternately above and below an equatorial plane, with a rotation of 60° on this plane between each, representing rotations to the centers of the edges of the hexagon cross section. An upper dual pentagon is at 456, with a center at 458, approximately 20.915151° above the horizon plane 460, while the lower dual pentagon 462 has a center 464 which is the same angle below. This equatorial plane 460 also intersects the center of the dodecahedron, and is equidistant from two opposite dodecahedral vertices, which lie along a polar axis.

A vertical support centered on the bottom of this mount would be in a kind of "blind spot," on the outermost tips of the bottom views. In practice, the equatorial plane will usually be horizontal, since this maximizes the benefits of the "blind spot," in line with the vertical dodecahedron vertex, but the X-S mount can be tilted in any orientation, just as any optical instrument is free to be pointed in any direction. The all-vertical dual-pentagon views in the X-S format do not represent a realignment of any of the six dual pentagon views making up an image of the surrounding concentric dodecahedron in the X format in general, merely a division of these six pentagon pairs along another plane tilted approximately 79.19° from the horizontal dividing plane for the X-H format, represented as 444.

In the X-S format the location of the top of the screen for the recorded image is on the same side, as indicated by 384. This can be defined as where the upper edge of the image will lie when the output of the camera is directly viewed, as for example on a monitor. In addition to an optical mount for simultaneous photography, where the cameras are clustered together on a kind of geometrical mount, as is the case for single pentagon systems described above, there can also be sequential photography by a still camera on a motion control rig.

FIG. 37 shows a front view of a motorized motion control X-S format mount with rotation around a nodal point. Here again the rotation is around the nodal point 122 of the lens 128 of the camera 110. The camera is mounted on an L-shaped support, according to a lateral distance 142 between the camera optical center (here corresponding to the mount center) and the side portion of this tilting camera support 146. Unlike the single-pentagon motion control mount described earlier, here the camera is turned on its side, and has a double-pentagon lens.

FIG. 38 shows a side view, where the forward distance from the nodal point to the camera mount center is shown at 148. Here the camera 110 is shown as horizontal so it has a horizontal optical axis 140. Returning to the front view, the base support for the tilting camera support is shown at 150, which rotates relative to a fixed base 152 by means of a rotary motor 154 driving gears or other appropriate means to create accurate, repeatable rotary motion. A similar rotary motor 158 is used in combination with gears or other means 160 to rotate the tilting camera support around a tilting axis 162 which also intersects the center of rotation 122.

FIG. 39 shows side views of this mount showing the characteristic orientations of the camera and its optical axis for the above-horizon 466 and below-horizon 468 views, which both represent displacement by approximately 20.915151° from the horizontal plane. In the preferred embodiment, a cable-driven motion control apparatus, such as those made by Sagebrush Technologies of Albuquerque, New Mexico, would be used, because of their smoothness, speed, accuracy, and repeatability. If a film camera is used, a motor drive added to the camera can advance the film while the motion control rig is repositioning the camera for the next shot. If a pause control is added before the picture is taken, then the cameraperson can make sure that they are not in the shot, even for a full-spherical image.

FIG. 40 shows a front view of the above mount, turned by approximately 79.19° to produce the X-H format. At 470 is this tilted X-H rotation plane, and at 472 is the tilted X-H rotation plane. Since this is a simple automatic apparatus, it does not invert the camera midway through the sequence. Therefore in order to have the proper reversed top of the image for one of the double pentagons along the horizon, as shown in FIG. 27 at 382, this image must be reversed in postproduction. The full sequence of six views can be understood as two hemispherical groups of three double pentagons each.

FIG. 41 shows a storage template for condensed storage of a hemispherical video image in the X-Hemisphere double-pentagon format. All of the double pentagons appear here so that their recorded images will read naturally as "right side up". The first side dual pentagons are at 374, with an "up" indication at 376.

The second side dual pentagons are at 380, and the vertical view 370 has an indication of the top of the recorded image at 378. The combined recorded images appear within a grouping of pixel information whose border is at 474. An image including a dual pentagon is at 476. Square subdivisions 478 with in the overall image hold the essential pentagon information such as the pentagon centered at 390, which is also the center of the square, given an ideal mapping of the pentagons with straight borders 86. Within this arrangement, there is also a space 480 within a common 4:3 video aspect ratio 82 for extra information along the top and bottom edges.

FIG. 42A shows a storage template for condensed storage of a stereoscopic spherical video image in the X-S format. The right pentagon 482 and the left pentagon 484 of an individual dual are shown, with an indication of the top of the recorded image at 486, which is the same for all of the views. However, since the dual pentagons are vertical relative to the horizon, all of the objects in this composite X-S recorded view will here appear to be sideways. The border of the overall composite image is at 488, representing a 4:3 aspect ratio. A second group of six pentagons is shown in FIG. 42 is at 490, in a vertical orientation that allows the recorded image to appear "right side up" according to a vertical indication at 492. This second group of six images can represent a stereoscopically offset set of views, exposed so that their pentagons overlap with the first set.

FIG. 43 shows a side X-H double pentagon image 396, showing the orientation of the top of the image 376 relative to the horizon, along with an indication of its width 386, which parallels the horizon.

FIG. 44 shows a vertical X-H double pentagon image 370, showing the orientation of the top of the image at 378.

A variation of the X-H configuration allows a hemispherical view to be in 3-D. As previously described for single-pentagon views, the photography of a scene from two offset points of view creates a stereo pair which can be used to create a stereoscopic illusion. The simplest way of doing this for the X-H format is to rotate the entire camera mount by 72° and repeat the exposure. Thus the effect is of a rotation of the composite image about the center of the uppermost pentagon of the uppermost dual-pentagon image, and the production of another complete dodecahedron image hemisphere whose component pentagonal faces overlap and match up with those of the original dodecahedron image hemisphere created by the first exposure.

While it is possible to rotate the complete X-Sphere camera mount in this way through motion control to create a stereoscopic spherical image, the necessary mounts will always be included in the image. An alternate approach to using double-pentagon images, the Panoramic or P-format, is a simple method of achieving coverage of almost a complete sphere, with easier production of stereoscopic stereo pairs of this view.

PANORAMIC FORMAT

A second format for double-pentagon images, the Panoramic or P format, employs mainly tilted camera views and optical axes in a single plane. Because in this format the main dual-pentagon views are recorded side by side, in a horizontal sequence resembling multi-view panoramic cameras, it can also be identified as the Pentarama™ format.

The use of a novel arrangement of cameras provides the means for the recording and reproduction of all or most of a spherical field of view, including the three-dimensional image that one would see if one stood in a place and turned around.

With this simple arrangement of cameras one can provide coverage of an extremely wide field of view in stereo pairs of images with the same optical separation throughout the recorded image. The 3-D illusion in this case is most strong and seamless in the areas that are usually of the most interest in any view—everywhere but straight up and straight down. Thus natural overall views of real places can be captured and shown to create a new type of "real space" virtual reality, unlike conventional virtual reality systems, which depend on computer-generated simulations for their three-dimensional images.

The component segments of the images are in a pentagonal format that is a simple and flexible standard for the exchange of visual information related to a spherical field of view; thus effects such as computer-generated images can be overlaid and matched to the real image, as long as the computer-generated images are made according to "camera" and "angle of view" settings compatible with the present system of dodecahedral photography.

For simultaneous recording of a surrounding scene, up to fourteen cameras are used (for a full stereoscopic view). Synchronized motion picture film cameras can be used, although video cameras are preferred, despite their lower resolution, because they allow a more lightweight and compact arrangement of cameras to be made, and they are compatible with applications such as live transmission of the video images to other locations.

FIG. 45 shows a "right-leaning" P-Format double pentagon image 494, showing and indication of the width of its double pentagons 496 and the orientation of the top of the image 498 relative to the horizon 90. The "leaning" of the image comes from the tilting of its camera by 54° relative to the horizon, and, of course, the same tilt for any corresponding projector for displaying this camera image.

FIG. 46 shows a succession of five right-leaning P-format double pentagons, representing ten pentagons, which contain most of a spherical field of view, extending 65° above and below the horizon. Note how the successive extracted double pentagons 500 and 502 parallel each other.

FIG. 47 shows, in contrast to the right-leaning image, a "left-leaning" P-Format double pentagon image 504, showing the orientation of the top of the image 498 relative to the horizon 90 which is also a rotation by 54°, but in the opposite direction as the right-leaning image.

FIG. 48 shows a succession of five left-leaning P-format double pentagons, representing most of a spherical field of view. Once again, the successive right-leaning extracted double pentagons parallel each other, and each contacts another along three zigzagging pentagon edges.

FIG. 49A shows a left-leaning double pentagon 504 and, in FIG. 49B, a right-leaning 494 P-Format double pentagon image, showing, in FIG. 49C, how they overlap to produce a stereoscopic area. Note how the recorded image 510 in the extracted left-leaning double pentagon 506 would seem to lean to the left if the image were viewed in the normal horizontal orientation on a monitor. Similarly, the recorded image 512 in the extracted right-leaning double pentagon 500 would seem to lean to the right. The opposite-leaning images together create a one-pentagon region of overlap 514, which, because it was recorded from two offset points of view, represents a stereoscopic region.

FIG. 50 shows a schematic representation of a succession of overlapping double-pentagon P-format views producing a stereoscopic area, and how the double pentagons are divided for assignment to alternate eyes in the stereoscopic viewing process. Ten cameras, five right-leaning and five left-leaning, make up a "main ring" for recording most of a spherical 3-D field of view. The equatorial plane of the dodecahedron is at 516. Upon this plane ie the optical axes of both right-leaning cameras such as 518 and left-leaning cameras such as 520, radiating outward from the center of the dodecahedron like evenly-spaced spokes of a wheel, and intersecting the centers of the ten equatorial dodecahedron edges.

In the P-format, the vertical axis of the recorded picture is tilted by 54°, as at 524, relative to the equatorial plane 522, for the cameras of the main ring. The width of view of the cameras is at least 140° wide, the width of two pentagons, to enable the recording of two pentagons whose centers, as shown connected by the width line 496, lie alternately above and below the equatorial plane by 26.5665°. The difference between the successive cameras along the ring defines an interocular distance 526 between the opposite orientations of dual pentagons. The center of the overlapping stereoscopic region is at 528, as recorded by both right-leaning camera 518 and left-leaning camera 520, but not by the adjacent right-leaning camera 530.

For 3-D viewing, different views need to be presented to the left eye and the right eye in order to create the stereo illusion. In order to do this, the two pentagons are split by a vertical division of each recorded image, and the halves are sent to opposite sides, to be viewed by opposite eyes. For example, the pentagon on the right-hand half of the screen goes to the left-eye view, and the pentagon on the left-hand half of the screen goes to the right-eye view. Thus, the indication at 532 shows the right-eye assignment for viewing of the left half of the left-leaning image, and 534 shows the left-eye assignment for viewing of the right half of the left-leaning image, while 536 shows the right-eye assignment for viewing of the left half of the right-leaning image, and 538 shows the left-eye assignment for viewing of the right half of the right-leaning image. This will produce a consistent stereo illusion as one turns one's head from view to view, and the right-and left-eye views are handed off like a relay from camera to camera.

The P-format views, like single-pentagon and X-format views, can be recorded either sequentially or simultaneously, depending on the construction of the camera mount.

SEQUENTIAL P-FORMAT PHOTOGRAPHY

FIG. 51 shows a simplified camera mount on a rotating bar for sequential photography, allowing two-dimensional coverage of most of a sphere with a single camera, or three-dimensional coverage of this area with two cameras. A transverse bar 540 rotates 120 about a fixed central point 542. At least one end of the bar is attached to a camera mount plate 544, tilted either to the right or to the left 54°, arranged so that the central optical axis 140 of the attached camera will always intersect the center of rotation 542. The mount hole for mounting the camera is at 546. The transverse bar is rotated to positions 72° apart, either by hand or by means of a motor attached to a rotating support such as a disk 548, which rotates relative to a fixed support 550, which could be the head of a tripod, with the center of rotation 542 in line with its central axis. If a photograph by a single camera is taken at each of these five positions, these five exposures offer two-dimensional, coverage of the ten-pentagon image area of the "main ring". The other end of the bar could hold a counterweight to the camera. But if a second camera with the opposite tilt is added to the other end of the bar, then five more views can be taken which will overlap in the manner previously described, producing three-dimensional coverage of the main ring area with only two cameras.

FIG. 52 shows another perspective view of the above mount, showing two cameras mounted for three-dimensional coverage. A right-leaning mounted still camera is at 552, and a left leaning mounted still camera is at 554. With this small, portable apparatus and only two cameras, a still three-dimensional image of most of a spherical environment can be photographed. A precision motion control mechanism such as the cable-driven systems made by Sagebrush Technologies, but other motion control means or even clockwork can be used, which has the advantage of not requiring any power supply.

The main ring area of camera views can also be covered by a single camera, alternately tilting to the right and to the left every 36°, as the bar revolves, which can be done by a gearing mechanism. However, this method is slower and less accurate than using two cameras in rigid mounts. One extra camera view will fill in the image in the top of the main ring. This can be created by a third camera with a narrower, vertical field of view attached to the bar 540. The rotation of the bar would thereby offset the camera, so that successive exposures could be taken from more than one point of view, thereby forming a stereo pair. The extra camera view can also be accomplished by motion control repositioning of at least one of the cameras covering the main ring.

SIMULTANEOUS P-FORMAT IMAGING

FIG. 53 shows a top view of a ring of ten cameras in the P-format used for a nearly complete stereoscopic recording of a surrounding field of view. All of the optical axes for the cameras, as shown for example at 556, lie along a plane, equally spaced like the spokes of a wheel, and meet at a central point There is a rotation angle 560 of 36° between any right-leaning camera 518 and any left-leaning camera 520, which creates an interocular separation distance shown at 526. There is twice that amount of rotation between two right-leaning or left-leaning cameras, creating a wider interocular distance shown at 562. This shows how there can be a relatively large amount of parallax difference between th e views of the similar-leaning cameras.

With conventional optics and cameras, in any single, double, or triple-pentagon format, the main limitation in minimizing parallax is the size of the cameras and how closely they can be packed together and still maintain the correct optical orientation. In order to minimize this parallax difference, there are several novel forms of optical mounts.

FIG. 54 shows a top view of a ring of five cameras in the P-format for two-dimensional coverage, showing the addition of nodal-point centered, divided lens optics to eliminate parallax differences between the adjacent views. If only the "left-leaning" cameras are used, the five dual pentagons they record will represent a complete circuit of the sphere. The same is true if only the "right-leaning" cameras are used. The forward part of a modified P-format lens is shown at 564, and its corresponding rear element is at 566, defining a path for the path of the light 568 passes through the center of the optical array, in such a way that the nodal point of the lens falls at the center point. The same is true for all of the lenses, which are held in a lightproof optical mount 570 which allows for the attachment of the lens elements, and for the attachment of cameras to each rear lens element. Note that here because there is an odd number of cameras, there is a simple alternating camera-lens arrangement. Also, because the cameras are not packed together and facing outward, but separated and facing inward, toward the lens on the opposite face, the cameras can be much larger, and hence can be chosen from among a wider range of existing cameras.

FIG. 55 shows a perspective view of a main ring of ten cameras used for simultaneous stereoscopic recording, with the cameras facing outward, showing the tilted camera views and optical axes in a single plane characteristic of the P format. These could be separate cameras for simultaneous photography, as here, or represent successive positions for one or more cameras in sequential photography. All of the camera axes lie along a single equatorial plane of a dodecahedron 516. The optical axis 572 of the left-leaning cameras is aligned to a point 574 on the center of an equatorial edge 576 of the concentric dodecahedron 2, and the optical axis 578 of the right-leaning cameras is aligned to a point 580 on the center of an oppositely-slanted equatorial edge 582 of the same dodecahedron. The camera views are alternately tilted, to the right or to the left, by 54°, so that the double-pentagon images they take are likewise tilted, as shown by the width indicators at 496, and are thus made to overlap, defining pentagonal overlapping regions with a center such as at 528.

A distortion of the raster scan of the video image, previously described as an electro-optical lens, can be done on the video image from each camera view to restore the proper straight pentagon boundaries and to create the effect of each image having two optical centers, one of which can be the center of the region of overlap. Each image is also cropped according to the shape of two adjacent pentagons, representing two pentagonal faces of a dodecahedral spherical projection. Because of the alternate tilts of the camera views previously described, at least one pair of these new optical centers from any two adjacent camera views will be congruent, either above or below the equatorial plane; the pentagonal borders from the sections represented by those optical centers will match as well. Thus double coverage of that pentagonal section is created from adjacent camera views: a stereo pair of images that gives a three dimensional illusion. If the process is continued, it produces an alternating series of matching overlaps, above and below the horizon, in a ring that covers all of a spherical field of view except the pentagonal portions represented by the dodecahedral face directly above as shown at 584, and the dodecahedral face directly below.

FIG. 56 shows a side view of multiple cameras for a full stereoscopic spherical image in the P format, with the top and bottom pentagons covered as well by additional cameras, for a maximum of fourteen. A right-eye single-pentagon camera for the top pentagon is at 586, and the left-eye single pentagon camera is at 588. Similar double cameras are also shown for the bottom view. For the sake of consistency in the overall composite image, all of these additional cameras should have the same amount of interocular distance 526, and have lenses that lie along the sphere 590 that defines the overall spherical diameter of the array. Because the cameras in the ten-camera main ring are opposite each other, divided optics, such as could be used for five cameras, cannot be used to minimize parallax separation. However, there are alternate arrangements that can minimize the distance between the cameras, especially when the main ring of ten is used.

FIG. 57 shows a side view of a P format camera, showing ten cameras using right-angle optics and extended axes. A double pentagon lens 592 is coupled to right-angle optics 594 with a camera 596 at the other end. Because of the opposite tilts of the cameras, this extension would be impossible if all of the cameras lay on the same side of the equatorial plane 516. Therefore, for one set of five cameras, such as those above the horizon such as at 596, the image will be inverted, and will have to be corrected in a separate step. For the rest of the cameras, such as at 598, the image will be recorded in its normal orientation.

Temporal Offset Mount

FIG. 58 shows an alternate method of subtracting parallax differences between the various views in a camera array, especially when that array is in motion. Because the offsets are described as offsets in time, this will be called a temporal offset mount. In this figure we see top views of temporally offset mounts of a five and ten-camera array, with all of the nodal points of the cameras equally-spaced along a line. The distance between the cameras is dynamically adjusted to be the equivalent of at least one frame's worth of distance at a given rate of speed, as an alternate method of controlling parallax differences between adjacent views. At 600 is a base frame position, equivalent to a zero frame offset. An offset position of one frame is at 602, indicating the distance between the nodal points of camera 604 and camera 606, which is equivalent to the motion of the nodal point of camera 604 to that of 606 over a span of time equal to one given frame division, which for NTSC video is roughly equivalent to $\frac{1}{30}$ of a second, and for motion pictures as $\frac{1}{24}$ of a second. All of the synchronized cameras would then be recording the scene from sequential positions exactly one frame apart. These temporal differences are then subtracted during the postproduction process. For example, the camera at the +4 frames offset position would be offset backward four frames. Thus, using SMPTE Time Code, for example, 00:10:00:10 for the baseline camera would be made synchronous with 00:10:00:14 for the offset camera. This would make the nodal point positions of all of the cameras occupy the same point in a virtual space, so that there would be no parallax differences between them. The only differences visible in the panoramic image would be in the appearance of moving objects moving among the various views, since these views are taken from slightly different points in time.

An offset camera such as the second camera 606 has a different orientation and field of view than the first, as shown at 608. The orientations shown here are designed to avoid, as much as possible, one camera seeing another, as can be seen by the field of view 608 avoiding the third camera at 610. This is the equivalent of a single-coverage P-Format array of five cameras. An expanding and contracting mount frame is shown at 612, which could be in the form of a linked accordion framework on a track With this mechanism a single transverse expansion and contraction control at 614 would serve to expand the distances between the various camera shown at 616 simultaneously and equally, according to the amount of motion of the entire array in the direction shown at 618.

If for any reason the amount of distance of one frame is too small, then a set distance of two or more frames can be used, as long as the use is always consistent. The same principle of an expanding or contracting temporally offset linear array can be used with different numbers of cameras.

The first example shown used five cameras, such as would be found in a 2-D single-coverage P-format array. The second example shown here is for ten cameras such as at 640, such as would be used for a 3-D double coverage P-format array. These two examples assume that all of the camera optical axes lie along the same horizontal plane. But it can readily be seen that this temporal offset principle could also be applied to arrays of cameras tilted relative to each other, such as single-pentagon systems, or other forms of multi-camera arrays, both dodecahedral and otherwise.

OCTAHEDRON FORMAT

A third form of double-pentagon format is that based on the octahedron, an eight-sided form made up of equilateral triangles. In this format, each double pentagon's central edge is aligned to one of the six points of a concentric octahedron. As in the X format and the P format, these multiple views can be taken by a multiplicity of cameras, or by one or two cameras moving from position to position via motion control. The creation of overlapping views for an all-over stereoscopic effect can also be done.

FIG. 59 shows a perspective view of a dodecahedron 10 and a concentric octahedron 622, illustrating the Octahedron or O-format. A vertex 624 and center 4 of this concentric octahedron define an optical axis 626 which is aligned to a point 628 which also lies midway along a dodecahedral edge 630 dividing two dodecahedral faces 632 and 634. A rotation 636 of this optical axis for stereoscopic effect by 36° brings it to a new position 638 and a new target point 640 which also lies on a dodecahedral edge 642 which divides two dodecahedral faces 644 and 646, which are rotated relative to the first pair of faces, like the left- and right-leaning rotation difference in the P-Format, by 54°. The second face 646 of the rotated position happens to be congruent to the second face 634 of the original position, thereby defining a stereoscopically offset region of double coverage of the photographed scene. A rotation of the octahedron on an axis through a dodecahedron vertex 10 and the center of the top octahedron face produces such matched pairs for all of the six octahedron vertices. Thus regions of stereoscopically offset pentagons can be created everywhere by simple rotations of the camera axes and their related double pentagons.

FIG. 60 shows a perspective view of an O-format optical mount 648. A first octahedral optical element is shown at 650, with the width line of the first recorded image at 652 indicated the directions of the two double pentagons, and an indication of the top of the recorded image shown at 654. A second octahedral optical element is at 656, with an indication of the top of the second recorded image at 658. The pole point at the center of the topmost face, corresponding to a dodecahedral vertex, is at 660. FIG. 61 shows a schematic representation of the characteristic arrangement of O-format double-pentagon views representing a spherical field of view. A first dual octahedral pentagon 662 shows an indication of the top of the recorded image 654, and a second octahedral dual pentagon 664 shows an indication 658 of the top of the recorded image which here appears turned 90° relative to the first. This great difference in the orientation of the various double-pentagon views must be taken into account when working with this particular format.

FIG. 62, in contrast, shows a schematic representation of a succession of five right-leaning P-format double pentagons 502, representing most of a spherical field of view. Here it can be seen that the indication of the top of the recorded image 498 always faces in the same direction.

Similarly, in FIG. 63 is a schematic representation of a succession of six X-S format double pentagons, such as above horizon pair 456 and the below-horizon pair 458, representing all of a spherical field of view. Here again the indication of the top of the recorded image 666 always faces in the same direction.

TRIPLE PENTAGON

T-FORMAT

In addition to the single and double-pentagon formats described previously, there can also be triple-pentagon imaging, wherein each camera records three pentagons surrounding a single dodecahedral vertex. The simplest way to use this approach for recording a spherical field of view is to use the geometry of a tetrahedron, a four-sided regular polyhedron made up, like the octahedron, of equilateral triangles. The format can be used for either 2-D or 3-D coverage, and, as with the previously described formats, the various views can be produced by simultaneous photography by a camera array, or sequential photography via motion control.

FIG. 64 shows a perspective view of a dodecahedron and a concentric tetrahedron, illustrating a triple-pentagon format, the Tetrahedron or T-format, which has optical axes pointing to the dodecahedron vertices 10 which also lie at the vertices of a tetrahedron. A concentric tetrahedron 668 has a first vertex point 670 which together with its center 4 defines a first optical axis 672. A second tetrahedron vertex is shown at 674, a third vertex at 676, and the final fourth vertex at 678. Each of these points defines the center of an area of optical coverage which encompasses three pentagons equivalent to dodecahedral faces. Referring back to FIG. 4, the vertex T at 74, which in FIG. 64 is identified as the first vertex at 670, lies at the center of a region including the first covered pentagon (Z) at 680, the second covered pentagon (A) at 682, and the third covered pentagon (E) at 684. A rotation of this first point according to a path 686, as produced by a rotation of the tetrahedron by 90° according to an axis passing through the center of a tetrahedron edge 688 and its opposite edge, creates a rotation position atop a dodecahedron vertex for all of the points of the tetrahedron; the new position for the first point 670 is shown at 690, for the second vertex at 692, for the third at 694, and for the fourth at 696, according to the rotation path shown at 698.

FIG. 65 is a perspective schematic view showing the relationships between these original and rotated target points. At 700 is a tetrahedron connecting the original positions of the various target points, at 670–678. These can be seen to lie also at alternate vertices of a concentric cube 702, with the rotated target points at the other vertices, such as 670 to 690, according to the rotation 686. The simple relationship of the vertices of a tetrahedron is also shown by the orthogonally rotated heavy lines connecting the top and bottom vertices in their rotated positions. If each of these positions is used to encompass the equivalent of three dodecahedral pentagons, then all of the twelve pentagons representing a full spherical image can be recorded.

FIG. 66 shows a schematic representation of four T-format triple pentagons, representing all of a spherical field of view. At 670 is the first target point, which lies at the center of a group of three dodecahedral faces. The center of one of these faces is shown at 342, and its outer edge is shown at 346 in its characteristic recorded form as part of an overall wide-angle image, and at 348 in its idealized form as part of a corrected single pentagon. An axis from pole to pole 704 can be defined by this first point 670 and a bottom point 706, a dodecahedral vertex which lies at the center of the three bottom triple-pentagon views, leaving the three pentagons surrounding the first point 670 are taken as a topmost group. The relationship of an intermediate dodecahedral vertex is shown at 708, a point which is shared between two groups.

Figure 67A:
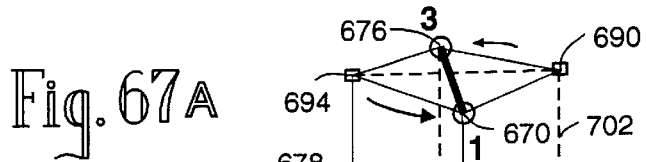
Figure 67B:
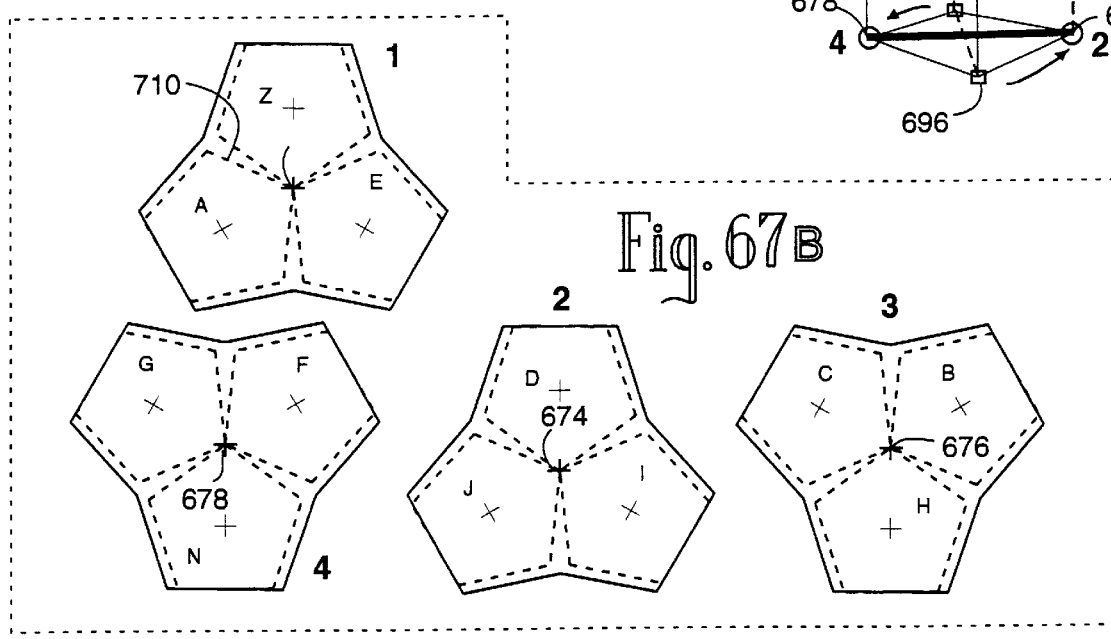

FIG. 67A and FIG. 67B show a perspective schematic view of the relationship between the dodecahedron vertices of two stereoscopic T-format sets of views, which also lie on the alternate vertices of a cube, and an illustration of the set of views produced by a first orientation of vertices 670, 672, 674, and 676. These vertices are shown in their original positions according to a cube 702, and in their rotated positions such as 690, 694 and 696. The pentagons in the three pentagon groups here are lettered according to the standard method of identification. The recorded top of pentagon image (Z) is at 710, and the recorded top of the bottom pentagon image (N) is at 712.

FIG. 68 shows an illustration of the set of views produced by the second rotated orientation with center points 690–696, with the pentagons identified by letter as before. Once again, the recorded top of pentagon image (Z) is at 710, and the recorded top of the bottom pentagon image (N) is at 712.

FIG. 69 shows a schematic cross section of a tetrahedral lens mount with criss-cross optics. Perhaps no other dodecahedral format besides the P format is so well suited for the application of this approach, because the lenses do not face opposite each other while sharing the same optical axis. A lens 714 and its male mount 716 are shown coupled to a female mount 718 to a front lens element 720 and a rear lens element 722 of a divided lens, with a male mount 724 suitable for coupling to a camera mount 726 of a camera 728. All of these mounts and their associated lens elements are in a rigid shell 730 that aligns the optical axes 732 of the various cameras 734 and lenses 736 opposite each other. The optimum lens elements will create an optical path 738 where the effective nodal point of the lens 740 is at the center of the array, which is also the center of the dodecahedron. This is used to eliminate the parallax separation between the camera views. As an alternative, the optics can be used to pass the image across the mount to the opposite side, in a criss-cross fashion, through the center.

CRISS CROSS LENS MOUNT

A criss cross lens mount, as shown in FIG. 69, has several advantages as a means of organizing the elements of a single- double or triple pentagon camera array. Because all of the optical axes cross at the same point in the center of the dodecahedron, alignment tests, both in manufacturing and in the field, are simplified. With this criss-cross mounting structure, lenses and cameras can be coupled and uncoupled independently of one another. The size and shape of the cameras becomes less important, because large cameras can be substituted, taking up more space going outward, while leaving the arrangement of the lenses and the other cameras untouched. Because this arrangement makes the cameras face in, a cameraperson can get behind each camera to look through the viewfinder in the usual manner, unlike in an arrangement where the cameras (and lenses) are bunched together facing out, where a cameraperson cannot use the viewfinders because they cannot get inside of the arrangement to get behind the cameras. Although this arrangement concentrates the cameras and lenses within a very small volume, no part of a camera or lens will block any portion of the view of another, even for lenses with extremely wide fields of view.

Unlike normal camera-lens arrangements, which have optical axes which do not cross, this invention is based on optical paths which cross in the center of a polyhedron with parallel, opposite faces. Unlike the usual direct coupling of lens to camera, this invention has each lens separated from its respective camera by a fixed distance equal to the distance between the centers of their respective parallel opposite faces.

In the Criss Cross Mount, shown in FIG. 69 a rigid polyhedral structure, consisting of parallel, opposite faces, is formed by opposed pairs of mounting structures, one for a lens and one for a camera. If a dodecahedral structure is used, there is a maximum of twelve pentagonal faces, in opposing pairs. For a single-pentagon system, there are thus a maximum of six lenses, facing outward, opposite six cameras, facing inward, covering in all a hemispherical view. The optical axes of these opposing lenses and cameras all cross the center of the dodecahedron.

The mounts for the cameras and lenses are the same as those usually used, for example a C-mount female mount for the lens and a C-mount male mount for the camera. These are the common mounts for 16 mm film lenses and cameras, and for ½" CCD video cameras. For smaller video formats such as CCDs ⅓" or smaller, the CS mount is often used. For larger format video systems such as professional video cameras with CCD's of ¾" or larger, the usual mounts such as the bayonet or the Fujinon-B mount can be used. With adapters, other special mounts such as the Nikon F, Olympus, Canon, Minolta, and Pentax K for 35 mm SLR still cameras and lenses can be used. If the lenses are the usual type, which focus the image on the usual focal plane where the image receptor of the camera would be, there is an extra lens at this focal plane, to pass this image across the dodecahedron to the image receptor on the opposite face. This can either be a single lens, or a series to focus and refocus the image across the polyhedron. The net effect of the optical assembly to pass the image across the polyhedron should not be to invert the image, because then the camera will have to be upside down on the opposite face, which will cause difficulty in using the camera controls and its viewfinder.

As an alternative, a wide angle lens can be used which has an extremely long focal length, which can be equal to the distance between the opposite faces of the polyhedral mount, so that it would focus for the first time on the camera's image receptor. For example, the Kodak Wide Field Ektar has an angle of view of 80° and a focal length of 5½ to 10 inches. However, the focal length of these lenses is variable, and even if it weren't, this design would mean that such a lens could not be used on a polyhedral mount of any other diameter, such as would be required for larger cameras.

The polyhedral structure can be one solid piece, or it can be subdivided. For example, a dodecahedron structure, as is illustrated in FIG. 1 and FIG. 20, could be in one piece, or it could be in two halves, with a top half for the lenses and a bottom half for the cameras. The dodecahedral faces could also each be separate, but so designed that when they are coupled together, they will meet at the proper dihedral angle to form the dodecahedral structure. Having each face separate is especially advantageous for the cameras, to allow each to be docked to a face before being tied to the dodecahedral structure, because this docking often involves rotation (such as would be done by a lens) and this rotation may be awkward when so many cameras are tied together in close proximity.

The mounts and faces may be of steel, brass or any other suitable rigid material. The coupling means between the faces may be corner dogs, or any other type of clamp that will bring them into the proper alignment. Internal baffles which do not block the main light paths should be used to minimize internal cross-reflections among the different imaging pairs. The same idea of criss-cross optical mounts can be applied to other arrangements of matched camera-lens pairs, as long as they are based on parallel opposite faces of a polyhedral solid. For example, among regular polyhedra, the faces of a cube, an octahedron, and an icosahedron also face each other. There are also many other polyhedra which have parallel opposite faces which could form the bases for camera-lens arrangements.

RECORDING MEANS

FIELD RECORDING

The multiple cameras and recorders inherent in all of the previously described variations on immersive recording require a slightly different approach to the problem of recording video in the field.

FIG. 70 shows a schematic overview of the major components of a single channel of a multichannel camera system. A camera lens at 742 represents the proper lens for recording in a single, double or triple-pentagon system. The camera 744 is appropriate for the format, and can be a film camera, a video camera, or other form of electronic imaging device, using any appropriate forms of sensor such as a CCD or CMOS imager. These electronic cameras are usually controlled by a Camera Control Unit or CCU at 746, which performs functions such as balancing the exposure among the various cameras and improving the performance of each individually. An external synchronization source 748 is usually fed through the CCU to synchronize the frame rate and if possible the pixel rate of the various electronic imaging sensors. Some common forms of sync are black burst, SMPTE time code or pixel clock signal. This synchronization signal is also fed to any recording device, to keep a constant time reference among all of the cameras and their related recorders. These recorders, shown at 750, can be any recording device that can record the image and synchronization information with the proper level of quality. Compact video recording formats, such as DVC or Hi8 are preferred for convenience. One common form of synchronization is to have the cameras all genlocked to a video clock, with SMPTE time code also split and sent simultaneously to all of the recorders to be striped along with the video on a separate channel for editing and reference purposes, synchronized to a video clock. The synchronization signal lines to other similarly linked and synchronized cameras and/or CCUs are shown at 752. An edit controller or other controller for stopping and starting the recorders is at 754, with lines to the other recorders at 756. One common form of such a device is a compact Control-L keypad, with a distribution amplifier to send the signal simultaneously to the various recorders. A monitor signal output line 758 carries the output of the recorder, either live or prerecorded, to selection switch 760. The inputs from the other signal sources are shown at 762. The selection switch determines which of the devices will appear on a monitor 764.

FIG. 71 shows a block diagram of the equipment used in the basic postproduction process. A playback source at 766 can be a video device either designed for the field or the studio, only again synchronized to the other decks via a sync source 748, with the lines to the other playback decks shown at 752, and controlled by an edit controller at 754, with the lines to the other decks at 756. Again a monitor signal output line 758 carries the output of the recorder, to a selection switch 760. The inputs from the other signal sources are shown at 762. The selection switch determines which of the devices' image will appear on a monitor 764. In addition to this, other steps can be taken to condition and balance the video signals before final re-mastering as a finished program. This correction at 768 can include color and distortion correction, and masking of the image according to the proper dodecahedral edges, along with comparison of a selected segment to adjacent segments, according to specialized switcher functions to be described later. A control line at 770 also controls a studio mastering recording device 772 synchronized to the playback device 766 for recording the final mastered version of the image. This final recorded image can be a corrected version of the single image signal produced by the original camera, or an integrated digital signal containing the multiplexed and/or compressed information produced by two or more cameras. A studio monitor 774 is used to check the recorded master information.

FIG. 72 shows a perspective view of a generic assembled dodecahedral camera 300. The form shown here is a single-pentagon configuration, although double or triple-pentagon configurations could also be used.

FIG. 73 shows a side view of a portable camera mount for a camera operator, including means for carrying the necessary recording and monitoring equipment. The camera array 300 is attached to a camera array mount 776, which can either be a fixed mount rigidly attached to the rest of the frame, or else include stabilizing mobile mount means 778 to create a more stable image independent of the motion of the rest of the frame, such as is used in the Steadi-Cam™ family of camera mounts, such as the original Steadi-Cam™, the BodyCam™ and the Steadi-Cam Jr.™ For a single-pentagon image format, there is a "blind spot" in the area directly underneath where the camera mount is. The camera operator, as well as the camera frame and the necessary support equipment, can all fit within this area and thus be invisible to the rest of the camera array. The maximum size of such a camera support is a pentagonal shape based on the projection of a dodecahedron face, therefore the outermost the outermost limits of the blind spot 780 are the bottom pentagon points, at an angle of 37.377° from a vertical axis 22, where here the struts of the camera support fall, and the innermost limit of the blind is defined by the center of the pentagon edge 782, at an angle of 31.6933° from vertical. The back support strut 784, and the side support struts 786 are here shown taking full advantage of this extra space at the pentagon points, and its best suited for a rigid mount. Having them at the narrower angle 782 would allow free panning of the camera without the struts becoming visible. And a yet-narrower angle of less than 30° would allow for the further tilting motion produced by independent image stabilization. If this narrower angle is too restrictive of the amount of space available for the camera operator and equipment, then the position of the camera array should be raised. The struts can be of any suitable lightweight, strong material, such as aluminum or fiber composite, and can be made to fold up and collapse when not in use. The camera operator is shown at 788. If it is especially desirable to maintain the level of the camera close to normal eye level, for a more natural image, then unusually short people may be best suited for this type of work. A shoulder strap 790 carries the frame and the equipment, which should be balanced as much as possible. The equipment can includes the camera control units at 792, and the recorders at 794. Base supports 796 can be in the form of shelves for the equipment suitable for protecting it and locking it into place. These recorders and CCU's typically require less attention during the shoot compared to any monitoring and other equipment 798, which is placed up front so it is conveniently visible to the operator.

FIG. 74 shows a top view of the above portable camera mount. A camera mount platform 800 holds the fixed or mobile mount used for the camera array.

FIG. 75 shows a side view of a portable camera and equipment mount, with means for carrying everything by means of a wheeled conveyance such as a wheelchair. The wheels 802 on this conveyance can be manual or electric; the existing design of wheelchairs is excellent for most purposes, although it may be necessary to add underinflated tires and a modified suspension for extra smoothness in the motion. The wheelchair approach also has the advantage that more weight in the form of extra equipment 804 can be added than could be portable by a standing operator. Because of their familiarity with wheelchairs, handicapped people may well be best suited to be camera operators for this form of immersive imaging.

FIG. 76 shows a side view of a portable camera mount in the form of a motorized cart, capable of carrying the necessary recording and monitoring equipment without a camera operator. This can enable a fairly large amount of equipment to be used, and for the camera array to be carried at a much lower level relative to the floor. A leg for this camera cart is at 806, constructed of a suitable material. Each leg has a wheel 808, which can be a rubber wheel for absorbing shocks and bumps. The smoother the floor surface 810, the less need for shock absorbers and custom wheels; for this reason this type of mount would work best in interiors and city streets. The equipment commonly used is here divided into layers on different shelves. The camera control units are the uppermost level of equipment 812. On the second level 814 is the power supply such as batteries for the cameras and recorders. Next at 816 is the third level, the recorders. And the bottom layer 818 can have the propulsion motors for the wheels, along with any extra power sources they require.

FIG. 77 shows the top view of the above camera cart. The base platform is at 820. All of the wheels can swivel. As in a car, some can be active steering wheels, and some passive following wheels. A first steering wheel is at 822, a second steering wheel at 824, and one of the passive wheels is shown at 826. For maximum maneuverability, all of these wheels should be able to change into steering or following wheels depending on the direction of motion.

MULTIPLE RECORDER

A new form of image processor taking advantage of the unique advantages of the dodecahedral pentagonal format, especially in the single-pentagon format, allows for the recording and playback of a plurality of views on a single recording medium.

To increase the amount of information recorded or to increase a field of view, many previous systems of compound photography have been used to record separate views, either in succession or simultaneously. Often these views are recorded on different portions of a recording medium, for example recording small rectangular views in a grid or portions of a larger film negative, or combining portions of several video images into a single image using postproduction equipment such as video switchers and the Quantel ADO. However, if reduced size images are combined in this way, here is a loss of resolution proportionate to the loss of size, so the playback resolution will suffer when a selected image is expanded back to full size again.

Multicamera, multiple recorder systems such as the Dodeca System can maintain this resolution by avoiding this combining process, but require that a separate video recording medium be used for each camera. For example, a separate videotape recorder (VTR) can be used for each camera when video cameras are used, although video recording is also possible with recordable videodisks, computer hard disks, and other digital recording media. The same number of recorder/players are needed when the recording of the cameras' views is played back at a later time (despite their dual nature as record/playback devices, the VTR is commonly called a "recorder;" however, it will be understood that here both senses are meant when this word is used.)

Smaller formats such as Hi-band 8 mm or S-VHS tape, offer fairly good quality for their size, but large numbers of these recorders together still add up to a considerable amount of weight for one person to carry as part of a camera recording system, and prevent such a multicamera system from being easily portable. These smaller formats, moreover, do not have the image quality upon playback to make video images acceptable for showing in a large-screen theater.

Broadcast-quality video recorders, such as Betacam SP recorders, are increasingly being used in field applications such as news-gathering. However, because of their size, weight, and cost, they are impractical to gather together in large numbers to serve as recorders for single pentagon cameras. For example, a Beta SP field recorder such as the Sony BVW-3020 weighs approximately twelve pounds and costs approximately $12,000 each; for eleven of these to be gathered together would make a composite recorder weighing at least 132 pounds and costing over $132,000, too heavy to be portable and too expensive to be used by the average producer, for either recording or playback. The latest-generation digital video recorders, such as the ½" DVC digital component cassette recorders from Panasonic, also have high quality and are much smaller than Beta SP VCRs, but are still very expensive.

New higher-quality forms of video have a wider picture with an aspect ratio of 9:16, especially the high-resolution video systems known as high-definition television (HDTV). Full HDTV recorder image quality is excellent, but the video recorders are especially large, complex and expensive, so requiring one of these recorders to be used for each pentagon camera makes a compound HDTV video system even more cumbersome, expensive and impractical. Moreover, most of the wide image area is wasted if only the central pentagonal image is used. However, these wide images have enough area to hold more than one pentagon image. In the earlier patent, a double-pentagon system is disclosed which features dual pentagon imaging with a vertical edge between the pentagons in the center of the image and pentagon points on the outside edges. However, recording single pentagons in this way on a wide aspect ratio requires a rotation by 36°, alternately clockwise and counterclockwise, of the two pentagon images as recorded by conventional single pentagon cameras. These rotations are likely to lead to aliasing of the horizontal scan lines in each image, and subsequent loss of video information and resolution.

Recently broadcast-quality video equipment has been introduced that employs an optional wide "HDTV" aspect ratio of 9:16 (1:1.77), thus maintaining aspect-ratio compatibility with the higher-quality true HDTV recorders. This is often done by increasing the scan recording speed from 13.5 MHz to 18 MHz, thus writing more information in every horizontal line, and thus creating the effect of a wider picture being recorded. This type of video, also know as extended-definition television or ADTV, offers less cost and weight per recorder than HDTV recorders, and a broadcast-quality image. However, using one of these recorders for each and every single-pentagon camera still adds up to considerable weight and expense.

To increase the capacity of data-recording equipment in general, new data-compression techniques have been developed. These techniques have been applied to video information, especially to HDTV and other digital video systems, to reduce the amount of data in the signal to manageable levels. However, this requires the addition of the data-compression equipment, which often cannot run at real-time speeds, and if the equipment is used, there is always the question of how much information is lost in the compression-decompression process.

TYPES OF MULTIPLE IMAGE PROCESSORS

The use of the pentagon shape for panoramic video information has unique advantages. These advantages can be put to use in three novel forms of video image processors to greatly reduce the number of recorders required for multiple pentagonal images, especially when multiple single-pentagon cameras are used, while maintaining maximum quality and resolution.

The photography of pentagonal panoramic images can most easily be done by dedicating one camera to each of the pentagonal segments. This has many advantages of simplicity. The images appear in the camera "right side up," as opposed to other described multiple-pentagon formats that require tilting of the images as they appear on the screen. The single-pentagon format allows for more flexible groupings of images, such as the four-pentagon combination for a full visual field of view, a six-pentagon hemispherical image or an eleven-pentagon nearly full spherical image. Conventional lenses with less distortion can also be used for single-pentagon cameras. Single pentagons represent the common denominator between all forms of dodecahedral imaging. However, the use of multiple single-pentagon cameras usually requires the use of that number of video recorders, greatly increasing the cost, weight and complexity of the system.

Therefore, three novel types of video image processors will be described, by whose use the number of required recorders can be cut in half, or even by two-thirds, without the loss of essential pentagonal image video information, and without the need for image compression.

The first processor is an encoding processor designed for a regular 4:3 aspect ratio th at pro vides means for making use of the open area surrounding a central pentagon image in order to record a second pentagon image by the rearrangement of its digital picture information. Thus two pentagons can be recorded simultaneously without the need for data compression, and only half of the number of recorders would be required.

The second processor, designed for an HDTV aspect ratio, is a transpositioning processor to enable one recorder to fully record two pentagonal views, providing the means for a 100% increase in the capacity of a 9:16 aspect ratio recorder to record pentagonal images for the Dodeca system, allowing one recorder to record two pentagonal views without aliasing, without the loss of any information, and with no need for data compression. Again, only half of the number of recorders would be required, making the overall photography system more portable, inexpensive and practical.

The third processor combines the rearrangement of the first processor to the transpositioning of the second processor to record a total of three images within a wide-screen recorder's video image, thus reducing the number of recorders required by two-thirds.

FIG. 78 shows a schematic representation of the operation of the first processor, for two pentagons being recorded within a common 4:3 video aspect ratio, with the second pentagon image being encoded and decoded in the area surrounding the first central Pentagon, showing the position of outside pentagon information before and after encoding. A 4:3 aspect ratio image such as a video image is at 828. This aspect ratio is common to most of the most common video formats, such as NTSC, PAL and SECAM, as well as to specialized digital video formats such as VGA, SVGA and the CCIR-601 broadcast standard. The central pentagon area at 830, which occupies only 44% of the total aspect ratio. Therefore, the region around the central pentagon, shown at 832, is large enough to contain the uncompressed information representing a second pentagonal image, shown reconstituted at 834. This information is stored by resequencing the retrace commands in the scan lines of the second image 836, so that the image information is written in a new configuration 838 of the proper shape to fit into the outside area 832. When working with the classic hard-edged straight-sided pentagons, there will be an extra area left unfilled 840. This extra area can be filled by adding outside pixels around the borders of both pentagons to aid in blending and anti-aliasing, or by leaving pentagon edges as slightly curved, reflecting a common form of lens distortion. Therefore, whether or not these extra pixels are included, it is best to allow a narrow optional "guard band" region around the pentagon edges.

FIG. 79 shows a block diagram of the first encoding processor for the coding and decoding of a dual pentagon image within a video aspect ratio. At 842 is the first source video image input from a Dodeca System source. For example, this could be from a single-pentagon camera photographing a real-life scene, or a virtual single-pentagon camera supplying a computer-rendered view of a part of an imaginary scene. This source image contains a first pentagonal image area 844, whether this appears as a cropped or an uncropped image. At 846 is the input from the second Dodeca System image source, which contains a second pentagonal image area 848. In the preferred embodiment, both of these image inputs are synchronized by a common synchronization source, such as a genlock source 850 supplying a sync signal such as a pixel clock or SMPTE time code.

These two signal source inputs are coupled to the encoding processor 852 along lines 826 and 856. Within the processor, is a frame buffer 858 where the region corresponding to the second pentagonal area 860 is digitized, either by itself or as part of the digitization of the entire frame, and the video data representing the pixels of this second pentagon view are recopied into an output buffer 864 in a sequential order into the open region 862 surrounding the area 866 representing the first pentagonal view, which is passed along from the first signal source essentially untouched except for a certain amount of delay shown at 868.

While the original input and final output signals can be analog, the rearrangement of the pixel information representing the second pentagon should be a form of digital signal processing. At 870 is a switch between the signal sources, according to a precision set of addresses 872 for the switcher timing, so that the signal sources are alternately recorded into a composite output image 874 for final display.

FIG. 80 shows a schematic representation of two pentagons being recorded within a common 4:3 video aspect ratio 828, according to the operation of the first type of processor, with the second pentagon image being encoded and decoded in the area 832 surrounding the first central pentagon 830. Here we can see an illustration of the principle of a delay between the two signals. Note that the original position of the first scanned pixel in each pentagon's central pentagon area 830 is at the upper left corner of the pentagon at 876. For the second encoded pentagon, however, the new encoded position for this pixel in the output image is at the upper left corner of the overall aspect ratio rectangle at 878. This means that such a pixel from the second view must therefore be re-recorded at the beginning of the raster scan of the final output image, in its upper corner at 878, before the first pixel of the first pentagon view is re-recorded in the output image in its normal position at 876. Therefore, if the two views are synchronized, a fixed delay must be applied to the first video signal, equal to at least the amount of time between the start of the raster scan and the start of the pentagon. The more delay is applied, the closer the start of re-recording will be to the upper corner at 878, and more can be stored in the outside area.

A second type of processor, a transpositioning processor, shows how a variation of multi-pentagon recording can be applied when recording and playing back a wide-screen video image with an aspect ratio of at least 9:16. This aspect ratio is common to the new wide-screen HDTV formats, both analog and digital, as well as to lower-level wide screen format known as ADTV. It is also within the 1:1.85 aspect ratio of motion picture theatrical film recording. Other film formats feature even broader aspect ratios. This transpositioning device cuts the number of required recorders in half. Thus, for a six-pentagon hemispherical image, only three such recorders would be required.

FIG. 81 shows a schematic representation of the operation of the second processor, showing two transposed pentagons recorded within a 9:16 aspect ratio, also showing where information representing a third outside pentagon can be recorded. The border of the wide 9:16 aspect ratio image is shown at 880. (The two pentagons can also be placed in this manner within a 4:3 aspect ratio, but this will lead to large open areas at the top and bottom of the frame, and hence a less efficient use of the available image area.) A cropped pentagon from a first source 882 is shown in the usual point-down orientation. The center of this first pentagon 884 is shifted to the left from its normal center in the center of the aspect ratio 888 by a distance 886 equal to 42.53254% of the height of the overall rectangular image (the 9 of the 9:16 aspect ratio). Similarly, a cropped pentagon from a second source 890 is shifted in the opposite direction to a new center 892 by an equal distance 894. However, this second pentagon has an opposite orientation of its point than the first. If one of the pentagons is an above-horizon pentagon and the other is from a below-horizon orientation, then they will naturally have opposite orientations, with the first being point-down and the second being point-up, as shown here. But if both are above-horizon, for instance, then the second is rotated about its center 896 by 180° before being recorded. In this way, the two images are made to lie side-by-side as two pentagons, one being upside down. The final result is a diagonal line of adjacent edges 898, tilted by 18° and passing through the center, that represents the boundary between the two pentagonal regions. The pentagons can be left uncropped except for these edges, for maximum retention of the information outside of the pentagons.

The two side-by-side pentagonal images together have a height to width ratio that closely matches the aspect ratio of the overall wide image, with a width of 1.8017096 instead of the usual 1.77777 ... width (relative to 1.0 as the height) produced by a 9:16 picture. Therefore, there is a 1.34618% overall error in the width. However, this error occurs on the far right and left edge points, where the image area is the smallest. Given a horizontal resolution of 1800 lines, that would mean only twelve vertical rows of pixels on each side, including a single pixel row at the tip. These pixels that would be cut off by the normal aspect ratio can either be ignored, to produce a tiny gap at some of the intersections of the composite pictures, or be recorded in the overscan area outside the normal frame line, or be recorded elsewhere, such as in the area outside of the pentagonal mask or in the vertical interval between frames.

If a larger pentagonal area for each picture is required, as in when overlap is used to disguise the borders between pentagonal images, the distances 886 and 894 are increased to create a space between the pentagons for this extra area to be included. Since this would push the right and left points of the pentagons further outside of the normal 9:16 aspect ratio, the overscan area is employed for recording of this bigger picture, and if this is still not wide enough, the problematic information from the points can be recorded elsewhere, such as in the area outside of the pentagonal mask or in the vertical interval between the video frames.

This method of dual recording of pentagonal views by shifting both and optionally inverting one can also be used optically, through the use of mirrors and prisms, to record two optical views onto motion picture film. Two such pentagonal views on film happen to fall well within the typical 1.85:1 aspect ratio of theatrical 35 mm motion picture projection. The recording of dual side-by-side images is already found in the prior art as part of stereoscopic recording. However, they do not use any such the division of the views according to the slanted pentagonal diagonal used here.

The number of pentagons recorded in the wide image can be increased to three by use of the third type of processor. This third processor, a combination of the first and the second, adds encoding to transpositioning to record the image information representing up to three pentagons into a single wide image without the use of compression. As shown in FIG. 80, for the maximum usage of the available aspect ratio area, the pentagons are fully cropped, and the outside image area 900 is used for the encoded storage of a third pentagon, in the same manner as the second pentagon's information is stored surrounding the first in the first encoding processor described above.

FIG. 82 shows a schematic representation of the above 9:16 image, anamorphically squeezed to fit within a 4:3 aspect ratio.

This anamorphic distortion is similar to that used in motion pictures wherein a special aspherical optical lens is used to record and play back a wide image in the usual aspect ratio. Such anamorphic distortion could be done optically, but it is preferred that the image manipulation be done digitally. In this case, the amount of information represents a 23% compression of the original amount of data in the original wide screen image, assuming that the same level of resolution in the image is maintained throughout. Here at 902 is the anamorphically squeezed 4:3 aspect ratio, with the anamorphically squeezed first pentagon at 904, with a center at 906. The anamorphically squeezed second pentagon 908 has a center at 910. The outside area 912 can hold an anamorphically squeezed outside third pentagon, by the use of the hybrid third processor.

For maximum precision in defining these distances, borders and images, digital recording and playback is preferred. All of these types of processors can be realized as an addition to the recording circuitry of the video recorder, operating by systematically changing the addresses of the pixels in a digital frame buffer for a digital recorder, or by applying a fixed series of delays and offsets in the scanning of an analog recorder.

In addition to efficient recording of camera pentagon views, these multi-image processors can also be used to record multiple synthetic pentagonal views, such as would be created by computer imaging, onto either videotape or onto film using a film recorder.

With any of these processors, in the playback process for any of these combined images, the procedure is reversed to extract the separate images, in the correct orientation, for multi-pentagon image projection or display.

POSTPRODUCTION MEANS

SWITCHER FUNCTIONS FOR COMPARISON OF IMAGES

In working with pentagonal images, it is often necessary to display two or more of them side by side, including their common edge, to check such things as the alignment or color balance in the images. The simultaneous display of portions of multiple video images is today commonly done through a device called a switcher. To achieve the best comparison of adjacent pentagonal images a simple set of image manipulations can be done to achieve this, either as a special-purpose analog switcher function or through a digital manipulation process. These switcher functions are of four types: the comparison of top edges, above-horizon adjacent edges, equatorial edges, and below-horizon adjacent edges. (since the bottommost pentagon is rarely included, the comparison of bottom edges will be omitted here.) Here the pentagonal images will be assumed to be in a proper form to have straight edges, so that straight-line cuts of the image will match them.

Figure 83A:
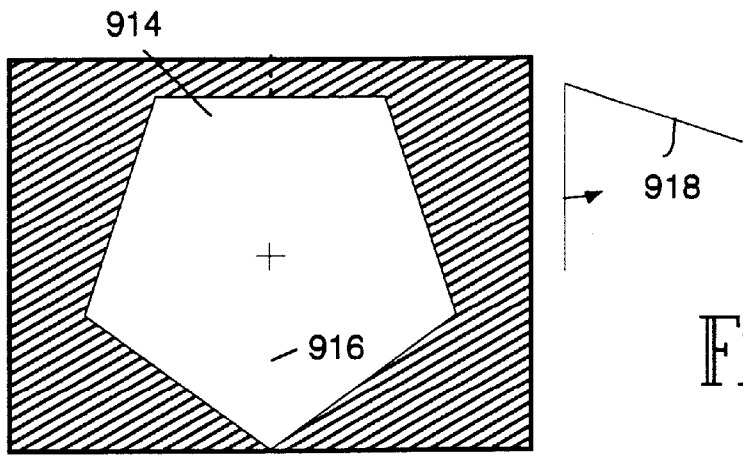
Figure 83B:
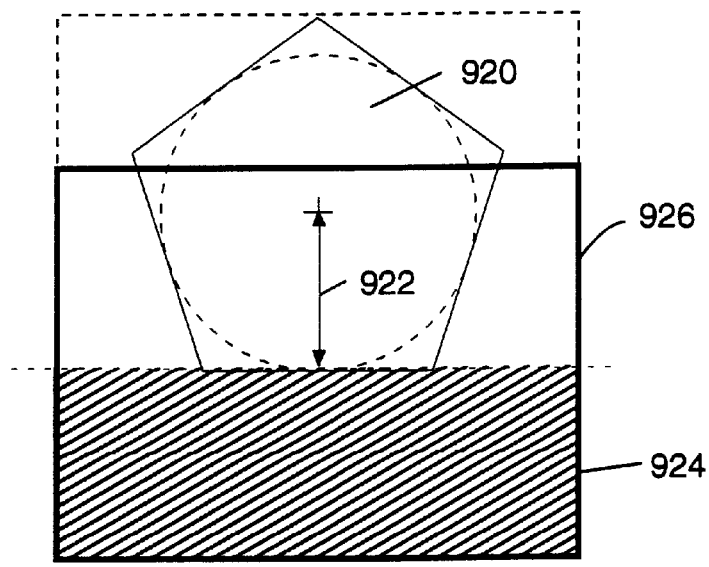
Figure 83C:
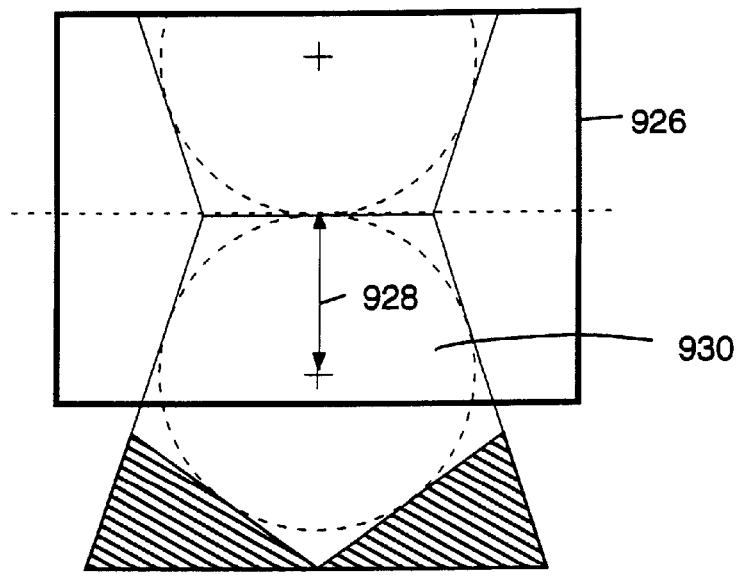

FIG. 83A, FIG. 83B and FIG. 83C show a schematic view of the top edge comparison process, showing the successive manipulation of two or more video images to examine an edge between adjacent pentagonal regions of a top single pentagon and a top of an above-the-horizon pentagon view. At 914 in FIG. 83A is a cropped top pentagon, commonly referred to as the Zenith or Z pentagon. A vertical line 916 intersects the bottom point of the pentagon image, and defines a distance from the center of the pentagon to the point which can be expressed as a half-height distance equal to 1.0. In the original orientation, only the top edge is horizontal. A rotation of 36° around the center will make either one of the two bottom edges horizontal instead, and further rotations by 72°, as shown at 918, will bring the edges in succession to a horizontal orientation with respect to the bottom of the display screen. At 920 in FIG. 83B is shown the rotated Z pentagon, with one of the edges selected to be horizontal at the bottom. The center of the rotated image 920 is shifted vertically by a distance 922 of approximately 0.809 relative to the half-height distance, so that the selected edge lies along the top edge of a horizontal half-screen clipping 924 of the displayed screen 926 as shown in FIG. 83C. So in the case of a displayed image that is 480 lines high, such as in a 640×480 display, the shift would be 194.16, or 194 lines. A similar 0.809 vertical shift of the center 928 of the second above-horizon pentagon image 930 is done in the opposite direction, and the display of this shifted image in the blank clip area 924 will present the top of this image in conjunction with the selected edge of the Z pentagon. A related procedure would be used to compare pentagons to the bottom, or N pentagon, were it to be used. In this case, however, the N pentagon should appear in the bottom half of the screen, a nd the below-horizon pentagon in the top.

Figure 84A:
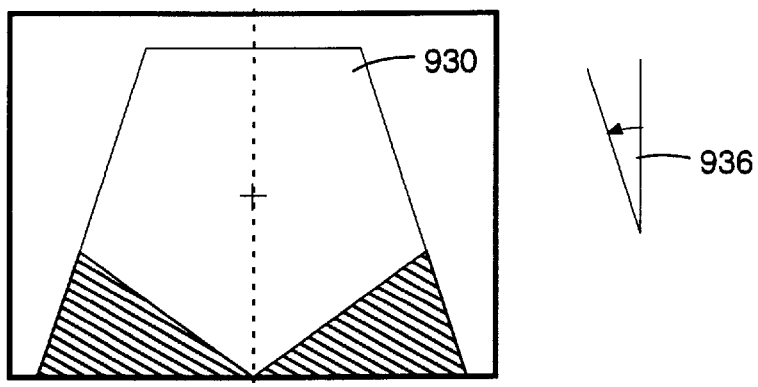
Figure 84B:
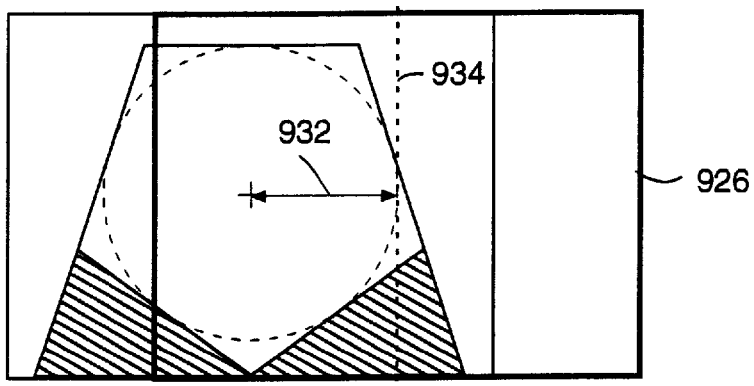
Figure 84C:
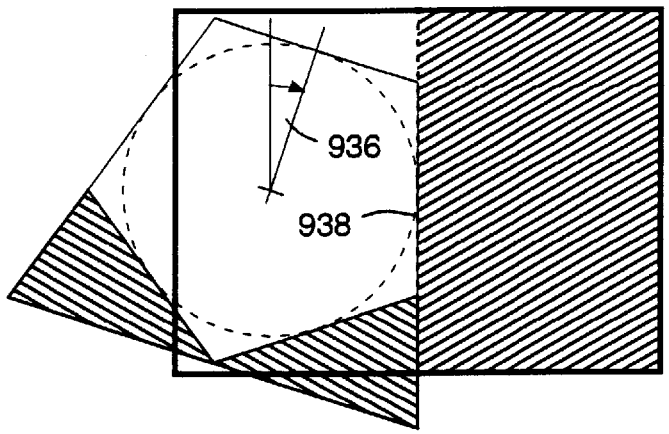
Figure 84D:
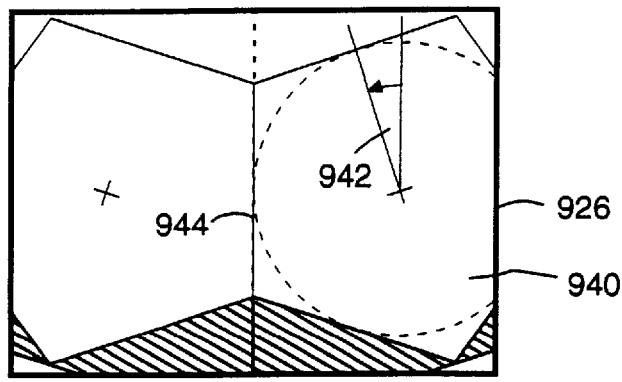

Other kinds of steps are used to bring other forms of pentagonal edges into conjunction with one another. FIG. 84A, FIG. 84B, FIG. 84C and FIG. 84D show a schematic view of the successive manipulation of two video images to examine an edge between adjacent above-the-horizon pentagon views. The first above-horizon pentagon 930 in FIG. 84A is shifted the same 0.809 distance to the left, as shown in FIG. 84B at 932, relative to a vertical center line 934 of the displayed screen 926. An 18 degree clockwise rotation of the image 936 as shown in FIG. 84C makes the selected pentagon edge vertical and aligned to the center line 934, which also represents the edge of a vertical half-clipping 938 of the display screen. A second adjacent above-horizon pentagon 940 as shown in FIG. 84D is treated similarly, but in the opposite direction, with an equal shift to the right and a counter-clockwise rotation of the image 942, so that after it appears in the blank area left by the half-clip of the image its selected edge will adjoin that of the neighboring pentagon along the line 944.

Figure 85A:
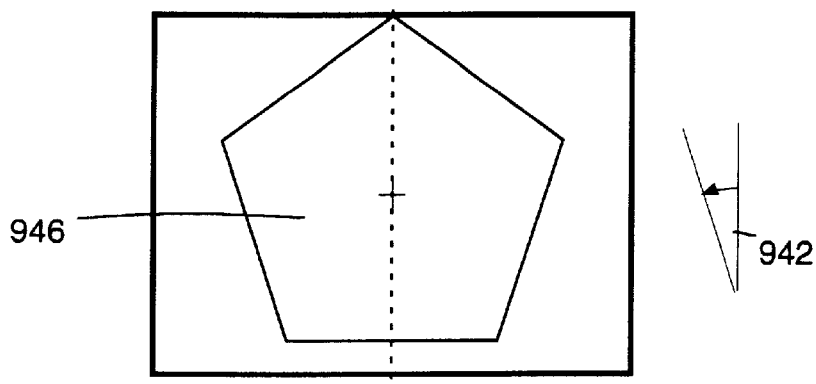
Figure 85B:
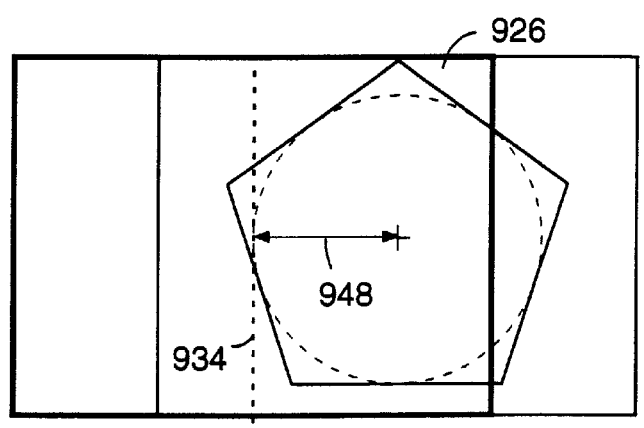
Figure 85C:
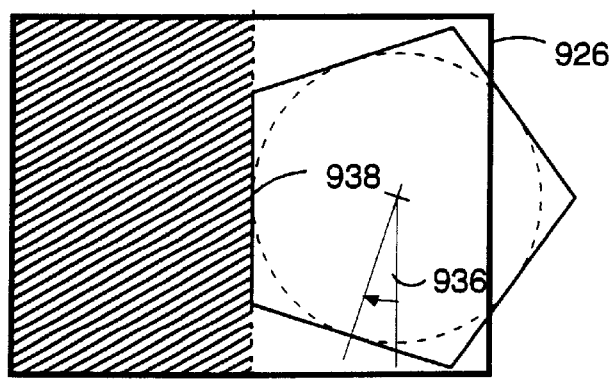
Figure 85D:
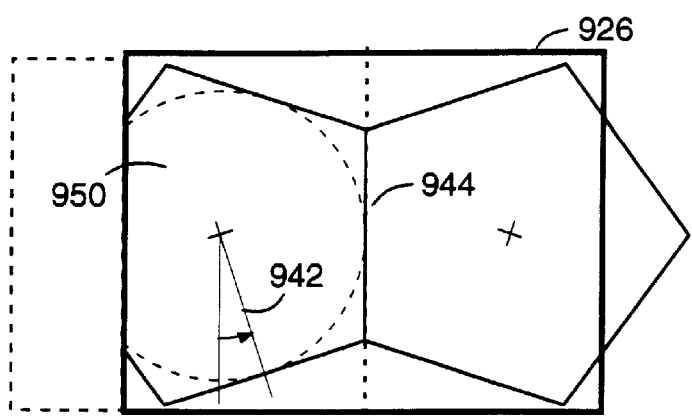

FIG. 85A, FIG. 84B, FIG. 85C and FIG. 85D show a schematic view of the successive manipulation of two video images to examine an edge between adjacent below-the-horizon pentagon views. The first below-horizon pentagon 946 in FIG. 85A is shifted the same 0.809 distance to the right, as shown in FIG. 85B at 948, relative to a vertical center line 934 of the displayed screen 926. An 18 degree clockwise rotation of the image 936 as shown in FIG. 85C makes the selected pentagon edge vertical and aligned to the center line 934, which also represents the edge of a vertical half-clipping 938 of the display screen. A second adjacent below-horizon pentagon 950 as shown in FIG. 85D is treated similarly, but in the opposite direction, with an equal shift to the left and a counter-clockwise rotation of the image 942, so that after it appears in the blank area left by the half-clip of the image its selected edge will adjoin that of the neighboring pentagon along the line 944.

Figure 86A:
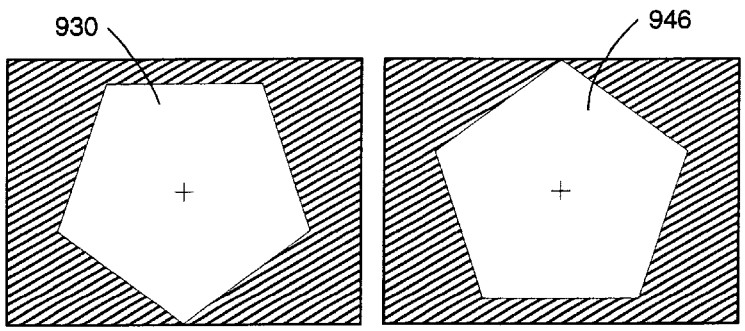
Figure 86B:
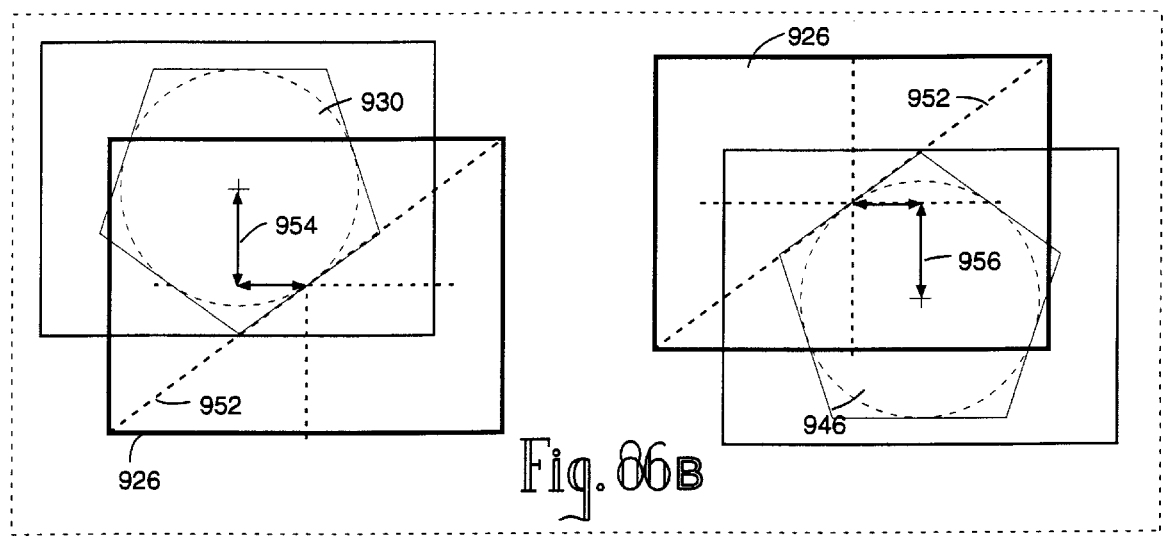
Figure 86C:
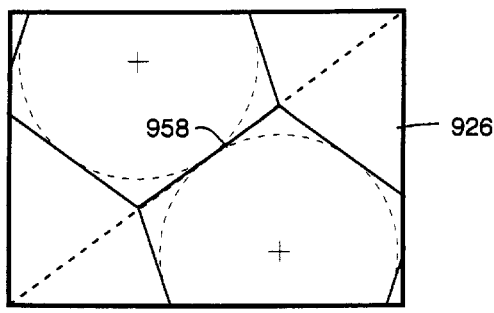

FIG. 86A, FIG. 86B, and FIG. 86C show shows a schematic view of the successive manipulation of two video images to examine an edge between an above-the-horizon pentagon view and a below-horizon pentagon view. This is the method used to examine the edges around the dodecahedral equator. An above-horizon view is at 930, and a below-horizon pentagon at 946 in FIG. 86A. At 952 in FIG. 86B is a diagonal line dividing the displayed screen 926. Each of the pentagons is shifted in opposite directions at 954 and 956, relative to this line by an oblique distance of 0.809, which can be accomplished by a combination of separate horizontal and vertical movements. When both of the shifted and cropped pentagons are simultaneously displayed as shown in FIG. 85C, their selected edges lie along the diagonal line at 958. This example shows only half of the total procedure, however, since it applies only to the right-handed lower edge of the above-horizon pentagon being compared to the left-handed upper edge of the below-horizon pentagon. For the opposite sides, the procedure followed is a mirror image, so that the edges will lie along an opposite diagonal of the displayed screen 926.

These three illustrated switcher functions will account for the comparison of all of the most common types of dodecahedral edges.

CROPPING DIAGRAMS AND STORAGE TEMPLATES

Existing photography and projection systems, both for film and video, are based on square or rectangular aspect ratios. Since the images for a dodecahedral imaging system are based on a pentagonal format, the original square or rectangular image must be cropped down to a pentagonal shape before the image is displayed. This cropping is accomplished by matting, through electronic means for video, and through physical barriers to light in film. The mattes shown here are indicated with sharp edges for clarity. Digital media offer the best chance for matching up such sharp edges. In cases with other media based on light or analog technology, blended edges would be preferred, so the sharp edges shown here should also be understood as representing the center of a region of transition across a pentagonal edge. By the use of these essential mattes, pentagonal images can be created that will match up to each other along their edges. The composite image thus formed can be subjected to further matting to cut out an overall artistic shape, but this extra matting, described in the earlier patent in connection to a masking processor, will not be described here.

One of the great advantages of the Dodeca System is its flexibility due to the fundamental compatibility of all of its images. A hemispherical image shot with a double-pentagon camera, for example, could be projected using single-pentagon projectors, because the single-pentagon components for the projectors are contained in the dual-pentagon image recorded by a dual-pentagon lens. To extract a single pentagon from such a dual pentagon takes a standardized transformation that can be described as: split in half vertically, choose half, rotate the half by 18° (either +or −), and shift the center of the half to the center of the final image. Similar standardized transformations can change singles into a dual, a triple, and vice versa. Thus each component of the imaging system can use its most effective angle of view. Because of system requirements, it might be found, for example, that a dual-pentagon camera may be a more efficient way of recording images in the field, a triple-pentagon transmitter may be a more effective means of relaying them, and a single-pentagon projector may offer maximum size and brightness in the final display. Because all of these use the standard pentagon shape and dodecahedral alignments, the images can be more easily translated from one format into another. Similarly, X-format images can be broken down to their component pentagons and reassembled as P-format images, and vice versa. The interchangability of these images, in whatever format, depends on the use of standardized mattes, also known as cropping diagrams. These define the placement and appearance of standardized Dodeca System images in their variety of formats.

In practice, combinations of all these dodecahedral imaging methods can be used if necessary. For instance, for a five-pentagon image, four pentagons could be produced by means of two dual-pentagon optical devices, and the last pentagonal image could be produced by one single-pentagon optical device. Simultaneous photography of multiple pentagonal views can be done with still cameras, using film, video or digital recording media, or with motion picture cameras, again using either film, video or digital recording. Such motion picture camera images could be synchronized to a simultaneous recording of the sound of the photographed scene, preferably with a directional sound recording apparatus that preserves the direction of the sound source so as to make a sound match up with the sound source's image.

IMAGE DISTORTION

FIG. 87 shows a cropping diagram for an uncorrected single-pentagon image in a video aspect ratio, including the optional image area and typical optical distortion. Note that the mask edges 960 of the pentagonal section of a spherical field of view are slightly curved compared to the ideal edge 86. This is the product of the image produced by a typical non-rectilinear lens. This wide-angle "fisheye effect" typically grows more pronounced the wider the field of view. The cropping mask here also includes the typical optional image area below the pentagon on either side of the pentagon point, producing more of a keystone shape. The uncorrected mask edge 962 of this optional image area tends to curve around to the vertical.

The outside optional image area can be included in the displayed image if there are no other adjacent pentagon images available that cover its area. For example, if six single pentagon views are used to make up a hemispherical view, and this hemispherical view, for the sake of convenience, runs equally down to the horizon in every direction, there would be a central pentagon at the zenith and five others running along above the horizon. The zenith pentagon would be fully cropped to its pentagon shape, since these is an adjacent pentagon against every edge. But the other above-the-horizon pentagons have no other pentagonal views below them, so for each, the original image in the optional image area can be allowed to remain. This has the effect of filling in what would otherwise be a zigzag line going above and below the horizon, to create a continuous level image border well below the horizon line. To make this lower border level, the bottom of the keystone shape must also be slightly cropped toward its corners, producing a gently rounded bottom for the keystone.

FIG. 88 shows a single pentagon image in a video aspect ratio, showing the correction of pentagon edges to their ideal shape. This entails an optical warping function changing the optical system to rectilinear performance, based on a gnomonic projection of the image outward from the center. The center of the image and the pentagon is at 80, with the border of the aspect ratio at 82. The straight, ideal pentagon edge is at 86, and its common curved form is at 88. The dodecahedral equator is at 90, and the border of the pentagonal edge carried down to encompass the optional image area is at 92. The correction of the image has the effect of straightening this edge out to 94. The area outside the pentagon 964 is cropped in the final display. This is fortunate, because the effect of the image warping can be to change the border of the original aspect ratio by drawing the pixels inward, creating blank areas around the outside.

FIG. 89 shows a representation of the ideal goniotropic optical characteristics for the single pentagon image, expressed in 3-degree increments of latitude and longitude lines on a concentric global field of view. This is taken from the point of view at the center of a globe, looking outward, with the optical axis elevated relative to the equatorial plane in the usual dodecahedral manner by 26.566°. At 966 is a longitude line of such a gnomonic projection, with a latitude line of the gnomonic projection at 968. Note that the equator or horizon line 970 is straight and level, since it, like the longitude lines, is on a great circle plane that passes through the center of the globe. The latitude lines, however, are not on great circle planes, so they have a curvature when compared to the pentagon edges, such as 972, which are always on great circle planes, so are always straight.

FIG. 90 shows a schematic representation of an optional correction of the equatorial edges of single pentagon images to fill in any missing regions caused by the use of lenses with fields of view narrower than the ideal. The border of an ideal 4:3 image is at 974, and at 976 is the boundary of the image produced by a lens with a slightly narrower field of view than the ideal, such as the Chinon 3 mm lens on a ⅓" CCD. The area 978 not covered by this narrower field of view can be filled in by using image information from adjacent segments, according to a slight adjustment of the bottom edges. The uncorrected edge 980 is rotated to 982, so that the point will lie within the available image area, thereby extending the length of the edge 984 compared to its uncorrected length at 86, and filing in the area 986, which represents one half of the missing point from an adjacent below-horizon pentagon which is also recording the outside area at 988.

FIG. 91 shows a schematic view of a minimal square recording of a single-pentagon image, using a different optical center and a smaller angle of view than normal. This is useful in especially restrictive formats. In still film cameras, for example, a special Hasselblad camera is made with a 38 mm rectilinear lens for panoramic photography. This camera produces a square-format image with a width and height of view of 69°, barely enough to fit in a dodecahedral pentagon, which extends 69.095151° from its bottom point to its top edge. In order to squeeze in the full pentagon when using such a narrow angle of view, the center of the pentagon and the center of the image can no longer be identical, and a lowering of the center of the camera image by 2.8299515° must be made. This changes the elevation of the optical axis for the images representing the pentagons above the horizon from the usual 26.565054° to 23.7351025°. The minimal square area is shown at 990, as compared to the usual aspect ratio at 974, and the revised center of this minimal square area is at 992, compared to the center of the pentagon itself (and the usual aspect ratio) at 80. In general, a slightly larger pentagon area around the edges 994 may be included in any cropped pentagon, to aid in blending separate pentagons together.

FIG. 92 shows another type of cropping, designed to only show areas in above-horizon pentagons that are actually above the horizon. At 996 is the dodecahedral equator, which is used as the bottom of the crop, with the area 998 subtracted, according to a masked area 1000 that includes a minimum of the original recorded image 974, while maintaining the same center. If more of the original image is included, this keystone mask can be extended towards the pole to include the extra area 1002, which is especially useful for filling in parts of the upper region if the Zenith view is missing.

FIG. 93A and FIG. 93B show a schematic representation of the optional image areas in P-format double-pentagon images, and how they can serve to fill in a substantial portion of any missing image information in the topmost region of an overall recorded field of view. A cropping diagram for a P-format right-leaning dual pentagon image 494 as shown in FIG. 93B in an wide aspect ratio, and in the 4:3 aspect ratio 974, can include an top optional image area 1004, and a bottom optional image area 1006. The dodecahedral equator is at 516, which bisects the central edge 582. These optional image areas represent regions within the top and bottom pentagons not otherwise covered by the main ring. Similarly, a cropping diagram for a P-format left-leaning dual pentagon image 504 in an wide aspect ratio and in the 4:3 aspect ratio 974 can include an top optional image area 1008, and a bottom optional image area 1010. In FIG. 93A, the dodecahedral equator is at 516, which bisects the central edge 582. By including these optional areas, the main ring of views can also cover most of this missing area. The remaining blank area will form a characteristic black star shape on the top pentagon face 584. This is shown with a top view of five right-leaning double pentagons assembled into a sphere, with their top optional areas 1004 reaching into the top face 584, and a center on the equator at 580, with an indication of the width of the double pentagon image at 496.

FIG. 94A and FIG. 94B show a schematic representation of the optional image areas in X-H format double-pentagon images, and how they can serve to fill in missing image information immediately below the horizon in an overall hemispherical recorded field of view. (In the X-Sphere format where six double-pentagons form a spherical image, all of the double pentagons are cropped only to their pentagonal edges, and there is no such optional image area.). Here in the X-Hemisphere format as is shown in FIG. 94B, three images make up the hemisphere, two with a horizontal orientation and low optical centers at 48 and 50, and one with a vertical orientation and a high optical center 52. The optional image areas represent those regions outside the lower edges 396 and 398 closest to the horizon 394 for the two horizontal dual pentagons. In FIG. 94A this optional image area along the bottom of the frame is shown generically for the horizontal pentagons at 1012. The different optional image area for the vertical dual pentagon is shown at 400, which runs along the right side of the frame. By use of these optional image areas, the overall image coverage is extended approximately 10° below the horizon all around, with the exception of three distinctive narrow blank "notches," one on the bottom between the two horizontal images at 1014, and two on either side of the bottom of the vertical image, such as at 1016.

FIG. 95 shows the outline of a typical double-pentagon image in a wide aspect ratio, showing typical optical distortion, related to the same distortion shown earlier for a single-pentagon image. Here the straightened edge of a double pentagon 1018 can be seen compared to the distorted edge of a double pentagon 1020.

FIG. 96 shows a representation of typical optical barrel distortion in a wide-angle image, as shown by the distortion of the lines of an evenly-spaced grid 1022.

FIG. 97 shows a schematic representation of alternately tilted orientations for the recording of double-pentagon images in a 4:3 aspect ratio. A generic double pentagon image 1024 is shown within a circular lens image approximately 140° wide at 1026, which is wide enought to include both ends of the double pentagon. Variations of the aspect ratio relative to this lens image and the double pentagon will be shown. These represent standardized ways of tilting the imager. A basic described orientation of a 4:3 aspect ratio relative to the double pentagon is shown at 1028, with the double pentagon extending from side to side horizontally. A rotation by 18° is shown at 1030. A rotation by 36° at 1032 places the axis of the double pentagon on the diagonal of the aspect ratio. And a rotation by 54°, shown at 1034, places the top and bottom edges 1036 close to and parallel with the top and bottom of the screen. This orientation make the most of the available height of the 4:3 aspect ratio, and can be used especially in the P-Format, where 90 would represent the dodecahedral equator and the photographed horizon, and the orientation shown here would represent a left-leaning double pentagon. In this orientation, the left and right-leaning P-Format images would be extracted from camera imagers that were horizontal, instead of tilted by 54°.

FIG. 98 shows a schematic representation of a camera mount with locking positions for these degrees of tilt. This type of mount can be constructed with a locking mechanism that allows a camera to be rotated to these positions and click into place. At 1038 is the basic horizontal position; a rotation by 18° is shown at 1040, by 36° at 1042, and a rotation by 54°, shown at 1044. A rotation by 90°, at 1046, places the imager in a vertical orientation. If the cameras are arranged in the P-format wheel of five cameras, this vertical orientation will make a horizontal panorama in the traditional manner, with vertical edges between the segments.

FIG. 99 shows a representation of five pentagon images represented as tilted facets in a 4:3 aspect aspect ratio 1048. This is a simple way of bringing pentagon images together for viewing with a minimum of image processing. By switching between groups of images, one can look around within an overall spherical image using preset increments of motion. The side pentagons 1050 have to be compressed the most to make the edges match; the above-horizon pentagons 1052 are tilted less, and the central pentagon 1054 is hardly tilted at all. An alternate three-up and two down arrangement can also be used, and a portion of the sixth pentagon for the full hemisphere can also be displayed.

FIG. 100 shows a schematic view of a sequence of ten single pentagons arranged in a circular virtual sequence representing most of a spherical field of view, along with a horizontally movable region of interest. This is another simple means of viewing most of a spherical image, and does not involve any image processing such as tilting. To make a continuous panorama, image segments such as 1056 and 1058 are held in a virtual memory, ready to be called up to appear 1060 as part of a movable region of interest, shown at 1062, and in an alternate position at 1064.

COMPRESSED STORAGE TEMPLATES

For recording and distributing pentagonal images, such as on video, a separate recorder and playback device can be used for each camera image, or camera images can be combined into a single storage medium, and then separated for subsequent display. This usually involves some compression of the image and subsequent loss of resolution, and a more complicated process of image retrieval and reorganization for display, but these disadvantages can be made up for by the ease of distribution of such combined multiple-pentagon images on existing single-system playback media such as videotapes, optical disks, and digital media for data distribution. Each template shown here is based on blocks such as standardized squares or rectangles, each containing one pentagonal image. This arrangement greatly simplifies the transfer of the video image data, because computer systems usually are designed to block-transfer whole squares or "tiles" at once, rather than read out individual raster lines within each. While full-sphere storage templates are shown here, it will be understood that other templates based on smaller numbers of pentagons are possible, such as templates based on common four, six, eight and ten-pentagon groups.

FIG. 101 shows a flattened view of the pentagonal facets of a spherical field of view, identified by standardized letters. The top Z pentagon 1066 is shown, along with the above-horizon pentagons 1068, which start with the A pentagon whose top is contiguous with the top edge of the Z, and runs clockwise to E. The below-horizon pentagons 1070 are then shown, beginning with F, still in a clockwise direction relative to E, and continuing to J. Finally, the bottom of the N or Nadir pentagon 1072 is contiguous to that of the J pentagon. This edge is directly opposite and parallel to the A-Z edge.

FIG. 102 shows a square storage template 1076 for condensed storage of a full spherical video image in twelve sections containing single-pentagon images, showing the individual facets and how their edges match. Here the 4:3 video frames in the frame buffer are divided into twelve equal areas, representing the twelve facets of a dodecahedron. The adjoining top edge of the Z pentagon and the A pentagon is shown at 1074. The labelling of the facets follows a roughly clockwise sequence from the top facet to the bottom facet. This arrangement for the pentagons allows the adjacent edges in the image, to be as near as possible to each other, so a viewer can easily perceive relationships among the segments if they are all displayed together. The pentagonal edges could include an extra area sufficient for blending the edges of adjacent images together. This storage template can also be viewed as consisting of two halves, one half 1078 containing the information for the above-horizon pentagons such as the top Z pentagon at 1066, and the other half 1080 containing the information for the below-horizon pentagons such as the bottom N pentagon 1072.

FIG. 103 shows a wide-aspect-ratio 9:16 aspect ratio storage template for the condensed storage of up to twelve 4:3 video images containing single identified pentagons. Each of these pentagons is surrounded by the optional image area to encode additional pentagons, such as for a stereoscopic view. The cropping to a pentagonal border shown here can done beforehand, as this video image is assembled, or later, during the final dodecahedral display of the pentagons. If it is done later, then such outside areas as can be allowed to remain for the time being, so the video frame will appear simply as a grid of contiguous images. This storage template can also be viewed as consisting of two halves, one half 1078 containing the information for point-down above-horizon pentagons such as the top Z pentagon at 1066, and the other half 1080 containing the information for point-up below-horizon pentagons such as the bottom N pentagon 1072. If only a stereoscopic hemisphere such as a dome projection is desired, then both of these halves could contain the point-down pentagons.

FIG. 104 shows a schematic diagram showing the relationship between a video aspect ratio 974 of 4:3 and a square 1084 containing a central pentagon area. At 1082 is the border of an intermediate form of cropping that is wide enough to include the optional image area extending outside the pentagon to make the characteristic keystone shape. This intermediate cropping shape can also be used as the basis for multi-pentagon storage templates.

FIG. 105 shows a storage template in a 4:3 aspect ratio for condensed storage of a full spherical video image in twelve squares containing single-pentagon images. The 4:3 aspect ratio shape of this storage template 1086 allows for the recording of the essential pentagon information within a set of squares.

FIG. 106 shows a storage template in a 1.5:1 aspect ratio for condensed storage of a full spherical video image in twelve dodecahedral divisions, according to the Arno Peters global projection. This projection of a globe has the advantage of relatively equal area everywhere on the global map. For a map of the world, for example, the areas of the various countries in the world are shown in their correct sizes, without exaggerating the size or importance of those in the northern hemisphere, as is usually done, with consequences to world history. Because this world projection keeps these areas in balance, it has been endorsed by the United Nations and other organizations. For working with a global image, the effect would be a minimum of change in the resolution of the source image, so not as much subtraction and interpolation would be necessary to display the images together. This would make such a map need to have somewhat fewer pixels than other types of global projections. Therefore, despite its tendency to distort shapes in an unfamiliar way, it could be the preferred form of displaying the overall spherical image. At 1088 are latitude lines and longitude lines mapped according to the Arno Peters projection, and at 1090 is the side of a pentagon, which in this projection is made to be a vertical line following the alignment of the meridians of longitude. The dodecahedral equatorial edges are shown at 1092. The top edge of a pentagon is shown at 1094, displaying a characteristic curve because, unlike the parallels of latitude, it is a great-circle route. The top edge of the A and the Z pentagon is at 1074.

FIG. 107 shows a storage template for the condensed storage of multiple pentagons in an anamorphically-squeezed 4:3 single-pentagon format, 1096 showing the extraction of up to six separate pentagonal views. An anamorphically squeezed first pentagon is at 904, an anamorphically squeezed second pentagon at 908, and an anamorphically squeezed outside third pentagon is at 912. These are decoded and extracted into a reconstituted first pentagon 1098, a reconstituted second pentagon 1100 and a reconstituted third pentagon 1102. In addition, if field or frame-alternate signal recording is used, then an additional set of three related pentagons 1104 can be recorded, although the overall per-second resolution of the extracted pentagons is necessarily cut in half.

Figure 108A:
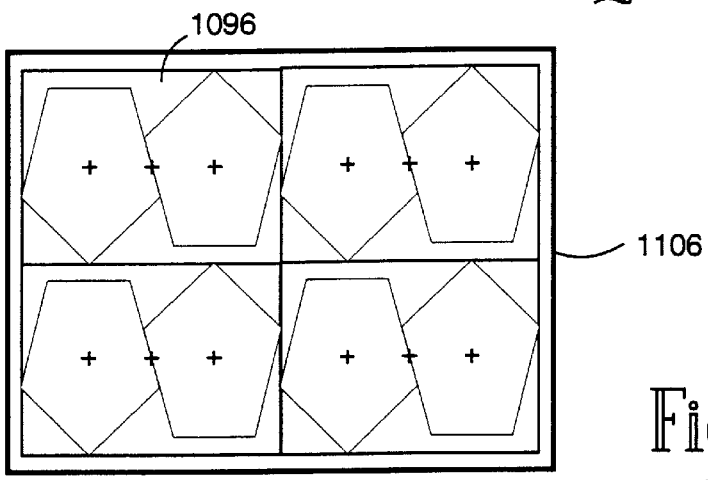
Figure 108B:
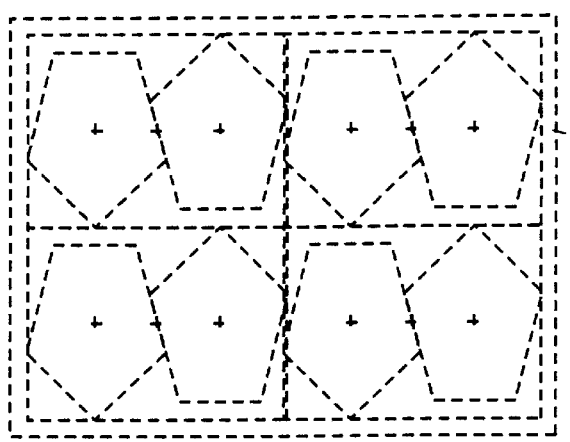

FIG. 108A shows a schematic view of a 4:3 storage template 1106 for up to four anamorphically-squeezed 4:3 images 1096, along with a second set in FIG. 108B 1108 for additional views such as for 3-D. This second set can be done by a separate channel of information, or by field or frame-alternate multiplexing of the original signal.

Figure 109A:
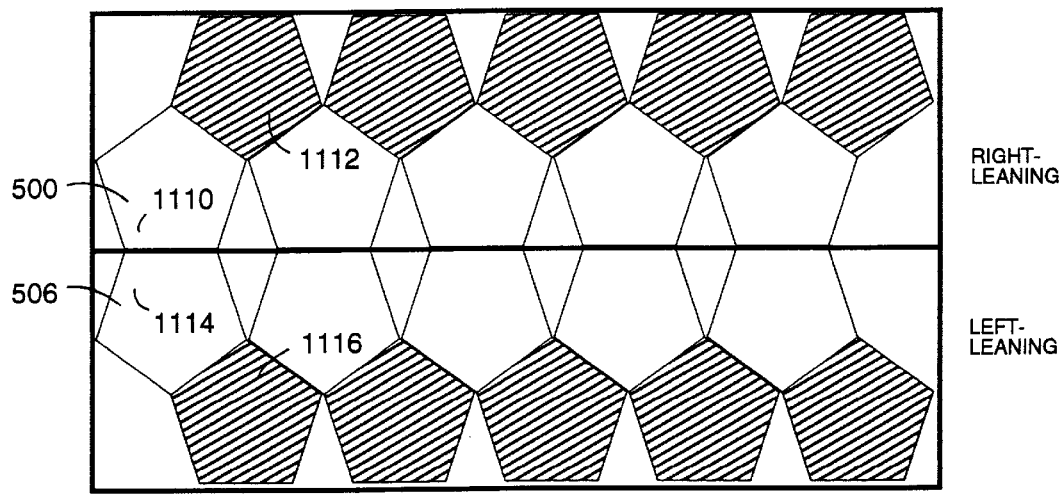
Figure 109B:
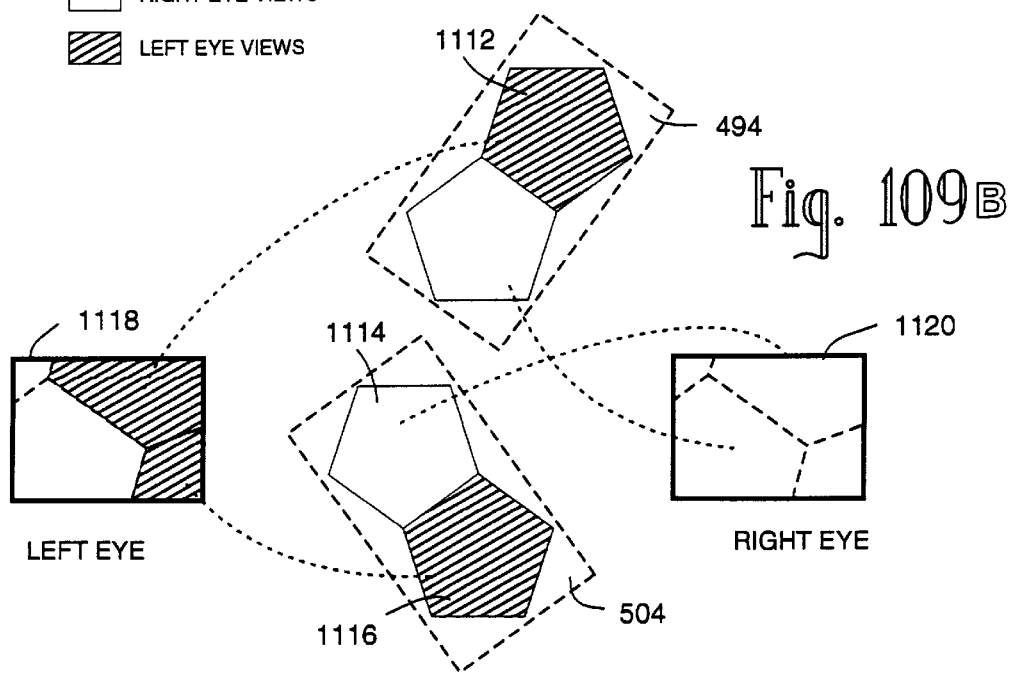

FIG. 109A shows a storage template for the condensed storage of a stereoscopic spherical video image in the P double-pentagon format, showing the right-eye and left-eye views extracted from the right-leaning pentagons 500 along the top half of the frame, and the left-leaning pentagons 506 along the bottom half of the frame. Some optional image areas along the top and bottom of each image can extend into the empty space along the top and bottom of the frame. The right eye portion of a right leaning double pentagon is at 1110, and the left-eye portion at 1112. Similarly, the right eye portion of a left leaning double pentagon is at 1114, and the left eye portion of the left leaning pentagons is shown at 1116. How these are put together is shown in FIG. 109B. At 494 is the area of an original recording of the right-leaning double pentagons, and 504 is the area of an original recording of the left-leaning double pentagons. From these images, two sets of composite views are created in a separate set of frame buffers, where 1118 represents a composite view viewed by the left eye, and 1120 represents a composite view made to be viewed by the right eye. Typically image information is extracted from several sets of double-pentagon images at once in order to make the composite views. When looking at a virtual spherical image, the selected pentagons will change as the region of interest roams around the available sphere.

To prevent the loss of resolution inherent in the condensed storage of multiple images in a single video signal, the separate dodecahedral images can be replayed as separate television signals. For efficient, if slow, transmission of these separate images in a single television signal, the image frames can be multiplexed in sequence, with this television signal then stored on a storage device such as a high capacity random-access memory which allows the multiplexed frames to be replayed at a later time in parallel channels to the viewing device. For real-time live viewing of the separate dodecahedral image signals, these separate signals can also be broadcast as separate television channels.

Current developments in video compression technology are changing the face of braodcasting. The adoption of the Grand Alliance system for digital high-definition broadcasting means that even a 1 GBps HDTV signal can be compressed into a 19 Mbps signal carried over a 6 MHz channel. Groups of standard definition television signals can be fit into this bandwidth as well. Other advances such as C-Cube Microsystems (Milpitas Calif.) and Scientific-Atlanta's (Atlanta Ga.) multi-channel MPEG satellite video delivery system for Viacom networks, and the DigiCipher II system from General Instruments, have expanded the number of stations available to a cable or satellite subscriber to over a thousand, so it is now economically possible to devote even eleven channels, for instance, to the transmission of separate parts of the same dodecahedral image. With a tuner capable of receiving these multiple channels and sending them to the appropriate parts of the virtual viewing system described earlier, then viewers everywhere can have their own unique live experience of looking around within the same wrap-around view. Thus viewers everywhere could share an experience such as walking on the face of Mars, with everyone free to look about in any direction they like.

With the upcoming development of small, high-capacity storage devices, dodecahedral immersive programming could be distributed as a type of multimedia program, even for home consumers. CD-ROMs have already become a standard for such programs, and other, even smaller storage devices are forthcoming, including solid-state memories, HD-ROMs, miniature hard disks based on the Personal Computer Memory Card International Association (PCMCIA) standards, high capacity Digital Videodisks (DVDs) and especially Digital Video Cassettes (DVCs). For a video standard, the usual NTSC (or PAL or SECAM) video could be used, cropped to the wide-screen aspect ratio. HDTV (in whatever standard finally emerges) could be used because it has higher resolution, and an aspect ratio better suited to double-pentagon images. For less expense and lighter-weight equipment, while using the same wide aspect ratio, one of the new 525-line wide-screen systems currently being developed could be used. Any extra manipulation of the video image can be done as a separate step later in a studio, so all that is needed in the field are the cameras and any necessary image recorders.

DISPLAY MEANS

There are three main methods of viewing a composite set of dodecahedral images, front projection on a dome, rear projection on a dome or globe, or virtual viewing. The first two methods relate to the display of the dodecahedral image through a matched set of projectors, and aligned in the same way as the cameras, and the third method displays the images through a computer memory without the use of projectors.

FIG. 110 shows a summary diagram of three possible ways of viewing the information representing a spherical field of view, here shown as a six pentagon hemisphere 1122 and with additional pentagons 1124 for a more spherical image, including an ideal central viewpoint 1126, a point of view from inside a dome 1128, and a point of view on the outside of a translucent dome or sphere 1130.

In the first method of viewing, front projection is done across the interior of a spherical dome and viewed by an interior viewpoint 1128. However, a floor or an audience would tend to limit such a dome display to a hemisphere of six pentagons or less. A recording of a spherical field of view is at 1122, representing the maximum 200° field of view available with six pentagons.

The second method of viewing would be to view the image through rear projection onto a translucent screen according to a viewpoint such as 1130. With a dome, this would mean being able to view only half of a hemisphere, or roughly one-quarter of a sphere. But rear projection has the advantage of also allowing the viewing of a more completely spherical image projected on the interior surface of a globe, called a Teleball™ or GloBall™, so that the audience could view it from the outside. The extended region below the horizon from additional pentagons, up to twelve, is at 1124. Again, the amount of visible area would be limited to a hemisphere, along with the characteristic distortion of a globe, unless the audience moves around the globe or the globe rotates.

The third method of viewing is to map the images into a virtual sphere for viewing through a virtual reality HMD display system such as the Virtual Viewer™. This takes advantage of the ideal viewpoint at 1126, and allows one to look at the total spherical image in every direction.

VIRTUAL VIEWER

FIG. 111 shows a symbolic representation of a virtual viewpoint 1132 established in the center of a spherical field of view, wherein the viewer is free to look around. This spherical field of view is shown with its characteristic dodecahedral divisions 1134. Multiple-pentagon views, whether from a combined source such as those described above or from separate individual sources, can be fed into a frame buffer, preferably digital, in such a way that they are made contiguous and surround the viewer, described previously by the Applicant in a pending application as a "Virtual Viewer™." The buffers are designed through addressing to be circular buffers, with adjacent pentagons contiguous along every edge. This defines a virtual three-dimensional structure analogous to a dodecahedron; such a three-dimensional construct out of memory segments is done through addressing control, so that one is free to move from pentagon to pentagon in every direction.

FIG. 112 shows a block diagram of the components of a multi-channel codec for the construction of a surrounding virtual field of view and the display of a region of interest therein. At 1136 is a receiver for a composite dodecahedral image, consisting of one or more channels of information representing the segments of an overall panoramic image. A codec for the separation of this image into its constituent segments, such as the decompression of multiple channels or the demultiplexing of multiple pentagons, is at 1138. The extracted pentagon information is shown as separate channels at 1140. Either all of the available information is extracted and stored, or, for maximum efficiency and minimum space and bandwidth requirements, only the pentagons that will be required are extracted. The required pentagons are selected 1142 corresponding to a specified mobile field of view, and pieces of the pentagon information are further selected 1144, according to a control signal 1146 specifying the dimensions of the desired region of interest. The center of the gaze of the person viewing the image defines the center of the window of information extracted from the whole. Typically the window will include all or part of several pentagonal sections (an eye's field of view is usually a total area of about four pentagons). The movement of this region of interest can be done through a joystick, or a similar serial control device, or by means of the movement of the tracker in a headmounted display. These image fragments are sent to a viewer buffer 1148 for compositing into a composite image signal 1150, sent to a display device 1152, such as a monitor or a head-mounted display, which displays the extracted region of interest 1154. The use of additional pentagon channels 1156 will increase the receiver, memory and processing requirements of the device, but could lead to greater resolution in the extracted image, and reduce the need for the decompression and demultiplexing.

The Virtual Viewer can also be used for the viewing of a panoramic 3-D image. Here the virtual viewer consists of a linked set of digital frame stores for the left and right-eye views, coupled to a head-mounted display and, if desired, a speed control. The digital frame stores contain the digitized pentagonal images of the camera views for a given moment, divided into left-eye and right-eye views on the HMD.

Movement in time can be controlled by the speed of playback of the recording. When watching a immersive recording of the Louvre, for instance, a person might want to go forward or pause depending on what they are seeing. This control can be done by a separate playback speed control that determines the rate at which the playback machines are supplying digital video information to the frame store. Since all of the playback machines are playing back in synchronization, a single control of the master sync or speed control is all that is needed. Because of their variable-speed qualities, videodisk machines are preferred as playback devices. The digitization and access of large quantities of video information can be time-consuming; for maximum efficiency and optimum performance, two sets of frame buffers can be used, one being accessed by the window determined by the HMD, and the other filling based on the information from the playback rate control. Because playback is done from a pre-recorded scene, there is much less visible lag in response time to viewer movements, as compared to the usual computer-generated virtual reality, wherein the scene has to be continuously recalculated for display.

SELECTIVE DECOMPRESSION

When viewing multiple pentagonal images forming a virtual sphere around the viewer, it is important to present a region of interest with as much resolution as possible, to present the most convincing picture. However, if all of the images are held in the frame buffer at full resolution, then this requires an enormous amount of memory. Usually data compression techniques are used to reduce the amount of data required for a digital image. These data compression techniques can be used to create the compressed multiple images stored in the twelve-square and six-square templates described above. The most common format for this compression used for still images is called JPEG, while other techniques have been developed for motion images, including MPEG, Px64, DVI, wavelets, FST (Four Square Transform), and fractal compression. Fractal compression, although computation-intensive on the compression side, seems to offer the best hope of reconstituting the full complexity of an original pattern from its compressed version, and allowing for a "fractal zoom" which simulates constant resolution even as one zooms into the image.

The dynamic use of a heierarchy of resolutions is included in many popular image formats, such as Kodak's Photo CD methods for encoding still images. The display of the pentagon information can vary according to the speed of movement in the image, such as is done with Apple's Quicktime VR, which uses a lower resolution, highly compressed format for the images when they are in motion, because of the processing requirements for such image updating, and switches to a higher resolution when the image is still.

To allow maximum resolution in the displayed image from a frame buffer of moderate size, the answer is to selectively decompress only that portion of the frame buffer included in the region of interest. This selective decompression of the region of interest can also reflect the higher level of resolution in the center of the field of view characteristic of human vision. Therefore the center of the region of interest can have a greater resolution than the periphery. This higher resolution can be based upon selection from a pyramid of available resolutions, as described in "Networked and Large Image Archives: The Storage and Management Issues" in *Advanced Imaging* January 1993.

PROJECTION MEANS

The display of pentagonal images on a screen enables many applications to expand to include wide-screen views. Here a variety of projectors will be described, with single-pentagon projection shown as an example. However, it will be well understood by those versed in the art that analogous projection according to the disclosed double or triple-pentagon formats can also be done.

The screen upon which any dodecahedral image is projected should be curved, to approximate the original spherical field of view the images represent. This curved screen can be something found in a special-purpose dome theater, or a more temporary kind of screen.

Figure 113A:
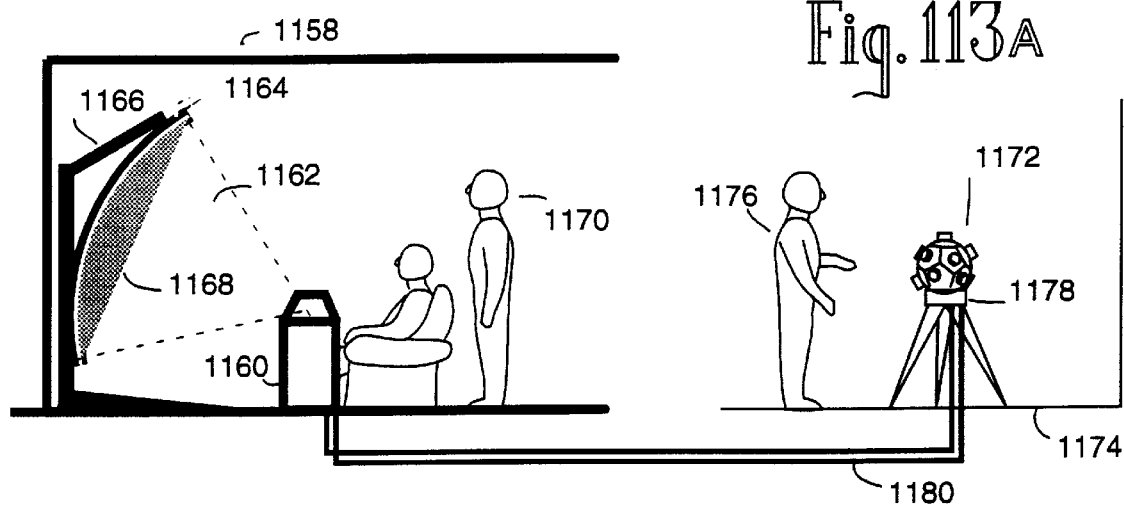
Figure 113B:
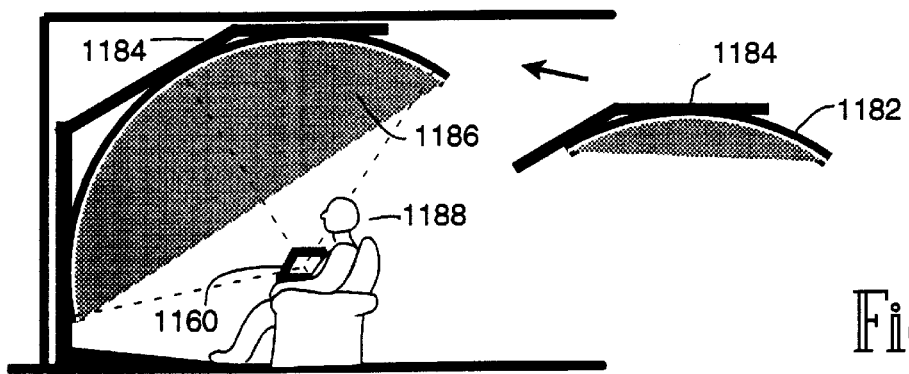
Figure 113C:
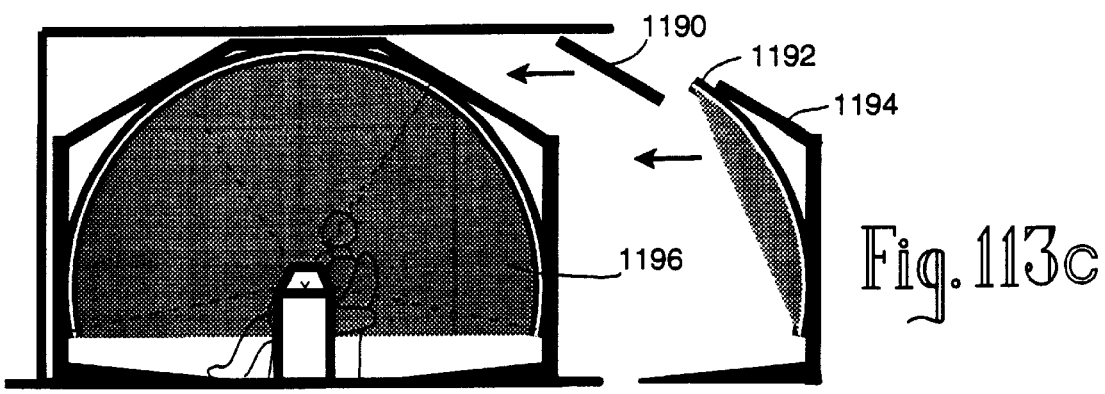

FIG. 113A, FIG. 113B, and FIG. 113C show cross sections of a small personal dome projection screen, capable of being assembled in sections, for displaying the image created by a compact central dodecahedral projector for full or partial dome views. In FIG. 113A at 1158 is the height of the average room ceiling, and a compact dodecahedral projector, such as the modular projectors described later, is as 1160. The projected image 1162 in the first case is cast onto a screen representing one or more above-the-horizon camera views 1164. These above-horizon screen segments are supported by a support frame 1166 that stands on the floor. By adding together screens and projections an apparent field of view of one or more pentagons 1168 in a simple panoramic horizontal sequence is created. The fewer the number of segments, the smaller and flatter the image, so that even an observer standing away the center of the sphere 1170 will see it as relatively undistorted.

The image information coming to this and other forms of video projectors can come live from a compatible dodecahedral camera 1172 in another location 1174, recording another subject 1176 and sending the video signals and any related sound through appropriate transmission means 1178, including any necessary codecs, along the transmission lines 1180 to the projector 1160. Existing twisted-pair telephone lines have a limited bandwidth, but satellite transmission and new fiber optic lines can carry much more information, and thus are more suited to full-motion color video images. At the same time, another camera can be recording the reaction sound and image for transmittal in the other direction. Videoconferencing with such wide-screen views would enable the viewer to experience the feeling of being in the room they are talking to, in a size closer to life-size, and free to look around and see much more than could be conveyed by a narrow conventional rectangular view.

Modular additions to the screen and any compatible camera will expand the displayed overall field of view. As shown in FIG. 113B, a top screen module 1182 can be attached by its support frame 1184 to the above-horizon segments to create a more encompassing field of view of three to four pentagons 1186, which is best seen undistorted by a seated observer 1188 located closer to the center of the dome. As shown in FIG. 113C, with a further added support 1190 to bridge the connections all around, additional above-horizon screen segments 1192 can be added, each with its support frame 1194, to create an apparent field of view 1196 up to a full hemisphere of pentagons, projected by a six pentagon projector, and created by a set of compatible live or prerecorded video sources.

GLOBAL PROJECTOR

The global projector is here presented in four versions. The first is a version for the projection of still film transparency slides. The second is used for the projection of moving images using LCD panels. Both of these versions can use a single internal light source. But an alternate form has the light source outside of the main body of the projector, with the light being channeled into the projector through fiber optic light guides. This has the distinct advantage of removing almost all of the heat and the electric power from the interior of the projector to a source outside of the projection screen which is attached to the other end of the fiber optic cables. The third version uses Digital Multi-mirror Devices to create the video image image for projection, preferably using light sources surrounding the projection array and facing inward. The fourth version of the projector presents video images through cathode rays, either on small CRT screens shining through projection lenses, or by directly exciting phosphors on a spherical projection surface.

The first version of the projector, for slides, presents a transparent image plane through which light passes for the projected image, like the LCD version. Unlike the LCD version, which can present a moving video image, the first version uses film slides as the transparent image plane. These are held in place relative to the projection lens and the light source in much the same way as the LCD panels. These can give a higher resolution projected image for less cost than the LCD panels But changing the image for this projector requires a specialized system of hinged slide mounts and a transport that allows them to be exchanged.

SLIDE PROJECTION

If still cameras such as those with slide film are used for photographing a set of single-pentagon view s, then such a set can be grouped for simultaneous projection using a special slide mount. In this case, the transparent images are grouped around a central light source, and the light radiating out through the slides creates a projection of the overall scene.

FIG. 114 shows a flattened top view of a hinged slide mount for six single-pentagon slides representing a hemispherical view, wherein the slides are hinged to a central view. Opaque plates hold the slides for projection. The central pentagon plate 1198 carries the slide representing the Z view. Another plate 1200 with the B view is attached to it by means of a hinge. These hinges should be flanged so that they do not swing beyond the horizontal; in this way, the plates will flatten out to a horizontal plane that can be lifted as a unit by an outside edge. For further ease in manipulation, the hinges can be made to lock, so the set of slides will form a rigid unit until it enters the projector, at which time the projector touches the releases for the hinges, causing them to swing free.

On each plate is a slide mount 1202 holding the slide 1204 in a precise and secure position. These mounts can either be designed to positively lock slides in place, or be guides that allow slides to be slid into place and held by tension. The edge 1206 of each plate is bevelled to an angle of approximately 58.28°. The cropped pentagonal image area on each slide 1208 is concentric with the face centers of the dodecahedron, and represents a dodecahedron face. This cropping can be the result of a matte applied to the image at the time of film development or duplication, or by a hard matte which is part of the slide mount or the projector. This cropping should have a soft edge; for a hard matte, the amount of sharpness is a result of its distance from the image plane. The opaque pentagon plates can have holes in the area of the pentagon area of the slides; and these holes can be pentagonally-shaped, and thus be the hard mattes for cropping. Note that the outline of the pentagon image is concentric to the outline of the pentagon plate. A shaded area of extra optional image area outside of the pentagons is also shown. An adjacent plate (here with the A view) at 1210 also has the same bevelled edge. When the distance 1212 between the bevelled edges is closed by the plates being brought into contact with each other, then the bevels keep the plates in the proper dodecahedral alignments representing the faces of a dodecahedron. A pull pin knob 1214 is used to manipulate the entire array, and a registration notch 1216 is used to register the slides in the projection apparatus.

FIG. 115 shows a flattened top view of an alternate hinged slide mount for six single-pentagon slides representing a hemispherical view, with the above-horizon slides mostly hinged to each other instead of to the zenith plate. While not as simple as the first version described here, this arrangement offers a narrower overall height. The semi-isolated top plate is shown at 1218, and the hinged edge between adjoining above-horizon plates is at 1220. In a projector for such slides, points 1222 and 1224 would be drawn inward to meet at point 1226, thereby forming the same semi-dodecahedron shape for projection described above.

FIG. 116 shows a special type of projection mechanism is used for the projection of a group of single pentagon images, such as a slide group shown in FIG. 114 or FIG. 115. The path of the slide group is between the inner spherical enclosure 1228 and an outer enclosure 1230, which is pulled away from the inner enclosure to allow space for the movement of the slide group. As the slide group passes over the top of the projection light and stops at the registration pin, the outer enclosure moves toward the inner enclosure, thereby conforming the slide group to the curve of the inner spherical enclosure and locking it in place, causing the pentagon plates to come together along their edges to form a semi-dodecahedron, with the light source 1232 at its center, and the images representing the pentagonal sections of a spherical field of view each shining out through a projection lens located along the optical axis perpendicular to the center of each pentagon image. After the projection is over, the outer enclosure moves away from the inner enclosure, thereby allowing room for the slide group to be pulled out of the projector by the push/pull pin 1234, flattening out as it goes back to its original position in the stack. The push/pull claw then disengages, and advances to the next slide group in line.

The most common form for such slide projection should be a maximum of six slides, for a hemispherical view. Below this, the projected image will begin falling on the audience. However, if this is not a problem, and if the five pentagons below the horizon are photographed, then additional plates with slides can be added to the mount, also by hinges. The optimum form for this is to attach them to the outer edges of the pentagon plates, as in the following illustrations.

FIG. 117 shows a flattened top view of a hinged slide mount for single-pentagon projection, showing additional images added below the horizon for a nearly spherical image. This arrangement has the advantage of being a symmetrical, spiral expansion of the earlier arrangement, and adaptable to an overall spiral contraction and expansion mechanism for projection. An above-horizon plate is shown at 1200, in this case the B view, with the distance between the bevelled edges at 1212. An additional outside below-horizon plate at 1236, for the G view, holds a below-horizon slide image 1238. When all of these plates are brought together to make the dodecahedral arrangement for projection, the bevelled edge 1240 of this plate will adjoin the corresponding edge 1242 of an adjacent outside plate.

FIG. 118 shows a flattened top view of an alternate hinged slide mount for a nearly spherical image. This arrangement has a narrower width, and features two attachments of two plates each to plates from the central group. Plates such as at 1244 and 1246 are attached in this way, and when the various edges are brought together, edge 1240 will adjoin edge 1242.

For double-pentagon photography on film, a special double-pentagon slide projector can also be used. In principle this projector would be the same as the single-pentagon format projector, but here only half of the number of slides and projection lenses would be required to achieve the same coverage of a spherical view.

FIG. 119 shows a flattened top view of a hinged slide mount for three double-pentagon slides photographed according to the X-Hemisphere format, representing a hemispherical view. The various slide mounts are hinged and attached to a central plate 1248. The upper hinged plate 1250 for the upper slide 1252 represents the vertical double pentagon, here shown with a mask 1254 including its optional image area. The lower slide plate #1 1256 and lower slide plate #2 1258 are also hinged to this central plate, preferably by flanged hinges that do not swing beyond the horizontal; in this way, the plates will flatten out to a horizontal plane, and the entire slide mount can then be lifted as a unit. For further ease in manipulation, the hinges can be made to lock, with a release that is activated during the actual loading of the slides into the projector, such as when the registration pin of the projector enters a registration notch 1260 in the central plate. Here also the side double pentagons are shown as including their optional image areas.

FIG. 120 shows dual partial cross sections of a slide projector for the above mount, showing the registration pin 1266 and the central light source 1268. The first partial cross section, according to the line at 1262, shows the upper slide 1250 falling into place according to a support 1270, so that the optical axis for projection 358 will pass throught the center of the vertical double pentagon. The second partial cross section, which is according to the line at 1264, shows the registration pin, which in fact is off-center from the pole, and shows one of the two lower slides 1256 falling into place according to a support 1270, so that the optical axis for projection 422 will pass through the center of the #1 side horizontal double pentagon.

FIG. 121 shows schematic side views showing the sequential manipulation of the slide mount in a slide projector suitable for X Form at double-pentagon images. The slide mounts a re normally held in a flattened position 1276, such as when they are stacked with other such slide mounts in a receptacle 1278. For convenience, such a stack could be a rotary arrangement such as is found in a Kodak Carousel™ slide projector; or the stack could be linear. A push-pull claw 1274 attaches to a manipulation knob 1272 on the slide mount, by means of which it is lifted out of the stack and drawn into the projection apparatus along a path 1280. During this intermediate phase, the plates of the slide mount bend inward, as the plate edges follow a curving path defined by a curved guide 1284 leading into the interior of the projector. At the apex of the slide mount's travel 1280 across the inner curved support 1282, its forward progress is stopped by a post 1266 which goes through a slot 1260 in the mount to a central hole. The releases for one or more plate hinges can be along this slot, to be activated when the post slides into the slot, thereby allowing the plates to swing down. A light source 1268 is at the center of a the curved enclosure 1270 with an outer enclosure 1286 that raises to admit the slide mount and its slides. The outer enclosure then moves downward, thereby locking the slides into position perpendicular to three optical axes: two 31.717473° above the dodecahedral equatorial plane, and the third axis with a declination of 31.717473° down from a line perpendicular to this plane and equidistant from the others, in the characteristic "two down, one up" pattern of the X-Hemisphere format, also shown in FIG. 120 and FIG. 29. Light from the center shines through the three transparencies along these optical axes and passes through three associated double-pentagon wide-angle lenses, thereby projecting three contiguous double-pentagon images of the proper size on a concentric dome screen.

After the projection is over, the process is reversed: the outer enclosure 1286 moves away from the inner enclosure 1282, thereby allowing room for the slide group to be pulled out of the projector by the push/pull claw 1274, flattening out as it goes back to its original position in the stack. The push/pull claw then disengages, and advances to the next slide group in line.

An alternative slide projector using the X-Sphere format could project up to a full spherical image. Of course, such an image would also be projected onto any audience member inside the projection space, and onto any floor or support for such an audience member. To avoid this, the most likely use for such a projector would be in projecting an image from within a translucent sphere viewed from outside, such as an image of the Earth. If a full spherical image is desired, then a variation on the above slide mount should be used which can hold up to six double-pentagon images.

LCD PROJECTOR

The second, LCD panel version of the projector, uses individual Liquid Crystal Display panels to display the individual portions of the overall image, including an image in motion. The preferred embodiment uses active-matrix, high resolution display panels. One example is the Sony LCX007 AK panel, which is capable of displaying both the usual 4:3 aspect ratio used for single pentagon images and the wide-screen 16:9 aspect ratio more suitable for the display of double-pentagon images. Other LCD panels may be used, but usually the smaller the panel, the less the resolution. Small LCD video projectors such as the Fujix Compact Video Projector, the CompView "Lotus" and the Panasonic PT-10L video projector are suitable for grouping together to project a composite dodecahedral image. An even more compact modular projector of LCD panels and a central light source is described in the earlier patent, and in more detail here. Advanced LCD panels capable of displaying full-motion video include the fast passive-matrix panels of Sharp, Sony and other manufacturers. A modular LCD projector such as this can be compact, lightweight, and easy to manufacture, and lend itself to spectacular new forms of video projection, such as animated video globes and portable dome projections.

FIG. 122A, FIG. 122B, and FIG. 122C show oblique, top and bottom views, respectively, of a dodecahedral LCD projection module. As shown in FIG. 122A, the LCD projection module 1288 has beveled edges 1290 that match the dodecahedral dihedral angle of 58.28°. Thus they will form a dodecahedral solid when they are brought together. Each module has a projection lens 1292. This lens should be designed to correctly reproduce the pentagon edges as straight lines on a concentric spherical projection surface. As shown in FIG. 122B, the lens mount 1294 can be of a common type to allow for the use of off-the-shelf lenses if possible. As shown in FIG. 122C, the lens is centered over a pentagonal image area 1296 which represents the center of an LCD panel 1298. The edges of the pentagons can be cropped in the input video signal, or can be physical masks in the path of the light, in the manner of the frame masks in conventional projectors. While the use of electronic masking of the outside image area 1300 means that such cropping must be added to every video image that passes through such a projector, physical masks cannot be changed as readily as electronic masks, and tend to produce a moiré fringe of light near the edges which interferes with proper mosaicking of images together.

FIG. 123 shows a conventionalized cross section of a modular dodecahedral LCD video projector with a central light source for a hemispherical image. This form of single-pentagon cross section is easier to understand visually than a strictly accurate dodecahedral cross section, which tends to look wrong because it is asymmetrical, and includes sections through both edges and faces. At 1302 is the active image area of the LCD with a single pentagon field of view at 1304. An adjacent module is shown at 1306. A central light source 1308 simultaneously shines out through the various modules, each using a condenser lens 1310 to concentrate the light in the LCD image area. The light then passes through the projector lens to illuminate the projection screen. Opaque side walls on each module 1312 prevent light scatter between them.

FIG. 124 shows a silhouette view of a modular dodecahedral LCD global video projector and a concentric global projection surface, made to be viewed from outside, such as at 1130. The central compact dodecahedral projector is at 1314, with the spaces between the projected images at 1316 gradually diminishing to zero (or slightly overlapping) by the time the projected image reaches the concentric spherical projection screen 1318. The seams between the images 1320 can be disguised by a blending of the images through either electronic or physical masks. A support member 1322 supports the projector, and carries the necessary cables for signals, air, and light 1324 into it. Not shown are the baffle plates that would likely extend outward from the central projector, following the spaces 1316 between the projected segments, in order to catch any back-reflections from the projection surface that would contaminate the other images.

FIG. 125 shows a conventionalized cross section of a modular LCD global video projector with a central light source and projection lenses such as 1292, showing support legs for the projector 1326, and extensions of the legs toward the central light source 1328. As long as these extensions are located in line with the dodecahedron vertices, they will not cast shadows on the projection screen, and the number of projection modules can be increased to create a complete spherical image. However, with a contained central light source such as this, it is very important that the support legs include conduits for high-intensity cooling of the light source, to prevent heat buildup within such a confined space, and to prevent heat from the light source from adversely affecting the performance of the LCDs. A vacuum or form of heat shield can also be used to isolate the central lighting chamber from the the LCDs and their associated electronics.

FIG. 126 shows a schematic representation of a dodecahedron projected onto a concentric sphere, showing dodecahedral divisions of the sphere. A projector is here symbolized as a dodecahedron 1330, and an example of the dodecahedral divisions of the image in the projected screen are at 1332

Fiber Optic Illumination

FIG. 127 shows a conventionalized cross section of a modular LCD global projector with a fiber optic remote light source, and individual fiber optic illumination cables for the projection modules. This is the preferred embodiment, because it has the advantage of bringing a cool, bright light source in to illuminate each of the projection modules. The fiber optic illumination cables 1334 carry the light from a remote light source such as the Cermax Xenon lamp. The light source used depends on the amount of surface area to be illuminated by the projector. Small domes could have all of the cables illuminated by a single halide or xenon bulb.

The fiber cables are sheathed in an opaque flexible covering, and can have few or many strands, in whatever thickness is appropriate for the amount of bending the cable has to do inside and outside the projection apparatus. For example, a half-inch diameter solid plastic fiber is still quite flexible. Glass fibers have the advantage of less loss of light over the length of the cable compared to plastic cables, although at the cost of less flexibility. The width of the cable also determines its flexibility. For larger amounts of illumination, such as would be used for large domes, more light sources can be used, each feeding into a smaller number, or even single, cables. The light should have a balanced color temperature within the visible range that will produce a pleasing overall effect to the projected image, and maintain that color temperature consistently over most of the life of the bulb. Brighter bulbs tend to have hotter and bluer light than dimmer, lower-temperature bulbs. To a certain extent, these differences in color can be compensated for by filters applied to the light before it enters the cables.

In a spherical projector, the fiber optic cables pass along the support legs shown in FIG. 3, and are used to illuminate the individual display panels. Other signals, such as for auxiliary cooling fans, individual video signals for the LCD panels, also pass along these legs to the projection array. Hollow legs are preferred, although having the cables pass along the outside of the support legs provides more access for servicing.

FIG. 128 shows a schematic representation of a global projection surface, with pentagonal support legs consistent with extensions of the vertices of a central dodecahedron. Since the outer support legs 1336 enter the globe and extend to the center in the area between the projected image segments, they will not cast shadows on the projection screen, and a continuous image up to a complete sphere can be projected. Similar results can be obtained if the legs, and their extension to the center as supports for the projector, lie along a plane representing a projection from the center of the dodecahedral edges. But this is more constrictive at the point where the support legs enter the projector, since there is less room between the lenses at the modules' edges compared to the space to be had at the vertices. The support of the projector in the center of the sphere can also be done by means of cables or combinations of rigid and stretched supports following these invisible paths. If the area on the top or bottom of the sphere does not have to be illuminated by projection, then the support for the projector and any associated cable can be along a vertical post centered on the dark area. These forms of extensions of the supports represent means for the elimination of cast shadows on the projection screen.

FIG. 129 shows a cross section of an individual fiber optic projection module. Here a single-pentagon projector is shown, with each panel containing the representation of one pentagonal image. The projector structure is modular, to ease the manufacturing process, and so that multiple modules can be assembled or disassembled as needed to project a given number of pentagons. The projection lens 1292 has a field of view at 1338 which in this case is equal to the necessary coverage of a single-pentagon screen. The side walls 1340 of the module have surfaces that align to adjacent modules and are light-tight to prevent the intense light on the interior from escaping. The video and power input cables 1342 are shown attached to the front of the modules, for convenience, while the fiber optic illumination cable 1344 attaches to the back, in line with the optical axis 258. A beam spreader 1346 such as a Galilean beam spreader expands the light beam coming from the fiber optic cable before it reaches the first lenses and the LCD projection panel. Only the central circular portion of the panel need be illuminated for projecting a single-pentagon image, although it may be desirable to spread the beam out further to illuminate the entire panel, despite the loss of brightness in the central area. It could then pass through a clear heat shield, and a polarizing filter. The light then passes through the panel, and carries the image out through the projection lens 1292 to the screen. To minimize distortion and to give the effect of a gnomonic projection of the image (i.e. from the center of the dodecahedron outward) the lens should be as rectilinear as possible. This will make the projected pentagon borders of the images appear as great circles on the spherical projection screen. For a panel such as the Sony LCX007 AK, which has a 1.35" diagonal, the focal length of the lens should be approximately 10 mm, and have a vertical angle of view of at least 74.75°.

The image is cropped to a pentagonal format so that it will match up to the other projected images to form an apparently continuous image area. This masking can be done to the video image before it is projected, or the masking can be done by means of physical light barriers either in front of or behind the lens. For a very wide-angle projection lens such as this, the focus is very close to the front surface of the lens, but some variation in the sharpness, to get a more or less fuzzy edge to facilitate blending, can be done by moving the mask closer or farther from the lens.

FIG. 130 shows a cross section of a remote fiber optic illumination source, and the division of the light into individual illumination cables. A separate illumination source can be used for each cable, for maximum brightness in the display. But if this is too expensive, bulky and uses too much power, then the light can be divided among the cables, although at a major sacrifice of brightness. Here the junction box for the division is shown at 1348, with optional condenser lenses 1350 for each cable. The main illumination cable 1352 can be made from a liquid light guide, plastic or glass, depending on the requirements of transmissibility of light, weight, cost and flexibility. A main cable can be ½" glass or liquid light guide, especially if it has a long distance to run, while, for weight, size and flexibility, a ¼" plastic cable is preferred within the projector itself. The illumination source is at 1354. Many types of illumination sources for fiber optic elements have been used, most based on theatrical bulbs. The preferred source is the Cermax Xenon lamp, especially the low-ozone emission models, which have a brightness up to 6000 lumens entering a ¼" fiber. A parabolic mirror 1356 is usually used to concentrate the light and direct it toward a collimating lens which directs it into the cable. The housing for the light source is at 1358, which usually includes the power supply and cooling fans. Filters 1360 are usually used before the light enters the cable to remove infrared and ultraviolet wavelengths, so that what passes through the cable to the projector is an exceptionally cool, bright, color-balanced light. Fibertech International of Portland OR uses a type of filter that is capable of removing all infrared wavelengths from the light entering the cable.

FIG. 131 features a cross section of the third version of the projector, showing an individual Digital Multimirror Device (DMD) projection module, with its illumination path components. The DMD is a significant advancement in video projector technology developed by Texas Instruments, allowing the fabrication through semiconductor methods of chips with individually variable mirrors representing hundreds of thousands or even millions of pixels. By varying the angle of reflection, light for projection is either transferred into or away from a projection lens. In this generalized design for a modular dodecahedral single-DMD projector, the light source for the DMD is at 1362. This can be a conventional projection bulb, or be the outlet for a fiber optic conduit for a light source in another location. The light passes through a condensor lens 1364 before passing through an RGB wheel or filter 1366 which is synchronized to the red, green and blue components being displayed on the DMD. This can be either a spinning filter wheel divided into red, green and blue sections, or be a liquid crystal shutter alternately displaying these colors. Because of the speed at which the angles of the pixels in the array can be changed, these separate changes can all be done within an overall video frame speed of 30 frames per second. The colored light then passes through another lens 1368 and forms an oblique light path 1370 which strikes the surface of the DMD 1372. The variation of individual pixels is done through compatible components on the support printed circuit board 1374, and any associated electronics 1376, which could be located elsewhere in the projection module, in components attached by flexible connectors 1378. The sides of the projection module are at 1380, representing the planes best suited to align the modules together to the proper dodecahedral alignments. The input signal to drive the display, such as a video signal, is shown at 1342. The variations in reflection of the pixels vary the amount of light passing through a projection lens 1292 to produce a projected image 1338.

SPHERICAL TELEVISION

The fourth type of projection uses cathode rays to form the video images. Here the same principles for single-pentagon global projection can also be seen applied to the projection of double-pentagon images.

FIG. 132 shows a cross section of a spherical television screen with a central X-S format double-pentagon pentagonal image projector, made for viewing from outside the screen. Each projector 1382 projects vertical double dodecahedral images according to a projector lens 1384 and an optical axis such as 1386, with a center of a projected segment shown at 1388. The projector array and the projection screen are supported by a vertical support column 1390 and a base 1396. Note that this vertical support column falls in a kind of "blind spot" at the outermost tips of the bottom three views, at a dodecahedral vertex, as described earlier for the X-Sphere camera configuration. This "blind spot" means that the support will not cast a shadow onto the screen from any of the three projectors.

The fourth form of global video projector would use cathode rays to reproduce the images of the various sections. Miniature Cathode Ray Tubes (CRTs) suitable for a compact projection array could be used, arranged in a geometry similar to that of the other projectors described here, except that the illuminated CRT screen would be the image source, instead of an illuminated transparency. A miniature, high-brightness color CRT made by FDE Associates of Beaverton, Oregon could be used for this purpose. Small CRTs can have higher resolution than most LCD screens, but output less light that projection bulbs, generate heat, are bulky, and difficult to color-balance relative to each other.

Another variation of the use of cathode rays more closely resembles the method of display used in conventional televisions, where each video projector 1382 represents a source emitting a cathode ray producing a raster scan onto a television screen, with a screen 1392 and a multicolored phosphor layer 1394 on this inside of a glass sphere.

The projectors used in a global projector could also be laser projectors, including the mirror-driven raster scan described in the earlier patent, or a more compact laser semiconductor array sufficient to produce a raster scan.

STEREOSCOPIC PROJECTION

If the projected images have been recorded stereoscopically, then they can be shown in 3-D, as long as the right-eye and left-eye views are presented correctly. These methods of stereoscopic projection can be used if the images are viewed from without, as in the spherical television, or from within, such as inside the geodesic curtain screen. One means of 3-D presentation is by using right-eye and left-eye projectors, each using oppositely polarized light, and separations of the images to the right and left eyes by glasses with opposite polarized filters. While a common method, it requires too many components for this application.

A better method is alternate-field projection, involving the multiplexing of the right-eye and left-eye dodecahedral views into the alternate fields of a single video signal. This video image is viewed through liquid-crystal shuttered glasses such as those produced by Tektonix Display Products of Beaverton, Oregon. These alternately blank out the right and left eye in synchronization with the field rate so that the proper view is always presented at the proper time. An infrared transmitter synchronizes the television display and one or more glasses. To eliminate the flicker that is sometimes still visible with this approach, the video frame rate should be doubled to 60 frames per second. This also has the advantage of preserving all of the video information in the original dual signals. A dodecahedral 3-D image would be extraordinary in its impact, whether it was presented in a head-mounted display, inside a dome theater, or in a spherical television such as that described above. A spherical television with such an image would have an uncanny "crystal ball" effect.

An alternate method of presenting a stereoscopic image which could eliminate the need for viewing glasses is especially suited to the spherical television. Here the multiplexing of the right and left-eye views is done between the pixels. In other words, the right and left-eye pixels alternate, so that right-eye and left-eye views appear as alternate vertical stripes. These stripes are matched by long lenticular elements on the outer glass. These lenticular strips bend the light from the images so that each eye will see a different set of views, in the same manner as stereoscopic postcards. Because of the curvature of the glass, this 3-D effect would be most pronounced toward the middle of the screen; as the glass curves away in all directions from this relatively flat center, the image, and with it the stereo illusion, tends to disappear. So if one walks around such a sphere, one would always see a three-dimensional, relatively undistorted image, surrounded by a blurry haze out to the edges of the sphere. Here a television forming a complete sphere is shown. However, A smaller portion of a sphere could also be used, such as a hemisphere, or a ⅞ sphere sufficient for the display of eleven single-pentagon views.

DOME PROJECTION

For the projection of images in a dome theater, a variety of approaches can be used to better accomodate the audience, and to make use of existing and upcoming types of video projectors.

FIG. 133 shows a cross section of a dome theater showing peripheral off-axis projection, and the use of a mounted mirror for the vertical view. The dome projection surface 1398 is usually supported by an integral framework behind it. An outer shell 1400 can be used to mount speakers, lights, and sound control baffles and reflectors. The seats 1402 can be fixed or allowed to swivel to allow for the audience to follow the action in several portions of the hemisphere. Motion control seating is increasingly being used by many companies for greater effect in the projected program. Usually, the best seating is located toward the center of the dome. The more mobility is allowed the seats and the audience, the smaller the seating capacity of the dome. A viewer 1404 is shown to scale for this 42' (12.8 m) diameter dome.

Most existing powerful theatrical video projectors are large in size and are not made for the extremely short, wide-angle throw that would characterize the ideal dodecahedral projection from the center of the sphere. An array of projectors in the center of the dome would also tend to block the view of the audience. Therefore, to clear the central area and still achieve clearance of the audience during projection, the projectors 1406 should be located around the periphery, with the axis tilted upward such as at 1408, at a level below the dome center 1410. This allows for the projection of the above-horizon pentagons down to, or below, the horizon, even to their full extent more than 10° below the horizon. For the vertical pentagon, the vertical axis is shown at 1412. To achieve the optimum throw distance, and to keep the projector out of the way of the audience, the vertical projector can be kept under the floor 1414, and reflected vertically off a mirror 1416. The projection beam thus emerges from a relatively small well or glassed-over opening that occupies a minimal part of the prime seating area in the center of the dome. If off-axis projection is used for the central projector as well, this opening can be moved away from the exact center of the dome. The projector and mirror can be part of a general service area 1418 underneath the audience, which can also hold the playback and monitoring equipment for the theater.

FIG. 134 shows a composite cross section of a dome screen showing peripheral projection, off-axis projection and the use of mounted mirrors for extended throw distances. The ideal location of a projector at the center of the sphere is shown at 1420. However, because of the constraints of existing projector manufacture, and because of the need to clear the central space for viewing, the projection will usually be done from farther away, around the periphery of the sphere, such as at 1422. In this position the optical axis still passes through the center of the sphere, and is perpendicular to a dodecahedron face. Projection from across the diameter of the dome has the effect of creating a slight pincushion distortion of the image, due to the varying distance of the screen to the lens, that can tend to correct for any barrel distortion in the original camera lens image. However, projection from across the dome creates a projection path where the beam occupies much of the area below the horizon that would normally be occupied by the audience. Therefore, this audience would be casting shadows on the screen. In the case of the projector for the vertical segment, 1424, the projector would have to be located closer to the center at an intermediate throw distance, because it is unlikely that a large area would be available below the floor for the full throw distance, and it is also not desirable to occupy a large part of the floor area in the center with the area of the projection beam.

The goal for every projected single pentagon 1426 from a side projector is to reproduce the appearance of a pentagonal division of a concentric field of view, without the projection beams falling onto the area of the audience. This can be accomplished for the side projectors even if they are moved to a new offset position to create an offset optical axis 1428. The image created by this offset projector 1430 can be corrected by means of a keystoning adjustment to reproduce the correct appearance of the projected segment. Some types of projectors or projection lenses may require an even farther throw distance than the diameter of the dome. Such a position is shown at 1432. But to conserve space, a mirror 1434 can be used for this peripheral projector as well, placing the projector at a position 1436 still close to the periphery of the dome. With the use of off-axis peripheral projectors, the effective lower limit for the projected image is shown at 1438, well below the horizon. This limit can be raised to the horizon or above, by means of further cropping, if there is a need to have a greater clearance between the audience and the projection beams.

FIG. 135 shows a cross section of dome screen projection showing the use of mounted mirrors for extended throw distances. This arrangement is useful for full or partial domes using inexpensive projectors with long required throw distances. The peripheral projector for the top segment is shown at 1440, with the image deflected off of a large central mirror 1442. The side projectors 1444 are also deflected from mirrors 1446. This arrangement is especially useful for a partial four-pentagon screen, because the viewer is able to take a vantage point behind the mirror 1446 that would otherwise be occupied by the projector.

Although three-gun RGB CRT projectors can be used, to maintain better consistent convergence and color, other types of projectors are preferred. The hybrid Hughes/JVC lightvalve projector is the current state of the art, and can be used for dodecahedral projection to fill a screen up to 60 feet (18.32 m) in diameter. Upcoming Digital Multimirror Device (DMD) projectors are preferred in the next generation, because of their high brightness, compact size, and consistency of image. For these bright projectors, the screen surface should have a low relectivity of around 25–30% to minimize cross-reflections within the projected full-dome image.

SCREEN MEANS

In addition to more conventional rigid dome shells, such as are made for planetariums and other dome theaters by such companies as Spitz Domes, new forms of dome screens particularly adapted to the display of dodecahedral images can be employed. Each of these screens is constructed with seams that follow the pentagonal divisions of the dodecahedral image. This not only aids in the alignment of the image to the screen, and the alignment of any multiple image projectors, but also serves to disguise the seams in the image and make it appear more continuous.

Geodesic Curtain Screen

FIG. 136 shows a cross section of a novel geodesic curtain screen, showing the suspension elements and the position of peripheral projectors. This dome can be folded up and left as a ceiling assembly, out of the way of the floor, until the need arises to lower all or part of it for projection. The geodesic curtain screen consists of sections, all attached to a ceiling 1448 by means of an anchor platform 1450 with suspension struts and pulleys 1452 attached to motorized reels for cables 1454, and these cables are attached behind the screen surface. The inner struts and cables are shown at 1456, responsible for the partial contraction of the screen, to a much lesser extent than the outer struts attached to the outer support 1458 for the inner projection screen surface 1460. The supports for each section are designed so that the sections of the screen will separate and fold up when pulled upward by their respective cables. These cables pass over pulleys attached to the anchor platform attached to a ceiling, whether of a conference room, living room, warehouse, or convention hall. The cables are coupled to motorized reels; by energizing the motors, the cables can either be reeled in or let out, thereby drawing up or letting down the sections of the geodesic curtain. Note that here a space is left open around the base of the screen, so audience members can pass in and out, and also to allow sound to escape from within the screen, minimizing distorting reflections. If the interior needs to be lightproofed, then a separate regular curtain can be added either to the bottom of the screen, or separately supported to minimize the weight put onto the geodesic screen. Projectors will display dodecahedral images upon such a screen, either from a composite central projector such as that described above, or from separate projectors 1406 located around the periphery. For convenience, the zenith's projector 1414, can be made to shine into a central mirror 1416 which then reflects the image upward.

FIG. 137 shows a cross section of a portion of this screen, showing the types of hinging elements used for the screen sections and how they interact during extension and retraction. Note that the screen sections are actually flat, but by coming together in a controlled way they create an overall surface that is effectively spherical. A strut attached to the anchor platform 1450 has a pulley 1452 attached to a motorized reel for a cable 1454. A rigid suspension member 1462 is attached to a section of the screen that does not move, such as the sections of the screen closest to the top. Contacting flanges in the support frames are shown at 1464 and a screen section is shown at 1466. The sections are grouped into folding panels. Inside each folding panel are struts between the sections that are attached by limited-travel hinges 1468, separated along their outer edges, providing a certain small amount of flex to create the spherical curvature of the screen. This amount of flex is limited by flanges on bolts going through holes through the struts, or by other limiting means such as loose, U-shaped elements along the outer edges. When a strip of folding panels is pulled upward at its lower end such as by a cable attached to an anchor point, the outer edges of these struts come together and the sections straighten out within the panel to a flat plane which resists further bending. It thus can be treated as a planar surface, and folded and stacked efficiently with other sections. The hinges connecting the folding panels are of two types: front-surface and back-surface hinges. The back-surface hinge 1470 is designed to fold inward, towards the projection surface 1460, along the line of travel 1472, thereby separating the flanges along their rearmost edges. The front-surface hinge 1474 is designed to fold outward, away from the projection surface. These hinges between the panels occur in an alternating sequence along a strip of folding panels. When the cable attached to the bottom of the strip at 1476 is contracted, the inner sections flatten as shown at 1478. When the strips are extended, the various panels and sections form a facted projection screen with an overall spherical curvature 1480, suitable for the projection of a dome image.

FIG. 138 shows a flattened top view of a one-fifth section of a geodesic curtain screen, showing the patterns of the major and minor support elements behind the projection surface. The overall structure of this particular geodesic curtain is a three-frequency triacontahedron (also known as a Triacon) geodesic dome, which can also be described at a 6-frequency icosahedron (Class II). It is made up of six constituent geodesic edge lengths 1482, shown here as A through F. The lengths, expressed as a proportion of the overall sphere's radius are:

A=0.22425
B=0.26427
C=0.21877
D=0.25562
E=0.20604
F=0.23182

These are used to form a large triangle 1484, a medium triangle 1486, and a small triangle 1488. The use of the Triacon breakdown offers the advantage of always yielding some divisions which represent the edges of a dodecahedron, such as at 1490; this simplifies the task of aligning several pentagonal images. The greater the number of facets, the greater the spherical curvature; the structure here represents a balance between maximum spherical curvature with minimum construction complexity.

Around the center at the top of the dome 1492 are portions of the curtain screen that are fixed in place, such as at 1494 for the section shown, and 1496 for the segments not shown in this illustration. The minor struts, forming the supports within each folding piece, are shown in lighter lines, such as at 1498, while major support elements, forming the edges of the folding pieces, are shown as bold lines. The separations, also known as gore paths or sinuses 1500 visible in this flattened view show its separate sections. One of the strips in the lower center is shown detached only to prevent overlap with the adjacent pieces in the illustration When these strips of sections meet along their edges, they form a faceted screen with spherical curvature. The folding pieces are connected along each strip by alternately front surface hinges, 1502, close to the projection screen, and back surface hinges 1504, between the back supports. As the strips contract, side by side edges in the strips will contract in opposite directions, preventing the strips from sliding atop each other. Each strip is raised an lowered by at least one cable anchor point at the bottom 1506. For purposes of neatness, the triangles along the very bottom of the strips should be cut to make an overall straight line across the bottom of the unfolded screen.

The geodesic screen should be as lightweight as possible, to aid in its portability. For example, the projection surface can be a lightweight canvas, stretched over lightweight wooden struts. Or the projection surface can be thin Styrofoam panels, with hardened edges and struts glued to their backs. Such a geodesic curtain can be useful in many situations. Because the deployment is controlled by the suspension cables, a number of segments covering an area of less than a hemisphere can be deployed and the partial curtain will still maintain its proper spherical curvature. If only three pentagonal sections around the horizon need be seen, for example, only that portion of the geodesic curtain need be deployed, and the other segments of the curtain can remain folded, or not be included in the curtain assembly.

Modular Great Circle Screen

FIG. 139 shows a top view of the framework of another kind of dome screen, made of sections that can be disassembled and easily packed, and designed according to geodesic great-circle divisions of the sphere. The constituent parts of this dome are extremely simple, and are related to the parts of a dodecahedron shown in FIG. 3. The framework of this dome has struts of only three lengths, corresponding to the radius, altitude and half-edge of a dodecahedral pentagon, as projected onto a concentric sphere. The long strut 1508, the medium strut 1510, which is 84.86% of the length of the long strut, and the short strut 1512, which is 55.93% percent of the length of the long strut. These struts are attached at hubs (the lengths of the struts are measured from hub center to hub center). These hubs are again of only three types. The large hub 1514 corresponds to the center of the dodecahedron face, and has ten sets of equally-spaced radial holes. The medium hub 1516 corresponds to the vertex of the dodecahedron face, and has six sets of equally-spaced radial holes. The small hub 1518 corresponds to the center of the dodecahedron edge, and has four sets of equally-spaced radial holes. When these elements are put together, they form a graceful, lightweight and extremely strong dome framework 1520 that lends itself to hemispheric and dodecahedral divisions.

FIG. 140 shows a schematic view of the components of this modular screen frame, with the long strut 1508, the medium strut 1510, and the short strut 1512, along with the large face-center hub 1514, the medium face-vertex hub 1516, and the small edge hub 1518, with bolt holes in each for attachment. A preferred material is 1/8" thick rounded-edge square aluminum tubing, for the frame, and 1/8" sheet for the hubs.

FIG. 141 shows a representation of a four-pentagon projected view, created by four pentagonal projectors 1522 displaying their images on a four-pentagon partial dome screen 1524, including the optional outside image areas. Such a four-pentagon screen is a useful configuration because it roughly fills a normal field of view, and is roughly equivalent to the OMNIMAX film image. The same field of view could also be created by two double-pentagon projectors.

FIG. 142 shows a perspective view of a partial dome screen representing a three-pentagon view. A three-pentagon view has one fewer projected segment than the four-pentagon view above, so is less immersive, but is better suited to cases where a shallow dome needs to be filled with an image. Here an assembled three pentagon screen 1526 is shown in a raked configuration, supported by curved vertical support struts 1528 that follow the lines of meridians of longitude, and are also formed by the use of the modular support frame elements described above.

FIG. 143 shows a cross section of the framework and the screen covering for the modular dome screen. A screen panel 1530 is a curved surface suitable for the projection of an image. A preferred shape is a kite-shape section described below. A preferred material is Celtec™, a white foam Polyvinyl Chloride sheet which is opaque, can be heat-formed to a spherical curvature over wooden or aluminum molds, resists discoloration, and is not brittle. Another material that can be used for the creation of translucent screen panels for projection, suitable for viewing both inside and outside the dome, is polyethylene. Each lightweight panel can be attached to the frame 1532 by means of Velcro™, which allows it to be taken on and off as needed. This cross section shows a long strut in the middle 1534 and a short or medium strut on either side 1536. Here too is shown an optional speaker 1538 attached to the back of the panel. With technology such as is used by Sound Advance Systems of Costa Mesa Calif., transducer speakers can be directly attached to panels to vibrate them as membranes, thereby eliminating the need for perforated screen material to allow sound waves to pass through, since the screen itself becomes in effect the speaker membrane.

FIG. 144 shows a perspective view of a sphere, showing how each kite-shaped division 1540 of this modular screen represents a fifth of a pentagon, formed to a spherical curvature which matches that of the overall sphere, as can be seen in the cross-section 1542. This kite shape is made up of two of the essential divisions of this framework, consisting of a triangle bounded by the three different struts. This triangle defines the smallest identical division possible of a sphere. The alternate pairing of these triangles, along the medium strut to make a larger triangle, is less preferred as a screen shape because it is more difficult to manufacture and to handle. After the desired number of pentagon sections are assembled, to round off the edges of the assembled screen, a certain number of the screen panels should be made in the small single-triangle shape.

FIG. 145 shows a top view of one assembled section of this screen, along with its covering, and showing the mounting of an attached speaker. Here once again we see the long 1508, medium 1510 and short struts 1512, along with the large 10-hub, 1514, the medium 6-hub 1516, and the small 4-hub 1518. The velcro used to attach the panel to the frame on the outside edge 1544 is half the width of the frame, while the Velcro along the center 1546 is the full width of the frame, since it is not adjacent to any other panel edges. The attachment of the panels by means of Velcro has the effect of naturally isolating their sound vibration from the frame, making them better as transducer speaker membranes. A speaker array is shown attached to the back of the panel, with a small speaker 1548 and a large speaker 1550 optionally anchored to the frame by means of clamps 1552.

Through the use of dodecahedral imaging, a new and more comprehensive view of the world becomes possible. The easy production of wrap-around images of real environments will lead to greater awareness of the unique places on this Earth, and the addition of special effects to these images will take the viewer to new realms of the imagination. Taken together, these techniques and tools for immersive imaging can define a new creative medium for the 21st Century.

I claim:

1. An improved method for photographing a wide field of view up to a complete sphere, including the steps of:
   centering a dodecahedron inside a concentric sphere representing a spherical field of view, and evert extension of the faces of said dodecahedron onto said sphere, thereby forming twelve pentagonal sections; and
   placing within the sphere at least one movable camera having a field of view of at least one pentagonal section; and moving the camera so as to produce a succession of images, each image being of a different section of the wide field of view from the preceding image, which images together form a composite image of the wide field of view; and combining the images to produce a record of the appearance of the wide field of view.

2. The method claim 1, wherein at least one pentagonal section is recorded more than once from offset points of view, for a stereoscopic effect.

3. A camera apparatus for recording the appearance of a wide field of view up to a complete sphere, by making use of six equally-spaced alignment points, comprising:

at least one subcamera, each subcamera comprising a lens having a field of view sufficient to encompass two adjacent pentagonal sections of a spherical field of view divided according to the projection of a concentric pentagonal dodecahedron; and means for centering said field of view on at least one of the six horizontal dodecahedron edges immediately above and below an equatorial plane equidistant from opposite vertices and bisecting said pentagonal dodecahedron.

4. The camera apparatus of claim 3, wherein said means for centering include a movable support member coupled to said subcamera, for the successive realignment of said field of view to produce a plurality of successive images.

5. The camera apparatus of claim 3, further including including the bisection of said spherical field of view into two halves of three dual-pentagon images each, according to a hemisphere base plane tilted approximately 54° relative to said equatorial plane, and wherein one double-pentagon image in each of the two halves is inverted.

6. The camera apparatus of claim 3, wherein said means for centering include alignment mount surfaces in the form of modular geometric shapes, comprising a rectangle with a short side and a long side, wherein the ratio of said long side to said short side is approximately equal to the Golden Section, and a trapezoid comprising three of said short sides and one of said long sides.

7. A camera apparatus for recording the appearance of a wide field of view up to a nearly complete sphere, by making use of a set of ten equally-spaced alignment points in a single plane, comprising:

at least one subcamera, each subcamera comprising a lens having a field of view sufficient to encompass two adjacent pentagonal sections of a spherical field of view divided according to the projection of a concentric pentagonal dodecahedron; and means for centering said field of view on at least one of the ten decahedron edge centers defined by an equatorial ring plane bisecting and equidistant from opposite faces of said pentagonal dodecahedron.

8. The apparatus of claim 7, wherein said means for centering include a movable support member for successive realignment to adjacent positions selected from among said ten dodecahedron edge centers thereby producing double-pentagon images which overlap in a manner suitable for stereoscopic effects.

9. The apparatus of claim 7, wherein said means for centering include a movable support member for successive realignment to to either the odd or the even positions selected from among said ten dodecahedron edge centers, thereby creating a set of up to five non-overlapping double-pentagon images which cover a nearly complete spherical field of view.

10. A camera apparatus for recording the appearance of a wide field of view up to a complete sphere, comprising:

at least one subcamera, each subcamera comprising a lens having a field of view sufficient to encompass two adjacent pentagonal sections of a spherical field of view divided according to the projection of a concentric pentagonal dodecahedron; and;

means for centering said field of view on one or more of a first set of six selected dodecahedron edge centers which also represent the vertices of a concentric octahedron.

11. The camera apparatus of claim 10, wherein said means for centering include a movable support member for the successive realignment of said field of view to at least one of said first set of selected dodecahedron edge centers.

12. The camera apparatus of claim 10, with a second set of six selected dodecahedron edges being determined by the rotation of said concentric octahedron by approximately 72 degrees, according to an axis of rotation equidistant from all of the vertices of said octahedron whereby double-pentagon images taken according to the second set of six selected dodecahedron edges will at least partly overlap double-pentagon images taken according to the first set, said overlap being suitable for stereoscopic effects.

13. A camera apparatus for recording the appearance of a wide field of view up to a complete sphere, comprising:

at least one subcamera, each subcamera comprising a lens having a field of view sufficient to encompass three adjacent pentagonal sections of a spherical field of view divided according to the projection of a concentric pentagonal dodecahedron; and means for centering said field of view on one or more of a first set of four selected dodecahedron vertices which also represent the vertices of a concentric tetrahedron.

14. The camera apparatus of claim 13, wherein a rotated position for a second triple pentagon image is created by a rotation of said centering means by approximately 90°, according to an axis connecting the centers of opposite edges of said tetrahedron, thereby creating an overlap of portions of a first triple pentagon image and said second triple-pentagon image for stereoscopic effect.

15. An optical apparatus for the transmission of images across crossing light paths, comprising:

A plurality of divided lens element sets, each divided lens element set capable of transmitting light along an optical path, said optical path including a central optical axis and representing a lens field of view, capable of being focused on an image plane, each divided lens element set comprising a front lens element and a rear lens element, A rigid mount array comprising a plurality of parallel opposite faces, and an opening in each of said faces containing a coupling for a coupled lens element, said coupled lens element selected from the set consisting of front lens elements and rear lens elements, so that the only light entering or leaving the array will be through said coupled len elements, and so that said front and said rear lens elements will form a divided lens element set along an optical axis that crosses the center point of said rigid mount array, with no part of any of said divided lens element sets blocking the transmission of light across said rigid mount array along any of the optical paths of said divided lens element sets, A plurality of cameras, each of said cameras coupled to one of said rear lens elements, and each designed to record the appearance of the image presented on said image plane.

16. The apparatus of claim 15, wherein said front and rear lens elements are designed to create an optical path which includes a nodal point roughly congruent to said center point of said rigid mount array.

17. A temporal offset optical mount apparatus for minimizing parallax differences through the use of one-frame increments of distance according to a given rate of movement, comprising:

A plurality of cameras in a row, beginning with a base reference camera, said cameras with lenses arranged so that their nodal points have an approximately equal spacing apart along an alignment line, Synchronized separate recording means for producing an image record for all of said cameras, according to a constant time scale of frame divisions, Means for measuring the rate of movement of said cameras in a direction parallel to said alignment line, Means for adjusting the amount of said approximately equal spacing to a distance divisible by the distance covered over a one-frame span of time by one of said nodal points, Means for subsequently adjusting the image record of a selected camera by a number of frames representing the number of one-frame spaces between it and the base reference camera.

18. An improved camera apparatus for recording the appearance of a wide field of view up to a complete sphere, comprising:

up to six subcameras, each subcamera comprising a lens having a field of view of at least one pentagonal section of a spherical field of view divided according to the projection of a concentric pentagonal dodecahedron; and a rigid mount coupled to the subcameras, and arranged to orient each lens to face inward along an optical axis crossing the center point of the dodecahedron.

19. Recording apparatus especially suited for the recording of nearly spherical views, comprising:

a camera array having a center point and an overall field of view of most of a sphere, the camera array comprising multiple cameras, each of which covers a segment of the overall field of view, the camera array having a blind spot including at least one segment of the field of view and extending outward from the center point, the blind spot being invisible to the camera array; and recording equipment coupled to the camera array and disposed within the blind spot.

20. The recording apparatus of claim 19, further comprising means for transportation of said camera array and said recording equipment together in a wheeled conveyence.

21. The recording apparatus of claim 19, further comprising means for transposition and combination of image information from multiple video camera feeds to record up to three pentagonal views on one video recorder without substantial image compression.

22. A modular global video projector for the projected display of up to an entire spherical image, comprising:

at least one light source, the light source being directed into a plurality of fiber optic light guides;

a projector array comprising a plurality of projector modules, each module being coupled to at least one of said fiber optic light guides, and each module producing an image segment projected outward through a lens, the projector array producing through the projector modules a contiguously arranged composite of image segments; and a support structure connected to said projector array.

23. The modular global video projector of claim 22, wherein each projector module uses a Digital Multimirror Device (DMD).

24. The modular global video projector of claim 22, comprising means for avoiding cast shadows in a spherical image projected on a screen surface.

25. An easily assembled modular screen for a dome theater, comprising:

a modular framework of geodesic great circle lengths, the lengths having dimensions corresponding to the radius, altitude and at least one half of an edge of a spherical dodecahedron, as projected onto a concentric sphere; and a plurality of screen elements attached to the modular framework, each screen element having a curvature corresponding to the concentric sphere and a standardized shape, with edges corresponding to said lengths, and means for attachment to said framework.

* * * * *